| United States Patent [19] | [11] Patent Number: 4,642,425 |
|---|---|
| Guinn, Jr. et al. | [45] Date of Patent: Feb. 10, 1987 |

[54] TELEPHONE PAGING SYSTEM AND METHOD

[75] Inventors: William H. Guinn, Jr., Lilburn; Richard M. Corbett, Atlanta; Robert S. Bundy, Shellville; Jeffrey M. Seaman, Lilburn; Keith B. Duncan; Charles M. Link, II, both of Lawrenceville, all of Ga.

[73] Assignee: BBL Industries, Inc., Atlanta, Ga.

[21] Appl. No.: 608,048

[22] Filed: May 7, 1984

[51] Int. Cl.[4] .............................................. H01Q 7/00
[52] U.S. Cl. ...................................... 379/57; 379/250
[58] Field of Search ................. 179/2 EA, 2 EC, 2 E, 179/18 BF, 99 R

[56] References Cited

U.S. PATENT DOCUMENTS

| 3,836,726 | 9/1974 | Wells et al. ............................ 179/41 |
| 3,872,261 | 3/1975 | Shinoi et al. ............... 179/18 BF X |
| 3,909,550 | 9/1975 | Villadsen ..................... 179/18 BF X |
| 4,178,476 | 12/1979 | Frost ........................................ 179/2 |
| 4,262,171 | 4/1981 | Schneider et al. ..................... 179/18 |
| 4,280,022 | 7/1981 | Sekiguchi et al. ......... 179/18 BF X |
| 4,313,035 | 1/1982 | Jordan et al. ........................... 179/18 |
| 4,577,060 | 3/1986 | Webb et al. ......:................ 179/2 EC |

FOREIGN PATENT DOCUMENTS 0040954 2/1981 European Pat. Off. .
1450971 9/1976 United Kingdom .

OTHER PUBLICATIONS

*High Technology*, vol. 3, No. 3, pp. 44–47, Mar. 1983.
U.S. patent application Ser. No. 495,803, "Paging Network", Webb et al.

*Primary Examiner*—Robert G. Lev
*Attorney, Agent, or Firm*—Willian Brinks Olds Hofer Gilson & Lione Ltd.

[57] ABSTRACT

An improved telephone paging system and method are disclosed. The sytem interfaces with a conventional telephone branching system, such as a PBX, and remote pager devices which are worn by subscribers to the system. A plurality of PBX extension telephone lines are connected to the system via a subscriber line interface, and one PBX extension line is connected to this system via a control line interface. The subscriber line interface is used to detect ring signals on the selected extension lines. When a ring signal has been detected on a selected line, the microprocessor-based system sends command signals to the PBX to place the incoming call on hold. The system identifies a paging code signal distinctively corresponding to the subscriber line on which the ring signal was detected. The identified paging code signal is sent to a transmitter which transmits the paging code signal to all pagers within its range. The pager which distinctively corresponds to the paging code signal will be activated and produce a paging signal. The subscriber may then retrieve the parked call from the PBX via any PBX extension line. To perform these functions, the subscriber to the disclosed telephone paging system may also enable or disable his pager, test his pager, or directly page another subscriber via the dedicated command line. To perform these functions, a subscriber calls the extension phone number corresponding to the command line and depresses the telephone keys which represent certain instruction in response to command signals sent by the microprocessor. Other embodiments of the telephone paging system are disclosed that interface with a PBX with a directed-call-pickup feature and that permit additional extension lines to be connected to the system.

41 Claims, 7 Drawing Figures

4,642,425

TELEPHONE PAGING SYSTEM AND METHOD

BACKGROUND OF THE INVENTION

This invention generally relates to a telephone paging system and method, and in particular to a system and method for transmitting paging signals based on calls directed to selected telephone extension lines.

It is not uncommon for people to be away from their telephones when they ring. If someone else is not present to pick up the call, an important message might be delayed or missed. And even if someone else does answer the phone, the message may still be delayed or missed if that person does not known the immediate whereabouts to how to contact the intended recipient. A missed, or even delayed, important message can have severe consequences (e.g., if the intended recipient is a doctor).

One solution to this problem has been the development of the paging terminal system which sends signals to a person wearing a remote pager device that informs him that someone is trying to contact him. When a person desires to contact a person subscribing to the paging terminal system (hereinafter "subscriber"), he calls a phone number corresponding to a central paging terminal. The particular phone number called may distinctively correspond to the particular pager worn by the intended subscriber, or the terminal may request the caller to enter a code distinctively corresponding to the subscriber. The paging terminal searches its data base to identify the particular subscriber corresponding to the number called or code number entered, what type of pager he wears, and what signals must be transmitted to activate the pager. A signal which activates the pager of the identified subscriber is then transmitted to all pagers within its range.

Conventional pagers can respond in a variety of ways to the transmitted signal. For example, they can produce a repetitive tone signal (e.g., a "beep") which notifies the subscriber to call an answering service to learn the identity of the caller or hear a recorded message, or they can produce an audio or visual signal containing the message that the subscriber can directly observe.

While this type of system informs a subscriber that someone is trying to contact him, it also has some drawbacks. For example, a caller may typically know the home or work phone numbers of the subscriber, which he may call first. If the subscriber is not present, the caller must known and remember the phone number of the subscriber's paging terminal and, possibly, an additional subscriber identification code. Thus, the caller must go through a number of steps before a paging signal is transmitted to the subscriber. Another drawback is that there is no interactive communication with the system after the subscriber receives the page. If the subscriber wears one of the relatively unsophisticated pagers that only produces a repetitive tone, he must call his answering service to find out the message or the identity of the caller who must then be contacted. Even if the subscriber wears a pager that transmits an audio or visual message, he must still contact the caller to clarify questions or to respond to the message.

SUMMARY OF THE INVENTION

The present invention is directed to an improved paging system and method which allows a person subscribing to the system to be paged via the subscriber's existing phone line.

According to this invention, a plurality of extension telephone lines of a conventional telephone line switching means (e.g., a PBX) are selected for connection to the paging system. A detection means detects signals representing calls directed to the selected extension lines. A storing means contains a plurality of different paging code signals, wherein each paging code signal distinctively corresponds to one of the selected extension lines. An identification means identifies the paging codes signal corresponding to the selected extension line for which a call signal has been detected. A transmitting means is provided to transmit the identified paging code signal to a receiving means that is responsive to that particular paging code signal.

In the presently preferred embodiment, the invention interfaces with a switching means that also has the capability to hold a call. A detection means is connected to each selected extension line to sense signals representing rings. When a ring signal is detected on a selected extension line, a control means sends a signal to the switching means to hold the call. The identification means identifies the stored paging code signal corresponding to the selected extension line on which a predetermined number of ring signals has been detected. The transmitting means transmits the identified paging code signal to a plurality of receiving means, one of which is responsive to the transmitted paging code signal.

Thus, in the preferred embodiment, when a predetermined number of ring signals is detected on a selected extension line, a control signal is sent to the switching means to hold the call and a paging code signal corresponding to that extension line is transmitted to a receiving device which is responsive to the paging code signal. This object provides several advantages. For example, a person subscribing to one of the selected extension lines can be directly paged by someone calling his regular telephone number. The caller does not have to remember a special paging terminal telephone number or an identification code for the subscriber. The invention also readily interfaces with a conventional telephone line switching means, thereby facilitating its implementation on an existing phone system and obviating the need for a separate paging terminal system. Further advantages are realized because the call is placed on hold. The switching means used in the preferred embodiment allows a held call to be retrieved from any extension, thereby permitting the intended subscriber to retrieve the call after he is paged. This permits quick interactive communication with the caller.

The invention can also be interfaced with other types of conventional telephone line switching means so that it can take advantage of some of the functions available on these switching means. For example, another embodiment of the invention interfaces with a switching means that permits a subscriber to pick up a call on an extension line from any other extension line. The invention can be interfaced to this switching means to eliminate the control means which places a call on hold. A paging code signal would then be transmitted while allowing the phone to ring. Upon being paged, the subscriber could pick-up the call from any extension line.

Another feature of the preferred embodiment of the present invention is that one of the extension lines of the switching means can be selected for command signals.

A ring detection means and a code detection means, which senses signals representing instructions, are connected to the command line. The storing means contains command signals which correspond to a ring signal on the command line or to instruction signals and paging signals which also correspond to instruction signals. The identifying means identifies the command signal corresponding to a ring signal or an instruction signal on the command line and the paging code signal corresponding to a subscriber line or an instruction. The control means sends the identified command signal to the switching means, and the transmitting means transmits identified paging code signals.

By using the command line and appropriate instruction signals, a subscriber can enable or disable his paging code signal or directly page another subscriber.

The invention, together with further objects and advantages, will be best understood by reference to the following detailed description taken in conjunction with the accompanying drawings.

DETAILED DESCRIPTION OF PREFERRED EMBODIMENT

Figure 1:
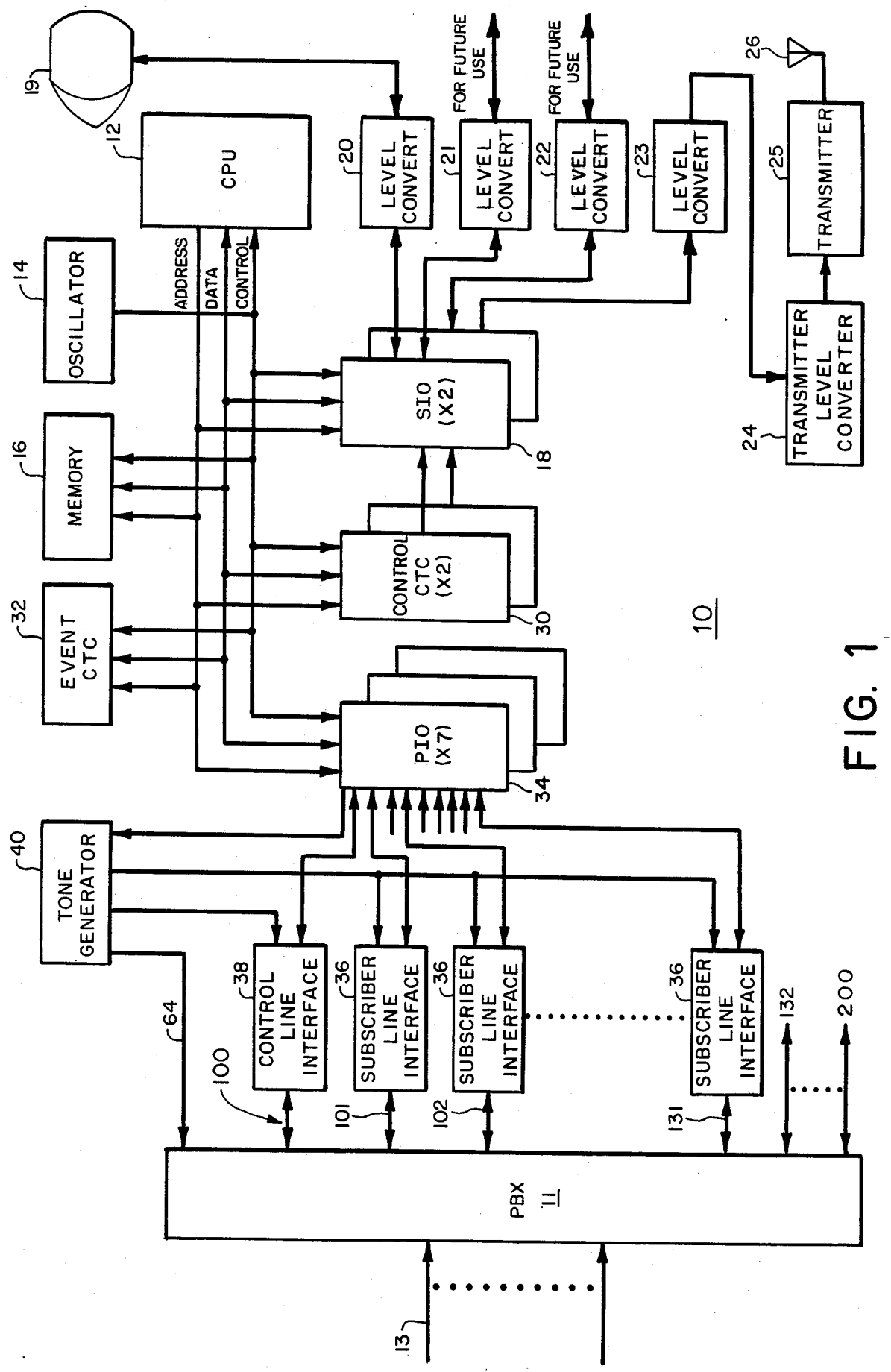
FIG. 1 is a block diagram of a telephone paging system including a preferred embodiment of the present invention.

Referring now to the drawings, a preferred embodiment of the improved paging system and method of the present invention will be described in connection with the telephone paging system shown in FIGS. 1-3.

FIG. 1 shows the major components of a telephone paging system 10 which interfaces with a conventional PBX 11. The basic function of the PBX 11 is to provide the capability of switching signals on an incoming telephone line 13 to any one of its extension lines 100-200. Thus, the PBX allows a large number of people subscribing (hereinafter "subscribers") to the various extension lines to be able to receive calls through relatively few incoming trunk lines 13. A typical PBX also permits one subscriber to directly call another subscriber by dialing the latter's extension phone number.

A wide variety of PBXs are available with this switching function (also referred to as a branching or demultiplexing function) as well as with various special functions. A General Dynamics PBX 11 (FCC Reg. No. BJ885Z-6779-PF-E) is connected to the presently preferred embodiment of the invention. This PBX 11 places a call directed to one of the extension lines on hold or "park" when it receives a predetermined command signal on that extension line. The subscriber transmits the appropriate command signal to the PBX 11, for example, by quickly depressing and releasing the hooklever on his phone and then entering a number from his telephone keypad that represents the call-parking function. The PBX 11 also allows a subscriber to retrieve a parked call from any extension line connected to the PBX 11 by entering an appropriate instruction via the keypad on a push-button telephone.

There are 101 extension lines 100-200 connected to the PBX 11 as shown in FIG. 1. Thirty-one of these extension lines 101-131 are selected for connection to the telephone paging system 10 via the subscriber line interfaces 36. A separate unused extension line 100 is selected for connection to the system via the control line interface 38. Thus, a total of 32 telephone extension lines are selected for connection to the system. The selected extension lines 101-131 which are connected to a subscriber line interface 36 will be referred to as subscriber lines, and the extension line 100 connected to the control line interface 38 will be referred to as the dedicated control line or command line. The persons whose extension telephones are connected to the subscriber lines 101-131 will be referred to as subscribers. The persons trying to direct a telephone call to a subscriber will be referred to as callers.

The basic control of the telephone paging system 10 is provided by the CPU 12, which executes the computer program contained in the program listing appended hereto. The presently preferred embodiment uses a conventional Z-8400 microprocessor for the CPU 12. The CPU 12 as well as the memory 16, SIOs 18, output CTCs 30, event CTCs 32, and PIOs 34 are controlled by timing signals derived from a master clock signal provided by the oscillator 14. The oscillator 14 used in the preferred embodiment is a Vectron CO231T-5, which produces a 19.6608 MHz master clock signal. This crystal frequency is preferred because it can be easily divided to provide the baud rates required by the SIOs 18. It is important that the clock signal provided by the oscillator 14 is stable for the paging formats to work correctly. The oscillator 14 divides the master clock frequency to several different frequencies which are output from different ports of the oscillator.

The memory 16 used in the presently preferred embodiment consists of two 2K×8 RAMs (model no. TMS 4016) and up to eight 4K×8 EPROMs (model no. 2732). The RAM is used to store variables that may be entered by the user through a conventional video terminal keyboard 19 (see FIG. 5) and program data variables that are used and updated during operation of the system. The EPROM is used to hold the master data base and the operating program for the CPU 12. The operating program is run directly from the EPROM.

The master data base record contains coded signals distinctively corresponding to each subscriber's extension telephone number, pager identification number, status (i.e. whether a subscriber's pager is enabled or disabled), and physical extension line number (e.g.,101-131). The pager identification number is the paging code signal that is transmitted to activate a subscriber's pager. A sample master data base record is included in the program listing appended hereto.

A copy of the master data base record is mapped into the RAM when the system 10 is initialized. These data can then be modified by the user via the video terminal keyboard 19 or some other means. For example, a particular subscriber may initially want his pager to be disabled (i.e., not have paging signals transmitted when his phone rings) when the system 10 is initialized. The subscriber can subsequently directly enable his device by means which will be explained below. In operation the CPU 12 uses the data base stored in RAM, which reflects the current status of the system and each subscriber.

The EPROM is used to store the master data base record and operating program to avoid re-loading that information whenever there is a power interruption. As a further enhancement of the system 10, a conventional non-volatile memory could be used in place of the EPROM and RAM. This would obviate the need for the working copy of the data base presently stored in RAM.

Two conventional SIOs 18 (Zilog model no. Z8440) are used to transmit paging code signals to a transmitter 25 and the video terminal display 19. A conventional General Electric transmitter (part no. 19D43296G1) is used to transmit paging code signals to the subscribers' pagers via a ground plane antenna 26. The antenna 26 is made from wire in a standard ground plane configuration that provides omnidirectional signals corresponding to the paging frequency of the transmitter 25. A Qume QVT102 video terminal 19 is used for monitoring the system, such as displaying system status, and providing a means for adding to or updating the copy of the subscriber data base records stored in RAM.

One of the SIOs provides serial data communication which is compatible with the transmitter 25, and one provides serial data communication which is compatible with the video terminal 19. The transmitter 25 requires a digital signal from the SIO 18 output at a 510 baud rate in accordance with the POCSAG paging format. The video terminal 19 requires a digital signal from the SIO 18 output at a 2400 baud rate in accordance with the ASCII format.

Voltage level converters 20-23 are connected to the output lines of the SIOs 18 to translate output signal voltage levels to voltage levels that are compatible with external peripheral devices (such as the video terminal 19). A conventional Motorola MC1488 or MC1489 level converter may be used for the level converters 20-23. The video terminal 19 is interfaced directly to the level converter 20.

Figure 1A:
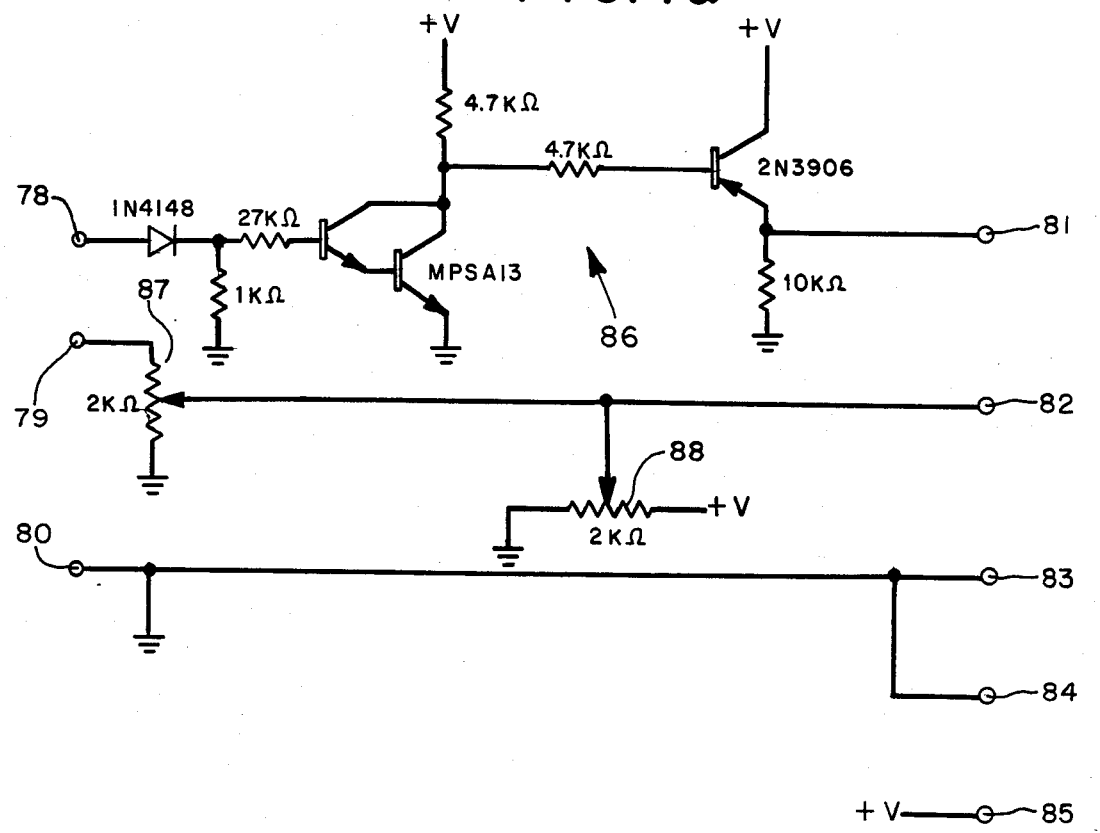
FIG. 1a is a circuit diagram of the transmitter level converter of the preferred embodiment of the present invention.

An additional transmitter level converter 24, shown in FIG. 1a, is connected between the level converter 23 and the transmitter 25. The pins 78, 79, 80 of the transmitter level converter 24 are connected to the outputs of the level converter 23 via a conventional 25-pin connector, and the pins 81, 82, 83, 84 85 of the transmitter level converter 24 are connected to the transmitter 25 via a conventional 10-pin connector. The CPU 12 sends a power-up signal to the connector pin 78 via the SIOs 18 in advance of sending the paging code signal data to the connector pin 79. The transistor network 86 converts the voltage level of the power-up signal to the voltage level compatible the transmitter 25 and amplifies the current to the level required by the transmitter. The two potentiometers 87 and 88 adjust the voltage level of the paging code data signal so that it is compatible with the transmitter 25. Connector pins 80, 83, and 84 are tied to a common ground so that the transmitter 25 will have the same ground level as the other components of the telephone paging system 10.

Figure 1B:
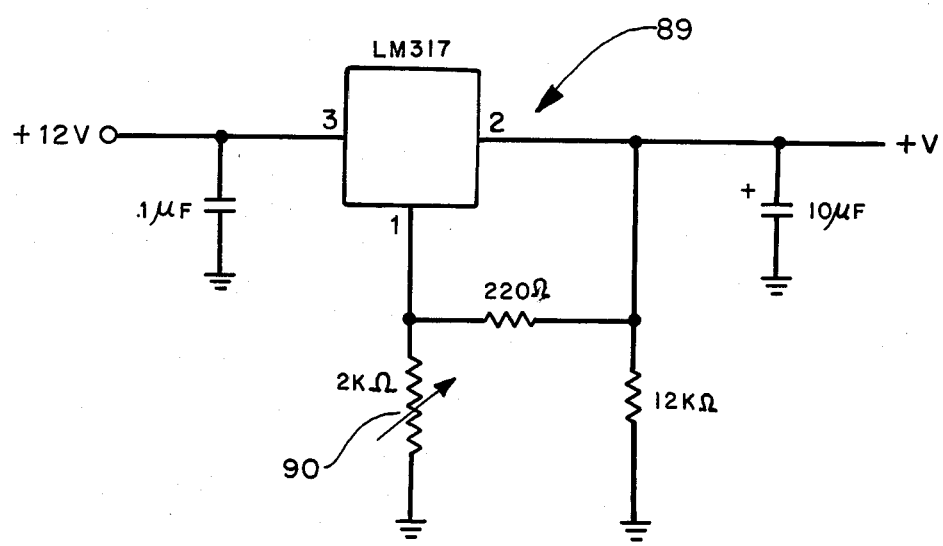
FIG. 1b is a circuit diagram of a voltage regulator used in the preferred embodiment of the present invention.

FIG. 1b shows the components of a voltage regulator circuit 89 that provides the bias voltage +V to the transistor network 86, the potentiometer 88, and the transmitter 25 via connector pin 85. The output voltage +V is adjusted via the potentiometer 90 to provide 10 volts. The particular voltage regulator 89 shown in FIG. 1b is designed operate with low power dissipation.

Two conventional control counter-timer circuits (CTC) 30 (Zilog model no. Z8430) are used to provide the clock signals to the clock input ports of the SIOs 18. One CTC 30 provides a clock signal corresponding to the baud rate of signals sent to the video terminal 19, and one provides a clock signal corresponding to the baud rate for signals sent to transmitter 25.

A conventional event CTC 32 (Ziolg model no Z8430) is provided to monitor real-time events. The event CTC 32 counts a predetermined number down to zero, whereupon an interrupt signal is sent to the CPU 12. The interrupt tells the CPU 12 that a predetermined amount of time has elapsed since the last interrupt. The CPU 12 is programmed to perform a predetermined operation in response to the interrupt signal.

In the preferred embodiment, the CPU 12, upon receipt of an interrupt from the event CTC 30, reloads the CTC 30 so it can count down again. The CPU then updates a real-time clock which is stored in software. The CPU 12 then scans each subscriber line interface 36 for detected ring signals. The CPU samples the ring signal on each successive interrupt to measure its duration. If the duration of the measured signal is longer or shorter than the duration of a standard ring signal, the CPU 12 knows the detected signal is not a valid ring signal. The event CTC 32 also may be adapted to schedule additional real-time events that a user may program into the operating program stored in the memory 16.

FIG. 1 also shows seven standard parallel input/output controllers (PIOs) 34 (Zilog model no. Z8420) that connect all the subscriber line interfaces 36 and the command line interface 38 with the CPU 12. The PIOs 34 essentially multiplex the data transmitted between the subscriber line interfaces 36, the command line interface 38, the tone generator 40, the tone decoder 60, and the CPU 12.

Figure 2:
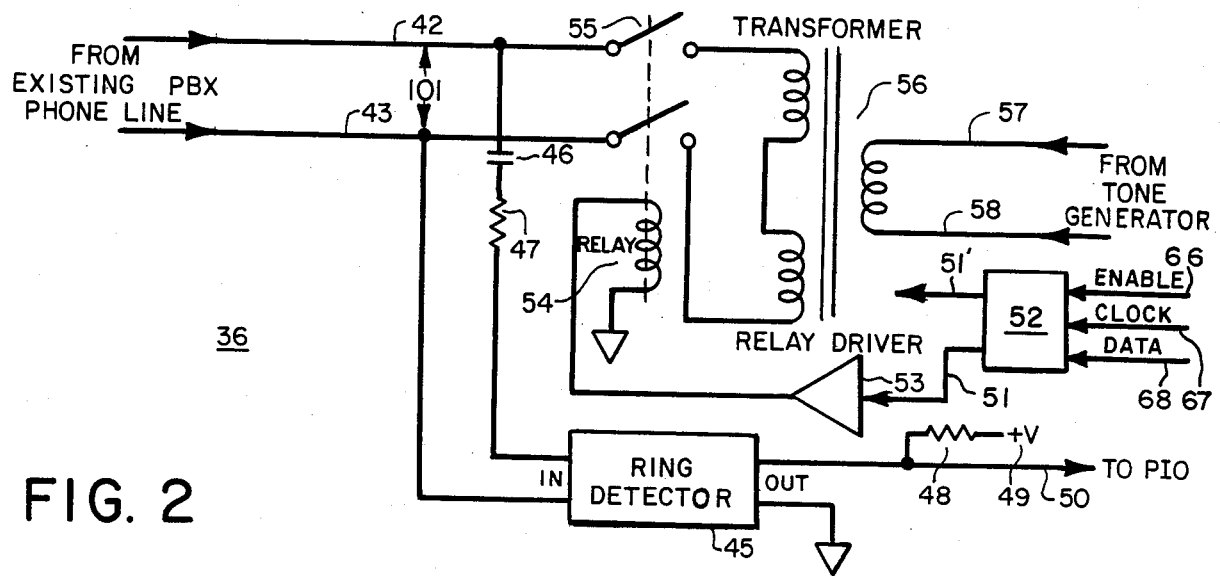
FIG. 2 is a schematic view of the subscriber line interface of the preferred embodiment of the present invention.

FIG. 2 shows the details of a subscriber line interface 36 for the subscriber line 101. The subscriber line interfaces for the other subscriber lines 102-131 are identical in structure and function. In the preferred embodiment, two subscriber line interfaces 36 are mounted on a conventional printed circuit card (e.g., BBL part no. PC908).

The existing subscriber extension line 101 actually consists of two lines 42 and 43. A standard optical isolater ring detector 45 (General Electric model no. H11AA1) is connected across lines 42 and 43. When the ring detector 45 senses a signal on lines 42 and 43 representing a telephone ring, the output line 50 from the ring detector to the PIO 34 goes into a low state. A 2.2 microfarad capacitor 46 is connected in series with an 8.2K ohm resistor 47 on the input side of the ring detector 45. The capacitor and resistor values are chosen to only permit ring signals on lines 42 and 43 pass to the ring detector 45. A standard ring signal will produce a 90 volt AC signal across lines 42 and 43 for a standard duration of time. The ring detector 45 has an internal optical isolation feature so that its output and the connected circuitry of the system 10 will be electrically isolated from the PBX 11. Thus, the telephone paging system 10 is transparent to the PBX 11. A conventional voltage source 49 is connected in series with a biasing resistor 48 to provide the voltage for the ring detector 45.

The subscriber line interface card 36 shown in FIG. 2 also includes a relay driver 53 which converts a 0–5 volt data signal on the input line 51 to a 0–12 volt signal. One control register 52 provides the signals on lines 51 and 51' for two subscriber line interfaces 36. In the presently preferred embodiment, two subscriber line interfaces 36 and one control register 52 are mounted on one printed circuit card (e.g., BBL model no. PC908). Accordingly, there are a total of 16 control registers 52 for the thirty-one subscriber line interfaces 36 and the one control line interface 38 in the system 10. (The control line interface 38 is on the same card as the first subscriber line interface 36.)

The inputs to the control register 52 include the command CLOCK line 68 and the command DATA line 67 which are also connected in parallel from the PIOs 34 to every other control register 52 provided on the subscriber line interfaces 36. Each control register 52 has its own command ENABLE line 66 which is connected to the PIOs 34. The CPU 12 clocks command data serially to every control register 52 via the CLOCK and DATA lines. The command data signals include signals which activate a relay driver 53 and signals which do not activate a relay driver. The control register 52 internally stores the activate and non-activate data signals in parallel so that the activate signals correspond to the relay driver 53 connected to the subscriber line 101 on which a ring signal has been detected. The CPU 12 sends a command signal on the ENABLE line 66 to the control register 52 which is connected to the subscriber line interface 36 which detected a ring signal. The activate signals are then sent on line 51 to the relay driver 53, and the non-activate signals are sent to the other relay driver of the subscriber line interfaces on the same card.

The signal output from the relay driver 53 energizes the relay 53, thereby closing the switch 55. When the switch 55 is closed, signals from a tone generator 40 can be transmitted to the PBX 11 via the input lines 57 and 58, the transformer 56, and the subscriber extension lines 42 and 43. The presently preferred embodiment uses a conventional relay driver (e.g., the Motorola MC1413 or the Sprague ULN2002), a conventional relay (model no. AZ7-4D-12DE), and a conventional transformer (model no. T1449).

The relay 54 is set to keep the switch 55 in a normally open position. In this state, ring signals on lines 42 and 43 are transmitted to the extension phone which then rings. However, when the ring detector 45 detects a ring signal on lines 42 and 43, the CPU 12 sends a command signal through the PIOs 34 and control register 52, to the relay driver 53 in the manner described above. The relay 54 closes the switch 55, thereby putting the transformer 56 across the subscriber lines 42 and 43. This command signal on input line 51 is a pulse signal which keeps the switch 55 closed long enough so that the PBX 11 thinks that the extension phone on lines 42 and 43 has been answered. The CPU 12 then sends a second command (or control signal) to the relay driver 53 that "flashes" the relay 54. That is, the relay 54 opens and closes again quickly, which signals the PBX 11 to prepare for a PBX control signal. Without the telephone paging system 10, a flash may typically be generated by pressing the hook receiver down on a conventional extension phone and quickly releasing it.

After the relay 54 has flashed, the tone generator 40, under control of the CPU 12, sends a DTMF tone signal to the PBX 11 which represents a particular PBX command (e.g., to part the call). The tone generator 40 includes a standard DTMF encoder (Mostek model no. MK 5087) and a standard tone generator (Signetics model no. NE567) mounted on a printed circuit card found in many conventional paging terminal systems (e.g., BBL Part no. PC9110). The DTMF encoder generates sixteen standard dual-tone, multi-frequency (DTMF) tones which correspond to the keys on a push-button telephone keypad. One of these DTMF tones is output by the tone generator 40 in response to a four-bit command signal from the CPU 12. The tone generator is used to generate "beep" tones and a "ring" tones for a caller to hear. The "ring" tones are constantly fed directly from the tone generator 40 to the PBX "music on hold" port via line 64. Thus, the caller hears "ring" tones whenever his call is parked, even while the system 10 sends paging code signals to the subscriber. The "beep" tones are constantly fed to the control line interface 38. The CPU 12 sends command signals to the control register 52a on the control line interface 38 which selects the "beep" tones via line 59.

Figure 3:
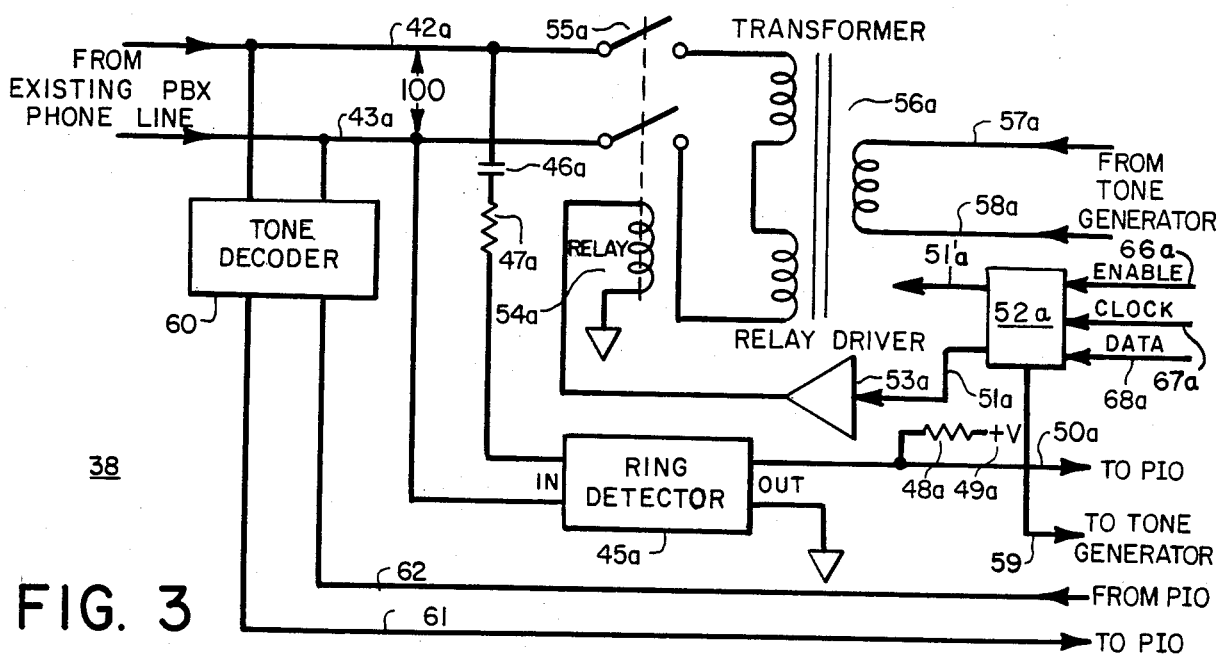
FIG. 3 is a schematic view of the command line interface of the preferred embodiment of the present invention.

FIG. 3 shows the basic components of the control line interface 38, which are identical of the components of a subscriber line interface 36, except that a tone decoder 60 is also bridged across the command line 100. The components of the command line interface 38 which are identical in structure and function to those components comprising the subscriber line interface 36 are given the same reference number as the corresponding component in FIG. 2 plus the suffix "a". A conventional DTMF tone decoder card 60 (e.g. BBL part no. PC908-2), which contains Mitel MT8865 and MT8860 chips, is used to sense DTMF tones generated by depressing keys on the telephone keypad that represent instructions to the system 10. The first Mitel chip separates the high frequency and low frequency components of the sensed DTMF tone signal. The second chip determines the particular telephone key corresponding to the sensed tone by determining the particular frequency of the high and low tone components. The digits or symbols (i.e., "#" or "*") representing the decoded instruction signals are stored in an internal buffer of the tone decoder on a first-in-first-out (FIFO) basis. The CPU 12 sends a strobe signal to the tone decoder 60 via the PIOs 34 and the input line 62 to place the first digit in the tone decoder buffer on the output line 61 and to position the next digit stored in the buffer. The CPU 12 sends this strobe signal until all the digits stored in the tone decoder buffer have been placed on output line 61. The decoded tone signals put on output line 61 are five bits lone. Four bits represent the digit or symbol corresponding to DTMF tone, and one digit represents whether or not the data is valid. These data bits are sent to the CPU 12 via the PIO 34. The operating program contains the command signals that correspond to the instructions represented by the decoded tone signals.

The elements described in FIGS. 1–3 comprise the basic hardware of the presently preferred embodiment of the invention. Most of these elements are comprised of standard off-the-shelf components. Moreover, many of these components can be found on printed circuit cards used in conventional paging terminal systems. For example, one control CTC 30, one SIO 18, and two level converts 20, 21 can be found on BBL part no. PC984; the CPU 12 and the memory 16 can be found on BBL part no. PC9700; the event CTC 32 can be found on BBL part no. PC985; and two of the PIOs 18 can be found on BBL part no. PC982.

The CPU 12, which provides the basic control for all components of the system, operates in accordance with the software program stored in the EPROM of memory 16. A program listing of the presently preferred software program that is stored in the EPROM is submitted herewith as an appendix. The appended listing is written in Z-80 assembler language. One skilled in the art would be able to readily adapt this program to the hardware previously described to make and use the present invention. Thus, the six sections of the appended program will only be described generally. A more detailed description of the program can be discerned from the program listing and its comment statements.

The first section is the Supervisor section which initializes the PIOs 34, the event CTC 32, the control CTCs 30 and the SIOs 18. The Supervisor section also maps a copy of the master data base record from the EPROM into the RAM for storage of temporary data variables.

Since these components can be programmed to operate in several different modes, the Supervision section initializes them in accordance with the Table 1 below. The initialization of the ports of the PIOs 34 will be self-explanatory to one skilled in the art.

The first channel of the event CTC 32 is set up in timer mode to count down to zero. The second channel of the event CTC 32 is set up in counter mode to count the number of times the first channel counts down to zero. The output of the first channel is connected to the input of the second channel of the event CTC 32 so that each time the first channel reaches zero it decrements the counter of the second channel. When the counter of the second channel reaches zero, it sends an interrupt to the CPU 12 which possesses it in the manner described above. The first channel is reset by the CPU 12 whenever the CPU receives an interrupt from the second channel. The first channel then immediately begins to count down again.

The two control CTCs 30 each use only one channel on each CTC chip. One control CTC 30 is set up to provide a clock signal to the video terminal SIO 18 everytime the CTC counts down to zero. This clock signal is 16 times the 2400 baud rate required by the video terminal 19. The other CTC is set up to provide a clock signal to the transmitter SIO 18 everytime this CTC counts down to zero. This clock signal is equal to 510 baud rate required by the transmitter 25. Once the two control CTCs 30 are set up in this manner they will continuously count down to zero and provide the clock pulse to the SIOs 18. These CTCs do not generate any external interrupts to the CPU 12.

The SIO 18 connected to the video terminal 19 is set up to divide the clock signals it receives from the video terminal control CTC by sixteen. This SIO then outputs 8-bit asynchronous signals to the video terminal 19 at a 2400 baud rate. These signals include a start bit, 7 data bits, a parity bit, and a stop bit. If the video terminal SIO detects a variation in the stop bit or parity, it sends an interrupt to the CPU 12 indicating there is a data transmission error. The video terminal SIO also sends the CPU 12 interrupts whenever it receives a byte of data input from the video terminal 19. The CPU 12 then reads this data and stores it in the memory 16. The transmitter SIO 18 outputs data to the transmitter 25 at the 510 baud rate input by the transmitter control CTC. The data is output as synchronous signals. The number of bits in each data character varies in accordance with the POCSAG format. Both SIOs 18 send interrupts to the CPU 12 when they output a character, thereby emptying their internal transmitter buffers. In response to this interrupt, the CPU 12 sends another byte of data to the empty transmitter buffers. Once the SIOs 18 are initialized, they are ready to receive data and operate in the manner described. The SIOs 18 do not respond to transitions on external devices.

The second second controls the detection of ring signals on the subscriber lines 101–131 and the command line 100, the detection of instruction signals on the command line 100, the identification of paging code signals distinctively corresponding to the subscriber lines on which ring signals have been detected or to instructions detected on the command line and the identification of command signals corresponding to ring signals or instruction signals detected on the command line, and the transmission of identified command signals to the tone generator 40, the tone decoder 60, the subscriber line interfaces 36 and the control interface 38.

The third section controls the output format of the identified paging code signals which are stored in the memory 16 in BCD format. Each paging code signal can be up to 7 digits. This section converts the BCD format paging code into a 4 byte binary pattern in accordance with the POCSAG paging format. POCSAG is a format for processing paging signals which is well known in the pertinent art. All the paging code signals which have been identified are converted to the POCSAG format in the memory 16 in batch. These POCSAG format paging code signals are then serially transmitted to the SIO 18 connected to the transmitter 25 one byte (8 bits) at a time in the manner described above until all bytes of data in the batch have been sent to the transmitter SIO 18. Prior to sending the first byte, however, a wake-up signal is sent to this SIO 18, which is transmitted to the pagers telling them to listen for their particular POCSAG format paging code signal. The bytes of data sent to the transmitter SIO 18 representing the paging code signals are synchronous signals which are frequency shifted in a conventional manner.

A fourth section is the Video Terminal Driver section which controls the output of data to SIO 18 connected to the video terminal 19. This section takes a copy of the identified paging code signal, which is in stored in memory 16 in BCD format, and converts it to the ASCII format. The extension number of the subscriber line corresponding to this paging code signal and the current value of the real-time clock are also identified and converted to ASCII format. These signals are then sent to the video terminal SIO 18 in the manner described above. These signals are then sent from this SIO to the video terminal 19 at 2400 baud.

The fifth section of the software controls the input of the data base record into the memory 16 via the video terminal 19. This section also controls editing of the copy of the master data base record in the RAM via the video terminal 19. This data is input to the memory via the video terminal SIO 18 in the manner described above.

The last section of the software defines the layout of the RAM of memory 16 for storing the copy of the data base record which is mapped in from the EPROM and the data for temporary and program variables.

The telephone paging system 10 embodying the present invention is intended to transmit paging code signals to a remote pager worn by a subscriber. Any type of conventional pager that produces a paging signal in response to a distinctive paging code signal in the POC- SAG format can be used. Each subscriber wears a pager that is responsive only to the paging code signal distinctively corresponding to his assigned extension line. The pager may output any type of well known paging signals in response to the paging code signal.

Having described the various elements that comprise the telephone paging system of the presently preferred embodiment of the invention, its operation will now be described. As a preliminary step, the extension phone number, pager code identification number, initial status, and physical extension line number for each subscriber are programmed into the EPROM. When the system is activated, the data base record stored in the EPROM is mapped into the RAM, and the RAM is set up for the storage of temporary and program variables. The CPU 12 then initializes the SIOs 18, the control CTCs 30, the event CTC 32, and the PIOs 34 in the manner described above.

The paging operation of the preferred embodiment is initiated in response to the first ring signal detected on a selected subscriber line 101-131. When the PBX 11 sends a ring signal to a subscriber's extension phone, (e.g., subscriber line 101), the ring detector 45 will force output line 50 into a low state. The CPU 12 will cooperate with the event CTC 32 to determine if output line 50 remains in the low state long enough to correspond to a ring signal on the subscriber extension line 101. If so, the CPU 12 sends an enable signal to the control register 52, thereby putting a command signal on input line 51. The command signal is amplified by the relay driver 53 to energize the relay 54 which closes the switch 55. The transformer 56 is then bridged across lines 42 and 43 of the subscriber line 101.

The switch 55 is closed for an amount time that indicates to the PBX 11 that the phone on subscriber line 101 has been answered. The PBX 11 will then stop producing ring signals on subscriber line 100. Nevertheless, the caller still hears ring signals that the tone generator 40 sends to the music on hold port of the PBX 11 via line 64 while his call is parked.

The CPU 12 then sends a second command signal to input line 51 via the PIOs 34 and the control register 52, which causes the relay 54 to flash the switch 55. This flash signals the PBX 11 to prepare to receive a PBX command signal. The CPU 12 then signals the tone generator 40 to send a DTMF signal to lines 42 and 43 of the subscriber line 101 via input lines 57 and 58 and transformer 56, which will command the PBX 11 to park the call on subscriber line 101.

Next the CPU 12 sends a command signal the relay driver 53 via the PIOs 34 and the control register 52, that de-energizes the relay 54, thereby opening the switch 55. The system 10 is then disconnected (or released) from the subscriber line 101. The PBX 11 interprets the open switch 55 to mean that the subscriber on extension line 101 has hung up his phone.

While the PBX 11 holds the call on park, the CPU 12 searches the memory 16 to identify the pager identification number (paging code signal) corresponding to the physical subscriber extension line 101 on which the ring signal was sensed. The CPU, under control of the output format section of the software, sends a key-up signal to the transmitter 25 via the SIOs 18 and connector pin 78 of the transmitter level converter 24. Dummy data is then sent to the transmitter 25 via connector pin 79 for about 1 second while the transmitter warms up. After this is completed, a wake-up signal is sent to the transmitter 25 via connector pin 79 to alert all pagers to prepare for a paging code signal. The CPU 12 then converts the identified paging code signal to the POCSAG format, converts a copy of the identified paging code signal, the corresponding subscriber line and the current real-time clock value to the ASCII format, and sends them to the SIOs 18. The SIOs 18 will serially transmit the POCSAG-format paging code signal to the transmitter 25 via connector pin 79 and the ASCII-format signals to video terminal 19 in batch in accordance with their respective baud rates as controlled by the control CTCs 30. The transmitter level converter 24 will translate the voltage level of paging code data signals input at pin 79 to a level compatible with the transmitter 25. After the last byte of the POCSAG-format paging code signal has been transmitted to the SIOs 18, the CPU 12 sends more dummy data bytes to the transmitter 25 via the SIOs 18 to assure that all bytes of the paging code signal were transmitted. The key-up signal is then terminated and the paging process can begin anew.

The transmitter 25 transmits the paging code signal via the antenna 26 to all pagers within the range of the transmitter 25 and antenna 26. The pager worn by a subscriber which is responsive to the particular POCSAG format paging code signal transmitted will produce a paging signal. The subscriber will then know that someone has directed a call to his extension line and that the call is parked. The subscriber can retrieve the parked call from any other extension phone on the PBX 11 by entering the appropriate PBX command via the telephone keypad.

A subscriber may enable or disable his pager via the command line 100 by entering the appropriate instructions via any extension telephone keypad. The subscriber first dials the extension telephone number corresponding to the command line 100. The ring detector 45a responds by putting line 50a in a low state for a period of time corresponding to a ring signal. The CPU 12 then sends a command signal to the relay driver 53a via the control register 52a and PIOs 34. The relay 54a closes the switch 55a and keeps it closed until the caller hangs up on the phone. In the meantime, the CPU 12 sends a command signal to the tone generator 40 to send a DTMF tone corresponding to a "beep" to lines 57a and 58a of the control line interface 38. This "beep" is routed to the subscriber by the PBX 11 by connecting the caller's extension to the command line 100. Upon hearing the "beep", the subscriber-caller enters his own extension phone number from the telephone keypad, which represents a first instruction signal. The tone decoder 60 decodes the DTMF tones that represent the digits of the phone number entered. The CPU 12 strobes the port of the tone decoder 60 with a strobe signal until it receives the data representing all digits on the data bus 61. The CPU 12 then sends another command signal to the tone generator 40 to produce two "beep" signals. Upon hearing the two "beep" signals, the subscriber depresses either the "*" or a "#" telephone key, which are enable or disable instruction signals, respectively. The tone decoder 60 decodes the DTMF tones that represent these two keys, and the CPU 12 sends a strobe signal over line 62 to put this data on line 61. The CPU 12 then searches the memory 16 to identify the subscriber corresponding to the extension number entered and updates the operating status of his paging code signal according to the second instruction signal entered. The updated status is stored in the RAM of memory 16.

The CPU 12 next sends the first command signal to the tone generator 40 to produce the "beep" tone signal again. Upon hearing this signal, the subscriber-caller may enable or disable the paging code signal of another subscriber by following the procedure just described. If, however, he pauses too long before entering the next instruction signal, the CPU 12 will command the tone generator 40 to produce an alternating "beep-beep" signal, thereby indicating the completion of this function. The subscriber-caller then must dial the command line 100 again to enable or disable another subscriber.

When this enable/disable function is available, the telephone paging system described above operates slightly differently. After a ring signal is detected on a subscriber line, the CPU 12 first identifies the status of that subscriber line before it seizes the subscriber line to answer the call. If the line is enabled, the telephone paging system proceeds to park the call and transmit a paging code signal to the subscriber in the manner described above. If the paging code signal for that subscriber line is disabled, however, the system never closes the relay 54. Thus, the phone is allowed to ring and no paging code signal is transmitted.

A subscriber can also directly page another subscriber via the command line 100. The subscriber-caller first dials the extension phone number corresponding to the command line 100 from any phone connected to the PBX 11. The CPU 12 answers the line and sends the first "beep" tone in the same manner just described for the enable/disable function. Upon hearing the "beep", the subscriber-caller enters from his telephone keypad the extension phone number of the subscriber he wishes to page (the "subscriber-pagee"), which represents a first instruction signal. The tone decoder 60 decodes the DTMF tones representing the digits of the number entered, and the CPU 12 sends a strobe signal to put this data of line 61. The CPU 12 then sends the second command signal to the tone generator 40 to produce two "beep" tones. Upon hearing the two "beeps", the subscriber-caller enters from his keypad the numbers 1, 2, 3 or 4, which represent four distinctive POCSAG paging tone patterns. This instruction signal is decoded by the tone decoder 60 and sent to the CPU 12 over line 61. The CPU 12 then searches the memory 16 to identify the subscriber-pagee corresponding to the extension phone number entered. The CPU 12 also identifies one of four POCSAG paging patterns corresponding to the second instruction entered. The CPU 12 converts the identified paging code signal into the POCSAG paging format that includes the paging format specified. This paging code signal is sent to the transmitter 25 via the SIOs 18 in the manner described above. The CPU 12 then sends a third command signal to the tone generator 40 to produce the alternating "beep"-"beep" tone for the subscriber-caller to hear, which represents that the operation has been completed. The subscriber-caller then hangs up his phone.

A subscriber may also test his pager by directly paging himself in accordance with the procedure described above. Upon hearing the first beep tone, the subscriber would enter his own extension telephone number. The system 10 would then send a paging code signal that would activate the subscriber's own pager.

Figure 4:
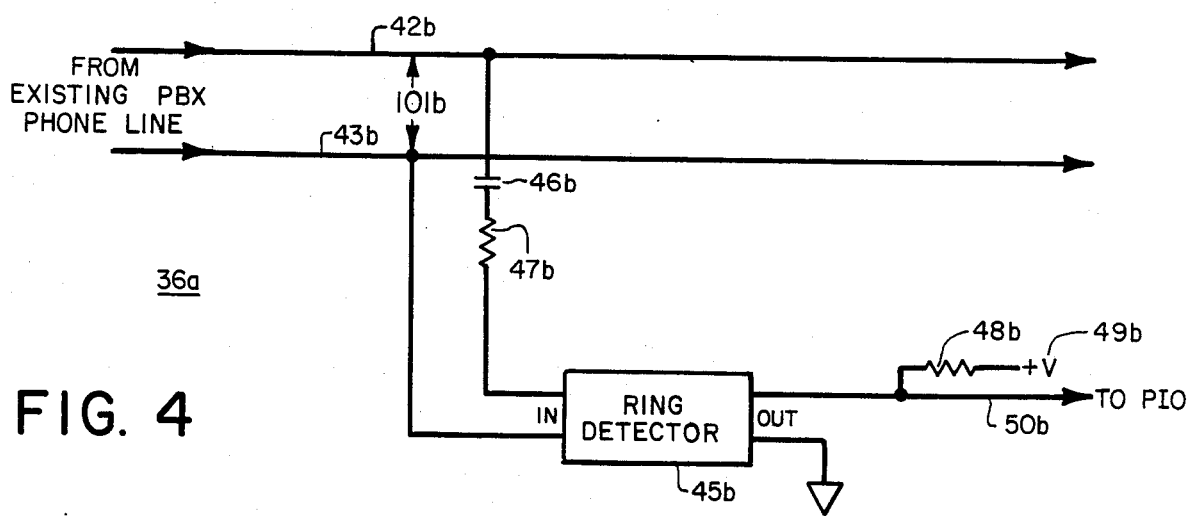
FIG. 4 is a schematic view of a subscriber line interface of another embodiment of the present invention.

FIG. 4 shows the subscriber interface card 36a which may be used in another embodiment of the invention. This type of subscriber interface card would be connected to a subscriber extension line 101b on a PBX 11 that has a direct-call-pickup function. This allows a subscriber to pick up a call on an extension line from any other extension line. A PBX with this directed call pick-up function can also forward a call to another extension line after a predetermined number of rings when requested by a subscriber. These functions are executed by the PBX 11 independent of the telephone paging system 10.

The modified subscriber interface card 36a, as shown in FIG. 4, includes a ring detector 45b connected across lines 42b and 43b of the subscriber extension telephone line 101b. A capacitor 46b and resistor 47b are connected in series to one of the input ports of the ring detector 45b. The ring detector 45b is optically isolated from the PBX 11 and powered by a voltage source 49b and biasing resistor 48b. These components cooperate to detect a ring signal on subscriber line 101b, and in response thereto place output line 50b in a low state in the same manner described above for the corresponding components in FIG. 2. The CPU 12 cooperates with the other components shown in FIG. 1 in the same way described above to transmit a paging code signal distinctly corresponding to the subscriber assigned to extension line 101b.

An important advantage of the subscriber line interface 36 or 36a is that it does not require a relay driver, relay, switch, transformer, control register, or equivalents thereof, to answer the call and then put it on park. In this embodiment, the subscriber line interface 36a and the other components of the telephone paging system 10 shown in FIG. 1 cooperate to transmit a paging code signal upon detection of the first ring signal on the subscriber line 101b while only monitoring ring signals on the subscriber line 101b. Thus, the phone on the subscriber line 101b continues to ring while the telephone paging system transmits a paging code signal corresponding to subscriber line 101. This also allows the PBX functions to operate concurrently with the system 10 (for example, transferring the call to another extension line after a predetermined number of ring signals, if requested by the user).

Figure 5:
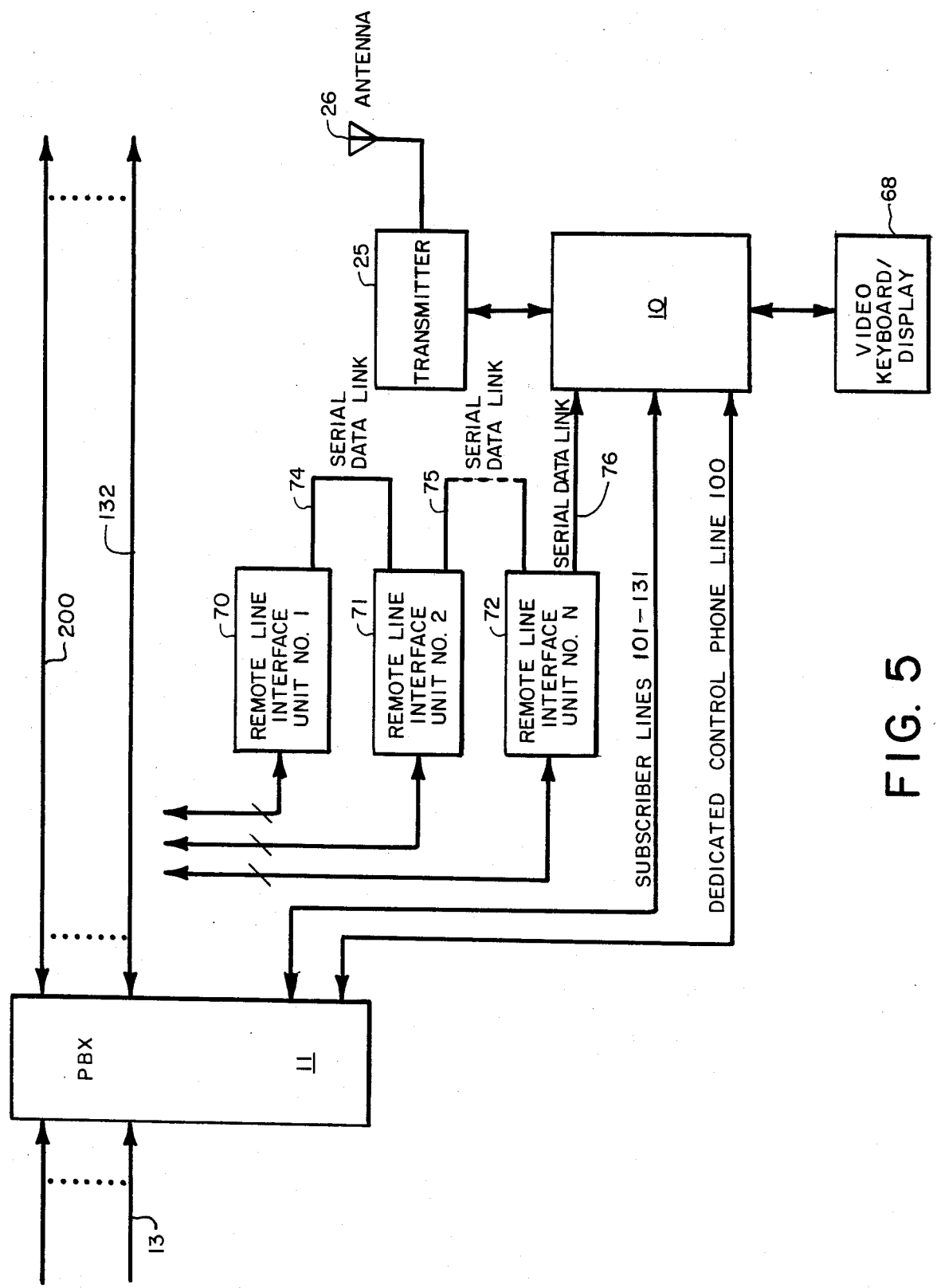
FIG. 5 is a schematic view of another embodiment of the present invention.

As shown in FIG. 1, the presently preferred embodiment of the invention does not select all the available extension lines 132–200 for connection to the telephone paging system 10. Another embodiment of the present invention is shown in FIG. 5 which allows the additional subscriber extension phone lines to be interfaced to the telephone paging system 10 via the remote line interface units 70, 71, 72. In this embodiment the dedicated control line 100 and the subscriber extension lines 101–131 are connected to the PBX 11 and the components of the telephone paging system 10 as explained above in connection with FIGS. 1-3.

The remote line interface card 70 would be connected across one of the extension lines 132–200. The remote line interface card 70 could be configured much like FIGS. 1 and 2 or 4, except that only one SIO chip 18 and one control CTC chip 30 would be required. The remote line interface card would detect ring signals on the selected remote extension line and send signals down the serial data lines 74, 75, 76 to the telephone paging system 10. The signal transmitted down the serial data line would represent that the particular remote extension line (e.g. 132) was ringing. Since this data is being transmitted serially, the beginning and end of this data would have to be marked. Only two SIO ports would be necessary: one to receive input from the remote line interface unit above and one to output the data to the remote line interface unit or the telephone paging system 10 below. The oscillator used on the remote line interface unit would not have to be as stable as the oscillator 14. The data base record stored in the memory in the telephone paging system 10 would also contain coded signals corresponding to the extension telephone number, pager identification number, status, and physical extension line number of each remote line connected to the system 10.

Using the remote line interface units 70, 71, 72, additional subscribers can be added to the telephone paging system 10 at minimal expense. The remote units will monitor each subscriber phone line and signal any "ringing" lines back to the system unit 10. The system 10 reads the digital information arriving from the serial communication line 76 and decodes the information to determine which remote phone line was ringing. The telephone paging system 10 could then proceed to page the subscriber to the remote line in the same manner described above for one of the subscribers line interfaces 36.

The preferred embodiment described above is a telephone paging system interfaced to a conventional telephone line branching system which has the capability of parking a call and conventional pagers that are responsive to POCSAG format paging code signals. However, it should be apparent that the present invention can be interfaced with other types of telephone line branching means or pagers. For example, the present invention could be adapted for use with a PBX that has voice synthesized announcements that could be played to the caller to indicate that the subscriber called is being paged. The present invention could also be used with a higher powered transmitter that would extend the range of the transmitted paging code signals from building wide to city-wide. At this point, a "meet-me" function in the PBX could be used by the subscriber receiving the call to accept the call at any phone in the city.

Other embodiments of the present invention should be also apparent to those skilled in the art from the foregoing description. For example, multiple transmitters 25 could be implemented in the system 10 so that more than one subscriber can be paged simultaneously. Also, a paging system other than POCSAG could be used. The system could also be modified to require the detection of more than one ring signal on a subscriber's extension line before transmitting a paging code signal. A PBX-type branching means may also be developed that identifies the intended subscriber line of an incoming call and then transmits a paging code signal in accordance with the present invention without putting a signal on the intended subscriber line.

Of course, it should be understood that various other changes and modifications to the preferred embodiment described above will be apparent to those skilled in the art. It is intended that the foregoing description be regarded as illustrative rather than limiting and that it be understood that it is the following claims, including all equivalents, which are intended to define the scope of the invention.

TABLE 1

The seven PIOs 34 are initialized as follows:

| PIO # | PIN NAME | DESCRIPTION | | |
|---|---|---|---|---|
| 1 | A7 | Output - | Command Data 68 to all subscriber interfaces 36 and the control interface 38 | |
| | ARDY | Output - | Command Clock 67 to all subscriber interfaces 36 and the control interface 38 | |
| | B0 | Output - | Command Enable to control interface 38 and subscriber interface #1 | |
| | B1 | Output - | Command Enable to Subscriber Interface 2 and 3 | |
| | B2 | Output - | Command Enable to Subscriber Interface 4 and 5 | |
| | B3 | Output - | Command Enable to Subscriber Interface 6 and 7 | |
| | B4 | Output - | Command Enable to Subscriber Interface 8 and 9 | |
| | B5 | Output - | Command Enable to Subscriber Interface 10 and 11 | |
| | B6 | Output - | Command Enable to Subscriber Interface 12 and 13 | |
| | B7 | Output - | Command Enable to Subscriber Interface 14 and 15 | |
| 2 | A0 | Input - | Control Interface Ring Detector 45a | |
| | A1 | Input - | Subscriber Interface #1 Ring Detector | |
| | A2 | Input - | Subscriber Interface #2 Ring Detector | |
| | A3 | Input - | Subscriber Interface #3 Ring Detector | |
| | A4 | Input - | Subscriber Interface #4 Ring Detector | |
| | A5 | Input - | Subscriber Interface #5 Ring Detector | |
| | A6 | Input - | Subscriber Interface #6 Ring Detector | |
| | A7 | Input - | Subscriber Interface #7 Ring Detector | |
| | B0 | Input - | Subscriber Interface #8 Ring Detector | |
| | B1 | Input - | Subscriber Interface #9 Ring Detector | |
| | B2 | Input - | Subscriber Interface #10 Ring Detector | |
| | B3 | Input - | Subscriber Interface #11 Ring Detector | |
| | B4 | Input - | Subscriber Interface #12 Ring Detector | |
| | B5 | Input - | Subscriber Interface #13 Ring Detector | |
| | B6 | Input - | Subscriber Interface #14 Ring Detector | |
| | B7 | Input - | Subscriber Interface #15 Ring Detector | |
| 3 | B0 | Output - | Command Enable to Subscriber 16 and 17 | |
| | B1 | Output - | Command Enable to Subscriber 18 and 19 | |
| | B2 | Output - | Command Enable to Subscriber 20 and 21 | |
| | B3 | Output - | Command Enable to Subscriber 22 and 23 | |
| | B4 | Output - | Command Enable to Subscriber 24 and 25 | |
| | B5 | Output - | Command Enable to Subscriber 26 and 27 | |
| | B6 | Output - | Command Enable to Subscriber 28 and 29 | |
| | B7 | Output - | Command Enable to Subscriber 30 and 31 | |
| 4 | A0 | Input - | Subscriber Interface #16 Ring Detector | |
| | A1 | Input - | Subscriber Interface #17 Ring Detector | |
| | A2 | Input - | Subscriber Interface #18 Ring Detector | |

TABLE 1-continued

| | | | |
|---|---|---|---|
| | A3 | Input - | Subscriber Interface #19 Ring Detector |
| | A4 | Input - | Subscriber Interface #20 Ring Detector |
| | A5 | Input - | Subscriber Interface #21 Ring Detector |
| | A6 | Input - | Subscriber Interface #22 Ring Detector |
| | A7 | Input - | Subscriber Interface #23 Ring Detector |
| | B0 | Input - | Subscriber Interface #24 Ring Detector |
| | B1 | Input - | Subscriber Interface #25 Ring Detector |
| | B2 | Input - | Subscriber Interface #26 Ring Detector |
| | B3 | Input - | Subscriber Interface #27 Ring Detector |
| | B4 | Input - | Subscriber Interface #28 Ring Detector |
| | B5 | Input - | Subscriber Interface #29 Ring Detector |
| | B6 | Input - | Subscriber Interface #30 Ring Detector |
| | B7 | Input - | Subscriber Interface #31 Ring Detector |
| 5 | A1 | Output - | Tone Generator 40 Data Bit 0 |
| | A2 | Output - | Tone Generator 40 Data Bit 1 |
| | A3 | Output - | Tone Generator 40 Data Bit 2 |
| | A4 | Output - | Tone Generator 40 Data Bit 3 |
| | A5 | Output - | Tone Generator 40 Enable |
| 6 | A0 | Output - | DTMF Tone Decoder 60 Strobe |
| 7 | A0 | Input - | DTMF Tone Decoder 60 Data Bit 0 |
| | A1 | Input - | DTMF Tone Decoder 60 Data Bit 1 |
| | A2 | Input - | DTMF Tone Decoder 60 Data Bit 2 |
| | A3 | Input - | DTMF Tone Decoder 60 Data Bit 3 |
| | A4 | Input - | DTMF Tone Decoder 60 Data Bit 4 |

(Note: All pin names are in accordance with standard Ziglog Nomenclature and all unused PIO pins are not listed.)

The event CTC 32 is initialized as follows:

Channel #1:
   A. Interrupts Disabled
   B. Timer Mode
   C. Prescaler = 256
   D. Automatic trigger when time constant is loaded
   E. Time Constant for 10 millisecond events Channel #2:
   A. Interrupts Enabled
   B. Counter Mode
   C. Prescaler = 16
   D. Vectored Interrupts The control CTCs 30 are initialized as follows:

CONTROL CTC #1 (to video terminal SIO 18):

Counter/Timer #1:
   A. Interrupts Disabled
   B. Counter Mode
   C. Prescaler = 16
   D. Time Constant for 2400 baud output to SIO 18

CONTROL CTC #2 (to transmitter SIO 34):

Counter/Timer #1:
   A. Interrupts Disabled
   B. Counter Mode
   C. Prescaler = 16
   D. Time Constant for 510 baud output to SIO 18

The SIOs 18 are initialized as follows:

SIO #1 (video terminal):
   A. X 16 Clock input
   B. Even parity
   C. 1 Stop Bit
   D. Asynchronous Communications
   E. 7 bits per character
   F. Interrupt on all received and transmitted characters
   G. Disable external interrupts SIO #2 (to transmitter):
   A. X 1 Clock input
   B. No parity
   C. No stop bit
   D. Synchronous communications
   E. Number of bits per character varies during operation
   F. Interrupt on all transmitted characters
   G. Disable external interrupts

```
PAGE 02
        TITLE   DATE 6/16/83  kbd  VER 4   L#1
        SUBTTL  PBELL APPLICATION CODE
.Z80
; FOR DEBUGGING
        PUBLIC  PULPAC,WTNULL,MATFLD
; MENU ENTRY POINTS
        PUBLIC  INSERT,DELETE,MODIFY,FINDEX,FINDNT,IMPAGE,LISTDB
        PUBLIC  CONFIG,DISTAT,CNSORT,BYTEX,PUTNUM
; SUB-ROUTINES
        PUBLIC  GETEXT,GETFLD,DTBASE,DPYREC,XSEARC,DATALN
; SCAN SORT LABELS
        PUBLIC  SCANST
; CONSTANTS
        PUBLIC  CODDEL ; ##########################################
; ENTRY POINT
        PUBLIC  DSTART
; SHARED ROUTINES
        PUBLIC  BTASC2,BTASC3,RD2NUM
; SUPERVISOR CALLS
        EXTRN   PUTCLF,WRTCLF,WRTC,WRT,RD1CHR,PUTC,PWUP
        EXTRN   CHKKEY,ANYKEY,CHKPAG,ACTCHK,ACTPUL,DTIMBS,LSSETP
; LINE INTERFACE
        EXTRN   CTHOLD,MONTER
; EAR
        EXTRN   CRTOBF
        EXTRN   TMTICK,TMHOUR,TMINUT,TMSECD
        EXTRN   WORK99,SAVETM,SRCRCD,QUALIF,EXTENS,WRECRD,EEADRS
        EXTRN   STRPTR,SCNPTR,ENDPTR,TEMPTR,SCNEXT
        EXTRN   TEMPEX,TEMPLT,DBSIZE,EEPROM ; ## MACRO DEFINITIONS ####
PUT     MACRO   X       ;WRITE A MESSAGE TO OUTPUT DEVICE
XLIST
        LD      HL,X
        CALL    WRT
LIST
        ENDM RCSIZE  EQU     8       ;SIZE OF EACH DATABASE RECORD
M6X812  EQU     200     ;MAX SIZE OF DATABASE (VARIABLE)
*INCLUDE FUNC LIB

CRLFED  EQU     0A0DH

; ######  VERSION MESSAGE  ########
MSGR00  DEFW    CRLFED
        DEFM    ' TEST 4  6/17/83'
        DEFB    255

NULREC  EQU     0FFH
CODDEL: DEFB    NULREC,NULREC   ;CODE FOR DELETING RECORD IN PLACE

; ############################################
; APPLICATION CODE START
DSTART: CALL    PUT8LF
        CALL    PUT8LF
; MENU ITEMS
```

```
DSMENU  CALL    PUTCLF
        PUT     MSGR00          ;PRINT RELEASE #
        PUT     MSG000          ;DISPLAY MENU
DSENTR  PUT     MSG001          ;PUT 'ENTER COMMAND
DSMN00  CALL    RD1CHR          ;GET 1 CHARACTER WITH/OUT ECHO
        CP      0
        JP      Z,MODIFY        ;MODIFY EXTENSION
        CP      1
        JP      Z,FINDEX        ;READ EXTENSION
        CP      2
        JP      Z,LISTDB        ;LIST DATABASE
        CP      3
        JP      Z,IMPAGE        ;IMMEDIATE PAGE
        CP      4
        JP      Z,FINDMT        ;SEARCH DATABASE
        CP      5
        JP      Z,CONFIG        ;CONFIGURE SYSTEM
        CP      6
        JP      Z,DISTAT        ;DISPLAY STATUS & TIME
        CP      0AH
        JP      Z,DSMENU        ;DISPLAY MENU AGAIN
        JP      DSMN00          ;IGNORE KEY, LOOK FOR NEXT

; ##################################################
; MODIFY EXTENSION #
MODIFY  CALL    PUTNUM          ;ECHO CHARACTER TO SCREEN
        CALL    PUTCLF
        LD      HL,MSG015       ;PUT 'MODIFY EXTENSION
        CALL    WRTCLF
        LD      HL,MSG006       ;PUT HEADING
        CALL    WRTCLF
MODEXT  CALL    GETEXT          ;GET EXTENSION #
        JP      C,DSMENU        ;---->>>>>>> UNDEFINED, RETURN TO MENU
        CALL    DTBASE          ;ACCESS DATABASE
        LD      HL,MSG100       ;'PHONE NOT FOUND
        JR      C,MODOUT
        CALL    LFMARG          ;LEFT MARGIN
        CALL    DPYREC          ;DISPLAY RECORD W/ SPACES
        CALL    WRTCLF
        LD      HL,SPACES
        CALL    WRT             ;INDEX OUT TO FIELDS
        CALL    GETFLD          ;GET NEW FIELD VALUES
        LD      HL,MSG013       ;PUT 'W=
        CALL    WRT
        CALL    RD1CHR          ;GET 1 NUMBER OR TAB-SPACE
        CP      1
        LD      HL,MSG015       ;PUT 'NO
        JR      NZ,MODOUT       ;DON'T UPDATE
        LD      HL,MSG014       ;PUT 'YES'
        CALL    WRTCLF
        CALL    DPYREC          ;DISPLAY UPDATED RECORD
        CALL    WRTCLF          ;PRINT IT
        LD      HL,WRECRD
        LD      DE,(EEADRS)     ;EEPROM ADDRESS
        LD      BC,RCSIZE       ;RECORD SIZE
        CALL    WRITEE          ;WRITE TO EEPROM
        JR      MODEXT          ;GET NEXT NUMBER
MODOUT  CALL    WRTCLF          ;WRITE MESSAGE OUT
        JR      MODEXT

; ##################################################
; IMMEDIATE PAGE
IMPAGE: CALL    PUTNUM
```

```
           LD      HL,MSG030        ;PUT 'IMMEDIATE PAGE
           CALL    WRTCLF
           LD      HL,MSG042        ;PRINT HEADING
           CALL    WRTCLF
IMPAGO:    CALL    GETEXT           ;GET EXTENSION #
           JR      C,DSMENU         ;------>>>>>>> UNDEFINDED, GO TO MENU
           CALL    DTBASE           ;LOOK UP IN DATABASE. RETURNS IY -> RECORD
           LD      HL,MSG100        ;PUT 'PHONE NOT FOUND
           JR      C,IMPOUT
           LD      A,COMM01         ;DO COMMAND PAGE
           CALL    LSSETP           ;SEND PAGE OUT. IY MUST -> RECORD. HL -> STREAM
           CALL    LFMARG           ;LEFT MARGIN
           EX      DE,HL            ;DE -> C,RECORD,TIME
           CALL    DSFORM           ;DISPLAY CODE, RECORD, TIME
           JR      IMPAGO
IMPOUT     CALL    WRTCLF
           JR      IMPAGO           ;CONTINUE

; ##################################################
; FIND A RECORD BY EXTENSION #
FINDEX:    CALL    PUTNUM           ;ECHO CHARACTER TO SCREEN
           CALL    PUTCLF
           LD      HL,MSG017        ;PUT 'READ EXTENSION
           CALL    WRTCLF
           LD      HL,MSG006        ;PUT HEADING
           CALL    WRTCLF
FINEXT:    CALL    GETEXT           ;GET EXTENSION #
           JR      C,DSMENU         ;------>>>>>>> UNDEFINED, RETURN TO MENU
           CALL    DTBASE           ;ACCESS DATABASE
           LD      HL,MSG100        ;'PHONE NOT FOUND
           JR      C,FNDOUT
           CALL    LFMARG           ;LEFT MARGIN
           CALL    DPYREC           ;DISPLAY RECORD W/ SPACES
FNDOUT:    CALL    WRTCLF           ;WRITE IT OUT
           JR      FINEXT           ;GET NEW NUMBER

; ###########################
; SEARCH FOR DATABASE MATCH
FINDMT:    CALL    PUTNUM           ;ECHO CHARACTER
           CALL    PUTCLF
           LD      HL,MSG004        ;PUT 'SEARCH DATABASE
           CALL    WRTCLF
           LD      HL,MSG006        ;PRINT HEADING
           CALL    WRTCLF
           LD      HL,SPACES
           CALL    WRT
           CALL    MATFLD           ;GET FIELDS TO MATCH FOR
           LD      HL,MSG011        ;PUT 'OK
           CALL    WRTCLF
           LD      BC,EEPROM        ;-> DATABASE START
           LD      (FEADRS),BC      ;SAVE IT FOR INDEXING
           LD      DE,0000          ;HIT COUNT
           LD      BC,(DBSIZE)      ;GET # OF ENTRIES
FINDMO:    LD      A,C
           OR      B
           JR      Z,FINDXX         ;NO MORE, EXIT
           PUSH    BC
           PUSH    DE
           CALL    CHKKEY           ;SCAN FOR ESCAPE/PAUSE
           POP     DE
           POP     BC
           JR      C,FINDXX         ;ESCAPE NOW
           CALL    XSEARC           ;EXECUTE SEARCH
           JR      NC,FINDHR        ;NO HIT
```

```
            PUSH    DE
            CALL    DPYREC          ;HIT, DISPLAY RECORD
            CALL    WRTCLF
            POP     DE
            INC     DE              ;+1 HIT COUNT
            POP     BC
FINDM2:     DEC     BC
            JR      FINDM0
FINDXX:     CALL    PUTCLF
            CALL    LSCONT          ;DISPLAY COUNT IN DE REG
            JP      DSENTR          ;GET NEXT MENU COMMAND

; ###############################
; LIST DATABASE
LISTDB:     CALL    PUTNUM          ;ECHO CHARACTER
            CALL    PUTCLF
            LD      HL,MSG005       ;'LIST DATABASE'
            CALL    WRTCLF
            LD      HL,MSG006       ;PUT HEADING
            CALL    WRTCLF
            LD      DE,0000         ;HIT COUNT
            LD      IY,EEPROM       ;-> DATABASE
            LD      BC,(DBSIZE)     ;GET # OF ENTRIES IN DATABASE
LISTRC:     LD      A,B
            OR      C
            JR      Z,LISTXX        ;NO MORE, EXIT
            PUSH    BC
            INC     DE              ;+1 HIT COUNT
            PUSH    DE
            CALL    DPYREC          ;FORMAT RECORD INTO ASCII
            CALL    WRTCLF          ;WRITE IT OUT
            LD      BC,RCSIZE       ;SIZE OF EACH RECORD
            ADD     IY,BC           ;BUMP TO NEXT ONE
            CALL    CHKKEY          ;CHECK FOR PAUSE OR ESCAPE
            POP     DE
            POP     BC
            JR      C,LISTXX        ;ESCAPE HIT
            DEC     BC
            JR      LISTRC
LISTXX:     CALL    LSCONT          ;DISPLAY COUNT IN DE REG
            JP      DSENTR          ;LOOK FOR NEXT COMMAND

; PRINT COUNT IN DE REG.   PRINT TOTAL DB-SIZE
LSCONT:     LD      HL,CRTOBF
            PUSH    HL
            CALL    B16TA4          ;CONVERT BINARY DE TO 5 DIGITS ASCII (HL)
            LD      DE,MSG002       ;PUT 'LISTED'
            CALL    MVDEHL
            LD      (HL),255        ;STOP
            POP     HL
            CALL    WRTCLF
            RET

; ###############################################
; DISPLAY STATUS & TIME
DISTAT:     CALL    PUTNUM
            CALL    PUTCLF
            LD      HL,MSG040       ;PUT 'TIME TICKER'
            CALL    WRTCLF
            LD      HL,MSG042       ;PUT 'HEADER'
            CALL    WRTCLF
; CHECK QUEUE
DSTAT0:     CALL    ACTCHK          ;CHECK ACTIVITY QUEUE FOR ENTRY. DE -> DATA
            JR      NC,DSTATR
```

```
           CALL    DSFORM          ;FORMAT DATA & PRINT IT
           JR      DSTAT0

DSTAT2:    CALL    DTIMBS          ;+1 TIME-BASE IF CPM SYSTEM
           CALL    ANYKEY          ;CHECK FOR ANY KEY
           JR      C,DSTEXT        ;GO BACK TO MENU
           LD      A,(TMTICK)      ;CHECK TICKER
           CP      1
           JR      NZ,DSTAT2
           LD      A,00            ;CLEAR TICK INDICATOR
           LD      (TMTICK),A
           CALL    FRMCLK          ;FORMAT CLOCK
           CALL    WRT
           CALL    ACTCHK          ;CHECK ACTIVITY QUEUE FOR ENTRY. DE -> DATA
           JR      NC,DSTAT2
           CALL    LFMARG          ;RETURN TO LEFT MARGIN
           CALL    DSFORM          ;FORMAT DATA & PRINT IT
           JR      DSTAT2
; EXIT
DSTEXT:    CALL    PUTCLF
           JP      DSENTR          ;GET NEXT MENU ITEM

; FORMAT CLOCK
FRMCLK:    LD      HL,CRTOBF
           PUSH    HL
           LD      (HL),0DH        ;RETURN TO LEFT MARGIN
           INC     HL
           LD      A,(TMHOUR)
           CALL    BTASC2          ;CONVERT HOURS
           LD      (HL),':'
           INC     HL
           LD      A,(TMINUT)
           CALL    BTASC2          ;MINUTES
           LD      (HL),':'
           INC     HL
           LD      A,(TMSECD)
           CALL    BTASC2          ;SECONDS
           LD      (HL),' '
           INC     HL
           LD      (HL),255
           POP     HL
           RET

; FORMAT DATA (DE) INTO OUTPUT BUFFER & PRINT IT
DSFORM:    LD      HL,CRTOBF
           PUSH    HL
           CALL    FORMDS          ;FORMAT PAGE INFORMATION
           POP     HL
           CALL    WRTCLF          ;WRITE NEW ACTIVITY OUT
           RET

; ##################################################
; LIST SYSTEM STATISTICS & ALLOW SYSTEM CONFIGURATION
CONFIG:    CALL    PUTNUM
           CALL    PUTCLF
           CALL    PUTCLF
           LD      HL,MSG020       ;PUT 'TOTAL PHONES -
           CALL    WRT
           LD      HL,CRTOBF
           PUSH    HL
           LD      DE,(DBSIZE)
           CALL    D16TA4          ;CONVERT TOTAL DATABASE SIZE TO ASCII
           LD      (HL),255
           POP     HL
```

```
            LD      HL,MSG021       ;PRINT CONFIGURE MENU
            CALL    WRTCLF
CNEXT1:     LD      HL,MSG023       ;PUT 'CONFIGURE #
            CALL    WRT
            CALL    RD1CHR          ;GET 1 KEY
            CP      0AH
            JR      Z,CNEXXX        ;NOT VALID
            CP      0
            JR      Z,CNSORT        ;SORT & ORDER DATABASE
            CP      1
            JP      Z,INSERT        ;INSERT PHONE
            CP      2
            JP      Z,DELETE        ;DELETE PHONE
            CP      3
            JP      Z,PULPAG        ;PULL PAGE FROM CIRCULAR QUEUE
            CP      4
            JP      Z,CONF06        ;SET DEFAULT RECORD
            CP      5
            JP      Z,HISTRY        ;DISPLAY PAGE HISTORY
            CP      6
            JP      Z,STIMEC        ;SET TIME-CLOCK
            CP      7
            JP      Z,STCONL        ;CONTROL TELEPHONE LINES
            CP      8
            JR      Z,STMONT        ;MONITOR PHONE LINES
            CP      9
            JP      Z,STREST        ;RESET CPU
CNEXXX:     LD      HL,MSG024       ;PUT 'EXIT
            CALL    WRTCLF
            JP      DSENTR          ;GO TO MAIN MENU
CONFXX:     CALL    WRTCLF
            JR      CNEXT1          ;GET NEXT OPTION

; ORDER AND SORT DATABASE
CNSORT:     CALL    PUTCLF
            LD      HL,MSG010       ;PUT 'ORDER & SORT DATABASE
            CALL    WRTCLF
            CALL    SCANST          ;DO SCAN SORT
            LD      HL,MSG011       ;PUT 'OK
            JR      CONFXX

; EXECUTE LINE CONTROL
STCONL:     CALL    CTHOLD          ;EXECUTE CONTROL OVER TELEPHONE LINES
            LD      HL,MSG024       ;PUT 'EXIT
            JR      CONFXX

; MONITER PHONE LINE STATES
STMONT:     CALL    MONTER          ;MONITER PHONE LINE
            LD      HL,MSG024       ;PUT 'EXIT
            JP      CONFXX

; RESET CPU
STREST:     CALL    PUTCLF
            LD      HL,MSG025       ;PUT 'ENTER 1 TO RESET CPU
            CALL    WRT
            CALL    RD1CHR          ;GET KEY
            CP      1
            JP      NZ,CNEXXX       ;DON'T RESET
            JP      PWUP            ;POWER UP RESET POINT

; DEFAULT RECORD SETTING
CONF06:     CALL    PUTCLF
            LD      HL,TEMPEX
            LD      DE,WRECRD
```

```
                LDIR                        ;MOVE TO WORK RECORD
        CALL    CNFREC                      ;PRINT TEMPLATE W/ HEADING
        LD      HL,SPACE5
        CALL    WRT
        CALL    GETFLD                      ;GET FIELDS INTO WORK-RECORD
        LD      HL,MSG013                   ;PUT 'W=
        CALL    WRT
        CALL    RD1CHR
        CP      1
        LD      HL,MSG015                   ;PUT 'NO
        JP      NZ,CONFXX
; UPDATE DEFAULT RECORD
        LD      HL,WRECRD
        LD      DE,TEMPEX
        LD      BC,RCSIZE                   ;RECORD SIZE - EXTENSION BYTES
        CALL    WRITEE                      ;UPDATE EEPROM DATABASE
        LD      HL,MSG014                   ;PUT 'YES
        JP      CONFXX

; DISPLAY TEMPLATE RECORD
CNFREC: LD      HL,MSG006                   ;PRINT HEADING
        CALL    WRTCLF
        LD      IY,TEMPEX                   ;TEMPLATE RECORD
        CALL    DPYREC
        CALL    WRTCLF                      ;PRINT IT
        RET

; ################################################
; INSERT EXTENSION # IN DATABASE
INSERT: CALL    PUTNUM
        CALL    PUTCLF
        LD      HL,MSG007                   ;PUT 'INSERT EXTENSION
        CALL    WRTCLF
INEXTO: CALL    GETEXT                      ;GET EXTENSION #
        JP      C,CNEXT1                    ;---->>>>>>>> UNDEFINED, RETURN
        CALL    DTBASE                      ;ACCESS DATABASE
        LD      HL,MSG103                   ;'PHONE EXISTS
        JR      NC,INDOUT
        CALL    DEFALT                      ;SET DEFAULT VALUES
        CALL    INDASE                      ;INSERT INTO DATABASE
        LD      HL,MSG102                   ;PUT 'DATABASE OVERFLOW
        JR      C,INDOUT
        CALL    LFMARG                      ;LEFT MARGIN
        CALL    DPYREC                      ;DISPLAY NEW RECORD W/ SPACES
INDOUT: CALL    WRTCLF                      ;WRITE RECORD OUT
        JR      INEXTO

; ################################################
; DELETE EXTENSION FROM DATABASE
DELETE: CALL    PUTNUM
        CALL    PUTCLF
        LD      HL,MSG008                   ;PUT 'ERASE EXTENSION
        CALL    WRTCLF
DELXTO: CALL    GETEXT                      ;GET EXTENSION #
        JP      C,CNEXT1                    ;---->>>>>>>> UNDEFINED, RETURN
        CALL    DTBASE                      ;ACCESS DATABASE
        LD      HL,MSG100                   ;'PHONE NOT FOUND
        JR      C,DELOUT
        CALL    LFMARG                      ;LEFT MARGIN
        CALL    DELDBS                      ;DELETE FROM DATABASE
        CALL    DPYREC                      ;DISPLAY RECORD FOR REFERENCE
        CALL    WRTCLF
        LD      HL,MSG009                   ;PUT 'DELETED
DELOUT: CALL    WRTCLF                      ;WRITE RECORD OUT
        JR      DELXTO
```

```
; DELETE RECORD FROM DATABASE
DELDBS: LD      DE,(EEADRS)     ;GET ADDRESS OF EE DATABASE RECORD
        LD      HL,CODDEL
        LD      BC,02
        CALL    WRITEE          ;UPDATE EEPROM
        RET

; ###################
; DISPLAY HISTORY OF LAST PAGES
HISTRY: CALL    PUTCLF
        LD      HL,MSG041       ;PUT 'HISTORY
        CALL    WRTCLF
        LD      HL,MSG042       ;PUT 'HR:MN:SC   C   EXTN   --PAGE--.'
        CALL    WRTCLF
        LD      B,0FFH          ;FIRST REQUEST
HISTRO: CALL    ACTPUL          ;PULL LAST ACTIVITIES FROM QUEUE
        PUSH    BC              ;SAVE COUNT TO GO
        PUSH    HL              ;SAVE -> TO DATA
        EX      DE,HL
        CALL    DSFORM          ;FORMAT DATA (DE) & PRINT IT
        POP     HL
        POP     BC
        DJNZ    HISTRO          ;CONTINUE
        LD      HL,MSG011       ;PUT 'OK
        JP      CONFXX

; ###################
; SET TIME-CLOCK
STIMEC: CALL    PUTNUM
        CALL    PUTCLF
        CALL    FRMCLK          ;FORMAT CLOCK
        CALL    WRTCLF          ;PRINT IT
        LD      HL,TMHOUR
        LD      DE,SAVETM       ;SAVE OLD CLOCK
        LD      BC,3
        LDIR
; SET HOURS
        LD      A,23H           ;LIMIT
        CALL    RD2NUM          ;READ 2 KEYBOARD NUMBERS
        JR      C,STM00
        LD      (SAVETM),A      ;NEW HOUR
        JR      STM02
STM00:  CALL    BACK02          ;BACKUP CURSOR & WRITE NULLS
STM02:  LD      A,':'
        CALL    PUTC
; SET MINUTES
        LD      A,59H
        CALL    RD2NUM
        JR      C,STM04
        LD      (SAVETM+1),A    ;NEW MINUTE
        JR      STM06
STM04:  CALL    BACK02          ;BACKUP & WRITE NULLS
STM06:  LD      A,':'
        CALL    PUTC
; SET SECONDS
        LD      A,59H
        CALL    RD2NUM
        JR      C,STM08
        LD      (SAVETM+2),A    ;NEW SECONDS
        JR      STM09
STM08:  CALL    BACK02
; RE-PRINT CLOCK
STM09:  LD      A,' '
        CALL    PUTC
```

```
          CALL    WRT
          CALL    RD1CHR         ;GET PERMISSION TO UPDATE CLOCK
          CP      1
          LD      HL,MSG015      ;PUT 'NO
          JR      NZ,STMXX
          LD      HL,SAVETM
          LD      DE,TMHOUR      ;SET NEW CLOCK
          LD      BC,3
          LDIR
          CALL    FRMCLK         ;FORMAT CLOCK
STMXX:    JP      CONFXX         ;EXIT & WRITE ANSWER OUT

; ################################
; PULL PAGE FROM QUEUE
PULPAG:   CALL    PUTCLF
          LD      HL,MSG032      ;PUT 'ADDRESS X TM'
          CALL    WRTCLF
          LD      HL,WORK99      ;-> AREA FOR RETURNED DATA PACKAGE
PULPGO:   CALL    CHKPAG
          JP      NC,PULEXT      ;GET NEXT OPTION
          EX      DE,HL
          CALL    PULFOR         ;FORMAT PAGE PACKAGE
          CALL    WRTCLF         ;WRITE IT OUT
          JR      PULPGO
PULEXT:   LD      HL,MSG024      ;PUT 'EXIT
          JP      CONFXX

; FORMAT PULLED PAGE
PULFOR:   LD      HL,CRTOBF      ;-> OUTPUT BUFFER
          PUSH    HL
          LD      A,(DE)         ;FORMAT 7 DIGIT ADDRESS
          AND     0FH
          OR      '0'
          LD      (HL),A
          INC     DE
          INC     HL
          LD      B,3            ;REST OF ADDRESS
PULFRO:   LD      A,(DE)
          PUSH    DE
          CALL    BCDTBA         ;CONVERT BCD IN A TO BCD ASCII -> HL
          POP     DE
          INC     DE
          DJNZ    PULFRO

LD      A,(DE)
          AND     0F0H
          SRL     A
          SRL     A
          SRL     A
          SRL     A
          OR      '0'
          LD      (HL),A         ;X-MITTER
          INC     HL
          LD      (HL),' '
          INC     HL
          LD      A,(DE)         ;TIMING
          AND     0FH
          CALL    BTASC2         ;CONVERT BINARY A TO 2 ASCII
          LD      (HL),255
          POP     HL
          RET

;; FORMAT THE PAGE FOR DISPLAY.  CODE, RECORD, TIME
```

```
           LD      A,(DE)
           AND     0FH
           OR      '0'             ;FORMAT COMMAND BYTE
           LD      (HL),A
           INC     HL
           LD      (HL),' '
           INC     HL
           INC     DE
           PUSH    DE              ;INDEX IY -> RECORD
           POP     IY
           CALL    FMRECD          ;FORMAT RECORD AT IY INTO (HL)
;FORMAT CLOCK
           POP     IY
           LD      (HL),' '
           INC     HL
           LD      A,(IY+9)
           CALL    BTASC2          ;CONVERT HOURS
           LD      (HL),':'
           INC     HL
           LD      A,(IY+10)
           CALL    BTASC2          ;MINUTES
           LD      (HL),':'
           INC     HL
           LD      A,(IY+11)
           CALL    BTASC2          ;SECONDS
           LD      (HL),' '
           INC     HL
           LD      (HL),255
           RET

; $$$$$$$$$$$$$$$$$$$$$$$$
; EXECUTE SEARCH BASED ON WORK RECORD AND QUALIFIER FIELDS
XSEARC:    PUSH    HL
           PUSH    DE
           PUSH    BC
           LD      HL,(EEADRS)
           LD      DE,WRECRD
           LD      BC,RCSIZE
           LDIR
           LD      (EEADRS),HL     ;NEXT ADDRESS
           LD      IY,WRECRD       ;ACTUAL RECORD
           LD      IX,SRCRCD       ;TEMPLATE
           LD      A,(QUALIF)
           LD      B,A
           BIT     1,B
           JR      Z,XSNX02
           CALL    XSFD01
           JR      NC,XSNXXX
XSNX02:    BIT     2,B
           JR      Z,XSNX03
           CALL    XSFD02
           JR      NC,XSNXXX
XSNX03:    BIT     3,B
           JR      Z,XSNX04
           CALL    XSFD03
           JR      NC,XSNXXX
XSNX04:    BIT     4,B
           JR      Z,XSNX05
           CALL    XSFD04
           JR      NC,XSNXXX
XSNX05:    BIT     5,B
           JR      Z,XSNX06
           CALL    XSFD05
           JR      NC,XSNXXX
XSNX06:    BIT     6,B
```

```
          CALL     XSFD06
          JR       NC,XSNXXX
          SCF                       ;IT'S A HIT
XSNXXX:   POP      BC
          POP      DE
          POP      HL
          RET

; SEARCH MATCH CHECK   IY -> RECORD, AGAINST IX->TEMPLATE
XSFD01:   LD       A,(IY+RC02)
          XOR      (IX+RC02)
          BIT      7,A
          RET      NZ
          SCF                       ;MATCH
          RET
XSFD02:   LD       A,(IY+RC02)
          XOR      (IX+RC02)
          AND      11111B
          RET      NZ
          SCF                       ;MATCH
          RET
XSFD03:   LD       A,(IY+RC03)
          XOR      (IX+RC03)
          AND      111111B
          RET      NZ
          SCF                       ;MATCH
          RET
XSFD04:   LD       A,(IY+RC03)
          XOR      (IX+RC03)
          AND      11000000B
          RET      NZ
          SCF                       ;MATCH
          RET
XSFD05:   LD       A,(IY+RC04)
          XOR      (IX+RC04)
          AND      11110000B
          RET      NZ
          SCF
          RET
XSFD06:   LD       A,(IY+RC04)
          XOR      (IX+RC04)
          AND      1111B
          RET      NZ
          LD       A,(IY+RC05)
          XOR      (IX+RC05)
          RET      NZ
          LD       A,(IY+RC06)
          XOR      (IX+RC06)
          RET      NZ
          LD       A,(IY+RC07)
          XOR      (IX+RC07)
          RET      NZ
          SCF                       ;MATCH
          RET

;##############################################
;##############################################
; PROMPT FOR AND GET EXTENSION # TO BE ACCESSED. CFLAG=1 GOOD, =0 NO CHAR
GETEXT:   LD       HL,EXTENS+1      ;-> EXTENSION #
          LD       (HL),00          ;CLEAR ANSWER
          DEC      HL
          LD       (HL),00
          LD       B,4              ;4 MAX DIGITS
GTEXT0:   PUSH     BC
```

```
            CALL    RD1CHR          ;GET # OR TAB-SPACE
            POP     HL
            POP     BC
; RIGHT JUSTIFY 4 #'S, CONVERT TO BCD
            CP      0AH             ;TAB-SPACE?
            JR      Z,GTEXT4
            CP      0BH
            JR      Z,GTEXT6        ;ESCAPE
            CALL    PUTNUM          ;ECHO IT
            RLD                     ;ROTATE 1ST BYTE = LS DIGIT
            INC     HL
            RLD                     ;ROTATE 2ND BYTE = MS DIGIT
            DEC     HL
            DJNZ    GTEXT0
GTEXT4:     LD      A,B
            CP      4               ;IF TAB-SPACE FIRST CHAR, EXIT NOW
            JR      Z,GTEXT6
            OR      A
            RET
; ERROR EXIT
GTEXT6:     SCF
            RET

LEMARG:     LD      A,0DH
            CALL    PUTC            ;RETURN CURSOR TO LEFT MARGIN
            RET

; ###########################################
; INSERT WORK RECORD INTO DATABASE
INDASE:     LD      BC,(DBSIZE)
            LD      HL,MAXSIZ       ;CHECK AGAINST MAX SIZE
            OR      A
            SBC     HL,BC
            RET     C               ;> MAXSIZE, BIG-TIME ERROR!!!!!!
            SCF
            RET     Z               ;DATABASE IS FULL
            LD      HL,EEPROM       ;-> DATABASE
            LD      DE,RCSIZE       ;1 RECORD SIZE
INDB00:     LD      A,C
            OR      B
            JR      Z,INDB02        ;NO MORE, EXIT
            ADD     HL,DE           ;INDEX TO END OF TABLE
            DEC     BC
            JR      INDB00
INDB02:     EX      DE,HL           ;DE -> TARGET
            LD      HL,WRECRD       ;HL -> SOURCE WORK RECORD
            LD      BC,RCSIZE
            CALL    WRITEE          ;WRITE INTO EEPROM
; @@@@ PROBABLY WILL BE IN EEPROM AREA, SO DO EEPROM WRITE
            LD      BC,(DBSIZE)
            INC     BC
            LD      (DBSIZE),BC
            OR      A               ;OKAY
            RET

; ###########################################
; SEARCH DATABASE FOR RECORD  (LINEAR SEARCH)
DBSRCH:     LD      DE,(EXTENS)     ;GET EXTENSION #
            LD      IY,EEPROM       ;-> DATABASE
            LD      BC,(DBSIZE)     ;GET # OF ENTRIES IN DATABASE
DBSC0:      LD      A,B
            OR      C               ;CHECK COUNT
            SCF
            RET     Z               ;RECORD NOT FOUND
            LD      H,(IY+RC00)
```

```
                OR      A
                SBC     HL,DE           ;CHECK FOR MATCH
                JR      Z,DTBGOT        ;GOT MATCH
                PUSH    BC
                LD      BC,RCSIZE       ;SIZE OF EACH RECORD
                ADD     IY,BC           ;INDEX TO NEXT
                POP     BC
                DEC     BC
                JR      DTBSRC          ;CONTINUE
; GOT RECORD
DTBGOT: PUSH    IY
        POP     HL                      ;HL -> DATABASE RECORD
        LD      (EEADRS),HL             ;STORE ADDRESS OF EE DATABASE RECORD
        LD      DE,WRECRD               ;-> WORKING RECORD
        LD      BC,RCSIZE               ;RECORD SIZE
        LDIR                            ;MOVE IT
        LD      DE,WRECRD               ;-> ANSWER
        LD      IY,WRECRD
        OR      A
        RET

; ##############################################
; SEARCH DATABASE FOR LINE UNIT/LINE # MATCH   B=LINE #, C=LINE UNIT IN HEX
DATALN: LD      DE,(EXTENS)     ;GET EXTENSION #
        LD      IY,EEPROM       ;-> DATABASE
        LD      HL,(DBSIZE)     ;GET # OF ENTRIES IN DATABASE
DATAP0: LD      A,L
        OR      H               ;CHECK COUNT
        SCF
        RET     Z               ;RECORD NOT FOUNT
        LD      A,(IY+RC03)
        AND     111111B         ;GET LINE #
        CP      B
        JR      NZ,DATAP2       ;NO MATCH
        LD      A,(IY+RC02)
        AND     11111B          ;GET LINE UNIT
        CP      C
        JR      Z,DATPGX        ;GOT MATCH
DATAP2: PUSH    BC
        LD      BC,RCSIZE       ;SIZE OF EACH RECORD
        ADD     IY,BC           ;INDEX TO NEXT
        POP     BC
        DEC     HL
        JR      DATAP0          ;CONTINUE
; IY -> RECORD IN DATABASE
DATPGX: OR      A
        RET

; ##############################################
; SCAN AND SORT DATABASE
SCANST: LD      HL,0000         ;FINAL SIZE
        LD      DE,(DBSIZE)     ;TOTAL # RECORDS
        LD      B,RCSIZE        ;MULTIPLY FACTOR
SCNS00: ADD     HL,DE
        DJNZ    SCNS00
        LD      DE,EEPROM       ;-> FIRST OF DATABASE
        ADD     HL,DE           ;HL -> ADDRESS OF END OF DATABASE
        LD      (ENDPTR),HL     ;STORE -> END OF DATABASE
        LD      (STRPTR),DE     ;-> FIRST OF DATABASE

; LOOK FROM START POINTER TO END OF DATABASE FOR LOWER VALUE THAN START PTR
SCNS04: LD      HL,(STRPTR)
        LD      (SCNPTR),HL     ;STORE NEW SCAN POINTER
```

```
            OR      A
            SBC     HL,DE
            JP      Z,SCNSXX            ;END, EXIT NOW

; DO FRESH SCAN FROM START POINTER TO END OF DATABASE
            LD      HL,0FFFFH
            LD      (TEMPTR),HL         ;NULLIFY TEMP POINTER
; CONTINUE SCANNING FOR LEAST VALUE IN LIST
SCNS10: LD      DE,(SCNPTR)
            LD      HL,(ENDPTR)
            OR      A
            SBC     HL,DE
            JR      Z,SCNS20            ;END OF 1 SCAN. +SCAN POINTER
            EX      DE,HL               ;HL -> SCAN POINTER
            LD      D,(HL)              ;GET SCAN.EXT
            INC     HL
            LD      E,(HL)
            LD      HL,(CODDEL)
            OR      A
            SBC     HL,DE               ;SEE IF SCAN IS -> NULL RECORD
            JR      Z,SCNS18            ;YES
            LD      (SCNEXT),DE         ;SAVE SCAN.EXT
            LD      HL,(STRPTR)
            LD      D,(HL)              ;GET START.EXT
            INC     HL
            LD      E,(HL)
            LD      HL,(SCNEXT)
            OR      A                   ;DE=START.EXT, HL=SCAN.EXT
            SBC     HL,DE               ;COMPARE (SCAN.EXT) ? (START.EXT)
            JR      NC,SCNS18           ;IT'S =>
; IF TEMP.EXT > SCAN.EXT, THEN TEMP.EXT <- SCAN.EXT
            LD      HL,(TEMPTR)
            LD      D,(HL)
            INC     HL
            LD      E,(HL)              ;GET TEMP EXTN #
            LD      HL,(SCNEXT)         ;GET SCAN.EXT
            OR      A
            SBC     HL,DE               ;COMPARE (SCAN.EXT) ? (TEMP.EXT)
            JR      NC,SCNS18           ;IT'S =>
            LD      HL,(SCNPTR)
            LD      (TEMPTR),HL         ;SAVE LOCATION OF LOWER EXTENSION #
SCNS18: LD      HL,(SCNPTR)
            LD      BC,RCSIZE           ;INDEX SCAN POINTER TO NEXT RECORD
            ADD     HL,BC
            LD      (SCNPTR),HL
            JR      SCNS10

; END OF 1 COMPLETE SCAN. DO SWAP IF TEMP POINTER NOT NULL
SCNS20: LD      DE,(TEMPTR)
            LD      HL,0FFFFH
            OR      A
            SBC     HL,DE
            JR      Z,SCNS40            ;NO SWAP, EVERYTHING IN ORDER ON THIS PASS

; EXECUTE SWAP IN PLACE OF LEAST VALUE WITH CURRENT START POINTER
            LD      HL,(TEMPTR)
            LD      DE,WRECRD
            LD      BC,RCSIZE
            LDIR                        ;MOVE SMALLER RECORD TO WORK AREA
            LD      HL,(STRPTR)
            LD      DE,(TEMPTR)
            LD      BC,RCSIZE
            CALL    WRITEE              ;MOVE BIGGER RECORD INTO SLOT NEARER END
            LD      HL,WRECRD
            LD      DE,(STRPTR)
```

```
                CALL    WRITEE          ;MOVE SMALLER RECORD BACK INTO FRONT-END

; INCREMENT START POINTER TO NEXT LOCATION IN DATABASE
SCNS40: LD      HL,(STRPTR)
        LD      BC,RCSIZE
        ADD     HL,BC           ;+ START POINTER
        LD      (STRPTR),HL
        JP      SCNS04

; END. MARK NEW SIZE OF DATABASE DETERMINED BY # OF NULL RECORDS AT END
SCNSXX: LD      HL,EEPROM       ;-> DATABASE
        LD      DE,RCSIZE       ;SIZE OF 1 RECORD
        LD      IY,0000         ;FINAL COUNT
        LD      BC,(DBSIZE)     ;MAX TO MARK
SCNS90: LD      A,B
        OR      C
        RET     Z               ;END OF LIST. FIRST NULL RECORD NOT FOUND
        PUSH    BC
        PUSH    HL
        LD      B,(HL)          ;GET EXTENSION # FROM EEPROM DATABASE
        INC     HL
        LD      C,(HL)
        LD      HL,(CODDEL)     ;IS IT NULLIFIED RECORD?
        OR      A
        SBC     HL,BC
        POP     HL
        POP     BC
        JR      Z,SCNS94        ;YES, FOUND REAL END-OF-LIST
        ADD     HL,DE           ;INDEX TO NEXT RECORD
        INC     IY
        DEC     BC
        JR      SCNS90
SCNS94: PUSH    IY
        POP     DE
; @@@ NEED EEPROM WRITE CYCLE
        LD      (DBSIZE),DE     ;UPDATE NEW DATABASE SIZE COUNT
        RET

; SET DEFAULT VALUES -> WORK RECORD
DEFALT: LD      IY,WRECRD
        LD      DE,(EXTENS)     ;GET EXTENSION #
        LD      (IY+RC00),D
        LD      (IY+RC01),E     ;SET EXTENSION # INTO RECORD
        LD      HL,TEMPLT       ;-> TEMPLAT
        LD      DE,WRECRD+RC02
        LD      BC,RCSIZE-2
        LDIR
        RET

; @@@@ UPDATE EEPROM
WRITEE: LDIR
        RET

; ###################################
; ALLOW MODIFICATION OF FIELDS
GETFLD: LD      IY,WRECRD       ;-> WORK RECORD
        CALL    GTFD01          ;GET FIELD VALUE
        JR      NC,GTF01
        CALL    BACKUP          ;BACKUP TO PROPER COLUMN
        CALL    DSFD01          ;BUILD FIELD
        CALL    WRT             ;PRINT IT
GTF01:  CALL    GTFD02
        JR      NC,GTF02
        CALL    BACKUP
        CALL    DSFD02
```

```
GTF02:  CALL    GTFD03
        JR      NC,GTF03
        CALL    BACKUP
        CALL    DSFD03
        CALL    WRT
GTF03:  CALL    GTFD04
        JR      NC,GTF04
        CALL    BACKUP
        CALL    DSFD04
        CALL    WRT
GTF04:  CALL    GTFD05
        JR      NC,GTF05
        CALL    BACKUP
        CALL    DSFD05
        CALL    WRT
GTF05:  CALL    GTFD06
        RET     NC
        CALL    BACKUP
        CALL    DSFD06
        CALL    WRT
        RET

; PRINT 1 SPACE
ONESPC: LD      A,' '
        JP      PUTC

; SET QUALIFIERS FOR MATCHING SEARCH
MATFLD: LD      IY,SRCRCD       ;-> SEARCH RECORD
        LD      IX,QUALIF
        LD      (IX),00         ;CLEAR QUALIFIER LIST
        CALL    GTFD01          ;GET KEYBOARD INPUT
        JR      NC,MTF01
        CALL    WTNULL          ;WRITE OUT NULL CHARACTERS
        SET     1,(IX)
MTF01:  CALL    GTFD02
        JR      NC,MTF02
        CALL    WTNULL
        SET     2,(IX)
MTF02:  CALL    GTFD03
        JR      NC,MTF03
        CALL    WTNULL
        SET     3,(IX)
MTF03:  CALL    GTFD04
        JR      NC,MTF04
        CALL    WTNULL
        SET     4,(IX)
MTF04:  CALL    GTFD05
        JR      NC,MTF05
        CALL    WTNULL
        SET     5,(IX)
MTF05:  CALL    GTFD06
        JR      NC,MTF06
        CALL    WTNULL
        SET     6,(IX)
MTF06:  SET     7,(IX)          ;NULL BIT
        LD      A,(IX)
        CPL                     ;COMPLEMENT BITS
        LD      (IX),A
        RET

; BACKSPACE BY COUNT IN B REGISTER. PRINT NULLS FROM C REGISTER
WTNULL: CALL    BACKUP
        LD      B,C
        LD      HL,NULXX
        CALL    WRTC
```

```
            CALL    PUTC                ; PRINT 1 SPACE
            RET

; BACKSPACE BY COUNT IN B REGISTER. PRINT NULLS FROM C REGISTER
BACK02:     CALL    BACKUP
            LD      B,C
            LD      HL,NULXXX
            CALL    WRTC
            RET

; BACK UP CURSOR BY COUNT IN B REG
BACKUP:     LD      A,B
            CP      0
            RET     Z
            LD      HL,BACKSP
            CALL    WRTC
            RET

BACKSP:     DEFB    8,8,8,8,8,8,8,8
NULXXX:     DEFM    'xxxxxxxx'

; PACER ON/OFF
GTFD01:     CALL    RD1CHR              ; GET 1 NUMBER
            CP      0AH
            LD      B,0                 ; # OF CHARACTERS
            LD      C,1
            SCF
            RET     Z                   ; TAB-SPACE
            CP      0BH
            JR      Z,GTFD01
            CP      2
            JR      NC,GTFD01
            CALL    PUTNUM              ; ECHO #
            LD      B,(IY+RC02)
            RL      B
            SRL     A                   ; SET/CLEAR CARRY
            RR      B                   ; ROTATE BIT IN
            LD      (IY+RC02),B
            CALL    ONESPC              ; WRITE 1 SPACE OUT
            OR      A
            RET

; LINE UNIT
GTFD02:     LD      A,31H               ; LIMIT
            CALL    RD2NUM              ; GET 2 NUMBERS
            RET     C                   ; TAB-SPACE
            LD      B,A
            LD      A,(IY+RC02)
            AND     11100000B
            OR      B
            LD      (IY+RC02),A         ; RE-STORE
            CALL    ONESPC              ; WRITE 1 SPACE OUT
            OR      A
            RET

; LINE #
GTFD03:     LD      A,49H
            CALL    RD2NUM              ; GET 2 NUMBERS
            RET     C                   ; TAB-SPACE
            LD      B,A
            LD      A,(IY+RC03)
            AND     11000000B
            OR      B
            LD      (IY+RC03),A         ; RE-STORE
            CALL    ONESPC              ; WRITE 1 SPACE OUT
```

```
                RET

; XMITTER
GTFD04: CALL    RD1CHR          ; GET 1 NUMBER
        CP      0AH
        LD      B,0             ; # OF CHARACTERS
        LD      C,1
        SCF
        RET     Z               ; TAB-SPACE
        CP      4
        JR      NC,GTFD04
        CALL    PUTNUM          ; ECHO CHARACTER
        AND     11B
        LD      B,A
        RR      B
        RR      B               ; MOVE NIBBLES TO HIGH 2 BITS
        RR      B
        LD      A,(IY+RC03)
        AND     111111B
        OR      B
        LD      (IY+RC03),A     ; RE-STORE
        CALL    ONESPC          ; WRITE 1 SPACE OUT
        OR      A
        RET

; TIMING
GTFD05: LD      A,15H           ; LIMIT
        CALL    RD2NUM          ; GET 2 NUMBERS
        RET     C               ; TAB-SPACE
        LD      B,A
        SLA     B
        SLA     B               ; MOVE TO TOP NIBBLE
        SLA     B
        SLA     B
        LD      A,(IY+RC04)
        AND     1111B
        OR      B
        LD      (IY+RC04),A     ; RE-STORE
        CALL    ONESPC          ; WRITE 1 SPACE OUT
        OR      A
        RET

; PAGER ADDRESS
GTFD06: LD      HL,WORK99
        LD      DE,WORK99+1     ; CLEAR RESULT
        LD      BC,3
        LD      (HL),00
        LDIR
        LD      C,0             ; COUNTER
        LD      B,7             ; MAX
GTFL30: CALL    RD1CHR
        CP      0AH             ; TAB-SPACE
        JR      Z,GTFL33
        CALL    PUTNUM          ; ECHO CHARACTER
        LD      HL,WORK99+3
        RLD                     ; ROTATE ANSWER INTO STORAGE
        DEC     HL
        RLD                     ; TOP BYTE
        DEC     HL
        RLD                     ; MIDDLE
        DEC     HL
        RLD                     ; LAST
        INC     C
        DJNZ    GTFL30
        LD      HL,WORK99
```

```
            AND     11110000B
            OR      (HL)
            LD      (IY+RC04),A         ;NIBBLE
            INC     HL
            LD      A,(HL)
            LD      (IY+RC05),A         ;TOP
            INC     HL
            LD      A,(HL)
            LD      (IY+RC06),A         ;MIDDLE
            INC     HL
            LD      A,(HL)
            LD      (IY+RC07),A         ;LOW
            CALL    ONESPC              ;WRITE 1 SPACE OUT
            OR      A
            RET
GTFL33:     LD      B,C                 ;LOAD # OF CHARACTERS TO BACKSPACE
            LD      C,7
            SCF
            RET

; DISPLAY FIELDS
DSFD01:     LD      HL,CRTOBF
            CALL    FLD01
            JR      DSFGO
DSFD02:     LD      HL,CRTOBF
            CALL    FLD02
            JR      DSFGO
DSFD03:     LD      HL,CRTOBF
            CALL    FLD03
            JR      DSFGO
DSFD04:     LD      HL,CRTOBF
            CALL    FLD04
            JR      DSFGO
DSFD05:     LD      HL,CRTOBF
            CALL    FLD05
            JR      DSFGO
DSFD06:     LD      HL,CRTOBF
            CALL    FLD06

; STOP CHARACTER, WRITE TO SCREEN
DSFGO:      LD      (HL),' '
            INC     HL
            LD      (HL),255
            LD      HL,CRTOBF
            RET

; ###################################################
; DISPLAY THE RECORD -> IY INTO OUTPUT BUFFER
DPYREC:     LD      HL,CRTOBF           ;-> OUTPUT BUFFER
            PUSH    HL
            CALL    FMRECD              ;FORMAT RECORD
            POP     HL
            RET

FMRECD:     CALL    FLD00               ;EXTENSION #
            CALL    ADSPAC
            CALL    FLD01               ;PAGER ON/OFF
            CALL    ADSPAC
            CALL    FLD02               ;LINE UNIT
            CALL    ADSPAC
            CALL    FLD03               ;LINE #
            CALL    ADSPAC
            CALL    FLD04               ;XMITTER
            CALL    ADSPAC
            CALL    FLD05               ;TIMING
```

```
            CALL    FLD06               ;ADDRESS
            LD      (HL),255            ;STOP CHARACTER
            RET

; ##################################################
; DISPLAY PAGE RECORD -> IY INTO OUTPUT BUFFER
DPYPAG:     LD      HL,CRTOBF           ;-> OUTPUT BUFFER
            PUSH    HL
            CALL    FLD00               ;EXTENSION #
            CALL    ADSPAC
            CALL    FLD04               ;XMITTER
            CALL    ADSPAC
            CALL    FLD05               ;TIMING
            CALL    ADSPAC
            CALL    FLD06               ;ADDRESS
            LD      (HL),255            ;STOP CHARACTER
            POP     HL
            RET

; EXTENSION #
FLD00:      LD      A,(IY+RC00)
            CALL    NULCHK              ;CONVERT BCD IN A REG TO ASCII -> HL
            LD      A,(IY+RC01)
            CALL    NULCHK
            RET

; PAGER ON/OFF
FLD01:      BIT     7,(IY+RC02)
            LD      A,'0'
            JR      Z,DPYR02
            INC     A
DPYR02:     LD      (HL),A
            INC     HL
            RET

; LINE UNIT
FLD02:      LD      A,(IY+RC02)
            AND     11111B              ;5 BITS WORTH
            CP      32
            JR      NC,FDINV2           ;VALUE NOT OKAY
            CALL    BTASC2              ;CONVERT BINARY TO ASCII
            RET

; LINE #
FLD03:      LD      A,(IY+RC03)
            AND     111111B
            CP      50
            JR      NC,FDINV2           ;VALUE NOT OKAY, FILL WITH ERROR SYMBOLS
            CALL    BTASC2              ;CONVERT BINARY TO ASCII
            RET

; 2 BYTE FIELD HAS INVALID VALUE. MOVE ERROR SYMBOL INTO OUTPUT BUFFER
FDINV2:     LD      DE,FILLR2           ;FILL IN WITH ERROR SYMBOLS
            CALL    MVDEHL
            RET
FILLR2:     DEFM    '??'
            DEFB    255

; XMITTER #
FLD04:      LD      A,(IY+RC03)
            AND     11000000B           ;MASK OUT AND CLEAR CARRY
            RL      A
            RL      A                   ;SHIFT TO LOWER 2 BITS
            RL      A
```

```
                LD      (HL),A          ;STORE XMITTER #
                INC     HL
                RET

; TIMING
FLD05:          LD      A,(IY+RC04)
                AND     11110000B
                SRL     A
                SRL     A
                SRL     A
                SRL     A
                CALL    BTASC2          ;CONVERT BINARY TO ASCII
                RET

; PAGER ADDRESS
FLD06:          LD      A,(IY+RC04)
                AND     1111B
                OR      '0'
                CP      3AH
                JR      C,FLD06B
                LD      A,'?'
FLD06B:         LD      (HL),A          ;TOP DIGIT
                INC     HL
                LD      A,(IY+RC05)     ;HI BCD
                CALL    FILTER
                LD      A,(IY+RC06)     ;MIDDLE BCD
                CALL    FILTER
                LD      A,(IY+RC07)     ;LOW BCD
                CALL    FILTER
                RET

; CHECK FOR NULL RECORD, CONVERT TO BCD IF OKAY
NULCHK:         CP      NULREC
                JR      Z,NULCKO
                CALL    BCDTBA          ;CONVERT BCD IN A REG TO BCD ASCII -> HL
                RET                     ;IE > ASCII BCD, THE RETURNS ERROR CHAR
NULCKO:         LD      (HL),'?'        ;INSERT ? MARKS INDICATING NULL RECORD
                INC     HL
                LD      (HL),'?'
                INC     HL
                RET

; ##############################
; READ IN 2 NUMBERS. CHECK ENTRIES AGAINST LIMIT
; IE TAB-SPACE ENTERED, EXIT WITH CARRY SET
RD2NUM          LD      B,A             ;STORE LIMIT
                SRL     B
                SRL     B
                SRL     B
                SRL     B               ;SAVE MSD
                AND     0FH
                LD      C,A             ;SAVE LSD
RD2NM0          CALL    RD1CHR          ;GET 1 NUMBER OR TAB-SPACE
                CP      0BH
                JR      Z,RD2NM0        ;DON'T ALLOW ESCAPES
                CP      0AH
                JR      Z,RD2NM8        ;TAB=SPACE, EXIT NOW
                CP      B
                JR      Z,RD2NM1        ;=
                JR      NC,RD2NM0       ;FIRST # TOO BIG
RD2NM1:         LD      D,A             ;SAVE ANSWER
                CALL    PUTNUM          ;ECHO TO SCREEN
RD2NM2          CALL    RD1CHR          ;GET 1 NUMBER OR TAB-SPACE
                CP      0BH
                JR      Z,RD2NM2        ;DON'T ALLOW ESCAPES
```

```
            JR      Z,RD2NM9            ;TAB=SPACE
            LD      E,A                 ;SAVE LSD
            LD      A,D
            CP      B
            LD      A,E                 ;ACTUAL #
            JR      NZ,RD2NM4           ;FIRST DIGIT IS < MAX, DON'T CHECK 2ND DIGIT
            CP      C
            JR      Z,RD2NM4            ;=
            JR      NC,RD2NM2           ;OUT OF RANGE, DON'T ACCEPT
RD2NM4:     CALL    PUTNUM              ;ECHO CHAR
            SLA     D
            SLA     D
            SLA     D
            SLA     D
            OR      D
            CALL    BYTEX               ;CONVERT 1 BCD # TO HEX
            OR      A                   ;CLEAR CARRY
            RET
RD2NM8:     LD      B,0                 ;# TO BACKSPACE
            JR      RD2NMA
RD2NM9:     LD      B,1
RD2NMA:     LD      C,2                 ;TOTAL # OF CHARACTERS
            SCF
            RET

; ####################################
; PRINT 1 NUMERIC CHAR
PUTNUM:     PUSH    AF
            AND     0FH
            OR      '0'                 ;MAKE ASCII
            CALL    PUTC                ;WRITE OUT
            POP     AF
            RET

; CONVERT 2 DIGIT BCD TO HEX
BYTEX:      LD      B,A
            AND     0FH
            LD      E,A                 ;SAVE UNIT
            LD      A,B
            AND     0F0H                ;TEN DIGIT
            SRL     A
            SRL     A
            SRL     A
            SRL     A
            OR      A                   ;CHECK FOR ZERO
            JR      Z,BYTX1
            LD      B,A                 ;SET COUNT
            LD      A,00
            LD      D,0AH               ;D=10
BYTX:       ADD     A,D                 ;ADD BY # OF TEN DIGITS
            DJNZ    BYTX
BYTX1:      ADD     A,E
            RET

; CONVERT BCD TO ASCII, CONVERT > BCD DIGITS TO '?'
FILTER:     LD      D,A
            AND     0FH
            OR      '0'
            CP      '9'+1
            JR      C,FILG1
            LD      A,'?'               ;UNDEFINED
FILG1:      LD      E,A
            LD      A,D
            SRL     A
            SRL     A
```

```
            SRL     A
            OR      '0'
            CP      '9'+1
            JR      C,FILG2
            LD      A,'?'           ;UNDEFINED
FILG2:      LD      (HL),A
            INC     HL
            LD      (HL),E
            INC     HL
            RET

ADSPAC:     LD      (HL),' '        ;ADD 1 SPACE AT (HL)
            INC     HL
            RET

; ###########################################
; CONVERT BINARY TO 3 ASCII CHARACTERS -> HL
BTASC3:     LD      C,'0'
            LD      B,100
            CALL    BTASC1          ;HUNDREDS
; CONVERT HEX TO 2 ASCII
BTASC2:     LD      C,'0'
            LD      B,10
            CALL    BTASC1          ;TENS
            OR      '0'
            LD      (HL),A          ;UNITS
            INC     HL
            RET
BTASC1:     SUB     B               ;SUBTRACT BASE
            JR      C,BTASC4
            INC     C
            JR      BTASC1
BTASC4:     ADD     A,B             ;ADJUST
            LD      (HL),C          ;STORE VALUE
            INC     HL
            RET

; CONVERT BCD IN A REG TO BCD ASCII -> HL.  HEX CHARACTERS = '>'
BCDTBA:     LD      D,A
            AND     0FH
            OR      '0'
            CP      3AH
            JR      C,ADIG1
            LD      A,'>'           ;ERROR IF CARRY
ADIG1:      LD      E,A
            LD      A,D
            SRL     A
            SRL     A
            SRL     A
            SRL     A
            OR      '0'
            CP      3AH
            JR      C,ADIG2
            LD      A,'>'           ;ERROR IF CARRY
ADIG2:      LD      (HL),A
            INC     HL
            LD      (HL),E
            INC     HL
            RET

; CONVERT BINARY # IN DE TO ASCII -> (HL)
B16TA4:     LD      BC,10000        ;1ST DIGIT
            CALL    B16TA1
            LD      BC,1000         ;2ND DIGIT
            CALL    B16TA1
```

```
            CALL    B16TA1
            LD      BC,10           ;4TH DIGIT
            CALL    B16TA1
            LD      A,'0'
            ADD     A,E
            LD      (HL),A          ;LAST DIGIT
            INC     HL
            LD      (HL),255
            RET
B16TA1:     EX      DE,HL
            LD      A,'0'-1
B16TA2:     INC     A
            OR      A               ;CLEAR CARRY
            SBC     HL,BC           ;SUBTRACT DIGIT COUNT
            JR      NC,B16TA2       ;CONTINUE UNTIL UNDERFLOW
            ADD     HL,BC           ;UNDO UNDERFLOW
            EX      DE,HL
            LD      (HL),A          ;STORE CHARACTER
            INC     HL
            RET

; MOVE (DE) -> (HL) UNTIL STOP CHARACTER
MVDEHL:     LD      A,(DE)
            CP      255
            RET     Z
            LD      (HL),A
            INC     HL
            INC     DE
            JR      MVDEHL

; OUTPUT 8 LINE-FEEDS TO CLEAR SCREEN
PUT8LF:     LD      HL,MSGLFD
            CALL    WRT
            RET
MSGLFD:     DEFW    CRLFED
            DEFB    10,10,10,10,10,10,10
            DEFB    255

; ##############################
; CONSTANTS
MSG000:     DEFW    CRLFED
            DEFM    '0  MODIFY'
            DEFW    CRLFED
            DEFM    '1  READ'
            DEFW    CRLFED
            DEFM    '2  LIST'
            DEFW    CRLFED
            DEFM    '3  PAGE'
            DEFW    CRLFED
            DEFM    '4  SEARCH'
            DEFW    CRLFED
            DEFM    '5  CONFIGURE'
            DEFW    CRLFED
            DEFM    '6  TIME & STATUS'
            DEFW    CRLFED
            DEFB    255
MSG001:     DEFM    'ENTER COMMAND '
            DEFB    255
MSG003:     DEFM    ' LISTED '
            DEFB    255
MSG004:     DEFM    'SEARCH DATABASE'
            DEFB    255
MSG005:     DEFM    'LIST DATABASE '
            DEFB    255
*MSG006     DEFM    'EXTN P LU LH X TM ADDRESS'
```

```
MSG007: DEFM    'INSERT EXTENSION'
        DEFB    255
MSG008: DEFM    'ERASE EXTENSION'
        DEFB    255
MSG009: DEFM    ' PHONE DELETED'
        DEFB    255
MSG010: DEFM    'ORDER & SORT DATABASE'
        DEFB    255
MSG011: DEFM    'OK'
        DEFB    255
MSG013: DEFM    'W='
        DEFB    255
MSG014: DEFM    'YES'
        DEFB    255
MSG015: DEFM    'NO'
        DEFB    255
MSG016: DEFM    'MODIFY EXTENSION'
        DEFB    255
MSG017: DEFM    'READ EXTENSION'
        DEFB    255

; CONFIGURATION
MSG020: DEFM    'TOTAL PHONES  -'
        DEFB    255
MSG021: DEFM    '0 SORT DATABASE'
        DEFW    CRLFED
        DEFM    '1 INSERT'
        DEFW    CRLFED
        DEFM    '2 DELETE'
        DEFW    CRLFED
        DEFM    '3 PULL PAGE'
        DEFW    CRLFED
        DEFM    '4 DEFAULT RECORD'
        DEFW    CRLFED
        DEFM    '5 HISTORY'
        DEFW    CRLFED
        DEFM    '6 SET CLOCK'
        DEFW    CRLFED
        DEFM    '7 CONTROL LINE'
        DEFW    CRLFED
        DEFM    '8 MONITOR LINE'
        DEFW    CRLFED
        DEFM    '9 RESET CPU'
        DEFB    255
MSG023: DEFM    'CONFIGURE #'
        DEFB    255
MSG024: DEFM    'EXIT'
        DEFB    255
MSG025: DEFM    'ENTER 1 TO RESET CPU '
        DEFB    255

; IMMEDIATE PAGE
MSG030: DEFM    'IMMEDIATE PAGE'
        DEFB    255
MSG031: DEFM    ' PAGE SENT'
        DEFB    255
MSG032: DEFM    'ADDRESS X TM'
        DEFB    255

MSG040: DEFM    'TIME & ACTIVITY'
        DEFB    255
MSG041: DEFM    'HISTORY'
        DEFB    255
MSG042: DEFM    'C EXTN P LU LH X TM ADDRESS HR:MN:SC'
        DEFB    255
SPACES: DEFM    '                '
        DEFB    255

; ERROR MESSAGES
MSG100: DEFM    ' PHONE NOT FOUND'
        DEFB    255
MSG102: DEFM    ' DATABASE OVERFLOW'
        DEFB    255
MSG103: DEFM    ' PHONE EXISTS'
        DEFB    255

END
```

PAGE 62
```
        TITLE   DATE 6/17/83  kbd  4  L #1B
        SUBTTL  PBELL LINE INTEFACE
.Z80
; @@@@ FOR DEBUGGING
        PUBLIC  OUTLIN, NMRING
        PUBLIC  LSLINE, LSCOMD, DTLOOK, DTFOND
        PUBLIC  LSIDLE, LSACTV, LSDEBN, LSNEXT, LSSEZO, LSTONE ; ENTRY POINTS
        PUBLIC  INFACE, LISCAN, CTHOLD, MONTER
        EXTRN   HIBER, ANYKEY
; UTILITIES
        EXTRN   LSSETP
        EXTRN   PUTCLF, WRTCLF, WRT, PUTC, RD1CHR, PUTNUM, BTASC3, RD2NUM
; RAM
        EXTRN   PHNLIN, CURPHN, OLDACT, SCNTAB
        EXTRN   CRTOBF, EEPROM, DBSIZE
; COMMAND LINE RAM
        EXTRN   TMPREC, SVRECD, RTLOCT, TONCNT, TONSTR, SAVHL

RCSIZE  EQU     8       ;SIZE OF 1 DATABASE RECORD

SHFT00  EQU     08H     ;SHIFT PORT 0 -> 31
STRB00  EQU     0AH     ;STROBE PORT 0 -> 15
STRB01  EQU     12H     ;STROBE PORT 16 -> 31
RDET00  EQU     0CH     ;RING DETECT FOR 0 -> 7 LINES
RDET01  EQU     0EH     ;RING DETECT FOR 8 -> 15 LINES
RDET02  EQU     14H     ;RING DETECT FOR 16 -> 23 LINES
RDET03  EQU     16H     ;RING DETECT FOR 24 -> 31 LINES
DTMF00  EQU     1CH     ;DTMF GENERATOR PIO
SLDTMF  EQU     20H     ;SELECT DTMF DECODER
RDDTMF  EQU     24H     ;READ DTMF DECODER

CODE00  EQU     0               ;RELEASE LINE
CODE01  EQU     00000100B       ;SEIZE LINE CODE
CODE02  EQU     00111100B       ;ENABLE DTMF & ANALOG SWITCH
CODE03  EQU     01001100B       ;GENERATE BEEP
CODE04  EQU     10001100B       ;BUSY
CODE05  EQU     00101100B       ;RING BACK

TOTLIN  EQU     32      ;# OF LINES IN SYSTEM
SCNSIZ  EQU     8       ;# BYTES IN 1 STATE TABLE ENTRY

; OFFSETS INTO STATE TABLE
LSTATE  EQU     0       ;CURRENT STATUS CODE. IDLE OR RINGING
LSLEVL  EQU     1       ;INTER-RING GROUP STATUS CODE
LCOUNT  EQU     2       ;SEIZE COUNT-DOWN
LSRNGC  EQU     3       ;ACTUAL RING COUNT
LCCODE  EQU     4       ;COMPLETION CODE
LTIMER  EQU     5       ;LINE TIMER
CMCODE  EQU     6       ;LAST COMMAND CODE

; TELEPHONE STATE TABLE CODES
LCIDLE  EQU     0       ;IDLE
LCACTV  EQU     1       ;RINGING ACTIVELY
LCCMD   EQU     2       ;COMMAND LINE
LRMOVE  EQU     3       ;REMOVED FROM SERVICE

; LEVEL STATE CODES
LCTRUD  EQU     0       ;CHECK FOR TRUE RING DETECT
LCHECK  EQU     1       ;CHECK FOR PAGER ON
```

```
LCNEXT    EQU    3              ;WAITING FOR NEXT RING IN GROUP (NOT FIRST)
LCSEZO    EQU    4              ;SEIZE 1ST TIME
LCFLSH    EQU    5              ;FLASH LINE
LCSEZ1    EQU    6              ;SEIZE 2ND TIME
LCTONE    EQU    7              ;GENERATE DTMF
LCDELY    EQU    8              ;DELAY

; LEVEL STATE CODES FOR COMMAND LINE
CDELYO    EQU    0              ;DELAY BEFORE READY-BEEP
CBEEPO    EQU    1              ;GENERATING READY-BEEP
CTONEO    EQU    2              ;GETTING DTMF TONE
CHDATA    EQU    3              ;WAITING FOR DATABASE LOOKUP
CTONE2    EQU    4              ;EXTENSION # ACKNOWLEDGE BEEP
CTYPEP    EQU    5              ;WAITING FOR OPTIONAL TIMING FOR IN-HOUSE PAGE
OPACKO    EQU    6              ;OPTION ACK 0
OPACK1    EQU    7              ;* PAGER ON TONE
CERROO    EQU    8              ;ERROR BEEP TONE

#INCLUDE FUNC.LIB

CRLFED    EQU    0A0DH

; PARAMETER TIMING VALUES
NMRING:   DEFB   0              ;# OF RINGS BEFORE SEIZE
UNTIME:   DEFB   70             ;MAX # OF TIME-UNITS BEFORE NEXT RING MUST HAPPEN
SZTIME:   DEFB   10             ;ACTUAL # OF TIME-UNITS TO SEIZE LINE
DEBOUNC:  DEFB   30             ;RING DEBOUNCE TIMER
FLTIME:   DEFB   10             ;FLASH TIME
TONTIM:   DEFB   6              ;DTMF PARK TONE TIME

;$$$$$$$$$$$$$$$$$$$$$$$$$$$$$$
; INITIALIZE LINE INTERFACE CODE
INFACE:   LD     A,04FH         ;SET CNTL PORT AS INPUTS
          LD     C,RDDTMF+1     ;READ DTMF DECODER
          OUT    (C),A
          LD     C,RDETO0+1     ;SET RING DETECT PIO
          OUT    (C),A
          LD     C,RDETO1+1     ;SET RING DETECT PIO
          OUT    (C),A
          LD     C,RDETO2+1     ;SET RING DETECT PIO
          OUT    (C),A
          LD     C,RDETO3+1     ;SET RING DETECT PIO
          OUT    (C),A
; SET UP STROBE PIO TO LATCH DATA TO SEIZE, ANSWER, RING-BACK, ETC
          LD     A,OFH          ;SET AS OUTPUT
          LD     C,SHFTOO+1     ;SHIFT PIO
          OUT    (C),A
          LD     C,STRBOO+1     ;STROBE PIO
          OUT    (C),A
          LD     C,STRBO1+1     ;STROBE PIO
          OUT    (C),A
          LD     C,SLDTMF+1     ;SELECT DTMF DECODER
          OUT    (C),A
; SET PIO DATA PORT LATCHES
          LD     A,OFFH
          LD     C,SHFTOO
          OUT    (C),A          ;SET SHIFT HIGH
          LD     C,STRBOO
          OUT    (C),A          ;SET STROBES HIGH
          LD     C,STRBO1
          OUT    (C),A          ;SET STROBES HIGH
          LD     C,SLDTMF
          OUT    (C),A          ;SELECT DTMF DECODER
```

```
              OUT      (C),A                  ;SET RING DETECTS HIGH
              LD       C,RDET01
              OUT      (C),A
              LD       C,RDET02
              OUT      (C),A
              LD       C,RDET03
              OUT      (C),A

LD       B,16
              LD       A,0FFH
   INFC00     OUT      (SHFT00),A             ;SHIFT ALL 1'S OUT
              DJNZ     INFC00
              LD       A,00
              OUT      (STRB00),A             ;STROBE LOW
              LD       A,0FFH
              OUT      (STRB00),A             ;STROBE HI
              LD       A,00
              OUT      (STRB01),A             ;STROBE LOW
              LD       A,0FFH
              OUT      (STRB01),A             ;STROBE HI

; CLEAR DTMF ENCODER
              LD       B,65
   INFC03:    PUSH     BC
              CALL     GETONE                 ;CLEAR DTMF RECEIVER
              POP      BC
              DJNZ     INFC03

; INITIALIZE DTMF GENERATOR
              LD       A,0FH
              OUT      (DTMF00+1),A           ;SET UP PIO
              LD       A,03
              OUT      (DTMF00),A             ;ENABLE BITS
              LD       A,20H
              OUT      (DTMF00),A             ;TURN GENERATOR OFF

LD       IY,SCNTAB              ;SCAN TABLE
              LD       DE,SCNSIZ              ;SIZE OF EACH LINE GROUP
              LD       B,TOTLIN               ;TOTAL # LINES
   INFC02     LD       (IY+LSTATE),LCIDLE    ;SET TO IDLE
              LD       (IY+LSLEVL),00
              LD       (IY+LTIMER),00         ;SET TIMER TO ZERO
              LD       (IY+LCOUNT),00
              LD       (IY+LSRNGC),00
              LD       (IY+CMCODE),CODE00     ;STORE LAST COMMAND CODE (RELEASE)
              ADD      IY,DE
              DJNZ     INFC02
              RET

COMLIN:    DEFB     00        ;COMMAND LINE ID #

;%%%%%%%%%%%%%%%%%%%%%%%%%%%%%
   ; SCAN TELEPHONE LINES
   LISCAN     PUSH     IY
              PUSH     IX
              LD       IY,SCNTAB              ;-> SCAN TABLE
              LD       E,00                   ;LINE # IDENTIFICATION
              LD       C,RDET00
              IN       D,(C)                  ;READ RING, D REGISTER BITS =0 RINGING, 1=IDLE
              LD       B,8                    ;DO 8 LINES
              CALL     LISGRP
              LD       C,RDET01               ;RING DETECT 1
              IN       D,(C)                  ;READ RING
              LD       B,8                    ;NEXT 8 LINES
              CALL     LISGRP
```

```
                IN      D,(C)                   ;READ RING
                LD      B,8                     ;DO 8 LINES
                CALL    LISGRP
                LD      C,RDETO3                ;RING DETECT 3
                IN      D,(C)                   ;READ RING
                LD      B,8                     ;DO 8 LINES
                CALL    LISGRP
                POP     IX
                POP     IY
                RET

LISGRP: PUSH    BC
                PUSH    DE
                LD      A,(IY+LSTATE)
                CP      LCIDLE
                JR      Z,LSIDLE                ;IDLE, CHECK FOR RINGING
                CP      LCACTV
                JR      Z,LSACTV                ;ACTIVE
                CP      LCCOMD
                JP      Z,LSCOMD                ;COMMAND LINE
                CP      LRMOVE
                JP      Z,LISC99                ;REMOVED FROM SERVICE
                JP      LSBL00                  ;BAIL-OUT

; IDLE, CHECK FOR RINGING
LSIDLE: BIT     0,D
                JP      NZ,LISC99               ;STILL IDLE
                LD      A,(COMLIN)
                CP      E
                JP      Z,LSLINE                ;IT'S COMMAND LINE
                LD      (IY+LSTATE),LCACTV      ;SET ACTIVE
                LD      (IY+LSLEVL),LRINGD      ;CHECK FOR TRUE RING
                LD      (IY+LTIMER),3           ;TIME-OUT VALUE
                LD      (IY+LCOUNT),1           ;ADDITIONAL DETECTS FOR TRUE RING
                JP      LISC99

; ACTIVE, CHECK NEXT LEVEL
LSACTV: LD      A,(IY+LSLEVL)
                CP      LRINGD
                JR      Z,LSRING                ;TRUE RING DETECT
                CP      LCHECK
                JP      Z,LSHECK                ;CHECK FOR PAGER ON/OFF
                CP      LCDEBN
                JP      Z,LSDEBN                ;DO DEBOUNCE
                CP      LCNEXT
                JP      Z,LSNEXT                ;WAITING FOR NEXT RING
                CP      LCSEZO
                JP      Z,LSSEZO                ;SEIZE 1ST TIME
                CP      LCFLSH
                JP      Z,LSFLSH                ;FLASH
                CP      LCSEZ1
                JP      Z,LSSEZ1                ;SEIZE 2ND TIME
                CP      LCTONE
                JP      Z,LSTONE                ;TONE GOING OUT
                CP      LCDELY
                JP      Z,LSDELY
                JP      LSBL02                  ;ERROR, BAILOUT

; CHECK FOR TRUE RING DETECT
LSRING: DEC     (IY+LTIMER)
                JP      Z,LSFALS                ;TIME-OUT, FALSE RING
                BIT     0,D
                JP      NZ,LISC99               ;IDLE NOW, MIGHT BE FALSE RING
                DEC     (IY+LCOUNT)
                JP      NZ,LISC99               ;NOT ENOUGH RING SAMPLES ARE GOOD YET
```

```
            CALL    DTLOOK              ;CHECK DATABASE FOR VALID PAGER
            LD      (IY+LSLEVL),LCHECK   ;CHECKING DATABASE
            LD      (IY+LTIMER),10       ;TIME-OUT VALUE
            JP      LISC99

; WAITING FOR DATABASE CONFIRMATION
LSHECK:     DEC     (IY+LTIMER)
            JP      Z,LSBAIL             ;TIMER EXPIRED
            CALL    DTFOND               ;SEE IF DATABASE RESPONSE HAS ARRIVED
            CP      CCOD00
            JP      Z,LISC99             ;NOT FOUND YET
            CP      CCOD01
            JP      NZ,LDELAY            ;EXTENSION IS INVALID
            BIT     7,(IX+RC02+2)        ;CHECK FOR PAGER ON/OFF
            JP      Z,LDELAY             ;PAGER OFF
; EXTENSION FOUND
            PUSH    IY
            PUSH    IX
            POP     IY                   ;IY -> RECORD
            INC     IY
            INC     IY
            LD      A,COMM00             ;DO RING PAGE
            PUSH    DE
            CALL    LSSETP               ;SEND PAGE DATA TO QUEUE
            POP     DE
            POP     IY
            LD      (IY+LSRNGC),00       ;ZERO ACTUAL RING COUNT
; FIRST RING, SEND PAGE, WAIT FOR NEXT GROUP
            LD      A,(NMRING)
            CP      00                   ;IF NO RING, SEIZE LINE RIGHT NOT
            JP      Z,LSEIZE
            LD      (IY+LCOUNT),A        ;# OF RINGS BEFORE SEIZE
            LD      (IY+LSLEVL),LCDEBN   ;DO DEBOUNCE
            LD      A,(DEBONC)
            LD      (IY+LTIMER),A        ;SET COUNT-DOWN DEBOUNCE
            JP      LISC99

; DEBOUNCE RINGING BY WAITING FOR RING TO GO AWAY
LSDEBN:     DEC     (IY+LTIMER)
            JP      NZ,LISC99            ;NO TIME-OUT YET
            LD      (IY+LSLEVL),LCNEXT   ;WAIT FOR NEXT RING
            LD      A,(UNTIME)           ;SET TIME-OUT IF RING DOESN'T OCCUR
            LD      (IY+LTIMER),A
            INC     (IY+LSRNGC)          ;+1 ACTUAL RING COUNT
            JP      LISC99

; NEXT RING IN GROUP EXPECTED
LCNEXT:     DEC     (IY+LTIMER)
            JP      Z,LSBL06             ;NO RING HAS OCCURRED, TIMER BAIL-OUT
            BIT     0,D
            JP      NZ,LISC99            ;NEXT RING HAS NOT OCCURRED
; NEXT RING IS HERE
            DEC     (IY+LCOUNT)          ;-1 TOTAL RINGS BEFORE SIEZE
            JR      Z,LSEIZE             ;SEIZE LINE
            LD      (IY+LSLEVL),LCDEBN   ;DO DEBOUNCE
            LD      A,(DEBONC)
            LD      (IY+LTIMER),A        ;SET COUNT-DOWN DEBOUNCE
            JP      LISC99

; TIME TO SEIZE LINE
LSEIZE:     LD      (IY+LSLEVL),LCSEZ0   ;SEIZE LINE 1ST TIME
            LD      A,(SZTIME)
            LD      (IY+LTIMER),A        ;SET SEIZE TIME
            CALL    DTMOFF               ;TURN DTMF OFF
            LD      A,CODE01             ;ANSWER PHONE
```

```
                JP      LISC99

; WAIT FOR SEIZE, THEN FLASH LINE
LSSEZ0: DEC     (IY+LTIMER)
        JP      NZ,LISC99       ;SIEZE TIME NOT UP
        LD      (IY+LSLEVL),LCFLSH ;FLASH LINE
        LD      A,(FLTIME)
        LD      (IY+LTIMER),A   ;SET FLASH TIME
        LD      A,CODE00        ;UN-ANSWER PHONE
        CALL    OUTLIN          ;COMMAND PHONE LINE
        JP      LISC99

; WAIT FOR FLASH, THEN SEIZE 2ND TIME
LSFLSH: DEC     (IY+LTIMER)
        JP      NZ,LISC99       ;FLASH TIME NOT UP
        LD      (IY+LSLEVL),LCSEZ1 ;SEIZE 2ND TIME
        LD      A,2
        LD      (IY+LTIMER),A   ;SET DELAY TIME BEFORE DTMF
        CALL    DTMOFF          ;TURN DTMF OFF
        LD      A,CODE01        ;ANSWER PHONE
        CALL    OUTLIN          ;COMMAND PHONE LINE
        JP      LISC99

; DELAY, THEN GENERATE PARK TONE
LSSEZ1: DEC     (IY+LTIMER)
        JP      NZ,LISC99       ;DELAY BEFORE DTMF
        LD      A,3
        CALL    GENSET          ;SET DTMF GENERATOR
        LD      A,CODE02        ;ENABLE DTMF GENERATOR
        CALL    OUTLIN          ;COMMAND PHONE LINE
        LD      (IY+LSLEVL),LCTONE ;WAIT WHILE TONE GOING OUT
        LD      A,(TONTIM)
        LD      (IY+LTIMER),A   ;SET TONE TIME
        JP      LISC99

; RELEASE LINE AFTER TONE TIME
LSTONE: DEC     (IY+LTIMER)
        JR      NZ,LISC99
        LD      (IY+LSTATE),LCIDLE ;RETURN TO IDLE STATE
        LD      A,CODE00        ;UN-ANSWER PHONE
        CALL    OUTLIN          ;COMMAND PHONE LINE
        CALL    DTMOFF          ;TURN DTMF OFF
        JR      LISC99

; FALSE RING DETECT, DELAY BEFORE LOOKING FOR NEXT RING
LSFALS: LD      (IY+LSLEVL),LCDELY ;DELAY NOW
        LD      (IY+LTIMER),70  ;DELAY COUNT
        JR      LISC99

; TELEPHONE LINE HAS PAGER TURNED OFF OR NOT FOUND IN DATABASE
LDELAY: LD      (IY+LSLEVL),LCDELY ;DELAY NOW
        LD      (IY+LTIMER),150 ;DELAY COUNT
        JR      LISC99

; WAIT FOR X SECONDS
LSDELY: DEC     (IY+LTIMER)
        JR      NZ,LISC99       ;NOT EXPIRED YET
        JR      LSBAIL

LSBL00: JR      LSBAIL
LSBL02: JR      LSBAIL
LSBL05: JR      LSBAIL

; ERROR BAILOUT
LSBAIL: LD      A,CODE00        ;UN-ANSWER PHONE
```

```
             LD         (IY+LSTATE),LCIDLE    ;BAILOUT, RING WAS A FALSE ONE
; REPEAT FOR NEXT LINE SCAN
LISC99:      LD         BC,SCNSIZ
             ADD        IY,BC                 ;INDEX TO NEXT PLOT
             POP        DE
             INC        E                     ;+1 LINE #
             SRL        D                     ;SHIFT RING PATTERN -> BIT 0
             POP        BC
             DEC        B
             JP         NZ,LISGRP             ;CONTINUE FOR # OF LINES
             RET

; ###################################
; #                                 #
; #         COMMAND LINE            #
; #                                 #
; ###################################

; IT'S COMMAND LINE, ANSWER, BEEP, ACCEPT EXTENSION #, OPTION
LSLINE:      LD         A,CODE01              ;ANSWER LINE
             CALL       OUTLIN
             LD         (IY+LSTATE),LCCOMD    ;COMMAND LINE
             LD         (IY+LSLEVL),CDELY0    ;ANSWER DELAY
             LD         (IY+LTIMER),08        ;DELAY TIME
             JP         LISC99

; COMMAND LINE
LSCOMD:      LD         A,(IY+LSLEVL)
             CP         CDELY0
             JP         Z,SDELY0              ;DELAY BEFORE   READY-BEEP
             CP         CBEEP0
             JR         Z,SBEEP0              ;GENERATING BEEP
             CP         CTONE0
             JR         Z,STONE0              ;GET DTMF TONE #'S
             CP         CHDATA
             JP         Z,SHDATA              ;CHECKING DATABASE NOW
             CP         CTONE2
             JP         Z,STONE2              ;DTMF EXTENSION # ACK BEEP
             CP         CTYPEP
             JP         Z,STYPEP              ;GET OPTIONAL TYPE OF PAGE  OR PACER ON/OFF
             CP         OPACK0
             JP         Z,SPACK0              ;ACK IN-HOUSE PAGE TONE
             CP         OPACK1
             JP         Z,SPACK1              ;PAGER ON/OFF TONE
             CP         CERR00
             JP         Z,SERR00              ;EXTENSION NOT FOUND ERROR BEEP
             JP         LSBAIL                ;UNDEFINED

; DELAY BEFORE GENERATING READY
SDELY0:      CALL       GETONE                ;FLUSH DTMF
             DEC        (IY+LTIMER)
             JP         NZ,LISC99             ;WAIT
             LD         A,CODE03              ;BEEP ACKNOWLEDGE
             CALL       OUTLIN
             LD         (IY+LSLEVL),CBEEP0    ;GENERATING BEEP
             LD         (IY+LTIMER),06        ;DURATION OF BEEP
             JP         LISC99

; GENERATE ACK BEEP
SBEEP0:      CALL       GETONE                ;FLUSH DTMF
             DEC        (IY+LTIMER)
             JR         NZ,LISC99             ;NOT TIMED OUT YET
             LD         (IY+LSLEVL),CTONE0    ;GET DTMF
             LD         A,00
```

```
            LD      A,CODE01
            CALL    OUTLIN          ; DISABLE BEEP
            LD      (IY+LTIMER),125 ; SET BAILOUT TIMER
            JP      LISC99

; GET DTMF TONE
STONE0:     DEC     (IY+LTIMER)     ; - BAILOUT TIMER
            JP      Z,LSBAIL
            CALL    GETONE          ; GET DTMF TONE
            JP      NZ,LISC99       ; NO TONE RECEIVED YET
            CALL    SFILTR          ; CONVERT A'S TO 0, CHECK FOR ESCAPE
            JP      Z,LSLINE        ; YES, EXIT, GET NEXT PHONE
            LD      (IY+LTIMER),75  ; RESET BAILOUT TIMER
            CALL    STRTON          ; STORE TONE, RETURN COUNT SO FAR
            CP      3
            JP      NZ,LISC99       ; NOT LAST ONE
            LD      (IY+LSLEVL),CHDATA ; CHECKING DATABASE NOW
            LD      (IY+LTIMER),30  ; TIME-LIMIT
            CALL    EXLOOK          ; LOOK UP # IN DATABASE
            JP      LISC99

; CHECKING DATABASE NOW
CHDATA:     DEC     (IY+LTIMER)
            JP      Z,LSBAIL        ; NOT FOUND, ERROR, HANG UP NOW
            CALL    DTFOND          ; FOUND IT YET? IF YES, IX -> RECORD PACKAGE
            CP      CCOD00
            JP      Z,LISC99        ; NOT FOUND YET
            CP      CCOD01
            JP      NZ,SERROR       ; INVALID EXTENSION #
            LD      (SVRECD),IX     ; SAVE -> TO RECORD PACKAGE
            LD      (IY+LSLEVL),CTONE2
            LD      A,CODE03        ; GENERATE BEEP
            CALL    OUTLIN
            LD      (IY+LTIMER),1011B ; BEEP DURATION
            JP      LISC99

; DTMF EXTENSION # ACK BEEP
STONE2:     CALL    GETONE          ; FLUSH DTMF
            BIT     2,(IY+LTIMER)
            LD      A,CODE01        ; NO BEEP
            JR      NZ,STN022
            LD      A,CODE03        ; BEEP
STN022:     CALL    OUTLIN
            DEC     (IY+LTIMER)
            JP      NZ,LISC99       ; BEEP NOT FINISHED YET
            LD      A,CODE01
            CALL    OUTLIN          ; TURN BEEP OFF
            LD      (IY+LSLEVL),CTYPEP ; WAIT FOR TYPE OF PAGE
            LD      (IY+LTIMER),40  ; DELAY
            JP      LISC99

; GET OPTIONAL TYPE OF PAGE OR PAGER ON/OFF
CTYPEP:     DEC     (IY+LTIMER)
            LD      A,04            ; DEFAULT IN-HOUSE PAGE CODE
            JR      Z,SENDPG        ; SEND NORMAL PAGE IF TIME-OUT
            CALL    GETONE          ; GET DTMF TONE
            JP      NZ,LISC99       ; NO TONE RECEIVED YET
            AND     0FH
            CP      01
            JR      Z,SENDPG
            CP      02
            JR      Z,SENDPG
            CP      03
            JR      Z,SENDPG
            CP      04
```

```
                CP      0DH                     ;#, TURN PAGER ON
                JP      Z,SPGONN
                CP      0CH                     ;#, TURN PAGER OFF
                JP      Z,SPGOFF
                JP      LISC99                  ;IGNORE TONE

; SEND IN-HOUSE PAGE
SENDPG: PUSH    DE                      ;SAVE LINE #
        PUSH    IY                      ;SAVE -> STATE TABLE
        LD      HL,(SVRECD)             ;IY -> RECORD PACKAGE
        INC     HL
        INC     HL                      ;-> COPY OF RECORD
        LD      DE,TMPREC               ;TEMPORARY RECORD
        LD      BC,RCSIZE               ;SIZE
        LDIR
        DEC     A                       ;MAKE RELATIVE 1 -> RELATIVE 0
        LD      B,A
        SLA     B
        SLA     B
        SLA     B
        SLA     B
        LD      IY,TMPREC
        LD      A,(IY+RC04)             ;GET TIMING FIELD
        AND     0FH
        OR      B
        LD      (IY+RC04),A             ;SET OPTIONAL TIMING FIELD
        LD      A,COMM01                ;COMMAND PAGE
        CALL    LSSETP                  ;SEND PAGE DATA TO QUEUE.
        POP     IY
        POP     DE
; GENERATE OPTION ACKNOWLEDGMENT
        LD      (IY+LTIMER),10
        LD      (IY+LSLEVL),OPACKO      ;OPTION ACKNOWLEDGEMENT
        LD      A,CODE03
        CALL    OUTLIN                  ;BEEP ON
        JP      LISC99

; GENERATING OPTION TONE
SPACKO: CALL    GETONE                  ;FLUSH DTMF
        BIT     0,(IY+LTIMER)
        LD      A,CODE01
        JR      Z,SPCK00                ;NO BEEP
        LD      A,CODE03                ;BEEP
SPCK00: CALL    OUTLIN
        DEC     (IY+LTIMER)             ;WAIT FOR TIME TO EXPIRE
        JP      NZ,LISC99
        JP      LSLINE                  ;GET NEXT EXTENSION #

; @@@@@@@@@@@@@@@@@@@@@@@@@@@@@@@@@@@@@
; @@@@
; @@@@    CHANGE WHEN EEPROM BASED
; @@@@
; @@@@@@@@@@@@@@@@@@@@@@@@@@@@@@@@@@@@@

; TURN PAGER ON/OFF
SPGOFF: LD      C,00                    ;TURN OFF
        JP      SPGSET
SPGONN: LD      C,60H                   ;TURN BIT ON
SPGSET: LD      D,A                     ;SAVE DTMF CODE
        LD      IX,(SVRECD)             ;-> RECORD PACKAGE
        LD      L,(IX+10)               ;GET LSD ADDRESS
        LD      H,(IX+11)
        PUSH    HL
        POP     IX                      ;-> REAL ADDRESS
```

```
                RES     7,A                     ;CLEAR BIT
                OR      C                       ;MERGE
                LD      (IX+RC02),A
; ON/OFF ACKNOWLEDGEMENT
                LD      (IY+LTIMER),64+7        ;SET TIMER
                LD      (IY+LSLEVL),OPACK1
                LD      A,CODE03
                CALL    OUTLIN                  ;BEEP ON
                JP      LISC99

; GENERATE TONE (800MS BUSY/BEEP)
SPACK1: CALL    GETONE                  ;FLUSH DTMF
                BIT     3,(IY+LTIMER)
                LD      A,CODE04
                JR      NZ,SPCK11               ;BUSY ON
                LD      A,CODE03                ;BEEP ON
SPCK11: CALL    OUTLIN
                DEC     (IY+LTIMER)
                JP      NZ,LISC99               ;CONTINUE
                JP      LSLINE                  ;GET NEXT EXTN #

; %%%%%%%%%%%%%%%%%%%%%%%%%%%%%%%%%%%%%%%%
; EXTENSION NOT FOUND, GENERATE ERROR TONES
SERROR: LD      (IY+LTIMER),32          ;SET TIMER
                LD      (IY+LSLEVL),CERROO      ;ERROR BEEPS
                LD      A,CODE04                ;BUSY ON
                CALL    OUTLIN
                JP      LISC99

; WAIT FOR ERROR BUSY TO GO OUT
SERROO: CALL    GETONE                  ;FLUSH DTMF
                BIT     2,(IY+LTIMER)
                LD      A,CODE01
                JR      NZ,SERRO2               ;BUSY OFF
                LD      A,CODE04                ;BUSY ON
SERRO2: CALL    OUTLIN
                DEC     (IY+LTIMER)
                JP      NZ,LISC99
                JP      LSLINE                  ;GENERATE NEXT TONE

; ##########################################
; GET DTMF TONE -> A REGISTER
GETONE: LD      A,OFEH
                OUT     (SLDTMF),A              ;SELECT DTMF DECODER
                IN      A,(RDDTMF)              ;READ DTMF REGISTER
                LD      B,A
                LD      A,OFFH                  ;DISABLE DTMF DECODER
                OUT     (SLDTMF),A
                OUT     (STRB00),A              ;SEND STROBE
                LD      A,B
                BIT     4,A                     ;CHECK VALID DATA BIT NOW
                RET

; CONVERT A'S TO 0, CHECK FOR ESCAPE
SFILTR: AND     OFH
                CP      OAH
                JR      Z,SFILTO                ;CONVERT A'S TO 00
                CP      OBH                     ; * ESCAPE
                RET     Z
                CP      OCH                     ; # ESCAPE
                RET
SFILTO: OR      1                       ;SET NZ FLAG
                LD      A,00
                RET
```

```
; STORE TONE, RETURN COUNT SO FAR
STRTON  AND     0FH
        PUSH    AF              ; SAVE TONE
        LD      A, (TONCNT)
        LD      C, A
        LD      B, 00
        LD      HL, TONSTR      ; TONE STORAGE
        ADD     HL, BC
        POP     AF
        LD      (HL), A         ; STORE TONE
        INC     C
        LD      A, C
        LD      (TONCNT), A     ; STONE NEW TONE COUNT
        RET

; SCHEDULE LOOK UP RECORD BY LINE #
DTLOOK: LD      (IY+LCCODE), CCOD00 ; SET CC CODE TO NOT FOUND YET
        LD      HL, RTLOCT      ; -> RETURN LOCATION
        PUSH    HL
        LD      (HL), TYPE00    ; TYPE OF LOOKUP
        INC     HL
        LD      (HL), CCOD00    ; NOT FOUND YET
        INC     HL
        LD      (HL), E         ; LINE #
        POP     HL
        PUSH    IY
        PUSH    DE
        CALL    LOOKUP          ; SCHEDULE LOOK-UP
        POP     DE
        POP     IY
        RET

; SCHEDULE LOOK UP RECORD BY EXTN #
EXLOOK: LD      (IY+LCCODE), CCOD00 ; SET CC CODE TO NOT FOUND YET
        LD      HL, RTLOCT      ; -> RETURN LOCATION
        PUSH    HL
        LD      (HL), TYPE01    ; TYPE OF LOOKUP
        INC     HL
        LD      (HL), CCOD00    ; NOT FOUND YET
        INC     HL
        LD      A, (TONSTR)
        LD      (HL), A
        INC     HL
        LD      A, (TONSTR+1)
        SLA     A
        SLA     A
        SLA     A
        SLA     A
        LD      B, A
        LD      A, (TONSTR+2)
        AND     0FH
        OR      B
        LD      (HL), A
        POP     HL
        PUSH    IY
        PUSH    DE              ; SAVE E=LINE #
        CALL    LOOKUP          ; SCHEDULE LOOK-UP
        POP     DE
        POP     IY
        RET

; SEE IF DATABASE LOOK UP FINISHED.  0=NOT FOUND YET, 1=FOUND, 2=INVALID
; IX -> DATABASE RECORD PACKAGE
WTFOND: LD      A, (RTLOCT+1)
```

```
            LD      IX,RTLOC1       ;-> RETURNED PACKAGE IF ANY
            RET

; ###########################################
; SEARCH DATABASE FOR RECORD    (LINEAR SEARCH)
LOOKUP:     LD      A,(HL)
            CP      TYPE00          ;SEARCH BY LINE #
            JR      Z,LOOK00
            CP      TYPE01          ;SEARCH BY EXTN #
            JR      Z,LOOK50
            SCF
            RET

; SEARCH DATABASE FOR LINE # MATCH  B=LINE #
LOOK00:     LD      (SAVHL),HL
            INC     HL
            INC     HL
            LD      E,(HL)
            LD      IY,EEPROM       ;-> DATABASE
            LD      HL,(DBSIZE)     ;GET # OF ENTRIES IN DATABASE
LOOK02:     LD      A,L
            OR      H               ;CHECK COUNT
            LD      A,CCOD02        ;RECORD NOT FOUND
            JR      Z,LOOK59
            LD      A,(IY+RC03)
            AND     111111B         ;GET LINE #
            CP      E
            JR      Z,LOOK58        ;MATCH
            LD      BC,RCSIZE       ;SIZE OF EACH RECORD
            ADD     IY,BC           ;INDEX TO NEXT
            DEC     HL              ;-1 DATABASE COUNT
            JR      LOOK02          ;CONTINUE

; SEARCH BY EXTN #
LOOK50:     LD      (SAVHL),HL      ;SAVE ->
            PUSH    HL
            POP     IY
            LD      D,(IY+2)
            LD      E,(IY+3)        ;GET EXTENSION #
            LD      IY,EEPROM       ;-> DATABASE
            LD      BC,(DBSIZE)     ;GET # OF ENTRIES IN DATABASE
LOOK52:     LD      A,B
            OR      C               ;CHECK COUNT
            LD      A,CCOD02        ;CODE = NOT FOUND
            JR      Z,LOOK59        ;RECORD NOT FOUND
            LD      H,(IY+RC00)
            LD      L,(IY+RC01)
            OR      A
            SBC     HL,DE           ;CHECK FOR MATCH
            JR      Z,LOOK58        ;GOT MATCH
            PUSH    BC
            LD      BC,RCSIZE       ;SIZE OF EACH RECORD
            ADD     IY,BC           ;INDEX TO NEXT
            POP     BC
            DEC     BC
            JR      LOOK52          ;CONTINUE
; GOT RECORD
LOOK58:     PUSH    IY
            POP     HL              ;HL -> DATABASE RECORD
            LD      DE,(SAVHL)
            INC     DE
            INC     DE
            LD      BC,RCSIZE       ;LENGTH OF RECORD
            LDIR
```

```
        PUSH    IY              ; GET -> REAL RECORD
        POP     DE
        LD      (HL),E          ; STORE PHYSICAL ADDRESS
        INC     HL
        LD      (HL),D
        LD      A,CCOD01        ; FOUND #
LOOK59: LD      HL,(SAVHL)
        INC     HL
        LD      (HL),A          ; COMPLETION CODE
        DEC     HL
        RET

; SHIFT COMMAND WORD, THEN STROBE PROPER TRUNK CARD
; IY -> TABLE, E=LINE #, A=NEW COMMAND WORD
OUTLIN: PUSH    HL
        PUSH    DE
        PUSH    BC
        LD      (IY+CMCODE),A   ; STORE NEW CODE INTO TABLE
        BIT     0,E
        JR      Z,OTLEVN        ; IT'S EVEN
; ELSE TRUNK IS ODD (HI OF PAIR)
        LD      H,A
        LD      L,(IY+CMCODE-SCNSIZ) ; GET OLD PAIRED COMMAND
        JR      OTLN00
OTLEVN: LD      L,A
        LD      H,(IY+CMCODE+SCNSIZ) ; GET OLD PAIRED COMMAND
OTLN00: LD      A,L             ; GET LOWER BYTE
        CPL                     ; COMPLEMENT COMMAND WORD
        LD      L,A
        LD      A,H             ; GET UPPER BYTE
        CPL                     ; COMPLEMENT COMMAND WORD
        LD      B,16
OTLN02: OUT     (SHFT00),A      ; SHIFT BITS OUT  (BIT 7)
        SLA     L
        RL      A
        DJNZ    OTLN02

LD      A,E
        AND     1111B           ; LIMIT TO 0 -> 15 VALUES
        SRL     A               ; DIVIDE BY 2 LINES PER TRUNK CARD
        INC     A               ; +1
        LD      B,A
        OR      A               ; CLEAR CARRY
        LD      A,0FFH
OTLN04: RL      A               ; ROTATE BIT PATTERN FOR STROBE ADDRESS
        DJNZ    OTLN04

LD      C,STRB00        ; FIRST GROUP STROBE ADDRESS
        BIT     4,E
        JR      Z,OTLN06        ; IT'S FIRST STROBE ADDRESS
        LD      C,STRB01        ; IT'S SECOND STROBE
OTLN06: OUT     (C),A           ; STROBE LOW
        LD      A,0FFH
        OUT     (C),A           ; STROBE HI
        POP     BC
        POP     DE
        POP     HL
        RET

*EJECT

; #############################################
; ; MONITOR PHONE LINE
```

```
                CALL    FRMVAR          ;FORMAT & PRINT LIST OF TIME CONSTANTS
; SET LINE #
MONNEW: LD      HL,MSG251       ;PUT 'MONITOR LINE # '
        CALL    SETNWL          ;SET NEW LINE #
        JR      C,MONEXT
; PUT 'LSTATE LSLEVL LCOUNT LSRNGC LCCODE LTIMER CMCODE
        LD      HL,MSG250
        CALL    WRTCLF
        CALL    FRMMON          ;FORMAT MONITER BYTES
        CALL    WRT

; POLL FOR NEW STATUS DISPLAY LINE
MONPOL: LD      A,1
        CALL    HIBER           ;SHARE PROCESSOR TIME
        CALL    ANYKEY          ;CHECK FOR ESCAPE KEY
        JR      C,MONNEW
        LD      HL,OLDACT       ;-> OLD ACTIVITY
        LD      DE,(CURPHN)     ;-> FIRST BYTE OF TABLE
        LD      B,6             ;# OF ITEMS
MNCHO:  LD      A,(DE)
        CP      (HL)
        JR      NZ,MONPNT       ;DIFFERENT, PRINT ENTIRE LINE
        INC     DE
        INC     HL
        DJNZ    MNCHO
        JR      MONPOL          ;POLL AGAIN
; PRINT NEW VARIABLES
MONPNT: LD      HL,(CURPHN)     ;-> ACTIVITY
        LD      DE,OLDACT       ;OLD STORAGE
        LD      BC,6
        LDIR                    ;MOVE COPY
        CALL    FRMMON          ;FORM MONITER VARIABLES
        LD      A,0DH
        CALL    PUTC            ;RETURN TO LEFT MARGIN
        CALL    WRT
        JR      MONPOL          ;POLL AGAIN
; EXIT POINT
MONEXT: RET

; FORMAT MONITOR VARIABLES
FRMMON: LD      HL,CRTBF        ;-> OUTPUT BUFFER
        PUSH    HL
        LD      DE,(CURPHN)     ;-> FIRST BYTE OF TABLE
        LD      B,5
FRMNO:  LD      A,(DE)          ;CONVERT 1ST GROUP BYTES
        INC     DE
        AND     0FH
        OR      30H
        LD      (HL),A
        INC     HL
        LD      (HL),' '        ;ADD SPACE
        INC     HL
        DJNZ    FRMNO
        LD      A,(DE)          ;FORMAT LAST 2 BYTES
        INC     DE
        CALL    BCDTA           ;CONVERT HEX TO ASCII
        LD      (HL),' '
        INC     HL
        LD      A,(DE)          ;FORMAT LAST 2 BYTES
        CALL    BCDTA           ;CONVERT HEX TO ASCII
        LD      (HL),255
        POP     HL
        RET

; CONVERT HEX A TO 2 BCD ASCII
```

```
                SRL     A
                SRL     A
                SRL     A
                SRL     A
                CALL    ADIG            ;STORE HIGH NIBBLE
                POP     AF
                AND     0FH             ;STORE LOW NIBBLE
ADIG:           OR      '0'
                CP      3AH
                JR      C,ADIG1
                ADD     A,7
ADIG1:          LD      (HL),A
                INC     HL
                RET

; FORMAT & PRINT LIST OF BYTE VARIABLES
FRMVAR: LD      HL,MSG208       ;PUT 'NMRING UNTIME SZTIME DEBONC FLTIME TONTIM
                CALL    WRTCLF
                LD      DE,NMRING       ;-> FIRST BYTE
                LD      HL,CRTOBF       ;-> OUTPUT BUFFER
                PUSH    HL
                LD      C,4             ;# OF SPACES
                LD      B,6             ;# OF VARIABLES
FRMVR0: PUSH    BC
                LD      A,(DE)
                INC     DE
                CALL    BTASC3          ;CONVERT BCD TO 3 ASCII
                POP     BC
                PUSH    BC
                CALL    ADSPAC          ;ADD # OF SPACES
                POP     BC
                DJNZ    FRMVR0
                LD      (HL),255        ;STOP
                POP     HL
                CALL    WRT
                RET

;###############################################
; MANUALLY CONTROL PHONE LINE
CTHOLD: CALL    PUTCLF
                LD      HL,MSG203       ;PUT 'LINE CONTROL
                CALL    WRTCLF
                CALL    FRMVAR          ;FORMAT LIST OF TIME CONSTANTS
CTNEWL: LD      HL,MSG209       ;PUT 'CONTROL LINE #
                CALL    SETNWL          ;SET NEW LINE #
                JR      C,CTHEXT        ;ERROR EXIT
                CALL    SETREM          ;REMOVE FROM SERVICE
CTMENU: LD      HL,MSG200       ;PRINT MENU
                CALL    WRTCLF
CTAGAN: LD      HL,MSG201       ;PUT 'ENTER CONTROL CODE
                CALL    WRT
CTGETC: CALL    RD1CHR          ;GET KEY
                CP      0BH
                JR      Z,CTHDXX        ;ESCAPE, EXIT
                CP      0AH
                JR      Z,CTMENU        ;RETURN, PRINT MENU
                CP      0
                JR      Z,CTSEIZ        ;SEIZE LINE
                CP      1
                JR      Z,CTRELS        ;RELEASE LINE
                CP      2
                JR      Z,CTFLSH        ;FLASH LINE
                CP      3
                JP      Z,CTPARK        ;PARK LINE
```

```
              JP          Z,CTDTMF         ;DTMF
              CP          5
              JR          Z,CTSETL         ;SET NEW LINE
              CP          9
              JR          NZ,CTGETC        ;INVALID KEY, IGNORE
; EXIT POINT
CTHDXX:       CALL        COLDLN           ;RESET OLD LINE TO IDLE MODE
CTHEXT:       LD          HL,MSG202        ;PUT 'CONTROL EXIT
              CALL        WRTCLF
              RET
; RETURN POINT FROM SUB-MENU ITEMS
CTRETN:       CALL        WRTCLF
              JR          CTAGAN           ;GET NEXT KEY

; SET NEW LINE #
CTSETL:       CALL        COLDLN           ;RELEASE OLD LINE #
              JP          CTNEWL           ;SET NEW LINE #

; SEIZE PHONE LINE
CTSEIZ:       LD          B,CODE01         ;SEIZE LINE
              CALL        COMMLN           ;COMMAND PHONE LINE
              LD          HL,MSG204        ;PUT 'SEIZE
              JR          CTRETN

; RELEASE PHONE LINE
CTRELS:       LD          B,CODE00         ;UN-ANSWER PHONE
              CALL        COMMLN           ;COMMAND PHONE LINE
              LD          HL,MSG205        ;PUT 'RELEASE
              JR          CTRETN

; FLASH PHONE LINE
CTFLSH:       LD          HL,MSG206        ;PUT 'FLASH
              CALL        WRT
              LD          HL,MSG205        ;PUT 'RELEASE
              CALL        WRT
              LD          B,CODE00         ;RELEASE PHONE
              CALL        COMMLN
              LD          A,(SZTIME)       ;# OF 1/10 SECONDS TO HIBERNATE
              CALL        HIBER            ;HIBERNATE
              LD          B,CODE01         ;SEIZE LINE
              CALL        COMMLN
              LD          HL,MSG204        ;PUT 'SEIZE
              JP          CTRETN

; PARK PHONE LINE
CTPARK:       LD          HL,MSG211        ;PUT 'PARK
              CALL        WRTCLF
              LD          HL,MSG204        ;PUT 'SEIZE
              CALL        WRT
              LD          B,CODE01         ;SEIZE LINE
              CALL        COMMLN
              LD          A,(SZTIME)       ;# OF 1/10 SECONDS TO HIBERNATE
              CALL        HIBER

LD          HL,MSG205        ;PUT 'RELEASE
              CALL        WRT
              LD          B,CODE00         ;UN-ANSWER PHONE
              CALL        COMMLN
              LD          A,(SZTIME)       ;HIBERNATE
              CALL        HIBER

LD          B,CODE01         ;SEIZE LINE AGAIN
              CALL        COMMLN
              LD          A,2              ;@@@
              CALL        HIBER            ;DELAY BEFORE PUTTING DTMF ON LINE
```

```
            LD      HL,MSG207         ;PUT 'DTMF
            CALL    WRT
            LD      A,3
            CALL    GNDTMF            ;GENERATE DTMF TONE
            LD      A,(SZTIME)
            CALL    HIBER

LD      B,CODE00          ;UN-ANSWER PHONE
            CALL    COMMLN            ;COMMAND PHONE LINE
            CALL    DTMOFF            ;TURN GENERATOR OFF
            LD      HL,MSG205         ;PUT 'RELEASE
            JP      CTRETN

; SEND DTMF
CTDTMF: LD      HL,MSG207             ;PUT 'DTMF
        CALL    WRT
        CALL    DTMOFF                ;TURN DTMF OFF
CTDAGN: CALL    PUTCLF
        LD      HL,MSG212             ;PUT 'ENTER DTMF
        CALL    WRT
        CALL    RD1CHR
        CP      0BH
        JR      Z,CTDTMX              ;ESCAPE
        CP      0AH
        LD      HL,MSG207             ;PUT 'DTMF
        JR      Z,CTDTXX              ;RETURN, PRINT MENU
        CALL    PUTNUM                ;ECHO #
        CALL    GNDTMF                ;GENERATE DTMF TONE
        JR      CTDAGN                ;GET NEXT
;EXIT
CTDTMX: CALL    DTMOFF                ;TURN DTMF OFF
        LD      HL,MSG210             ;PUT 'DTMF OFF
CTDTXX: JP      CTRETN

DTMOFF: LD      A,20H
        OUT     (DTMF00),A            ;TURN GENERATOR OFF
        RET

; GENERATE DTMF TONE
GNDTMF: CALL    GENSET                ;SET GENERATOR
        LD      B,CODE02              ;ENABLE DTMF
        CALL    COMMLN
        RET

GENSET: CP      0
        JR      NZ,GNDT00
        LD      A,0AH                 ;MAP 0 AFTER DIGIT 9
GNDT00: SLA     A                     ;DOUBLE
        OUT     (DTMF00),A            ;SET GENERATOR W/ CODE
        RET

; SET NEW PHONE # FOR DIRECT COMMAND
SETNWL: CALL    PUTCLF
        CALL    WRT
        LD      A,31H                 ;LIMIT
        CALL    RD2NUM                ;GET 2 KEYS FOR PHONE #
        RET     C                     ;TAB-SPACE EXIT
        LD      (PHNLIN),A
;SET PHONE # AND POINTERS
        LD      B,A
        INC     B                     ;RELATIVE TO 1
        LD      IY,SCNTAB-SCNSIZ      ;TABLE
        LD      DE,SCNSIZ             ;SIZE OF TABLE
        ADD     IY,DE                 ;INDEX TO PROPER SLOT
```

```
            LD      (CURPHN),IY     ;-> CURRENT PHONE TABLE
            CALL    PUTCLF
            OR      A
            RET

; REMOVE FROM SERVICE
SETREM:     LD      IY,(CURPHN)     ;-> CURRENT PHONE TABLE
            LD      (IY+LSTATE),LRMOVE ;REMOVE FROM SERVICE
            RET

; RETURN LINE TO IDLE MODE
COLDLN:     LD      B,CODE00        ;RELEASE LINE
            CALL    COMMLN
            LD      IY,(CURPHN)     ;-> CURRENT PHONE TABLE
            LD      (IY+LSTATE),LCIDLE ;RESET BACK TO NORMAL
            RET

; COMMAND PHONE LINE  B REG HAS COMMAND  IY -> SCAN TABLE
COMMLN:     DI
            LD      IY,(CURPHN)     ;-> CURRENT PHONE TABLE
            LD      A,(PHNLIN)
            LD      E,A             ;GET PHONE LINE #
            LD      A,B             ;TRANSFER COMMAND BYTE
            CALL    OUTLIN
            EI
            RET

; ADD # SPACES IN C REGISTER
ADSPAC:     LD      (HL),' '
            INC     HL
            DEC     C
            JR      NZ,ADSPAC
            RET

; CONTROL MESSAGES
MSG200:     DEFW    CRLFED
            DEFM    '0 SEIZE'
            DEFW    CRLFED
            DEFM    '1 RELEASE'
            DEFW    CRLFED
            DEFM    '2 FLASH'
            DEFW    CRLFED
            DEFM    '3 PARK'
            DEFW    CRLFED
            DEFM    '4 DTMF'
            DEFW    CRLFED
            DEFM    '5 SET #'
            DEFW    CRLFED
            DEFM    '9 EXIT'
            DEFB    255
MSG201:     DEFM    'ENTER CONTROL CODE '
            DEFB    255
MSG202:     DEFM    'CONTROL EXIT'
            DEFB    255
MSG203:     DEFM    'LINE CONTROL'
            DEFB    255
MSG204:     DEFM    'SEIZE '
            DEFB    255
MSG205:     DEFM    'RELEASE '
            DEFB    255
MSG206:     DEFM    'FLASH '
            DEFB    255
MSG207:     DEFM    'DTMF '
            DEFB    255
```

```
               DEFB     255
MSG209: DEFM     'CONTROL LINE # '
        DEFB     255
MSG210: DEFM     'DTMF OFF'
        DEFB     255
MSG211: DEFM     'PARK '
        DEFB     255
MSG212: DEFM     'ENTER DTMF # '
        DEFB     255

; MONITOR LABELS
MSG250: DEFM     'LSTATE LSLEVL LCOUNT LSRNGC LCCODE LTIMER CMCODE'
        DEFW     CRLFED
        DEFM     '0 1 2 3 4 5  6'
        DEFB     255
MSG251: DEFM     'MONITOR LINE # '
        DEFB     255

END
PAGE 62
        TITLE    DATE  6/16/83  kbd  4  L #1
        SUBTTL   POCKET BELL MASTER AND DISPLAY
.Z80
; SUPERVISOR ENTRY POINTS
        PUBLIC   PUTCLF, WRTCLF, WRT, WRTC, PUTC
        PUBLIC   RDCRT, RD1CHR, CHKKEY, ANYKEY, DTIMBS
        PUBLIC   ZSID, INIT, SERINI, OISRVA, IISRVB, RDCPMN
        PUBLIC   OSYSTM, RDWE, HIDER, PWUP
        PUBLIC   INITT, LOTPUT, LINPUT, INTOO, INTIO
; START OF APPLICATIONS CODE
        PUBLIC   CHKPAG, ACTCHK, ACTPUL, LSSETP
        EXTRN    DSTART, BYTEX
; LINE INTERFACE CODE
        EXTRN    INFACE, LISCAN
; PERMANENT DATABASE LOOKUP
        EXTRN    DBSIZO, EEPRMO ; ####   RAM  #####
; QUEUES
        EXTRN    OLDPTR, OLDACP, NEWPTR, NEWACP
        EXTRN    CQSPAC, CQSEND, ACQUEU, ACQEND
; BUFFERS & TIME BASE
        EXTRN    CRTIBF, CRTOBF, TYPEHD, TYPSWP, PAGOBF, WORK99
        EXTRN    TMTICK, TMDAYS, TMHOUR, TMINUT, TMSECD, TMDOWN, TRESOL
; LINE INTERFACE
        EXTRN    LSTATE, LCOUNT, LDATA
; RUN-CODES
        EXTRN    RSCOSW, TCCOSW, TTCOSW, ITCOSW, INDOSW, OBFOSW, OTCOSW, SSBUFA, RSTIMR
        EXTRN    HOTCPU, TEMPOO, SAVSTK, HLSAVE, SAVRET, SAVOLD, USRSTK, SSTACK
; DATABASE
        EXTRN    EXTENS, DTBASE, DATALN, DBSIZE, EEPROM, TEMPEX PGGNUM  EQU      02       ; NUMBER OF SLOTS PAGE QUEUE
PGQLEN  EQU      05       ; # OF SLOTS IN PAGE CIRCULAR QUEUE
ACTLEN  EQU      12       ; LENGTH OF 1 SLOT IN ACTIVITY QUEUE $INCLUDE FUNC.LIB
DBSIZE  EQU      0        ; SIZE OF DATABASE RECORD TIMR00  EQU      00       ; TIMER CHANNEL FOR INTERRUPT VECTOR
TIMR2   EQU      02       ; CTC ON 985 CARD
TIMR3   EQU      03

; PROTOTYPE CAGE #2
```

```
;LINCHN  EQU     96H
 TOPSCT  EQU     97H
; SIO-CTC ADDRESS PAIRINGS FOR BAUD RATES
;  90=B2 92=B1 94=B6 96=B5 98=BA 9A=B9 9C=BE 9E=BD
 CLKBB1  EQU     0B6H    ;CTC FOR BAUD CRT CHANNEL
 CLKDD1  EQU     0B5H    ;CTC FOR BAUD LINE CHANNEL

; PROTOTYPE CAGE #1
;CRTCHN  EQU     098H    ;CRT DATA CHANNEL ON 984 CARD
;LINCHN  EQU     09AH    ;LINE INTERFACE UNIT CHANNEL
;TOPSCT  EQU     09BH    ;CHANNEL B CNTL OF SIO FOR INTERRUPT VECTOR
;CLKBB1  EQU     0BAH    ;CTC FOR BAUD CRT CHANNEL
;CLKDD1  EQU     0B9H    ;CTC FOR BAUD LINE CHANNEL

; LINE INTERFACE RUN-STATE CODES
 WTSTX   EQU     0       ;WAITING FOR STX
 WTDATA  EQU     1       ;WAITING FOR DATA

LMAXCT  EQU     5       ;MAX DATA STRING FROM LINE INTERFACE

; CRT RUN-STATE CODES
 RDYRUN  EQU     1       ;READY FOR CPU TIME
 WTSTP   EQU     2       ;OUTPUT, WAITING FOR STOP CHAR
 WTCNT   EQU     3       ;OUTPUT, WAITING FOR TERMINATION COUNT
 WTEND   EQU     4       ;OUTPUT, 1 CHARACTER
 RDECHO  EQU     5       ;INPUT STRING WITH ECHO
 RSCD1C  EQU     7       ;INPUT 1 CHARACTER
 WTWAIT  EQU     8       ;WAITING FOR TIME-OUT

LOCAL   EQU     01      ;LOCAL 1-USER CODE MODE
 SHARED  EQU     00      ;SHARED TASKS CODE MODE

CRLFED  EQU     0A0DH

; =============================
 PWUP:   DI
         JP      INIT

ZSID:   DEFB    0       ;IF THIS BYTE IS 1, THEN OS CALLS CPM SYSTEM
 SC050M: DEFB    5       ;TIME-BASE RESOLUTION FOR TIMER
 BAUDFT: DEFB    1       ;BAUD RATE FACTOR. 4 FOR OLD CAGE. 1 FOR NEW CAGE
         JP      DSTART  ;X-REFERENCE POINTER TO APPLICATION CODE START

JP      INIT
         JP      INIT

; =============================
; THE D CHANNEL IS FIRST  TERMINAL CHANNEL #B
 SCHAN1: DEFW    LOTPUT          ;TRANSMIT BUFFER EMPTY
         DEFW    LEXSTT          ;EXTERNAL STATUS
         DEFW    LINPUT          ;RECEIVE DATA AVALIABLE
         DEFW    LSPREC          ;SPECIAL RECEIVE CONDITION

; CHANNEL A
         DEFW    INT00           ;TRANSMIT BUFFER EMPTY
         DEFW    EXSTAT          ;EXTERNAL STATUS
         DEFW    INTIO           ;RECEIVE DATA AVALIABLE
         DEFW    SPREC0          ;SPECIAL RECEIVE CONDITION

; ### TIME-BASE VECTOR
 TMBSVC: DEFW    TM1INT          ;TIME-BASE 1
         DEFW    TM1INT
         DEFW    TM1INT
         DEFW    TM1INT
```

```
        DI                              ;RESET 38
        JP      INIT

DEFS    66H-($-PWUP)    ;FILLER
        DI                              ;RESET 66
        JP      INIT            ;NMI OR RESET BUTTON PRESSED

DEFS    80H-($-PWUP)    ;FILLER
;JUMP VECTORS FOR INTERFACE TO OUTPUT MODULE
        JP      INJUMP          ;INITIALIZATION JUMP POINT
        JP      GOJUMP          ;CPU SHARE JUMP POINT
        JP      CHKPAG          ;CHECK AND PASS ANY PAGE INFORMATION TO OUTPUT
        JP      UNUSED          ;----------

JP      INTOO           ;TRANSMIT BUFFER EMPTY
        JP      EXSTAT          ;EXTERNAL STATUS
        JP      INTIO           ;RECEIVE DATA
        JP      SPRECO          ;SPECIAL RX CONDITION

JP      LOTPUT          ;LINE INTERFACE TRANSMIT
        JP      LEXSTT          ;EXTERN STAT
        JP      LINPUT          ;LINE INTERFACE INPUT
        JP      LSPREC          ;SPECIAL RX CONDITION

JP      TM1INT          ;TIME BASE 1
        JP      TM1INT          ;TIME BASE 1
        JP      KEYBRD          ;KEY-BOARD HANDLER
        JP      LCDISP          ;LCD DISPLAY HANDLER

UNUSED: RET
KEYBRD: RET
LCDISP: RET

;============================
; ALL RESETS COME HERE
INIT:   DI
        LD      SP,SSTACK       ;SET THE SUPERVISOR STACK
        CALL    INITOO          ;INITIALIZE HARDWARE
        CALL    INJUMP          ;INITIALIZE FOR MASTER SECTION
; INITIALIZE TIMER VECTOR
        LD      HL,TMBSVC       ;TIMER INTERRUPT VECTOR
        LD      A,L
        OUT     (TIMROO),A      ;SET INTERRUPT VECTOR
; SET UP THE INTERRUPT VECTORS ON FIRST 984 CARD
        LD      B,2
        LD      C,TOPSCI        ;GET B CHANNEL #
        OUT     (C),B           ;SELECT REG. 2
        LD      HL,SCHAN1
        OUT     (C),L           ;SET VECTOR
        LD      A,H
        LD      I,A             ;SET UP I REGISTER
        IM      2               ;SET INTERRUPT MODE TO 2
        EI

LD      A,LOCAL
        LD      (TYPSWP),A      ;TYPE OF SWAP
        LD      SP,SSTACK       ;SET SUPERVISOR STACK
        JP      OSYSTM

;$$$$$$$$$$$$$$$$$$$$$$$$$$$$$$$$$$$$$$$$$$$$$$$$$$$$$$
;$$$$$$$$$$$$$$$$$$$$$$$$$$$$$$$$$$$$$$$$$$$$$$$$$$$$$$
;GET CPU TIME FROM OTHER TASK
JUMP:   LD      A,SHARED
        LD      (TYPSWP),A      ;TYPE OF SWAP
```

```
OSYSTM:

; SEE IF CRT READY TO RUN
OSYST4:  LD      A,(RSCOSW)
         CP      RDYRUN
         JR      NZ,SWAPOT       ;NOTHING READY TO RUN
; SWAP-IN CRT APPLICATION CODE FOR CPU-TIME
         LD      SP,(SAVSTK)     ;RESTORE USER'S STACK
         POP     HL
         POP     DE
         POP     BC
         POP     IX
         POP     IY
         RET                     ;START EXECUTING APPLICATION CODE

; SWAP-OUT TIME. SEE IF SHARED CPU
SWAPOT:  LD      A,(TYPSWP)
         CP      LOCAL
         JR      Z,OSYSTM        ;IT'S SINGLE USER MODE
         LD      SP,(SAVOLD)
         RET                     ;RETURN TO SHARED TASK

; &&&&&&&&&&&&&&&&&&&&&&&&&&&&&&&&&&&&&&&&&&
; CHECK FOR PAGE AND STORE IT INTO (HL)
CHKPAG:  PUSH    HL              ;SAVE TARGET
         LD      HL,(NEWPTR)
         LD      DE,(OLDPTR)
         OR      A
         SBC     HL,DE
         POP     HL
         RET     Z               ;EQUAL, RETURN WITH NO CARRY

DI
         PUSH    HL              ;-> FINAL TARGET
         LD      DE,(OLDPTR)
         EX      DE,HL
         LD      BC,PGQLEN       ;MOVE TRANSACTION INTO OUTPUT BUFFER
         LDIR
; UPDATE OLD POINTER
         LD      HL,(OLDPTR)
         LD      BC,PGQLEN       ;ADD LENGTH OF QUEUE SLOT
         ADD     HL,BC
         OR      A
         LD      BC,CQSEND       ;COMPARE AGAINST END
         PUSH    HL
         SBC     HL,BC
         POP     DE
         JR      C,CHKP92        ;NOT END
         LD      DE,CQSPAC       ;-> TOP
CHKP92:  LD      (OLDPTR),DE     ;STORE NEW OLD POINTER
         POP     HL              ;-> START OF BUFFER
         EI
         SCF
         RET

; &&&&&&&&&&&&&&&&&&&&&&&&&&&&&&&&&&
; SET PAGE INFORMATION INTO QUEUE
LSETP:   LD      DE,PAGQBF
         PUSH    DE
         LD      (DE),A          ;TYPE OF PAGE
         INC     DE
         PUSH    IY
         POP     HL
```

```
            LDIR
        LD      HL,TMHOUR
        LD      BC,3            ;MOVE TIME-STAMP
        LDIR
        POP     HL
        CALL    PAGLIN          ;STORE PAGE INFORMATION IN MAIN QUEUE
        RET

; &&&&&&&&&&&&&&&&&&&&&&&&&&&&&&&&&&&&&&&&&&&&&
; STORE DATA AT HL INTO A FREE BUFFER SLOT. HL -> CODE, RECORD, TIME-STAMP
PAGLIN: PUSH    BC
        PUSH    DE
        PUSH    HL
; COMPRESS AND STORE IY -> RECORD FOR OUTPUT CPU
        LD      HL,(NEWPTR)
        CALL    COMPAG          ;COMPRESS PAGE INTO QUEUE
; UPDATE NEW POINTER
        LD      HL,(NEWPTR)
        LD      BC,PGQLEN       ;GET LENGTH
        ADD     HL,BC
        OR      A
        LD      BC,CQSEND       ;COMPARE AGAINST END
        PUSH    HL
        SBC     HL,BC
        POP     DE
        JR      C,GETP92        ;NOT END
        LD      DE,CQSPAC       ;-> TOP
GETP92: LD      (NEWPTR),DE     ;STORE NEW OLD POINTER

POP     HL              ;-> CODE, RECORD, TIME-STAMP
        CALL    STORAC          ;STORE INTO ACTIVITY QUEUE
        POP     DE
        POP     BC
        RET

; STORE ACTIVITY INFORMATION INTO QUEUE
STORAC: PUSH    HL
        LD      DE,(NEWACP)
        LD      BC,ACTLEN
        LDIR                    ;MOVE PAGE INTO QUEUE
; UPDATE NEW POINTER
        LD      HL,(NEWACP)
        LD      BC,ACTLEN       ;GET LENGTH OF SLOT
        ADD     HL,BC
        OR      A
        LD      BC,ACQEND       ;COMPARE AGAINST END
        PUSH    HL
        SBC     HL,BC
        POP     DE
        JR      C,STAC92        ;NOT END
        LD      DE,ACQUEU       ;-> TOP
STAC92: LD      (NEWACP),DE     ;STORE NEW OLD POINTER
        POP     HL
        RET

; ##################################
; COMPRESS PAGE INTO DATA STREAM. IY MUST -> AT RECORD
COMPAG: PUSH    HL
        LD      A,(IY+RC04)
        AND     0FH
        LD      (HL),A
        INC     HL
        LD      A,(IY+RC05)     ;MOVE PAGER ADDRESS
        LD      (HL),A
```

```
            LD      A,(IY+RC06)
            LD      (HL),A
            INC     HL
            LD      A,(IY+RC07)
            LD      (HL),A
            INC     HL
            LD      B,(IY+RC04)     ;MOVE TIMING
            SRL     B
            SRL     B
            SRL     B
            SRL     B
            LD      A,(IY+RC03)     ;GET XMITTER
            AND     11000000B
            SRL     A
            SRL     A               ;LEFT JUSTIFY NIBBLE
            OR      B
            LD      (HL),A          ;STORE XMITTER/TIMING
            POP     HL
            RET

; &&&&&&&&&&&&&&&&&&&&&&&&&&&&&&&&&&&&&&&&&&&&
; CHECK FOR ANY PAGE ACTIVITY IN QUEUE. RETURNS C=1 IF YES. DE -> DATA
ACTCHK:     DI
            LD      HL,(NEWACP)
            LD      DE,(OLDACP)
            OR      A
            SBC     HL,DE
            JR      Z,ACTCEX        ;EQUAL, RETURN WITH NO CARRY

LD      DE,(OLDACP)
            PUSH    DE
; UPDATE OLD POINTER
            LD      HL,(OLDACP)
            LD      BC,ACTLEN       ;ADD LENGTH OF QUEUE SLOT
            ADD     HL,BC
            OR      A
            LD      BC,ACQEND       ;COMPARE AGAINST END
            PUSH    HL
            SBC     HL,BC
            POP     DE
            JR      C,ACCHK2        ;NOT END
            LD      DE,ACQUEU       ;-> TOP
ACCHK2:     LD      (OLDACP),DE     ;STORE NEW OLD POINTER
            POP     DE              ;-> START OF BUFFER
            SCF
ACTCEX:     EI                      ;EXIT
            RET

; PULL HISTORY OF ACTIVITY FROM QUEUE. RETURNS C=1 IF YES. DE -> DATA
ACTPUL:     LD      A,B
            CP      255
            JR      NZ,ACTCUN       ;NOT FIRST ONE, CONTINUE
            LD      B,PQQNUM        ;# OF SLOTS
            LD      HL,(NEWACP)     ;-> OLDEST ACTIVITY
            RET
; UPDATE POINTER, SAVE B REG
ACTCUN:     LD      DE,ACTLEN       ;ADD LENGTH OF QUEUE SLOT
            ADD     HL,DE
            OR      A
            LD      DE,ACQEND       ;COMPARE AGAINST END
            PUSH    HL
            SBC     HL,DE
            POP     HL
            JR      C,ACTPL2        ;NOT END
```

```
ACTFLO: RET

; $$$$$$$$$$$$$$$$$$$$$$$$$$$$$$$$$$$$$$$$$$$$$
; $$$$$$$$$$$$$$$$$$$$$$$$$$$$$$$$$$$$$$$$$$$$$
; INITIALIZATION ENTRY CALL FROM OUTPUT SECTION
INJUMP: CALL    WARMCK          ;CHECK FOR COLD POWER-UP RESET
        CALL    INITT           ;INITIALIZE THE SIO TIMERS
        CALL    SERINI          ;INITITALIZE THE SIO CHANNNELS
        CALL    INFACE          ;INITIALIZE LINE INTERFACE CODE
; INITIALIZE PAGE QUEUE
        LD      HL,CQSPAC
        LD      (OLDPTR),HL     ;INITIALIZE CIRCULAR QUEUE POINTERS
        LD      (NEWPTR),HL
; INIT ACTIVITY QUEUE
        LD      HL,ACQUEU
        LD      (OLDACP),HL     ;INITIALIZE ACTIVITY QUEUE POINTERS
        LD      (NEWACP),HL

LD      A,00
        LD      (TYPEHD),A      ;CLEAR TYPE-AHEAD CHARACTER
        LD      A,WTSTX
        LD      (LSTATE),A      ;WAITING FOR STX
        LD      A,00
        LD      (LCOUNT),A      ;CHARACTER COUNT

; PRECONDITION RUN-STATE INFORMATION FOR APPLICATION CODE RESTART
        LD      (SAVOLD),SP     ;SAVE CURRENT STACK POINTER
        LD      SP,USRSTK       ;USER STACK
        LD      A,RDYRUN        ;READY TO RUN
        LD      (RSCOSW),A
        LD      A,00
        LD      (RSTIMR),A      ;CLEAR TIMER
        LD      HL,DSTART       ;ENTRY ADDRESS FOR FIRST RUN
        PUSH    HL              ;PRE-SET RETURN ADDRESS
        PUSH    IY
        PUSH    IX
        PUSH    BC              ;PRE-PUSH REGISTERS
        PUSH    DE
        PUSH    HL
        LD      (SAVSTK),SP     ;SAVE USER'S STACK POINTER
        LD      SP,(SAVOLD)
        RET

; INITIALIZE HARDWARE
INIT00: LD      A,4FH
        CALL    OUTIN
        CALL    OUTIN
; TURN ALL INTERRUPTS OFF
        LD      A,3
        CALL    OUTALL
        CALL    OUTALL
; INITIALIZE ALL IEI AND IEOS
        LD      B,32
XRETI:  CALL    RETII           ;CLEAR DIASY CHAIN
        DJNZ    XRETI
        RET
RETII:  RETI
OUTALL: LD      B,20            ;CLEAR 0 DATA PORTS
        LD      C,0
OALL:   OUT     (C),A
        INC     C
        DJNZ    OALL
        RET
```

```
; SEE IF CPU HAS GONE THROUGH A WARM OR COLD RESET
WARMCK: LD      A, (HOTCPU)
        CP      55H
        JR      NZ, COLDST      ; IT IS A COLD RESET
        LD      A, (HOTCPU+1)
        CP      0AAH
        JR      NZ, COLDST      ; COLD
; WARM RESTART
        RET                     ; EVERTHING OKAY
; COLD RESET
COLDST: LD      A, 55H
        LD      (HOTCPU), A
        LD      A, 0AAH         ; SET HOT RESET FLAGS
        LD      (HOTCPU+1), A

LD      A, 00
        LD      (TMDAYS), A
        LD      (TMHOUR), A     ; RESET TIME-OF-DATE CLOCK TO 0
        LD      (TMINUT), A
        LD      (TMSECD), A
        LD      A, 4
        LD      (TMDOWN), A     ; DOWN-COUNT

LD      HL, (DBSIZO)
        LD      (DBSIZE), HL    ; SET DATABASE SIZE
        ADD     HL, HL   ; *2
        ADD     HL, HL   ; *4   MULTIPLY BY RECORD SIZE OF 8 BYTES
        ADD     HL, HL   ; *8
        PUSH    HL
        POP     BC
        LD      HL, EEPRMO      ; DATABASE SAMPLE
        LD      DE, EEPROM
        LDIR                    ; MOVE SAMPLE DATABASE INTO RAM
        LD      HL, TMPEXO      ; SAMPLE TEMPLATE EXTENSION & RECORD
        LD      DE, TEMPEX      ; ACTUAL TEMPLATE EXTENSION
        LD      BC, 8           ; SIZE OF 1 RECORD
        LDIR
        RET

; ##################################
; INITIALIZE THE SERIAL PORTS
SERINI: LD      HL, ISIOTO      ; NORMAL 2-WAY INTERRUPT
        LD      B, ISCNTO
        LD      C, CRTCHN+1     ; CRT CHANNEL
        OTIR
        LD      HL, ISIOTO      ; NORMAL 2-WAY INTERRUPT
        LD      B, ISCNTO
        LD      C, LINCHN+1     ; LINE CHANNEL
        OTIR
; INITIALIZE CTC BAUD RATES
        LD      C, CLKBB1       ; SET CRT CHANNEL SIO BAUD RATE
        LD      B, 47H
        OUT     (C), B
        LD      A, (BAUDFI)     ; GET BAUD RATE FACTOR
        OUT     (C), A
        LD      C, CLKDD1       ; SET LINE CHANNEL SIO BAUD RATE
```

```
; SIO INITIALIZATION CONSTANTS
; STANDARD TABLE (CRT INITIALIZATION)
ISIOT0:  DEFB    0                       ; IDLE
         DEFB    0
         DEFB    0+11000B                ; CHANNEL RESET
         DEFB    0                       ; IDLE
         DEFB    4+10000B                ; REG 4, RESET EXTERNAL STATUS
         DEFB    01000111B               ; 16X CLOCK, ENABLE PARITY
                                         ; EVEN PARITY, 1 STOP BIT, ASCY
         DEFB    3+110000B               ; REG 3, RESET ERROR LATCHES
         DEFB    01000001B               ; RECEIVE ENABLE, 7 BITS/CHAR
         DEFB    5+101000B               ; REG 5, RESET XMIT INT PENDING
         DEFB    10101010B               ; TX ENABLE, 7 BITS/CHAR
         DEFB    1                       ; REG 1
         DEFB    00011110B               ; INT ON ALL RX AND TX, ST AFS VECTOR, NO EXT.
ISCNT0   EQU     $-ISIOT0

; ###########################################################
; INITIALIZE THE TIMERS FOR TIME-BASE
INITT:   LD      A,00100111B             ; TIMER MODE, PRESC=256, LOAD CONST, RESET
         OUT     (TIMR2),A
         LD      A,98
         OUT     (TIMR2),A               ; TO PRODUCE 10 MSEC OUTPUT
         LD      A,11000111B             ; COUNTER MODE, INTERRUPT ON, LOAD CONST, RESET
         OUT     (TIMR3),A
         LD      A,(SC050M)
         OUT     (TIMR3),A               ; PRODUCES INTERRUPT
         LD      A,5
         LD      (TRESOL),A              ; SET RESOLUTION DIVIDER
         RET

; ###########################################################
; TIME-BASE 2 INTERRUPT
TM2INT:  NOP
         EI
         RETI

; ###########################################################
; TIME-BASE 1 INTERRUPT
TM1INT:  EX      AF,AF'
         EXX
         LD      A,(TRESOL)              ; GET TIMER-RESOLUTION
         DEC     A
         LD      (TRESOL),A
         JR      NZ,TM1XX0
         CALL    UPTIMB                  ; UPDATE THE TIME-BASE
         LD      A,5
         LD      (TRESOL),A              ; RESET TIMER RESOLUTION
TM1XX0:  CALL    LISCAN                  ; SCAN TELEPHONE LINES
         LD      A,(RSCOSW)
         CP      WTWAIT                  ; WAITING FOR TIME-OUT?
         JR      NZ,TM1XX2
         LD      A,(RSTIMR)
         DEC     A                       ; -1 TIMER
         LD      (RSTIMR),A
         JR      NZ,TM1XX2               ; NOT ZERO
```

```
; UPDATE THE TIME-BASE
UPTIMB: LD      A,(TMDOWN)
        DEC     A                       ;WAIT 1 SECOND
        LD      (TMDOWN),A
        JR      NZ,TM1BSX
        LD      A,4
        LD      (TMDOWN),A              ;RESET DOWN-COUNTER
        LD      A,1
        LD      (TMTICK),A              ;RESET TICKER INDICATOR
; SECONDS = 1 MINUTE
        LD      A,(TMSECD)
        INC     A
        LD      (TMSECD),A
        CP      60
        JR      NZ,TM1BSX
; MINUTES = HOUR
        LD      A,00
        LD      (TMSECD),A              ;CLEAR SECONDS
        LD      A,(TMINUT)
        INC     A
        LD      (TMINUT),A
        CP      60
        JR      NZ,TM1BSX
        LD      A,00
        LD      (TMINUT),A              ;CLEAR MINUTES
        LD      A,(TMHOUR)
        INC     A
        LD      (TMHOUR),A
        CP      24
        JR      NZ,TM1BSX
        LD      A,00
        LD      (TMHOUR),A
        LD      A,(TMDAYS)
        INC     A
        LD      (TMDAYS),A              ;+1 DAYS
TM1BSX: RET

; ##################################
; LINE INTERFACE UNIT OUTPUT
LOTPUT: EX      AF,AF'
        EXX
        LD      C,LINCHN                ;LINE CHANNEL
        INC     C                       ;POINT TO COMMAND CHANNEL
        LD      A,28H                   ;RESET TRANSMITT INT. PENDING
        RES     7,A                     ;CLEAR TOP BIT
        OUT     (C),A
        EXX
        EX      AF,AF'                  ;RESTORE REGISTER SET
        EI
        RETI

; LINE INTERFACE INPUT INTERRUPT
LINPUT: EX      AF,AF'
        EXX
        LD      C,LINCHN                ;LINE CHANNEL
        IN      A,(C)                   ;GET CHARACTER
        RES     7,A                     ;RESET HIGH BIT
```

```
            LD      E, A
            CP      1BH             ; IF ESCAPE, RESET TO NO CHARACTERS
            JP      Z, LINPES
            CP      ';'
            JR      Z, LINP06       ; STX.
            CP      ','
            JR      Z, LINP06       ; STX.
            LD      A, (LSTATE)
            CP      WTDATA
            JR      Z, LINP10       ; WAITING FOR DATA
; ASSUME WAITING FOR STX
            JR      LINPXZ          ; UNDEFINED, IGNORE
; STX. SET WAITING FOR DATA
LINP06:     LD      A, WTDATA
            LD      (LSTATE), A
            LD      A, 01
            LD      (LCOUNT), A     ; ZERO THE COUNT
            LD      A, E
            LD      (LDATA), A      ; STORE FIRST CHARACTER
            JR      LINPXX
; NOW WAITING FOR DATA
LINP10:     LD      A, E
            CP      08H             ; CHECK FOR BACKSPACE
            JP      Z, LINPBK
            LD      A, E
            CP      0DH             ; END-OF-TEXT
            JR      Z, LINP20
            CP      '0'             ; RELATIVE TO ZERO
            JR      C, LINPXZ       ; BELOW NUMERIC, IGNORE
            CP      '9'+1
            JR      NC, LINPXZ      ; ABOVE NUMERIC, IGNORE
            LD      E, A
            LD      A, (LCOUNT)
            CP      LMAXCT          ; MAX DATA STRING
            JR      NC, LINPXZ      ; = OR > MAX #
            PUSH    BC
            LD      C, A
            INC     A               ; +1 COUNT
            LD      (LCOUNT), A
            LD      B, 00
            LD      HL, LDATA
            ADD     HL, BC
            POP     BC
            LD      (HL), E         ; STORE RIGHT NIBBLE
            JR      LINPXX

; END OF TEXT, MOVE DATA INTO INTERMEDIATE BUFFER
LINP20:     LD      A, (LCOUNT)
            CP      LMAXCT          ; MAX DATA STRING
            JR      NZ, LINPXZ      ; > MAX
            LD      HL, LDATA
; @@@@@ WAS OLD PAGLIN, NEED DATABASE LOOK UP NOW
;           CALL    PAGLIN          ; STORE DATA INTO LINE QUEUE
            LD      A, WTSTX
            LD      (LSTATE), A     ; RESET TO WAITING FOR STX
; MAIN EXIT POINT FOR ALL CHARACTERS
LINPXX:     LD      A, D            ; SEE IF ORIGINAL CHARACTER IS <RETURN>
            CP      0DH
            JR      NZ, LINPXY
            OUT     (C), A          ; SEND CAR
            LD      E, 0AH          ; SEND LINE-FEED ALSO
LINPXY:     OUT     (C), E          ; ECHO CHARACTER
LINPXZ:     EXX
            EX      AF, AF'
```

```
; ESCAPE: RESET BUFFER
LINPES: LD      A,00
        LD      (LCOUNT),A
        LD      A,WTSTX
        LD      (LSTATE),A
        LD      D,0DH
        JR      LINPXX          ;SEND CARRIAGE RETURN, LINE-FEED
; CHECK FOR BACKSPACE
LINPBK: LD      A,(LCOUNT)
        CP      0
        JR      Z,LINPXY        ;ALREADY 1 OR ZERO, EXIT
        DEC     A
        LD      (LCOUNT),A
        JR      LINPXY          ;DO THE BACKSPACE

; LINE INTERFACE  EXTERNAL STATUS INTERRUPTS
LEXSTT: PUSH    AF
        LD      A,LINCHN
        JR      EXSTTT

; LINE INTERFACE  SPECIAL RECEIVE CONDITION INTERRUPTS
LSPREC: PUSH    BC
        PUSH    AF
        LD      C,LINCHN        ;LINE CHANNEL
        JR      SPRCCC

;###################
; EXTERNAL STATUS INTERRUPTS
EXSTAT: PUSH    AF
        LD      A,CRTCHN
EXSTTT: POP     AF
        EI                      ;NO SIO SHOULD HAVE EX STATUS INT ENABLED
        RETI

; SPECIAL RECEIVE CONDITION INTERRUPTS
SPRECO: PUSH    BC
        PUSH    AF
        LD      C,CRTCHN
;RESET THE ERROR LATCH FOR PROBLEM SIO CHANNEL
SPRCCC: INC     C               ;SELECT CNTL REG
        LD      A,00010000B     ;RESET EXT/STATUS INTERRUPT  (EXTRANOUS)
        OUT     (C),A
        LD      A,00110000B     ;ERROR RESET (PARITY, OVERRUN ERRORS CLEARED)
        OUT     (C),A           ;NULL CODE
        POP     AF
        POP     BC
        EI
        RETI

; CRT OUTPUT INTERRUPT
INTOO:  EX      AF,AF'
        EXX
        LD      C,CRTCHN        ;CRT CHANNEL
; OUTPUT INTERRUPT SERVICE ROUTINE
        LD      A,(RSCOSW)      ;GET RUN STATE CODE
        CP      WTSTP           ;WRITE BY STOP CHARACTER?
        JR      Z,OISRVA
        CP      WTEND           ;1 CHAR. END NOW?
        JR      Z,OISRV1
        CP      WTCNT           ;WRITE BY COUNT?
        JR      NZ,OISRV2       ;ERROR, RESET TXMIT PENDING
```

```
                LD      HL,(OBFOSW)     ;GET OUTPUT BUFFER POINTER
                INC     HL              ;BUMP UP
                LD      (OBFOSW),HL     ;RESTORE NEW POINTER
                LD      A,(OTCOSW)
                DEC     A               ;-1
                LD      (OTCOSW),A
                JR      Z,OISRV1        ;END OF WRITE
                LD      A,(HL)          ;GET CHAR.
                JR      OISRV3
; WRITE BY TERMINATION CHAR.
OISRVA:         LD      HL,(OBFOSW)     ;GET OUTPUT BUFFER POINTER
                INC     HL              ;BUMP UP
                LD      (OBFOSW),HL     ;RESTORE NEW POINTER
                LD      A,(HL)          ;GET CHARACTER
                CP      255             ;COMPARE TO OUTPUT TERMINATION CHAR.
                JR      Z,OISRV1        ;YES
                JR      OISRV3
OISRV1:         LD      A,RDYRUN
                LD      (RSCOSW),A      ;SET READY TO RUN
OISRV2:         INC     C               ;POINT TO COMMAND CHANNEL
                LD      A,28H           ;RESET TRANSMITT INT PENDING
OISRV3:         RES     7,A             ;CLEAR TOP BIT
                OUT     (C),A
                EXX
                EX      AF,AF'          ;RESTORE REGISTER SET
                EI
                RETI

;*******************************
; INPUT INTERRUPT SERVICE ROUTINE
; CHANNEL 0 INPUT
INTIO:          EX      AF,AF'
                EXX
                LD      C,CRTCHN        ;CRT CHANNEL
                IN      A,(C)           ;GET CHARACTER
                RES     7,A             ;RESET HIGH BIT
                LD      E,A
                LD      A,(RSCOSW)      ;GET RUN STATE CODE
                CP      RDECHO          ;WAITING FOR CHAR STRING INPUT?
                JR      Z,IISRV0
                LD      HL,(INBOSW)     ;-> STORAGE
                CP      RSCD1C          ;READ 1 CHARACTER?
                JP      NZ,IITYPE       ;UNSOLICITED, STORE IN TYPE-AHEAD
; EXPECT 1 NUMERIC OR (TAB-SPACE)
                LD      A,E
                CALL    DECOD1          ;DECODE CHAR
                JR      C,IISRV3        ;NOT VALID CHARACTER
                LD      (HL),A          ;STORE IT IN USER BUFFER
                LD      A,RDYRUN
                LD      (RSCOSW),A      ;SET READY TO RUN
                JR      IISRV3          ;DO NOT ECHO CHARACTER

; NORMAL VRS CHARACTER INPUT HANDLING
IISRV0:         LD      HL,(INBOSW)     ;GET INPUT BUFFER POINTER
                LD      A,E             ;GET THE CHARACTER
                CP      08H             ;BACKSPACE?
                JR      Z,IISRV4
                LD      (HL),A          ;STORE CHARACTER
                INC     HL              ;BUMP UP
                LD      (INBOSW),HL     ;RESTORE NEW POINTER
                LD      D,00
                CP      0DH             ;TERMINATION CARRIAGE RETURN?
                JR      Z,IISRV1
                LD      D,1
```

```
                JR      Z,IISRV1
                LD      A,(ITCOSW)
                INC     A                       ;INCREMENT CHAR. COUNT
                LD      (ITCOSW),A
                LD      A,(TTCOSW)
                DEC     A                       ;DECREMENT TERMINATION CHAR. COUNT
                LD      (TTCOSW),A
                JR      NZ,IISRV2               ;MAX COUNT NOT REACHED
; IF FALL THROUGH HERE, THEN TERMINATE AS IF RETURN HIT
                LD      D,00
; TERMINATE INPUT
IISRV1:         LD      HL,(SSBUFA)             ;GET INITIAL BUFFER ADDRESS
                LD      (HL),D                  ;STORE TERMINATION CODE
                INC     HL
                LD      A,(ITCOSW)              ;GET COUNT
                LD      (HL),A                  ;STORE IT IN USER BUFFER
                LD      A,RDYRUN
                LD      (RSCOSW),A              ;SET READY TO RUN
; DETERMINE IF CHARACTER IS TO BE ECHOED
IISRV2:         LD      A,(RSCOSW)
                CP      RDECHO                  ;READ WITH ECHO
                JR      NZ,IISRV3               ;DON'T ECHO THE INPUT CHARACTER
                LD      A,E
                CP      0DH                     ;CARRIAGE RETURN?
                JR      Z,IISRV3
                CP      1BH                     ;ESCAPE ?
                JR      Z,IISRV3
                CP      ' '                     ;IS CHARACTER CONTROL CHARACTER?
                JR      NC,IISRVX
                LD      E,'!'                   ;ECHO CNTL CHAR AS PRINTABLE
; EXIT POINT FOR ALL INPUT INTERRUPTS
IISRVX:         OUT     (C),E                   ;ECHO CHARACTER
IISRV3:         EX      AF,AF'                  ;RESTORE REGISTER SET
                EXX
                EI
                RETI

; TYPE-AHEAD HANDLER
IITYPE:         LD      A,E
                LD      (TYPEHD),A              ;STORE IN TYPE-AHEAD BUFFER
                JR      IISRV3

; CHARACTER WAS RUBOUT OR BACKSPACE
IISRV4:         LD      A,(ITCOSW)              ;GET COUNT
                CP      0                       ;ZERO CHARACTERS?
                JR      Z,IISRV3                ;ALREADY ZERO
                DEC     HL                      ;DECREMENT AND STORE INPUT POINTER
                LD      (INBOSW),HL
                LD      A,(ITCOSW)
                DEC     A
                LD      (ITCOSW),A              ;DECREASE THE CHAR. COUNT
                LD      A,(TTCOSW)
                INC     A
                LD      (TTCOSW),A              ;INCREASE THE TERMINAL CHARACTER COUNT
                LD      E,08H                   ;BACKSPACE CHARACTER
                JR      IISRVX                  ;OUTPUT IT & RETURN

; CHECK FOR ANY KEY
ANYKEY:         CALL    CPMSYS                  ;CHECK IF SYSTEM IS CPM
                JR      Z,ANYKCP
                LD      HL,TYPEHD
                LD      A,(HL)                  ;CHECK TYPE-AHEAD
```

```
                RET     Z               ;NONE, CARRY CLEAR
                LD      (HL),00         ;CLEAR TYPE-AHEAD
                SCF
                RET                     ;GOT KEY
ANYKCP:         CALL    CPCHKK          ;SEE IF CHARACTER ENTERED
                RET     NC              ;NO KEY
                RET                     ;GOT KEY

; CHECK FOR PAUSE OR ESCAPE KEY
CHKKEY:         CALL    CPMSYS          ;CHECK IF SYSTEM IS CPM
                JR      Z,CPKCPM
                LD      HL,TYPEHD
                LD      A,(HL)          ;CHECK TYPE-AHEAD
                CP      0
                RET     Z               ;NONE, CARRY CLEAR
                LD      (HL),00         ;CLEAR TYPE-AHEAD
CHKCHK:         CP      1BH
                SCF
                RET     Z               ;ESCAPE
                CP      'O'
                SCF
                RET     Z               ;ESCAPE
                CP      ','
                SCF
                RET     Z               ;ESCAPE
                CP      '.'
                JR      Z,CHKPAU        ;PAUSE
                OR      A
                RET                     ;IGNORE KEY
; FOR CPM SYSTEM
CPKCPM:         CALL    CPCHKK          ;SEE IF CHARACTER ENTERED
                RET     NC              ;NO KEY
                JR      CHKCHK
CHKPAU:         CALL    RD1CHR          ;GET 1 CHARACTER
                CP      0BH
                SCF
                RET     Z               ;ESCAPE
                OR      A
                RET

; READ FROM KEYBOARD WITH ECHO
RDCRT:          LD      B,22            ;MAX # CHARACTERS
                LD      HL,CRTIBF       ;CRT INPUT BUFFER
                CALL    RDWE            ;READ WITH ECHO
                LD      HL,CRTIBF+2     ;-> DATA
                LD      A,(CRTIBF+1)    ;CHAR COUNT
                CP      0
                RET     NZ
                SCF
                RET                     ;NO CHARACTERS

; READ 1 NUMERIC CHARACTER, TAB-SPACE RETURN , OR \ ESCAPE ,
RD1CHR:         LD      HL,CRTIBF
                CALL    RD1WOE          ;READ 1 CHARACTER WITH/OUT ECHO
                LD      A,(CRTIBF)
                RET

; ##################################
; PRINT 1 CHAR
PUTC:           LD      (TEMPOO),A
                CALL    CPMSYS          ;CHECK IF SYSTEM IS CPM
                LD      A,(TEMPOO)
                JP      Z,CPWONE
                CALL    SAVREG          ;SAVE USER REGS, ENTRY POINT, AND STACK PTR
```

```
                JR      WRTAAA

; PRINT STRING BY COUNT IN B REG
WRTC:   CALL    CPMSYS          ;CHECK IF SYSTEM IS CPM
        JP      Z,CPWRTC
        CALL    SAVREG          ;SAVE USER REGS, ENTRY POINT, AND STACK PTR
        LD      E,WTCNT         ;SET WAIT CODE OF WRITE BY COUNT
        JR      WRTA

; PRINT STRING BY STOP CHARACTER
WRT:    CALL    CPMSYS          ;CHECK IF SYSTEM IS CPM
        JP      Z,CPWRT
        CALL    SAVREG          ;SAVE USER REGS, ENTRY POINT, AND STACK PTR
        LD      E,WTSTP         ;SET WAIT CODE OF WRITE BY STOP CHARACTER
        LD      B,01            ;NULL OUTPUT CHARACTER COUNT (RELATIVE TO 1)
WRTA:   LD      A,B
        LD      (OTCOSW),A      ;STORE # OF CHARACTERS IF BY COUNT
        LD      A,(HL)          ;GET FIRST CHARACTER
        LD      (OBFOSW),HL     ;STORE STRING POSITION INTO SWITCH TABLE
WRTAAA: LD      C,CRTCHN
        OUT     (C),A           ;OUTPUT THE FIRST CHARACTER
        LD      A,E
        LD      (RSCOSW),A      ;SET WAIT CODE
        JP      SWAPOT          ;ACTIVATE NEXT TASK

; ##################################
; READ 1 NUMERIC, TAB-SPACE, ESCAPE
PD1WOE: CALL    CPMSYS          ;SEE IF CPM
        JP      Z,RDCPMN
        CALL    SAVREG          ;SAVE USER REGS, ENTRY POINT, AND STACK PTR
        LD      (INBOSW),HL     ;STORE DATA ADDRESS IN SWITCH TABLE
        LD      A,RSCD1C        ;READ 1 CHAR, W/OUT ECHO
        LD      (RSCOSW),A      ;PUT WAIT CODE INTO TABLE ENTRY
        JP      SWAPOT          ;ACTIVATE NEXT TASK

; READ WITH ECHO FUNCTION, REG B HAS MAX COUNT
RDWE:   CALL    CPMSYS          ;CHECK IF SYSTEM IS CPM
        JP      Z,CPRDEC
        LD      C,RDECHO        ;DO ECHO
        CALL    SAVREG          ;SAVE USER REGS, ENTRY POINT, AND STACK PTR
        LD      (SSBUFA),HL     ;SET START BUFFER ADDRESS
        INC     HL
        INC     HL              ;INDEX TO DATA AREA
        LD      (INBOSW),HL     ;STORE ADDRESS OF ACTUAL DATA IN SWITCH TABLE
        LD      A,B
        LD      (TCCOSW),A      ;STORE MAX INPUT CHARACTER COUNT
        LD      A,00
        LD      (ITCOSW),A      ;ZERO THE INPUT CHAR. COUNTER
        LD      A,C
        LD      (RSCOSW),A      ;PUT WAIT CODE INTO TABLE ENTRY
        JP      SWAPOT          ;ACTIVATE NEXT TASK

; WRITE MESSAGE -> HL, THEN SEND CRET, LINE FEED
WRTCLF: CALL    WRT
        JP      PUTCLF
PUTCLF: PUSH    HL
        LD      HL,MSGCLF
        CALL    WRT
        POP     HL
        RET
MSGCLF: DEFW    CRLFED
        DEFB    255

; ####################################
```

```
; THIS EFFECTIVELY SWAPS-OUT THE APPLICATION CODE AND SAVES ENVIRONMENT
; A-REG IS NOT DESTROYED
SAVREG: LD      (HLSAVE),HL
        POP     HL
        LD      (SAVRET),HL     ;SAVE RETURN ADDRESS
        PUSH    IY
        PUSH    IX
        PUSH    BC
        PUSH    DE              ;SAVE USER'S REGISTERS
        LD      HL,(HLSAVE)
        PUSH    HL
        LD      (SAVSTK),SP     ;SAVE STACK POINTER
; EVERYTHING SAVED, USER IS NOW SWAPPED-OUT.
        LD      SP,SSTACK       ;POINT TO SUPERVISOR STACK
        LD      HL,(SAVRET)
        PUSH    HL              ;PRE-SET RETURN ADDRESS
        LD      HL,(HLSAVE)
        RET                     ;RETURN TO SYSTEM CALL POINT

; ################
; HIBERNATE FOR 1/10 SECOND
HIBER:  LD      B,A
        CALL    CPMSYS
        JR      Z,CHIBNT        ;HIBERNATE UNDER CPM
        CALL    SAVREG          ;SAVE USER REGS, ENTRY POINT, AND STACK PTR
        LD      A,B
        LD      (RSTIMR),A      ;SET TIMER
        LD      A,WTWAIT        ;SET WAIT CODE OF WAIT
        LD      (RSCOSW),A      ;SET WAIT CODE
        JP      SWAPOT          ;ACTIVATE NEXT TASK

; ##############################
; UPDATE TIME-BASE IF CPM SYSTEM
DTIMBS: CALL    CPMSYS
        RET     NZ
        CALL    CHIBER          ;HIBERNATE UNDER CPM FOR 1/4 SECOND
        CALL    UPTIMB          ;UP THE TIME BASE
        RET

; CPM HIBERNATE BY B REG FOR 1/10 SECOND
CHIBNT: PUSH    BC
        LD      BC,2FFFH        ;TIME-CONSTANT
CPHR31: DEC     BC
        LD      A,B
        CP      0
        JR      NZ,CPHR31
        POP     BC
        DJNZ    CHIBNT
        RET

; CPM TIME-DELAY FOR APPROXIMATELY 1 SECOND)
CHIBER: LD      B,7
CPHR10: PUSH    BC
        LD      BC,0D80H        ;TIME-CONSTANT
CPHR11: DEC     BC
        LD      A,B
        CP      0
        JR      NZ,CPHR11
        POP     BC
        DJNZ    CPHR10
        RET

; ###########################
; IF CPM SYSTEM UNDER TEST, THEN Z SID BYTE MUST BE SET TO 1
```

```
                CP      01
                RET                     ;Z=1 IF CPM SYSTEM

;###########################
;; WRITE TO SCREEN UNDER CPM
CPWRT:  PUSH    HL
        PUSH    DE
        PUSH    BC
CPWRT1: LD      A,(HL)
        CP      255             ;STOP WHEN REACH STOP CHARACTER 255
        JR      Z,CPWRT2
        CALL    CPWRT3
        JR      CPWRT1
CPWRT2: POP     BC
        POP     DE
        POP     HL
        RET

; CP/M WRITE BY COUNT
CPWRTC: PUSH    HL
        PUSH    DE
        PUSH    BC
CPWRTA: PUSH    BC
        LD      A,(HL)
        CALL    CPWRT3
        POP     BC
        DJNZ    CPWRTA
        POP     BC
        POP     DE
        POP     HL
        RET

; OUTPUT 1 CHARACTER
CPWONE: PUSH    BC
        PUSH    DE
        PUSH    HL
        LD      C,6
        LD      E,A
        CALL    0005            ;SEND CHAR TO CONSOLE
        POP     HL
        POP     DE
        POP     BC
        RET

; OUTPUT CHARACTER UNDER CPM
CPWRT3: LD      C,6             ;C=TYPE CALL
        LD      E,A             ;A=CHARACTER
        PUSH    HL
        CALL    0005            ;OUTPUT CHAR
        POP     HL
        INC     HL              ;BUMP ->
        RET

;###################################
; CP/M READ. BYTE 0=TERMINATER, BYTE 1=CHARACTER COUNT, BYTE 2--> INPUT STRING
CPRDEC: PUSH    BC
        PUSH    DE
        PUSH    HL
        LD      C,0             ;INITIALIZE CHARACTER COUNT = C
        INC     HL
        INC     HL              ;BUMP UP TO INPUT AREA
RDCPM2: PUSH    BC
        CALL    CPGETC          ;GET CHARACTER FROM CPM SYSTEM
        POP     BC
        REG     Z,A             ;GOT CHARACTER
```

```
                CP      0DH                     ;CARRIAGE RETURN?
                JR      Z,RDCPM4
                CP      08H
                JR      Z,RDCPM5                ;BACKSPACE?
                CP      1BH
                JR      Z,RDCPM6                ;ESCAPE?
                CP      03H                     ;TERMINATE
                JR      Z,RDCPMX                ;CONTROL C? IF SO, THEN EXIT TO ZSID
                LD      (HL),A                  ;STORE CHAR
                INC     HL
                INC     C
                DEC     B                       ;BUMP POINTER AND CHARACTER COUNT
                LD      A,E                     ;DECREMENT TERMINATOR
                CP      ' '
                JR      NC,RDCPME               ;IS CHARACTER CONTROL CHARACTER?
                LD      E,'!'
        RDCPME: CALL    RDCPM9                  ;ECHO AS A EXCLAMATION POINT
                                                ;ECHO TO CRT
                ;IS BUFFER FULL?
                LD      A,B
                CP      0
                JR      NZ,RDCPM2               ;IS MAX COUNT = 0?
        RDCPM4: POP     HL                      ;NO, CONTINUE
                LD      (HL),0                  ;TERMINATE INPUT WITH CARRIAGE RETURN
                JR      RDCPMA
        RDCPM6: POP     HL
                LD      (HL),1                  ;TERMINATE INPUT WITH ESCAPE
        RDCPMA: INC     HL
                LD      (HL),C                  ;STORE COUNT
                DEC     HL
                POP     DE
                POP     BC
                RET

; BACKSPACE OR DELETE KEY
        RDCPM5: LD      A,C
                CP      0                       ;CHECK CHAR COUNT
                JR      Z,RDCPM2
                LD      E,8
                CALL    RDCPM9
                DEC     C                       ;DECREMENT CHARACTER COUNT
                DEC     HL                      ;-1 INPUT POINTER
                INC     B
                JR      RDCPM2

RDCPBK: CALL    56                      ;BREAK TO ZSID DEBUGGER
                JR      RDCP99
        RDCPMX: CALL    56                      ;BREAK TO ZSID DEBUGGER
                JP      RDCPM2                  ;CONTINUE READING CHARACTERS

; READ 1 NUMERIC DIGIT OR (TAB-SPACE) W/OUT ECHO
        RDCPMN: PUSH    BC
                PUSH    DE
        RDCP99: CALL    CPGETC                  ;GET CHARACTER
                ; EXPECT 1 NUMERIC (TAB-SPACE) OR ESCAPE
                RES     7,A
                CP      03H                     ;CONTROL C? IF SO, THEN EXIT TO ZSID
                JR      Z,RDCPBK
                CALL    DECOD1                  ;DECODE CHARACTER
                JR      C,RDCP99                ;NOT VALID CHARACTER
                POP     DE
                POP     BC
                RET

; DECODE 1 NUMERIC, TAB-SPACE OR ESCAPE
```

```
            JR      Z,RDCP12        ;IT'S TAB-SPACE
            CP      ' '
            JR      Z,RDCP12
            CP      09H             ;HORIZONTAL TAB
            JR      Z,RDCP12
            CP      0DH             ;RETURN
            JR      Z,RDCP12
            CP      '\'
            JR      Z,RDCP20        ;ESCAPE
            CP      1BH
            JR      Z,RDCP20
            CP      ','
            JR      Z,RDCP20
            SUB     '0'
            JR      C,RDCP11        ;BAD CHARACTER
            CP      10
            JR      C,RDCP30        ;NUMERIC, OKAY
RDCP11:     SCF                     ;BAD CHARACTER
            RET
RDCP20:     LD      A,0BH           ;ESCAPE
            JR      RDCP30
RDCP12:     LD      A,0AH           ;IT'S TAB-SPACE
RDCP30:     LD      (HL),A          ;STORE CHARACTER
            OR      A
            RET

; GET 1 CHARACTER FROM CPM
CPGETC:     PUSH    HL
            PUSH    DE
            PUSH    BC
            LD      C,6
            LD      E,0FFH          ;TYPE OF CALL
            CALL    0005            ;CALL CPM OPERATING SYSTEM FOR INPUT
            POP     BC
            POP     DE
            POP     HL
            CP      0               ;CHAR. READY?
            JR      Z,CPGETC        ;NO
            RET

; SEE IF 1 KEY ENTERED
CPCHEK:     PUSH    HL
            PUSH    DE
            PUSH    BC
            LD      C,6
            LD      E,0FFH          ;TYPE OF CALL
            CALL    0005            ;CALL CPM OPERATING SYSTEM FOR INPUT
            POP     BC
            POP     DE
            POP     HL
            CP      0
            RET     Z               ;CHAR NOT READY
            SCF
            RET                     ;CHAR READY.

; PRINT CHARACTER IN E REGISTER
RDCPM2:     PUSH    BC              ;CALL CPM OPERATING SYSTEM TO OUTPUT CHARACTER
            PUSH    HL
            LD      C,6
            CALL    0005            ;CPM ROUTINE
            POP     HL
            POP     BC
            RET

;%%%%%%% SAMPLE DATABASE VALUES  %%%%%%%%%%%

TMPEX0:     DEFW    0FFFFH          ;INVALID EXTENSION # FOR PRINTING OF DEFAULT
TMPLT0:     DEFB    0               ;PAGER OFF, LINE UNIT
            DEFB    0+31            ;XM, LINE #
            DEFB    0+0             ;TIMING, PAGER TOP
            DEFB    20H             ;PAGER HI
            DEFB    31H             ;PAGER MIDDLE
            DEFB    00H             ;PAGER LOW

END
```

```
        TITLE   6/16/83 kbd  4  L#1
        SUBTTL  PBELL   RAM   MODULE
.Z80
; QUEUES
        PUBLIC  OLDPTR, OLDACP, NEWPTR, NEWACP
        PUBLIC  CQSPAC, CQSEND, ACQUEU, ACQEND
; BUFFERS & TIME BASE
        PUBLIC  CRTIBF, CRTOBF, TYPEHD, TYPSWP
        PUBLIC  TMTICK, TMDAYS, TMHOUR, TMINUT, TMSECD, TMDOWN, TRESOL
; LINE INTERFACE
        PUBLIC  LSTATE, LCOUNT, LDATA
; RUN-CODES
        PUBLIC  RSCOSW, TCCOSW, TTCOSW, ITCOSW, INBOSW, OBFOSW, OTCOSW, SSBUFA, RSTIMR
        PUBLIC  HOTCPU, TEMP00, SAVSTK, HLSAVE, SAVRET, SAVOLD, USRSTK, SSTACK
; LINE INTERFACE COMMAND LINE RAM
        PUBLIC  TMPREC, SVRECD, RTLOCT, TONCNT, TONSTR, SAVHL
; APPLICATIONS RAM
        PUBLIC  WORK99, SAVETM, SRCRCD, QUALIF, EXTENS, WRECRD, EEADRS
        PUBLIC  STRPTR, SCNPTR, ENDPTR, TEMPTR, SCNEXT
        PUBLIC  TEMPEX, TEMPLT

; LINE INTERFACE RAM
        PUBLIC  PAGOBF, PHNLIN, CURPHN, OLDACT, SCNTAB

; DATABASE STORAGE
        PUBLIC  DBSIZE, EEPROM

RCSIZE  EQU     8       ; RECORD SIZE
TOTLIN  EQU     32      ; # OF PHONE LINES IN SYSTEM
SCNSIZ  EQU     8       ; # SLOTS IN TABLE PER LINE

PGQNUM  EQU     08      ; NUMBER OF SLOTS PAGE QUEUE
PGQLEN  EQU     05      ; # OF SLOTS IN PAGE CIRCULAR QUEUE
ACTLEN  EQU     12      ; LENGTH OF 1 ACTIVITY QUEUE

;############   RAM MODULE   ###############
; RING DETECT CIRCULAR QUEUE
OLDPTR: DEFS    2       ;-> OLDEST RING DETECT QUEUE SLOT
NEWPTR: DEFS    2       ;-> NEXT FREE SPACE
CQSPAC: DEFS    PGQNUM*PGQLEN   ; CIRCULAR QUEUE SPACE
CQSEND:                 ; END
        DEFS    5       ; SAFETY

OLDACP: DEFS    2       ;-> ACTIVITY QUEUE
NEWACP: DEFS    2       ;-> NEXT FREE SPACE
ACQUEU: DEFS    PGQNUM*ACTLEN   ; ACTIVITY QUEUE
ACQEND:                 ; END
        DEFS    5       ; SAFETY

CRTIBF: DEFS    40      ; CRT INPUT BUFFER
CRTOBF: DEFS    81      ; CRT OUTPUT BUFFER
TYPEHD: DEFS    1       ; TYPE-AHEAD FEATURE  USED FOR ESCAPE/PAUSE TOO
TYPSWP: DEFS    1       ; LOCAL 1 TASK OR SHARED MULTI-TASKING FLAG

; TIME-OF-DAY
TMTICK  DEFS    1       ; TICK INDICATOR
TMDAYS  DEFS    1       ; DAYS
TMHOUR: DEFS    1       ; HOURS
TMINUT  DEFS    1       ; MINUTES
TMSECD  DEFS    1       ; SECONDS
```

```
TMRSOL: DEFS    1           ;TIMER RESOLUTION DIVIDER

; LINE INTERFACE VARIABLES
LSTATE: DEFS    1           ;LINE RUN-STATE CODE
LCOUNT: DEFS    1           ;LINE DATA COUNT
LDATA:  DEFS    20          ;LINE DATA STORAGE

; LINE INTERFACE    COMMAND LINE RAM
TMPREC: DEFS    RCSIZE      ;TEMP RECORD FOR IN-HOUSE PAGE
SVRECD: DEFS    2           ;SAVE -> TO RECORD
; FORMAT= REQUEST CODE, COMPLETION CODE, 8 BYTE RECORD COPY, 2 BYTE -> REAL
RTLOC1: DEFS    12+6        ;DATABASE LOOKUP RETURN ANSWER PACKAGE (LINE INTERFACE)
TONCNT: DEFS    1           ;DTMF TONE COUNT
TONSTR: DEFS    5           ;DTMF TONE STORAGE
SAVHL:  DEFS    2           ;SAVE -> TO LOCATION

; CRT VARIABLES
RSCOSW: DEFS    2           ;RUN-STATE-CODE
TCCOSW: DEFS    2           ;CODE ??
TTCOSW: DEFS    2           ;INPUT TERMINATION COUNT
ITCOSW: DEFS    2           ;INPUT CHARACTER COUNT
INBOSW: DEFS    2           ;-> INPUT BUFFER
OBFOSW: DEFS    2           ;-> OUTPUT BUFFER
OTCOSW: DEFS    2           ;OUTPUT BUFFER COUNT
SSBUFA: DEFS    2           ;INPUT BUFFER START ADDRESS
RSTIMR: DEFS    1           ;TIMER 1/10 SECOND

HOTCPU: DEFS    2           ;HOT OR COLD RESET INDICATOR
TEMP00: DEFS    1           ;TEMPORARY STORAGE
SAVSTK: DEFS    2           ;-> TO STACK SAVE POINTER
HLSAVE: DEFS    2
SAVRET: DEFS    2           ;RETURN ADDRESS SAVE AREA
SAVOLD: DEFS    2           ;OTHER PROGRAM'S STACK POINTER

; RAM DEFINITIONS
WORK09: DEFS    10          ;GENERAL PURPOSE WORK AREA
SAVETM: DEFS    3           ;SAVE AREA FOR CLOCK
SRCRCD: DEFS    8           ;SEARCH RECORD
QUALIF: DEFS    1           ;QUALIFERS FOR SEARCH
EXTENS: DEFS    2           ;CURRENT WORKING EXTENSION #.  4 BCD NIBBLES
WRECRD: DEFS    8           ;WORKING RECORD
EEADRS: DEFS    2           ;ADDRESS OF WORKING RECORD IN DATABASE

; COMPRESS & SORT POINTERS
STRPTR: DEFS    2           ;START POINTER
SCNPTR: DEFS    2           ;SCAN POINTER
ENDPTR: DEFS    2           ;-> TO END OF DATABASE
TEMPTR: DEFS    2           ;-> TO SWAP ITEM IN DATABASE
SCNEXT: DEFS    2           ;SCAN EXT # STORAGE

;&&&&&&&&&&&&&&&&&&&&&&&&&&&&&
; APPLICATIONS RAM
PAGOBF: DEFS    15          ;PAGE COMMAND PACKAGE = CODE, RECORD, TIME/STAMP
PHNLIN: DEFS    1           ;PHONE LINE #
CURPHN: DEFS    2           ;-> TO CURRENT PHONE TABLE
OLDACT: DEFS    6           ;OLD COPY OF PHONE LINE VARIABLES FOR MONITORING
SCNTAB: DEFS    TOTLIN*SCNSIZ  ;RESERVED SPACE FOR LINE STATE TABLE

DEFS    40          ;USER STACK AREA
USTACK:
        DEFS    40          ;SYSTEM STACK
SSTACK:
        DEFS    30

; DEFAULT TEMPLAT WHEN CREATING RECORDS
TEMPLT: DEFS    6           ;REST OF SAMPLE TEMPLATE

DBSIZE: DEFS    2           ;ACTUAL # OF DATABASE RECORDS
EEPROM: DEFS    0           ;------ ACTUAL RECORD STORAGE  ------

END
```

```
PAGE 62
        TITLE    DATE    6/27/83  kbd  4  L#1C
        SUBTTL   PERMANENT DATABASE
.Z80
        PUBLIC   DBSIZ0, EEPRM0

DBSIZ0: DEFW    31       ;ACTUAL SIZE OF DATABASE AT ANY GIVEN TIME
EEPRM0:
;COMMAND LINE
        DEFB    3, 12H
        DEFB    0, 0
        DEFB    0, 20H, 31H, 00H
;L SMITH
        DEFB    3, 00H
        DEFB    80H, 1               ;PBELL ON
        DEFB    20H, 20H, 31H, 50H   ;2 TIMING FOR PRIVATE LINE
;L SMITH
        DEFB    3, 70H
        DEFB    0, 2
        DEFB    0, 20H, 31H, 50H     ;0 TIMING FOR FIRST LINE
;L SMITH
        DEFB    4, 01H
        DEFB    0, 3
        DEFB    10H, 20H, 31H, 50H   ;1 TIMING FOR SECOND LINE
;D FREEMAN
        DEFB    3, 76H
        DEFB    0, 4
        DEFB    0, 20H, 31H, 51H
;B KANNE
        DEFB    3, 80H
        DEFB    0, 5
        DEFB    0, 01H, 00H, 35H
;G DYE
        DEFB    3, 32H
        DEFB    80H, 6               ;PBELL ON
        DEFB    0, 20H, 31H, 58H
;KEITH DUNCAN
        DEFB    3, 13H
        DEFB    80H, 7               ;PBELL ON
        DEFB    0, 20H, 31H, 54H
;M SANER
        DEFB    3, 73H
        DEFB    0, 8
        DEFB    0, 20H, 31H, 55H
;K KUHN
        DEFB    3, 81H
        DEFB    0, 9
        DEFB    0, 20H, 31H, 60H
;J BECKSTEDT
        DEFB    3, 67H
        DEFB    0, 10
        DEFB    0, 20H, 31H, 61H
;I MOORE
        DEFB    3, 75H
        DEFB    0, 11
        DEFB    0, 20H, 31H, 92H
;D WEBB
        DEFB    3, 04H
        DEFB    80H, 12              ;PBELL ON
        DEFB    0, 20H, 31H, 74H
;B GUINN
        DEFB    3, 05H
```

```
              DEFB      0, 20H, 31H, 75H
; JEFF SEAMAN
              DEFB      03, 10H
              DEFB      80H, 14          ; PBELL ON
              DEFB      0, 20H, 31H, 65H
; R KENT
              DEFB      4, 17H
              DEFB      80H, 15          ; PBELL ON
              DEFB      0, 20H, 31H, 70H
; C TUTTLE
              DEFB      3, 30H
              DEFB      80H, 16          ; PBELL ON
              DEFB      0, 20H, 31H, 62H
; J ARNOLD
              DEFB      3, 15H
              DEFB      80H, 17          ; PBELL ON
              DEFB      0, 20H, 31H, 82H
; T FAUST
              DEFB      4, 26H
              DEFB      0, 18
              DEFB      0, 20H, 31H, 83H
; S CHIPKA
              DEFB      3, 79H
              DEFB      0, 19
              DEFB      0, 20H, 31H, 64H
; B CLODY
              DEFB      3, 07H
              DEFB      80H, 20          ; PBELL ON
              DEFB      0, 20H, 31H, 80H
; FRED WILSON
              DEFB      3, 47H
              DEFB      80H, 21          ; PBELL ON
              DEFB      0, 20H, 31H, 71H
;
; LINE #22 FREE
;
;
; LINE #23 FREE
;
; M CORBETT
              DEFB      3, 58H
              DEFB      80H, 24          ; PBELL ON
              DEFB      0, 20H, 31H, 84H
; C LINK
              DEFB      3, 17H
              DEFB      80H, 25          ; PBELL ON
              DEFB      0, 20H, 31H, 85H
; J CORBETT
              DEFB      4, 04H
              DEFB      0, 26
              DEFB      0, 20H, 31H, 63H
; G MOBLEY
              DEFB      3, 33H
              DEFB      80H, 27          ; PBELL ON
              DEFB      0, 20H, 31H, 91H
; L EATON
              DEFB      3, 14H
              DEFB      0, 28
              DEFB      0, 20H, 31H, 52H
; D ESPEUT
              DEFB      3, 09H
              DEFB      80H, 29          ; PBELL ON
              DEFB      0, 20H, 31H, 90H
; BETTY GARRICK
              DEFB      3, 28H
              DEFB      0, 20H, 31H, 72H
; ROGER FOOKS
              DEFB      3, 38H
              DEFB      80H, 31          ; PBELL ON
              DEFB      0, 20H, 31H, 53H
; G KREEFT
              DEFB      3, 78H
              DEFB      0, 00            ; NO RELATED PHONE LINE
              DEFB      0, 20H, 31H, 81H

END
```

```
PAGE 62
        TITLE   DATE 4/11/83  kbd  1  L #16
        SUBTTL  POCKET BELL LINE INTERFACE   STAND-ALONE
Z80
; COMMON MODULE ROUTINES
        EXTRN   TABINT, CHKQUE, TM1RDT
        EXTRN   RNGDT0, RNGDT1, RNGDT2, RNGDT3, RNGDT4, RNGDT5, RNGDT6, RNGDT7

; INTER-RING DELAY COUNT
        PUBLIC  NMSECD, PTABLE

; FOR DEBUGGING
        PUBLIC  INIT, WARMCK, SERINI, INITT
        PUBLIC  INTINP, INTOUT, SIOUT
; RAM AREA
        PUBLIC  HOTCPU, OBFOSW, SSTACK, OUTBUF
        PUBLIC  LINCNT

TIMR0   EQU     40H         ;CTC ON 985 CARD
TIMR1   EQU     41H
SC250M  EQU     25          ;TIME BASE OF 250 MSEC

CLKSIO  EQU     0B1H        ;CTC FOR BAUD RATES
DSW1    EQU     88H         ;DIP SWITCHES ON 984 CARD FOR BAUD RATE
LNKCHN  EQU     90H         ;LINK CHANNEL ON 984 CARD
DSYCHN  EQU     92H         ;DAISY CHAINED LINK CHANNEL

; LINK OUTPUT STATUS CODES
RDYRUN  EQU     1           ;READY TO RUN
WTSTP   EQU     2           ;WAITING FOR STOP CODE

CRLFED  EQU     0A0DH

; ***********************************
PWRUP:  DI
        JR      INIT

NMSECD: DEFB    5*4+1       ;# OF 1/4 SECONDS DELAY BETWEEN RING GROUPS

MSGREL: DEFM    'T 1    4/08/83'  ;RELEASE, DATE CODE
        DEFB    255

DEFS    20H-($-PWRUP)     ;ALIGN
; THE DAISY CHAINED LINK CHANNEL B
SCHAN1: DEFW    DSYOUT      ;TRANSMIT BUFFER EMPTY
        DEFW    EXSTAT      ;EXTERNAL STATUS
        DEFW    DSYINP      ;RECEIVE DATA AVALIABLE
        DEFW    SPREC1      ;SPECIAL RECEIVE CONDITION
; THE MASTER LINK IS CHANNEL A
        DEFW    INTOUT      ;TRANSMIT BUFFER EMPTY
        DEFW    EXSTAT      ;EXTERNAL STATUS
        DEFW    INTINP      ;RECEIVE DATA AVALIABLE
        DEFW    SPREC0      ;SPECIAL RECEIVE CONDITION

; TIME BASE VECTOR
        DEFW    TM1RDT
        DEFW    TM1RDT
        DEFW    TM1RDT
        DEFW    TM1RDT

WRMTRG: DI
```

```
               DEFS    40H-($-PWRUP)
; RING DETECT VECTOR FOR PIO'S
PIOVEC: DEFW    RNGDT0
        DEFW    RNGDT1
        DEFW    RNGDT2
        DEFW    RNGDT3
        DEFW    RNGDT4
        DEFW    RNGDT5
        DEFW    RNGDT6
        DEFW    RNGDT7

DEFS    66H-($-PWRUP)   ;ALIGN
RSET66: DI
        JP      INIT

; PIO ADDRESS TABLE FOR RING DETECT
PTABLE: DEFB    48H             ;1ST GROUP
        DEFB    4AH
        DEFB    4CH
        DEFB    4EH
        DEFB    50H
        DEFB    52H
        DEFB    54H
        DEFB    56H

; ###########################################
INIT:   DI
        LD      SP,SSTACK
        CALL    INIT00          ;INITIALIZE HARDWARE
        CALL    WARMCK          ;CHECK FOR WARM POWER-UP RESET
        CALL    INITT           ;INITIALIZE THE SIO TIMERS
        CALL    SERINI          ;INITIALIZE THE SIO CHANNEL
        CALL    TABINT          ;INITIALIZE THE PIO CHANNELS & RING TABLES
        LD      HL,PTABLE       ;-> PIO ADDRESS TABLE
        LD      DE,PIOVEC       ;VECTOR IS IN LS REG
        LD      B,8             ;# OF PIO'S
INIT04: LD      C,(HL)
        INC     C               ;GET CONTROL PORT
        OUT     (C),E           ;SET VECTOR
        INC     DE
        INC     DE              ;+ VECTOR
        INC     HL              ;+ TABLE ADDRESS
        DJNZ    INIT04

LD      HL,SCHAN1       ;POINT TO INTERRUPT VECTOR TABLE
        LD      A,H
        LD      I,A
        IM      2               ;SET INTERRUPT MODE TO 2

LD      A,00
        LD      (LINCNT),A      ;CRT LINE COUNTER
        EI

; START PROCESSING
        LD      HL,MSG002       ;PUT 'LINE INTERFACE UNIT #
        CALL    WRT
        CALL    GETLNM          ;GET LINE UNIT #
        LD      HL,OUTBUF
        OR      30H
        LD      (HL),A          ;MAKE ASCII
        INC     HL
        LD      (HL),255
        DEC     HL
```

```
            LD      HL,MSGREL           ;PUT 'DATE/ RELEASE' MESSAGE
            CALL    WRTCLF
            LD      HL,MSG000           ;PUT 'READY
            CALL    WRTCLF

;###########################################################################
; MAIN PROCESSING LOOP
LOOP:       CALL    CHKQUE              ;CHECK QUEUE
            JR      NC,LOOP00           ;NOTHING
            PUSH    AF                  ;SAVE LINE #
            LD      A,(LINCNT)
            INC     A                   ;+1 LINE COUNTER
            LD      (LINCNT),A
            LD      HL,OUTBUF
            PUSH    HL
            CALL    BTASC3              ;EXPAND LINE COUNTER & PRINT IT
            LD      (HL),' '
            INC     HL
            LD      (HL),' '
            INC     HL
            LD      (HL),255
            POP     HL
            CALL    WRT
            POP     AF                  ;A REG = LINE #
            CALL    SIOUT               ;FORMAT OUTPUT BUFFER WITH LINE INFORMATION
            CALL    WRT                 ;SEND IT OUT
            CALL    PUTCLF              ;SCROLL UP
LOOP00:     JR      LOOP

;###########################################################################
; WRITE A STRING OUT TO MASTER
WRT:        LD      A,WTSTP             ;WAITING FOR STOP CODE
            LD      (RSCOSW),A
            LD      (OBFOSW),HL         ;SET POINTER
            LD      A,(HL)
            LD      C,LNKCHN            ;LINK CHANNEL
            OUT     (C),A               ;SEND FIRST CHARACTER
            JR      WAIT

; WAIT FOR I/O TO COMPLETE
WAIT:       LD      A,(RSCOSW)
            CP      RDYRUN
            JR      NZ,WAIT
            RET                         ;RETURN TO APPLICATION CODE

; INITIALIZE HARDWARE
INITIO:     LD      A,4FH
            CALL    OUTIN
            CALL    OUTIN
            LD      A,3
            CALL    OUTALL              ;TURN ALL INTERRUPTS OFF
            CALL    OUTALL
            LD      B,32                ;INIT ALL IEI AND IEOS
XRETI       CALL    RETII               ;CLEAR DAISY CHAIN
            DJNZ    XRETI
            RET
RETII:      RETI
OUTALL:     LD      B,20                ;CLEAR O DATA PORTS
            LD      C,0
OALL        OUT     (C),A
            INC     C
            DJNZ    OALL
            RET
OUTIN       LD      B,20                ;CLEAR I DATA PORTS
            LD      C,1
```

```
            INC     C
            INC     C
            DJNZ    OIN
            RET

; RESET CHECK  SEE IF CPU HAS GONE THROUGH A WARM OR COLD RESET
WARMCK:     LD      A,(HOTCPU)
            CP      55H
            JR      NZ,COLDST       ;IT IS A COLD RESET
            LD      A,(HOTCPU+1)
            CP      0AAH
            JR      NZ,COLDST       ;COLD
            RET                     ;WARM RESTART
; COLD RESET
COLDST:     LD      A,55H
            LD      (HOTCPU),A
            LD      A,0AAH          ;SET HOT RESET FLAGS
            LD      (HOTCPU+1),A
            RET

; SIO INITIALIZATION
SERINI:     LD      HL,ISIOT0       ;LINK CHANNEL
            LD      B,ISCNT0
            LD      C,LNKCHN+1
            OTIR
            LD      HL,ISIOT0       ;DAISY CHANNEL
            LD      B,ISCNT0
            LD      C,DSYCHN+1
            OTIR
; SET UP THE INTERRUPT VECTORS ON FIRST 984 CARD
            LD      B,2
            LD      C,DSYCHN+1      ;GET B CHANNEL #
            OUT     (C),B           ;SELECT REG. 2
            LD      HL,SCHAN1
            OUT     (C),L           ;SET VECTOR
            RET

; STANDARD TABLE (CRT INITIALIZATION)
ISIOT0:     DEFB    0               ;IDLE
            DEFB    0
            DEFB    0+11000B        ;CHANNEL RESET
            DEFB    0               ;IDLE
            DEFB    4+10000B        ;REG 4, RESET EXTERNAL STATUS
            DEFB    01000111B       ;16X CLOCK, ENABLE PARITY
                                    ;EVEN PARITY, 1 STOP BIT, ASCY
            DEFB    3+110000B       ;REG 3, RESET ERROR LATCHES
            DEFB    01000001B       ;RECEIVE ENABLE, 7 BITS/CHAR
            DEFB    5+101000B       ;REG 5, RESET XMIT INT PENDING
            DEFB    10101010B       ;TX ENABLE, 7 BITS/CHAR
            DEFB    1               ;REG 1
            DEFB    00011110B       ;INT ON ALL RX AND TX, ST AFS VECTOR, NO EXT.
ISCNT0      EQU     $-ISIOT0

; INITIALIZE THE TIMERS FOR TIME-BASE AND SIO BAUD RATES
INITT:      LD      HL,TMBSVC       ;TIMER INTERRUPT VECTOR
            LD      A,L
            OUT     (TIMR0),A       ;SET INTERRUPT VECTOR
            LD      A,00100111B     ;TIMER MODE, PRESC=256, LOAD CONST, RESET
            OUT     (TIMR0),A
            LD      A,98
            OUT     (TIMR0),A       ;TO PRODUCE 10 MSEC OUTPUT
            LD      A,11000111B     ;COUNTER MODE, INTERRUPT ON, LOAD CONST, RESET
            OUT     (TIMR1),A
```

```
                OUT     (TIMR1),A        ;PRODUCES 250 MSEC INTERRUPT
; SET SIO BAUD RATES
        LD      C,CLKSIO         ;INITIALIZE CLOCK
        LD      B,47H            ;SET FOR COUNTER MODE
        OUT     (C),B
        LD      B,4              ;9600 BAUD CONSTANT
        OUT     (C),B
        INC     C
        LD      B,47H            ;SET FOR COUNTER MODE
        OUT     (C),B
        LD      B,4              ;9600 BAUD CONSTANT
        OUT     (C),B
        RET

; EXTERNAL STATUS. SHOULD NEVER OCCUR
EXSTAT: EI
        RETI

; DAISY CHAIN OUTPUT
DSYOUT: EX      AF,AF'
        EXX
        LD      C,DSYCHN         ;DAISY CHANNEL
        INC     C                ;POINT TO COMMAND CHANNEL
        LD      A,28H            ;RESET TRANSMIT INT. PENDING
        RES     7,A              ;CLEAR MSB
        OUT     (C),A
        EXX
        EX      AF,AF'
        EI
        RETI

; DAISY CHAIN INPUT
DSYINP: EX      AF,AF'
        EXX
        LD      C,DSYCHN         ;DAISY CHANNEL
        IN      A,(C)
        RES     7,A
        OUT     (C),A            ;ECHO IT
        EXX
        EX      AF,AF'
        EI
        RETI

; SPECIAL RX FROM DAISY LINK
SPREC1: PUSH    BC
        PUSH    AF
        LD      C,DSYCHN         ;DAISY CHAIN LINK
        JR      SPRECX

; SPECIAL RECEIVE CONDITION INTERRUPTS
SPRECO: PUSH    BC
        PUSH    AF
        LD      C,LNKCHN
; RESET THE ERROR LATCH FOR PROBLEM SIO CHANNEL
SPRECX: INC     C                ;SELECT CNTL REG
        LD      A,00010000B      ;RESET EXT/STATUS INTERRUPT  (EXTRANOUS)
        OUT     (C),A
        LD      A,00110000B      ;ERROR RESET (PARITY, OVERRUN ERRORS CLEARED)
        OUT     (C),A            ;NULL CODE
        POP     AF
        POP     BC
        EI
        RETI
```

```
; MASTER LINK INPUT INTERRUPT
INTINP:  EX      AF,AF'
         EXX
         LD      C,LNKCHN           ;LINK CHANNEL
         IN      A,(C)
         RES     7,A
         EXX
         EX      AF,AF'
         EI
         RETI

; MASTER LINK OUTPUT INTERRUPT
INTOUT:  EX      AF,AF'
         EXX
         LD      C,LNKCHN           ;LINK CHANNEL
         LD      A,(RSCOSW)
         CP      WTSTP
         JR      NZ,OISRV2          ;NOT DEFINED, RESET PENDING
         LD      HL,(OBFOSW)        ;GET OUTPUT BUFFER POINTER
         INC     HL
         LD      A,(HL)
         CP      0FFH               ;TERMINATION CHARACTER?
         JR      Z,OISRV1           ;YES
         LD      (OBFOSW),HL        ;+1 POINTER
         JR      OISRV3
OISRV1:  LD      A,RDYRUN
         LD      (RSCOSW),A         ;READY-TO-RUN
OISRV2:  INC     C                  ;POINT TO COMMAND CHANNEL
         LD      A,28H              ;RESET TRANSMIT INT. PENDING
OISRV3:  RES     7,A                ;CLEAR MSB
         OUT     (C),A
         EXX
         EX      AF,AF'
         EI
         RETI

; FORMAT ASCII OUTPUT RING PROTOCALL TO MASTER
SIOUT:   LD      HL,OUTBUF          ;-> OUTPUT BUFFER
         PUSH    HL
         PUSH    AF                 ;SAVE LINE #
         LD      (HL),''            ;START-OF-TEXT
         INC     HL
         CALL    GETLNM             ;GET LINE UNIT #
         CALL    BTASC2             ;CONVERT UNIT # TO ASCII
         POP     AF
         CALL    BTASC2             ;CONVERT THE LINE # TO HEX
         LD      (HL),255           ;STOP CHAR
         POP     HL
         RET

; GET LINE UNIT # FROM DIP SWITCH
GETLNM:  IN      A,(DSW1)           ;GET UNIT #
         XOR     255                ;GET COMPLEMENT
         AND     1111B              ;LOOK BITS
         RET

; CONVERT HEX IN A TO 3 ASCII
BTASC3:  LD      C,'0'
         LD      B,100              ;HUNDREDS
         CALL    BTASC1
; CONVERT HEX IN A TO 2 ASCII
BTASC2:  LD      C,'0'
         LD      B,10
         CALL    BTASC1             ;TENS
```

```
                LD      (HL),A
        INC     HL
        RET
BTASC1: SUB     B               ;- BASE
        JR      C,BTCCC4
        INC     C
        JR      BTASC1
BTCCC4: ADD     A,B
        LD      (HL),C          ;STORE VALUE
        INC     HL
        RET

; WRITE MESSAGE, THEN CAR,LINE-FEED
WRTCLF: CALL    WRT
PUTCLF: PUSH    HL
        LD      HL,MSG001       ;PUT CAR,LINE-FEED
        CALL    WRT
        POP     HL
        RET

MSG000: DEFM    'READY'
        DEFW    CRLFED
MSG001: DEFW    CRLFED
        DEFB    255
MSG002: DEFM    'LINE INTERFACE UNIT #'
        DEFB    255

; *********************
; RAM DATA STORAGE
RSCOSW: DEFS    1       ;RUN-STATE-CODE
OBFOSW: DEFS    2       ;-> TO OUTPUT BUFFER

HOTCPU: DEFS    2       ;HOT OR COLD RESET INDICATOR
OUTBUF: DEFS    40      ;OUTPUT BUFFER
LINCNT  DEFS    1       ;LINE COUNTER FOR OUTPUT TO LINK

DEFS    30      ;SYSTEM STACK
SSTACK: DEFS    0

END
```

```
PAGE 62
        TITLE   DATE 4/11/83  kbd  1  L #16
        SUBTTL  POCKET BELL LINE INTERFACE    SHARED MODULE
.Z80
; ENTRY POINTS
        PUBLIC  TABINT,CHKQUE,SETRNG,TM1RDT
        PUBLIC  RNGDT0,RNGDT1,RNGDT2,RNGDT3,RNGDT4,RNGDT5,RNGDT6,RNGDT7

; RAM
        PUBLIC  RQUNEW,RQUOLD,RQUQUE,STABLE

; MAIN VARIABLES
        EXTRN   NMSECD,PTABLE

; PROTOTYPE RING DETECT AT PIO = 48H.  BITS 1&0. 985 PIO IS 44 DT, 45 CT
PIOLNO  EQU     48H     ;PIO ADDRESS FOR RING DETECT

; LINE # STATUS
RLINES  EQU     8       ;# OF RING LINES
RSLOTS  EQU     2       ;# OF RING SLOTS
IDLE    EQU     0       ;LINE IS IDLE
RNGING  EQU     1       ;LINE IS ACTIVELY RINGING
RNGSTA  EQU     0       ;RING STATE OFFSET
RNGTIM  EQU     1       ;RING TIMER OFFSET

RQULEN  EQU     05      ;# OF RING DETECT SLOTS IN CIRCULAR QUEUE

; INITIALIZE ALL TABLES
TABINT: LD      B,8             ;# OF PIO'S TO ADDRESS
        LD      HL,PTABLE
INTPI2: PUSH    BC
        PUSH    HL
        LD      C,(HL)
        INC     C
        LD      HL,IPIOX1       ;PIO CONTROL ADDRESS
        LD      B,X1CNT         ;GET NORMAL SET-UP PARAMETERS
        OTIR                    ;LOAD PARAMETERS INTO PIO
        POP     HL
        POP     BC
        DJNZ    INTPI2

; INITIALIZE RING DETECT TABLES
        LD      HL,LSTMSK       ;LAST MASK TABLE
        LD      IY,STABLE
        LD      DE,RSLOTS       ;LENGTH OF EACH SLOT
        LD      B,RSLOTS        ;# OF SLOTS
TBINT0: LD      (IY+RNGSTA),IDLE ;SET EACH LINE IDLE
        LD      (IY+RNGTIM),00  ;RESET TIMER
        ADD     IY,DE           ;-> NEXT ENTRY
        LD      (HL),0FFH       ;PRE-SET LAST MASK READ FROM PIO
        INC     HL
        DJNZ    TBINT0

; INITIALIZE CIRCULAR QUEUE
        LD      HL,RQUQUE       ;-> RING DETECT QUEUE
        LD      (RQUNEW),HL     ;TOP PTR
        LD      (RQUOLD),HL     ;END PTR
        RET

; NORMAL PIO INITIALIZATION TABLE
IPIOX1: DEFB    0FFH            ;MODE 3
        DEFB    0FFH            ;SET TO INPUTS
```

```
                DEFB    0               ;MONITOR ALL BITS
X1CNT   EQU     $-IPIOX1

; SEE IF ANYTHING IN CIRCULAR QUEUE. RETURNS C FLAG IF YES. VALUE IN A REG.
CHKQUE: DI
        LD      HL,(RQUNEW)     ;CHECK CIRCULAR QUEUE POINTERS
        LD      DE,(RQUOLD)
        OR      A
        SBC     HL,DE
        JR      Z,CHKQNX        ;EQUAL, NOTHING IN QUEUE. C FLAG = 0
; GET LINE # VALUE
        LD      A,(DE)          ;GET LINE # ANSWER
        INC     DE              ;+1 NEXT SLOT
        OR      A
        LD      BC,RQUEND       ;QUEUE END
        PUSH    DE
        POP     HL              ;MAKE COPY
        SBC     HL,BC
        JR      C,CHKQN4        ;NOT END OF QUEUE
        LD      DE,RQUQUE
CHKQN4: LD      (RQUOLD),DE     ;STORE NEW OLD PTR
CHKQNX: EI                      ;C FLAG=0 IF NOTHING, 1 IF GOT VALUE IN A REG
        RET

; ENTER RING LINE # INTO CIRCULAR QUEUE.
SETRNQ: PUSH    HL
        PUSH    BC
        LD      HL,(RQUNEW)
        LD      (HL),A
        INC     HL
        OR      A
        LD      BC,RQUEND       ;CHECK FOR END
        PUSH    HL
        SBC     HL,BC
        POP     HL
        JR      C,SETRN2
        LD      HL,RQUQUE       ;RESET -> TOP
SETRN2: LD      (RQUNEW),HL     ;STORE NEW POINTER
        POP     BC
        POP     HL
        RET

; *******************************************
; TIME-BASE INTERRUPT   CURRENTLY IS 250 MSEC
TM1RDT: EX      AF,AF'
        EXX
        PUSH    IY
        LD      IY,STABLE
        LD      B,RLINES
        LD      DE,RSLOTS
TM1RD0: LD      A,(IY+RNGSTA)   ;GET RING STATE
        CP      RNGING
        JR      NZ,TM1RD4       ;NOT RINGING, LEAVE ALONE
        DEC     (IY+RNGTIM)
        JR      NZ,TM1RD4       ;NOT EXPIRED
        LD      (IY+RNGSTA),IDLE ;IT'S NOW IDLE
TM1RD4: ADD     IY,DE           ;-> NEXT SLOT
        DJNZ    TM1RD0          ;CONTINUE FOR # OF SLOTS
        POP     IY
        EXX
        EX      AF,AF'
        EI
        RETI

; $$$$$$$$$$$$$$$$$$$$$$$$$$$$$$$$$$$$$$$$$$$$
; RING DETECT INTERRUPT FROM PIO'S
RNGDT0: EX      AF,AF'
        EXX
        LD      HL,LSTMSK       ;LAST PIO VALUE READ
        LD      A,(PTABLE+0)
        JR      RNGDDD
```

```
RNGDT1:
RNGDT2:
RNGDT3:
RNGDT4:
RNGDT5:
RNGDT6:
RNGDT7:  EX      AF,AF'
         EXX
         LD      HL,LSTMSK+1         ;LAST PID VALUE READ
         LD      A,(PTABLE+1)

; DETECT RINGING LINE
RNGDDD:  LD      C,A                 ;C=DATA PORT
         PUSH    IY
         LD      IY,STABLE           ;STATUS TABLE
         IN      A,(C)               ;SEE WHICH LINE DROPPED
         LD      B,A
         XOR     (HL)                ;SUBTRACT LAST PATTERN
         JR      Z,RNGDTX            ;FALSE INTERRUPT
         LD      (HL),B              ;STORE NEW PID VALUE
         LD      E,-1                ;CLEAR ANSWER
RNGDOO:  INC     E
         RR      A                   ;SEE WHICH BIT IS SET
         JR      NC,RNGDOO
         LD      D,00                ;E=LINE #
         LD      B,RSLOTS            ;SIZE OF EACH RING LINE ENTRY
RNGDO2:  ADD     IY,DE
         DJNZ    RNGDO2
         LD      A,(IY+RNGSTA)       ;GET STATUS
         CP      IDLE
         JR      Z,RNGDO4            ;1ST RING OF GROUP
         CP      RNGING
         JR      Z,RNGDO6            ;IT'S BEEN RINGING
         LD      (IY+RNGSTA),IDLE    ;UNDEFINED
         JR      RNGDTX
; 1ST OF GROUP OF RINGS
RNGDO4:  LD      (IY+RNGSTA),RNGING  ;SET ACTIVE
         LD      A,E
         CALL    SETRNQ              ;SET CIRCULAR QUEUE SLOT
; AFTER 1ST RING, RESET TIMER
RNGDO6:  LD      A,(NMSECD)
         LD      (IY+RNGTIM),A       ;RESET TIME-OUT
; MAIN EXIT POINT
RNGDTX:  POP     IY
         EXX
         EX      AF,AF'
         EI
         RETI

;************
; RAM MODULE
RQUFRE:  DEFS    2           ;-> FREE RING DETECT CIRCULAR QUEUE SLOT
RQUOLD:  DEFS    2           ;-> OLD RING DETECT VALUE
RQUQUE:  DEFS    RQULEN*1    ;RING DETECT QUEUE
RQUEND   DEFS    0

LSTMSK:  DEFS    8           ;LAST VALUE READ FROM 1 PIO

END

;PAGE INPUT PROGRAM FOR DIGITAL PAGERS
;LAST REVISED 02-05-81   CURRENT DATE 02-06-81

EXTERNAL EMPFLG,XMTCNT,MNPTR,MNEND,BUFLOP,CALJMP
         EXTERNAL PAGPTR,CHLEN,NECDIS,POCQ,POCDEC,POCEMP,RSTME1
         EXTERNAL FSTPTR,LSTPTR,RAMSET,NDISQ
         EXTERNAL MNBUF,NECCNT,DSPPQC,RSTFL
         EXTERNAL DSPPOC,IDSET,XMTPRI,INPBUF
```

```
        GLOBAL   CMP16,PGINPT,UPDTGC

;
;
;
;        TEST CODE
;
;
        EXTERNAL  TSTTIM,TSTCNT,TSTDT1,TSTDT2,TSTDT3,TSTDT4,TSTDT5

TSTLIM: EQU       30
TSTSWC: EQU       1F00H     ;SOFTWARE TEST SWITCH LOCATIN
INVPRT: EQU       88H       ;DIP SWITCH LOCATION

;
;        END OF TEST CODE

BUFOFF  EQU       10        ;NUMBER OF BYTES TO XFER
ADDR:   EQU       01        ;OFFSET OF ADDRESS INFO IN PAGE
BUFMOV  EQU       05        ;NUMBER OF BYTES PER PAGE IN MAIN BUFFER
BKPAG2  EQU       6         ;OFFSET TO LSB OF BACK POINTER
BKPAG1  EQU       7         ;OFFSET TO MSB OF BACK POINTER
FTPAG2  EQU       8         ;OFFSET TO LSB OF FRONT POINTER
FTPAG1  EQU       9         ;OFFSET TO MSB OF FRONT POINTER
GRP:    EQU       00        ;OFFSET TO FORMAT BYTE
XMIT:   EQU       05        ;OFFSET IN PAGE TO XMITTER NUMBER
TIME:   EQU       05        ;OFFSET IN PAGE TO TIMING NUMBER (PAGE TYPE)

;
BASE:   EQU       3080H     ;BASE OF MASTER/DISPLAY JUMP TABLE
CHKPAG: EQU       BASE+06H           ;LOCATION OF PAGE INPUT ROUTINE
#E

;SUBROUTINE TO LOAD PAGE BUFFER AND XMIT'ER PAGE PTRS FOR NEW PAGES

PGINPT: IN        A,(INVPRT)         ;SEE IF TEST CODE TURNED ON
        BIT       7,A                ;IF LOW  DO TEST CODE
        JR        NZ,NOTEST          ;NO TEST IF SET
        LD        HL,TSTTIM
        BIT       7,(HL)             ;CHECK FOR PAGE TIME OUT
        RET       Z                  ;IF NOT TIME GO BACK
        LD        (HL),TSTLIM        ;RESET TIMER
        LD        A,(TSTCNT)         ; GET TEST BUFFER NUMBER
        CP        05                 ;ONLY 4 BUFFERS
        JR        NZ,NOREST          ;IF UNDER  DONT RESET
        XOR       A                  ;RESET BUFFER CNT
NOREST: LD        B,0
        LD        C,A                ;FORM OFFSET
        SLA       C                  ;TWO BYTES PER ENTRY
        ADD       IX,BC
        LD        L,(IX)
        LD        H,(IX+1)           ;PUT ADDRESS IN HL
        INC       A                  ;NEXT BUFFER
        LD        (TSTCNT),A
        JR        GETPG2             ;PROCESS TEST PAGE
;
;

NOTEST: LD        HL,INPBUF          ;POINT TO INPUT BUFFER
        CALL      CHKPAG             ;CHECK INPUT ROUTINE IN MASTER/DISPLAY
        RET       NC                 ;CARRY MEANS NO NEW PAGE

;REJECT PAGE IF FOR XMITTER WHICH IS NOT INSTALLED.

GETPG2: PUSH      HL                 ;PTR TO PAGE
        POP       IX
        DEC       IX
        CALL      XMTCAL
        INC       A                  ;MAKE RELATIVE TO 1
```

```
        LD      B,A
        LD      A,(XMTCNT)          ;GET NUMBER OF XMITTERS INSTALLED
        CP      B                   ;IF PAGE HAS XMITTER HIGHER THAN INSTALLED
        RET     C                   ;DONT Q

PUSH    HL                  ;SAVE SOURCE
        CALL    GETPG3              ;FIND MAIN BUFFER SPACE
        CP      OFFH                ;FF MEANS NO GOOD
        JR      NZ,GETPG5           ;NOT FF MEANS OK
        POP     HL                  ;HOUSEKEEP
        RET                         ;NO MORE SPACE RETURN
GETPG5: LD      BC,BUFMOV           ;NUMBER OF BYTES TO XFER IN FIRST PAGE
        LD      (PAGPTR),HL
        INC     HL                  ;PUT MASTER INFO IN SECOND LOCATION
        EX      HL,DE               ;MAKE DESTINATION
        POP     HL                  ;GET SOURCE
        CALL    FNDIT               ;TRANSFER TO MAIN BUFFER

PTROK   LD      IX,(PAGPTR)         ;GET PTR TO PRESENT PAGE

;DETERMINE RAM OFFSET FOR THIS CHANNEL

CALL    XMTCAL              ;CALCULATE XMITTER
OFFCAL: LD      BC,(CHLEN)          ;LENGTH OF RAM PER CHANNEL
        LD      HL,0                ;INIT OFFSET TO 0 FOR CHANNEL 1
CPRXMT: CP      0                   ;CMPR TO XMITTER CNT IN A-REG
        JR      Z,CALCRM            ;IF ZERO MATCH XMITTER
        ADD     HL,BC               ;ADD CHANNEL INCREMENT
        JR      CPRXMT
CALCRM  LD      (RAMSET),HL         ;CALCULATE RAM OFFSET FOR CHANNEL
        EX      DE,HL               ;KEEP OFFSET IN DE FROM THIS POINT ON

;       GET TYPE PAGER AND JUMP TO FORMAT ROUTINE
;

LD      A,(IX+TIME)         ;GET TIMING NUMBER
        AND     OFH                 ;USE ONLY LOW NIBBLE
        LD      HL,TONTIM
        CALL    CALJMP              ;CALCULATE JUMP VECTOR
        JP      (HL)

;
;       FORMATTING ROUTINES
;
;
POCDSP: LD      A,01                ;DISPLAY CODE FLAG
        LD      (DSPPOC),A          ;SET FLAG
GOTPOC  CALL    POCDEC              ;DECODE POCSAG
        LD      B,0                 ;INITIALIZE
        XOR     A                   ;CLEAR A
        LD      (DSPPOC),A          ;RESET DISPLAY FLAG
        LD      A,(IX+GRP)          ;GET GROUP VALUE
        AND     70H                 ;MASK LS NIBBLE
        SRL     A                   ;GET OFFSET X4
        SRL     A
```

```
        LD      C,A         ;SAVE RESULT
        SRL     A           ;GET OFFSET X1
        SRL     A
        LD      HL,POCFMP   ;SHOW Q NOT MT
        ADD     HL,DE
        CALL    RSTME1
        LD      HL,POCQ     ;Q UP PAGE
        ADD     HL,BC       ;BC HAS GROUP OFFSET
        CALL    ADDTOQ
        RET

;
;       NEC DISPLAY ROUTINES
;
;
NECDEC: CALL    GRPDEC      ;DECODE GROUP NUMBER
        CALL    NECDIS      ;FORMAT FOR NECDISPLAY
DECORP: LD      D,0         ;INITIALIZE HI BYTE OF OFFSET
        LD      A,(IX+GRP)  ;GET GROUP VALUE
        AND     30H         ;MASK LS NIBBLE
        SRL     A           ;OFFSET X4
        SRL     A
        LD      C,A         ;SAVE IN "C"
        SRL     A           ;GET OFFSET X 1
        SRL     A
        LD      HL,EMPFLG   ;GET MT FLAGS
        ADD     HL,DE       ;ADD CHANNEL OFFSET
        CALL    RSTFL       ;SHOW G NOT MT
        LD      HL,NDISQ    ;LOAD BASE FOR DISPLAY PTRS
        ADD     HL,BC       ;ADD GROUP OFFSET
        CALL    ADDTOQ      ;ADD TO MAIN BUFFER
        RET                 ;RETURN TO MAIN LOOP

COME HERE FOR INVALIDS

;
NOTVLD: RET                 ;JUST RETURN INVALID TIMING
;
;

UPDTQC: LD      B,1         ;LOAD INCREMENT VALUE
        JR      NEWCNT      ;INCREMENT CALL COUNT
REDCNT: LD      B,-1        ;LOAD DECREMENT VALUE
NEWCNT: PUSH    BC          ;SAVE INC DEC VALUE
        LD      B,0
        LD      HL,NECCNT   ;GET PTR TO CALL CTRS
        ADD     HL,BC       ;ADD TYPE OFFSET
        ADD     HL,DE       ;ADD CHANNEL OFFSET
        LD      A,(HL)      ;GET COUNT VALUE
        POP     BC          ;GET INC/DEC VALUE
        ADD     A,B         ;UPDATE COUNTER
        LD      (HL),A      ;SAVE NEW COUNT
        RET                 ;BACK TO MAIN LOOP

;SUBROUTINE TO ADD PAGE TO TRANSMITTER LISTS
; IX = PTR TO PAGE IN BUFFER
; HL = PTR TO LOCATION OF 'FIRST' PTR
; DE = CHANNEL RAM OFFSET
;ZERO TIMES-SENT CNT, USE SPARE NIBBLE IN PHONE # FIELD
;
ADDTOQ: PUSH    DE          ;SAVE RAM OFFSET
        ADD     HL,DE       ;ADD OFFSET TO BASE ADR
        LD      (FSTPTR),HL ;SAVE PTR TO LOC OF 'FIRST'
        INC     HL
        INC     HL          ;PTS TO LOC OF 'LAST' PTR
        LD      (LSTPTR),HL ;SAVE
        LD      HL,(FSTPTR) ;GET BACK PTR TO 'FIRST'
        LD      A,0
```

```
            CP      (HL)      ;IF PTR AT 'FIRST' IS 0, THEN NO PAGES EXIST
            JP      NZ,ADDPAG ;1 OR MORE PAGES ARE ALREADY IN THE LIST
            INC     HL
            CP      (HL)      ;MSB = 0?
            JP      NZ,ADDPAG ;NO
            LD      DE,(FSTPTR)    ;GET PTR TO 'FIRST'
            LD      HL,PAGPTR ;THIS LOC HOLDS PTR TO PAGE
            LD      BC,2      ;BYTE CNT
            LDIR              ;PUT PTR TO PAGE AT 'FIRST'
            LD      (IX+BKPAG2),0  ;ZERO BACK PTR IN PAGE
            LD      (IX+BKPAG1),0
UPDTLA:     LD      DE,(LSTPTR)    ;GET PTR TO 'LAST'
            LD      HL,PAGPTR ;THIS LOC HOLDS PTR TO PAGE
            LD      BC,2
            LDIR              ;PUT PTR TO NEW PAGE AT 'LAST'
            LD      (IX+FTPAG2),0  ;ZERO FRONT PTR IN PAGE
            LD      (IX+FTPAG1),0
            POP     DE        ;RESTORE DE
            RET
;

ADDPAG      LD      HL,(LSTPTR)    ;GET PTR TO 'LAST'
            LD      E,(HL)    ;BRING PTR TO LAST PAGE TO DE
            INC     HL
            LD      D,(HL)
            LD      HL,FTPAG2 ;OFFSET TO FRONT PTR IN EACH PAGE
            ADD     HL,DE     ;ADD OFFSET
            EX      DE,HL     ;DE PTS TO 'FRONT' IN LAST PAGE
            LD      HL,PAGPTR ;HL POINTS TO PTR TO NEW PAGE
            LD      BC,2
            LDIR              ;LOAD 'FRONT' PTR
            POP     DE        ;PTR TO LAST PAGE
            LD      (IX+BKPAG2),E  ;LOAD PTR TO LAST PAGE IN 'BACK' OF NEW PAGE
            LD      (IX+BKPAG1),D
            JR      UPDTLA    ;UPDATE LAST PAGE POINTER
;

; GROUP DECODE SUBROUTINE WILL TAKE BCD PAGER ADDRESS
; AND DETERMINE WHICH GROUP THE PAGER BELONGS TO

GRPDEC:     LD      (IX+GRP),0     ;INITIALIZE GROUP
            LD      B,3
            LD      C,0       ;INITIALIZE GROUP CTR
            LD      HL,LMTBL  ;GO TO TOP OF LIMIT TABLE
            LD      A,(IX+ADDR+2)  ;GET ADDRESS BYTE
CHKA:       CP      (HL)      ;COMPARE ACC TO TABLE LIMIT
            JR      C,SETGRP  ;GO SET GROUP IF LESS THAN LIMIT
            INC     C         ;INCREMENT GROUP COUNT
            INC     HL        ;GET NEXT BYTE OF TABLE
            DJNZ    CHKA      ;CONTINUE IF NOT AT LIMIT
SETGRP      SLA     C         ;SHIFT LEFT FOUR BITS
            SLA     C
            SLA     C
            SLA     C
            LD      (IX+GRP),C     ;PUT GROUP VALUE IN PAGE
            BIT     0,(IX+ADDR+1)  ;CHECK FOR ALTERNATE ADDRESS
            RET     Z         ;RETURN IF NOT ALT. ADDRESS
            SET     6,(IX+GRP)     ;SET ALTERNATE ADDR. FLAG
            RET

; COMPARE 2 16 BIT VALUES
CMP16.      PUSH    BC
            LD      C,A       ;SAVE ACC
            LD      A,H
            CP      D
            JR      NZ,CMPRET
            LD      A,L
            CP      E
CMPRET.     LD      A,C
            POP     BC
            RET
```

```
;       XMTCAL   WILL TAKE XMITTER NUMBER INFO FROM MASTER
;
XMTCAL: LD      A,(IX+XMIT)     ;GET XMIT BYTE
        SRL     A               ;RIGHT JUSTIFY
        SRL     A
        SRL     A
        SRL     A
        RET
;
;
;       GETPG3 WILL FIND NEXT AVAILABLE LOCATION IN MAIN BUFFER FOR PAGE
;       IF SPACE IS AVAILABLE IT WILL RETURN WITH HL AS THE LOCATION OF
;       THE BUFFER. IF SPACE IS NOT AVAILABLE FF WILL BE RETURNED IN ACC

GETPG3: PUSH    HL              ;SAVE ADR OF DATA
        LD      HL,(MNPTR)      ;GET PTR TO NEXT BUFFER
NEXTPG: LD      A,(HL)          ;GET FIRST LOCATION
        CP      00              ;ZERO MEANS FREE
        JR      NZ,TRYAGN       ;NON ZERO MEANS BUFFER NOT FREE
        PUSH    BC              ;SAVE PTRS
        PUSH    HL
        LD      B,BUFOFF        ;32 BYTES
NXTCLR: LD      (HL),A          ;A HAS ZERO CLEAR BUFFER
        INC     HL
        DJNZ    NXTCLR          ;LOOP TILL DONE
        POP     HL              ;RESTORE
        POP     BC
        POP     DE              ;DE HAS LOCATION OF DATA
        RET
TRYAGN: LD      BC,BUFOFF       ;OFFSET TO NEXT BUFFER LOCATION
        ADD     HL,BC           ;ADD TO LAST BUFFER LOCATION
        LD      DE,MNEND        ;CHECK FOR MAIN BUFFER END
        CALL    CMP16
        JR      NZ,NEXTPG       ;DONT ADJUST IF NOT AT END
        LD      HL,MNBUF        ;IF AT END GO TO TOP
        LD      A,(BUFLOP)      ;LOOP CNT
        ADD     A,1             ;INCREMENT
        LD      (BUFLOP),A
        CP      5               ;CHECK FOR 5 LOOPS
        JR      NZ,NEXTPG       ;TRY AGAIN
        LD      A,0             ;IF 5 REINITIALIZE LOOP
        LD      (BUFLOP),A
        POP     IX              ;HOUSEKEEP
        LD      A,0FFH          ;SHOW AS NO MORE SPACE
        RET

;       FOUNDIT WILL MOVE DATA FROM TEXT BUFFER TO MAIN BUFF

;       ON ENTRY HL POINTS TO DATA BUFFER ,DE POINTS TO MAIN BUFFER
;       LOCATION AND BC HAS TRANSFER COUNT.

FNDIT:  LD      A,0             ;REINIT LOOP CNT
        LD      (BUFLOP),A
        LDIR                    ;TRANSFER
        LD      HL,(PAGPTR)     ;GET LAST BUFFER PTR
        LD      DE,BUFOFF       ;OFFSET TO NEXT BUFFER LOCATION
        ADD     HL,DE
        LD      (MNPTR),HL      ;SAVE AS NEXT BUFFER LOCATION
        LD      DE,MNEND        ;CHECK FOR END OF BUFFER
        CALL    CMP16
        RET     NZ              ;RETURN IF NOT AT END OF BUFFER
        LD      HL,MNBUF        ;RESET TO TOP OF MAIN BUFFER
        LD      (MNPTR),HL      ;SAVE AS NEW POINTER
        RET

;       GROUP UPPER LIMIT VALUES FOR DETERMINING GROUP #

GRTBL:  DEFB    25H             ;GROUP 1   LIMIT
```

```
         DEEP    75H          GROUP 3 LIMIT

;
;
;       TABLE OF TIMING CODES (PAGER TYPE)
;

TONTIM: DEFW    GOTPOC   ;TIMING 0 POCSAG T/O 1 BEEP
        DEFW    GOTPOC   ;TIMING 1 POCSAG T/O 2 BEEP
        DEFW    GOTPOC   ;TIMING 2 POCSAG T/O 3 BEEP
        DEFW    GOTPOC   ;TIMING 3 POCSAG T/O 4 BEEP
        DEFW    POCDSP   ;TIMING 4 POCSAG DISP. 1 BEEP
        DEFW    POCDSP   ;TIMING 5 POCSAG DISP. 2 BEEP
        DEFW    POCDSP   ;TIMING 6 POCSAG DISP. 3 BEEP
        DEFW    POCDSP   ;TIMING 7 POCSAG DISP. 4 BEEP
        DEFW    NECDEC   ;TIMING 8 NEC DISP. 1
        DEFW    NECDEC   ;TIMING 9 NEC DISP. 2
        DEFW    NECDEC   ;TIMING 10 NEC DISP 3
        DEFW    NECDEC   ;TIMING 11 NEC DISP 4
        DEFW    NOTVLD   ;TIMING 12 INVALID
        DEFW    NOTVLD   ;TIMING 13 INVALID
        DEFW    NOTVLD   ;TIMING 14 INVALID
        DEFW    NOTVLD   ;TIMING 15 INVALID

;
; TEMPORARY *********************
;
; ******************************
;
GBUF:   RET

;
; ************** TEST CODE TO BE REMOVED
;
; ******************************
;
TSTTBL: DEFW    TSTDT1
        DEFW    TSTDT2
        DEFW    TSTDT3
        DEFW    TSTDT4
        DEFW    TSTDT5
        END
;SUBRTN TO SEND SIGNALS TO NEC DIGITAL PAGER AND NEC DIGITAL-DISPLAY PAGER

;10/17/80     W. H. GUINN

EXTERNAL  PAGPTR, DIDAT, WORK1, DSPPOC, POCDEC
        GLOBAL    NECDIS, POCDEC, SWAP

GLOBALS FOR DELAY ROUTINES

GLOBAL  CHKCAL, BITCK, BITCK3

DISP    EQU     14       ;OFFSET TO FIRST DISPLAY BYTE
ADDR    EQU     01       ;OFFSET TO ADDR BYTE
GRP     EQU     00       ;DISPLAY WORD COUNT
POCADR  EQU     02       ;POINTER TO MSB OF POCSAG ADDRESS BYTE
IFWORD  EQU     00       ;POCSAG 00
TR01:   EQU     0AH      ;TRUNK 00
STAR    EQU     0BH      ;TRUNK STAR (*)
SPACE   EQU     0CH      ;POCSAG DISPLAY SPACE CODE
HYPHEN  EQU     0DH      ;POCSAG HYPHEN
TONMSK  EQU     0FH      ;MASK FOR UPPER NIBBLE OF POCSAG ADDRESS
```

```
PCSDS1    EQU       04        ;POCSAG DISPLAY PAGE WITH ONE BEEP.
PCSDS2    EQU       05        ;POCSAG DISPLAY PAGE WITH TWO BEEPS.
PCSDS3    EQU       06        ;POCSAG DISPLAY PAGE WITH THREE BEEPS.
PCSDS4    EQU       07        ;POCSAG DISPLAY PAGE WITH FOUR BEEPS.
POCTN1    EQU       00        ;POCSAG T/O 1 BEEP
POCTN2    EQU       01        ;POCSAG T/O 2 BEEP TIMING
POCTN3    EQU       02        ;POCSAG DISPLAY T/O 3 BEEP TIMING
                              ;BYTE

DB        MACRO     #1,#2,#3,#4,#5,#6,#7,#8,#9,#A,#B,#C
          COND      NOT.('#1'='')
          DEFB      #1
          ENDC
          COND      NOT.('#2'='')
          DEFB      #2
          ENDC
          COND      NOT.('#3'='')
          DEFB      #3
          ENDC
          COND      NOT.('#4'='')
          DEFB      #4
          ENDC
          COND      NOT.('#5'='')
          DEFB      #5
          ENDC
          COND      NOT.('#6'='')
          DEFB      #6
          ENDC
          COND      NOT.('#7'='')
          DEFB      #7
          ENDC
          COND      NOT.('#8'='')
          DEFB      #8
          ENDC
          COND      NOT.('#9'='')
          DEFB      #9
          ENDC
          COND      NOT.('#A'='')
          DEFB      #A
          ENDC
          COND      NOT.('#B'='')
          DEFB      #B
          ENDC
          COND      NOT.('#C'='')
          DEFB      #C
          ENDC
          ENDM

; CONVERT 6 BCD DIGITS (3 BYTES) TO BINARY.
; DE POINTS TO BCD FIELD AND HL CONTAINS RESULT
; B REG CONTAINS NUMBER OF BCD BYTES TO PROCESS

PUSH      DE
          PUSH      DE        ;SAVE POINTER
          LD        HL,0      ;GET A 16 BIT ZERO
DECBT1:   POP       DE        ;GET ADDR. OF DATA
          PUSH      DE        ;SAVE AGAIN
          LD        A,(DE)    ;GET DATA
          SRL       A         ;GET MSB TO LSB
          SRL       A
          SRL       A
          SRL       A
          CALL      DECBIX    ;DO ROUTINE
          POP       DE        ;GET ADDR. OF DATA
          LD        A,(DE)    ;GET DATA BYTE
          INC       DE        ;BUMP UP
          PUSH      DE        ;SAVE AGAIN
          AND       15        ;REMOVE HIGH 4 BITS
          CALL      DECBIX    ;DO ROUTINE
```

```
        DJNZ    DECBI1  ;LOOP UNITL DONE
        POP     DE      ;REMOVE DUMMY ENTRY FROM STACK
        POP     DE      ;RESTORE REGS.
        POP     BC
        RET

; ROUTINE USED BY THE ABOVE ROUTINE

DECFIX: LD      D,H     ;SAVE VALUE
        LD      E,L
; MULTIPLY BY 10
        ADD     HL,HL   ;TIMES 2
        ADD     HL,HL   ;TIMES 2
        ADD     HL,DE   ;ADD IN ORIGINAL VALUE
        ADD     HL,HL   ;TIMES 2
        LD      E,A     ;GET DIGIT
        LD      D,0
        ADD     HL,DE   ;ADD IN DIGIT
        RET
;

; TRANSMIT SIGNALS TO NEC DIGITAL-DISPLAY PAGER
; IX -> FUNC/CODE OF PAGE  (IX+10 -> PAGER ADDRESS)
; ANY DISPLAY DATA WILL BE FOUND AT 'DIDAT'

; FORMAT ADDRESS BITS

NECDIS: PUSH    DE      ;SAVE OFFSET ADRRESS
        LD      DE,ADDR ;OFFSET TO FIRST DISPLAY BYTE
        LD      IX,(PAGPTR)     ;POINT TO CURRENT PAGE
        ADD     IX,DE
        LD      A,(IX)  ;GET MSD
        AND     0FH     ;ZERO MS NIB
        LD      (IX),A  ;RESTORE
        LD      B,4     ;BYTE CNT FOR SUBRTN
        CALL    PCDHX   ;CONVERT PAGER ADDRESS TO BINARY IN BC,DE
        LD      B,L     ;ALIGNMENT FOR CHECK-BIT CALC
        LD      C,D
        LD      D,E
        LD      A,0FH   ;ZERO MS NIB OF MSD (ALSO 0'S RECOGNITION BIT)
        AND     B
        LD      B,A
        PUSH    BC      ;SAVE ORIGINAL VALUES
        CALL    DCHK10  ;CALC 10 CHECK BITS
        EX      DE,HL   ;PUT CHECK BITS IN HL
        POP     DE      ;RESTORE ORIG DATA
        POP     BC
        CALL    MERGE   ;MERGE ORIG DATA AND CHECK BITS INTO BC,DE
        CALL    PARITY  ;CALC PARITY BIT
        LD      IX,(PAGPTR)     ;PUT FORMATTED ADDRESS BACK IN PAGE
        LD      (IX+ADDR),B
        LD      (IX+ADDR+1),C
        LD      (IX+ADDR+2),D
        LD      (IX+ADDR+3),E
        SET     2,(IX+GRP)      ;SET DECODE BIT
;****************************************************
;****************** DUMMMY RETURN TO DISABLE NEC DISPLAY DATA
;****************************************************
;****************************************************
;
        POP     DE      ;HOUSEKEEP
        RET             ;REMOVE THIS FOR DISPLAY DATA

; LOOK FOR ANY DISPLAY BYTES
```

```
             CALL    UNPACK      ;UNPACK DATA FOR FORMATTING
             LD      A,(IX+GRP)  ;ZERO DISPLAY BYTE COUNT
             AND     0FCH
             LD      (IX+GRP),A
             LD      HL,DIDAT
             LD      A,0FFH      ;DELIMITER
             LD      B,0         ;CHAR CNT
DLM:         CP      (HL)        ;DELIMITER?
             JR      Z,DLM2      ;YES, QUIT
             INC     B
             INC     HL
             JR      DLM
DLM2:        LD      A,0
             CP      B           ;CHAR CNT
             JR      Z,DISDON    ;JUMP IF NO DISPLAY NEEDED
             DEC     HL          ;PT TO LAST DISPLAY CHAR
             LD      A,5         ;MAX CHAR PER WORD XMITTED
             CP      B
             JR      C,TWOWRD    ;CNT > 5 => SEND 2 MORE WORDS
             SET     0,(IX+GRP)  ;SET DISPLAY WORD CNT
             LD      A,0         ;ZERO WORD COUNT FOR SECOND WORD
             JR      INSERT      ;FORMAT OUTPUT WORDS
TWOWRD  LD   A,B                 ;A <- BYTE COUNT
             SUB     5           ;CALC # TO SEND IN 2ND WORD
             LD      B,5         ;SEND 5 IN FIRST WORD
             SET     1,(IX+GRP)  ;SET DISPLAY COUNT

INSERT: PUSH AF                  ;SAVE BYTE CNT FOR 2ND PASS
             CALL    PACK        ;PACK DISPLAY DATA IN BC,D
             PUSH    HL          ;SAVE PTR TO NEXT DISPLAY BYTE
             PUSH    BC          ;SAVE ORIG DATA
             PUSH    DE
             CALL    DCHK10      ;CALC 10 CHECK BITS
             EX      DE,HL       ;HL <- CHECK BITS
             POP     DE
             POP     BC
             CALL    PARITY
             LD      (IX+DISP),B
             LD      (IX+DISP+1),C
             LD      (IX+DISP+2),D
             LD      (IX+DISP+3),E
             POP     HL          ;PTR TO NEXT DISPLAY BYTE
             POP     AF          ;CNT FOR PASS 2
             CP      0
             JR      Z,DISDON    ;DONE WITH DISPLAY FORMAT

; FORMAT 2ND DATA WORD

LD      B,A         ;SET UP TO-DO CNT
             CALL    PACK
             PUSH    BC          ;SAVE ORIG DATA
             PUSH    DE
             CALL    DCHK10      ;CALC CHECK BITS
             EX      DE,HL       ;HL <- CHECK BITS
             POP     DE          ;RESTORE ORIG DATA
             POP     BC
             CALL    MERGE       ;MERGE ORIG DATA WITH CHECK BITS
             CALL    PARITY      ;CALC PARITY BIT
             LD      (IX+DISP1),B    ;LOAD FOURTH BYTE
             LD      (IX+DISP1+1),C  ;LOAD SECOND BYTE OF FIRST WORD
             LD      (IX+DISP1+2),D  ;LOAD THIRD BYTE OF FIRST WORD
             LD      (IX+DISP1+3),E  ;LOAD FOURTH BYTE OF FIRST WORD
DISDON: POP  DE                  ;RESTORE CHANNEL OFFSET
             RET                 ;DONE WITH DISPLAY FORMATTING
*E

;       THIS IS A ROUTINE THAT CONVERTS A FOUR BYTE PAGER ADDRESS
;       INTO A THREE BYTE BINARY CODE SUITABLE FOR USE BY THE POCSAG
;       TONE OR DISPLAY ROUTINES.
```

```
;       NOTE:   NOTE:   NOTE:   NOTE:   NOTE:
;       BYTES 10 THRU 14 OF THE PAGER FORMAT MUST CONTAIN THE
;       BCD PAGER ADDRESS. THE DE AND IX REGS. ARE NOT SAVED IN THIS RTNE.

POCDEC: PUSH    DE              ;SAVE POINTER IN DE REGS. FROM CALL-
                                ;ING RTNE
        LD      DE,ADDR         ;SET UP A POINTER TO THE BEGINNING OF
        LD      IX,(PAGPTR)     ;THE FOUR BYTE POCSAG PAGER ADDRESS
        ADD     IX,DE
        LD      A,(IX)          ;TAKE THE MSB OF THE PAGER ADDRESS
        AND     TONMSK          ;AND TAKE OUT ANY UNWANTED BITS.
        LD      (IX),A          ;REPLACE THE MASKED BYTE
        CALL    BCDBI2          ;GO TO THE PAGER ADDRESS CONVERSION
        LD      A,(IX+3)        ;RTNE. BCDBI2 IS THE ROUTINE THAT
        AND     00000111B       ;ACTUALLY DOES BCD TO BINARY CONVERSION
        RLCA                    ;MASK OUT THE THREE LS-BITS OF THE
        RLCA                    ;LSB OF THE CONVERTED PAGER ADDRESS
        RLCA                    ;AND STORE THEM IN THE TONE TYPE BITS
        RLCA                    ;OF THE PAGE FORMAT BYTE.
        OR      (IX-1)
        LD      (IX-1),A
        SRL     (IX)            ;THE FOUR PAGER ADDRESS BYTES
        RR      (IX+1)          ;MUST BE SHIFTED RIGHT BY ONE BIT
        RR      (IX+2)
        RR      (IX+3)
        LD      A,(IX+3)        ;SET UP THE LAST TWO LSB'S FOR
        LD      (IX+3),A        ;INTO THE COMPLETED BINARY ADDRESS
        LD      A,(IX+4)        ;GET TYPE BYTE AND BEGIN CHECKING
        AND     0FH             ;MASK OUT TOP NIBBELE
        CP      PCSDS1          ;POCSAG DISPLAY PAGE ONE
        JR      NZ,CKPCS2       ;NO , JUMP
        LD      A,0             ;NUMBER OF BEEPS
        JR      LDFUNC
CKPCS2: CP      PCSDS2          ;POCSAG DISPLAY TWO BEEPS
        JR      NZ,CKPCS3       ;NO, JUMP
        LD      A,1
        JR      LDFUNC
CKPCS3: CP      PCSDS3          ;POCSAG DISPLAY THREE BEEPS
        JR      NZ,CKPCS4
        LD      A,2
        JR      LDFUNC
CKPCS4: CP      PCSDS4          ;POCSAG DISPLAY FOUR BEEPS
        JR      NZ,CK223
        LD      A,3
        JR      LDFUNC
CK223:  CP      POCTN1          ;TO SEE WHAT IS TO BE ADDED TO THE
        JR      NZ,CK224        ;TWO LSB'S OF THE BINARY ADDRESS JUST
        LD      A,0             ;CALCULATED BY DECBI
        JR      LDFUNC          ;GO PUT THE TWO BITS INTO THE FINAL
                                ;BINARY ADDRESS
CK224:  CP      POCTN2
        JR      NZ,CK225
        LD      A,1
        JR      LDFUNC
CK225:  CP      POCTN3
        JR      NZ,CK226
        LD      A,2
        JR      LDFUNC
CK226:  LD      A,3
LDFUNC: OR      (IX+3)
        LD      (IX+3),A        ;THE TWO LSB'S HAVE NOW BEEN PLACED
        CALL    POCTON          ;INTO THE FINAL BINARY PAGER ADDRESS
        POP     DE              ;RESTORE PROPER POINTER
        RET                     ;THIS IS A TEMPORARY ENDING TO THIS
                                ;ROUTINE. A COMPARISON WILL HAVE TO BE
                                ;ADDED TO DETERMINE WHETHER A DISPLAY
                                ;OR TONE PAGE IS TO BE CALCULATED

POCTON: LD      DE,POCADR       ;OFFSET TO FIRST DISPLAY BYTE
        LD      IX,(PAGPTR)     ;POINT TO CURRENT PAGE
        ADD     IX,DE
```

```
        LD      A,(IX)          ;GET MSD
        AND     TONMSK          ;ZERO MS NIB
        LD      (IX),A          ;RESTORE
        LD      B,A             ;ALIGNMENT FOR CHECK-BIT CALC
        INC     IX              ;POINT TO NEXT POCSAG BYTE TO BE LOADED
        LD      C,(IX)          ;PUT NEXT POCSAG ADDRESS BYTE INTO C REG
        INC     IX              ;POINT TO NEXT POCSAG ADDRESS BYTE
        LD      D,(IX)
        PUSH    BC              ;SAVE ORIGINAL VALUES
        PUSH    DE
        CALL    DCHK10          ;CALC 10 CHECK BITS
        EX      DE,HL           ;PUT CHECK BITS IN HL
        POP     DE              ;RESTORE ORIG DATA
        POP     BC
        CALL    MERGE           ;MERGE ORIG DATA AND CHECK BITS INTO BC,DE
        CALL    PARITY          ;CALC PARITY BIT
        LD      IX,(PAGPTR)     ;PUT FORMATTED ADDRESS BACK IN PAGE
        LD      A,B             ;BEGIN PUTTING DECODED ADDRESS IN BUFFER
        LD      (IX+ADDR),A
        LD      A,C
        CALL    SWAP
        LD      (IX+ADDR+1),A
        LD      A,D
        CALL    SWAP
        LD      (IX+ADDR+2),A
        LD      A,E
        CALL    SWAP
        LD      (IX+ADDR+3),A
        SET     2,(IX+GRP)      ;SET DECODE BIT
;
;
;***************** DUMMY RETURN HERE TO DISABLE DISPLAY
;
;
;**********************************************************
;
;
        RET
E
;THE NEXT ROUTINE CHECKS FOR DISPLAY DATA.  IF DISPLAY DATA EXISTS THE
;DATA IS CONVERTED INTO ONE OR TWO MESSAGE CODE DEPENDING ON THE NUMBER
;OF DISPLAY CHARACTERS.

LD      A,(DSPPOC)      ;GET DISPLAY FLAG
        CP      01H             ;IS THIS A DISPLAY PAGE
        RET     NZ              ;NO, RETURN

LD      HL,(PAGPTR)     ;HL->BEGINNING OF PAGE RECORD
        LD      BC,14           ;OFFSET TO DISPLAY DATA
        ADD     HL,BC           ;HL->FIRST DISPLAY BYTE
        LD      C,0             ;CLEAR C FOR NIBBLE COUNT
        LD      B,5             ;BYTE COUNT
NIBCNT: LD      A,(HL)          ;GET DISPLAY DATA
        AND     0F0H            ;MASK OUT LOW NIBBLE
        CP      0F0H            ;IS IT END MARKER
        JR      Z,NIBNUM        ;YES, JUMP
        INC     C               ;BUMP NIBBLE COUNT
        LD      A,(HL)          ;GET DISPLAY DATA BACK
        AND     0FH             ;MASK OUT HIGH NIBBLE
        CP      0FH             ;IS IT END MARKER
        JR      Z,NIBNUM        ;YES, JUMP
        INC     HL              ;BUMP TO NEXT DATA
        INC     C               ;BUMP CHARACTER COUNT
        DJNZ    NIBCNT          ;IF NOT END MARKER JUMP

NIBNUM: LD      A,00            ;CHECK AGAINST 00 CHARACTER CNT
        CP      C
        RET     Z
        LD      A,5             ;TEST FOR MORE THAN 5 CHARACTERS
        CP      C
        LD      IX,(PAGPTR)     ;IX->BEGINNING OF PAGE RECORD
```

```
            JR      C,SET2DP        ;IF MORE THAN 5 CHARACTERS JUMP
            SET     0,(IX+GRP)      ;INDICATOR FOR ONE MESSAGE CODE
            JR      POCD1

SET2DP      SET     1,(IX+GRP)      ;INDICATOR FOR TWO DISPLAY CODES
            LD      HL,(PAGPTR)     ;SETUP FOR TWO MESSAGE CODES
            LD      BC,14           ;OFFSET TO FIRST DISPLAY BYTE
            ADD     HL,BC           ;HL->LAST DISPLAY BYTE
            PUSH    HL              ;SAVE PTR
            CALL    FORPOC          ;FORMAT POCSAG BUFFER
            POP     HL
            CALL    SPASET          ;INSERT SPACES WHERE NEEDED
            JR      POCDIS

POCD1       LD      HL,(PAGPTR)     ;SET UP FOR ONE MESSAGE CODE
            LD      BC,14           ;OFFSET TO FIRST DISPLAY BYTE
            ADD     HL,BC           ;HL->LAST DISPLAY BYTE
            PUSH    HL              ;SAVE PTR
            CALL    FORPOC          ;FORMAT POCSAG
            POP     HL
            LD      B,3             ;NUMBER OF BYTES FOR SPACE INSERT CHECK
            CALL    SPASET

*E
;
POCDIS      LD      IX,(PAGPTR)     ;IX->PAGE
            CALL    SETDSP          ;ENCODE 2 MESSAGES
            LD      IX,(PAGPTR)     ;IX->PAGE
            LD      B,(IX+14)       ;SET ENCODED DATA IN BC/DE FOR PARITY CALCULATE
            LD      C,(IX+15)
            LD      A,(IX+16)       ;GET LAST NIBBLE
            AND     0F8H            ;MASK OUT UNWANTED BITS
            LD      D,A             ;SET IN D
            LD      E,0
            PUSH    BC
            POP     HL
            PUSH    HL
            PUSH    DE
            LD      B,3             ;BIT COUNT
            CALL    RJUST           ;RIGHT JUSTIFY
            PUSH    HL
            POP     BC
            CALL    DCHK10          ;CALC 10 CHECK BITS
            EX      DE,HL
            POP     DE
            POP     BC
            SLA     L               ;MOVE CHECKBITS IN CORRECT POSITON
            RL      H
            LD      A,D             ;MOVE IN PARITY CHECK BITS
            OR      H
            LD      D,A
            LD      E,L
            CALL    PARITY          ;INSERT PARITY BITS
            LD      A,B             ;GET DATA
            CALL    SWAP
            LD      (IX+14),A       ;SET MESSAGE CODE IN PAGE RECORD
            LD      A,C             ;GET DATA
            CALL    SWAP
            LD      (IX+15),A
            LD      A,D             ;GET DATA
            CALL    SWAP
            LD      (IX+16),A
            LD      A,E             ;GET DATA
            CALL    SWAP
            LD      (IX+17),A
            LD      A,(IX+GRP)      ;GET MESSAGE INDICATOR
            AND     03H
            CP      2               ;ARE THERE TWO MESSAGES TO ENCODE
            JR      Z,DSPL1         ;YES, JUMP
            XOR     A               ;CLEAR A
            LD      (DSPPOC),A      ;RESET DISPLAY PAGE INDICATOR
            RET

DSPL1       LD      B,3             ;BYTE COUNT FOR MESSAGE DATA
```

```
            ADD     IX,DE                   ;(IX+14) IS REALLY (IX+18)
            CALL    SETDP2                  ;ENCODE SECOND MESSAGE
            LD      IX,(PAGPTR)             ;IX->PAGE
            LD      B,(IX+18)               ;PLACE ENCODED DATA IN BC/HL FOR PARITY
            LD      C,(IX+19)
            LD      A,(IX+20)               ;GET LAST NIBBLE
            AND     0F8H                    ;MASK UNWANTED BITS
            LD      D,A
            LD      E,0
            PUSH    BC
            POP     HL
            PUSH    HL
            PUSH    DE
            LD      B,3
            CALL    RJUST                   ;RIGHT JUSTIFY DATA
            PUSH    HL
            POP     BC                      ;DATA BACK TO BC
            CALL    DCHK10                  ;CALCULATE 10 CHECK BITS
            EX      DE,HL
            POP     DE
            POP     BC
            SLA     L                       ;MOVE CHECK BITS TO CORRECT POSITION
            RL      H
            LD      A,D
            OR      H                       ;MOVE IN CHECK BITS
            LD      D,A
            LD      E,L
            CALL    PARITY
            LD      A,B                     ;GET DATA
            CALL    SWAP
            LD      (IX+18),A               ;PLACE MESSAGE CODE IN PAGE RECORD
            LD      A,C                     ;GET DATA
            CALL    SWAP
            LD      (IX+19),A
            LD      A,D                     ;GET DATA
            CALL    SWAP
            LD      (IX+20),A
            LD      A,E                     ;GET DATA
            CALL    SWAP
            LD      (IX+21),A
            XOR     A                       ;CLEAR A
            LD      (DSPPOC),A              ;RESET DISPLAY PAGE INDICATOR
            RET

;SPASET ROUTINE WILL INSERT A SPACE CODE IN POSITIONS WHERE END MARKERS
;EXISTS  THEN THE DATA WILL BE SAVED ON THE STACK

SPASET: LD      DE,PCDPBF               ;DATA BUFFER
SPALP:  XOR     A                       ;CLEAR A
        RRD                             ;MOVE IN LOW NIBBLE
        CP      0FH                     ;IS IT END MARK
        JR      NZ,SPA1                 ;NO, JUMP
        LD      A,SPACE                 ;SET SPACE CODE

SPA1    RRC                             ;MOVE IN HIGH NIBBLE
        CP      0FH                     ;IS IT END MARK
        JR      NZ,SPA2                 ;NO, JUMP
        LD      A,SPACE                 ;SET SPACE

SPA2    RRD                             ;PLACE NIBBLES IN CORRECT POSITION
        LD      A,(HL)                  ;GET DISPLAY BYTE
        LD      (DE),A                  ;SAVE DATA
        INC     DE                      ;NEXT BYTE
        INC     HL
        RET

;THE SETDSP ROUTINE ENCODES THE DISPLAY DATA INTO A MESSAGE CODE

SETDSP: LD      HL,PCDPBF               ;HL->DATA
        LD      B,3                     ;BYTE COUNT
        CALL    STREV                   ;REVERSE BITS
        LD      HL,PCDPBF               ;HL->BEGINNING OF BUFFER
        SCF
```

```
          LD      B,3
DIPL1:    LD      C,00H       ;CLEAR FOR BIT MASK
          RR      C           ;MOVE IN CARRY
          LD      A,(HL)      ;GET DATA
          RRA                 ;SHIFT MSBIT TO CARRY
          PUSH    AF          ;SAVE CARRY
          RES     7,A         ;ZERO MSBIT
          OR      C           ;COMBINE WITH CARRY
          LD      (IX+14),A   ;STORE DATA IN RECORD
          INC     IX
          INC     HL
          POP     AF          ;RESTORE CARRY
          DJNZ    DIPL1
          RET

;STREV ROUTINE MAKES A MIRROR IMAGE OF DATA IN (HL)
;AND PLACES IT BACK IN (HL)
;ENTRY CONDITIONS:     HL->DATA BUFFER
;                      B= NUMBER OF BYTES IN BUFFER
;
STREV:    XOR     A           ;CLEAR A
          LD      C,2
REVBIT:   RLD                 ;MOVE IN NIBBLE
          CALL    SWAP
          RRA                 ;MOVE TO LOW NIBBLE
          RRA
          RRA
          RRA
          DEC     C
          JR      NZ,REVBIT
          RLD                 ;MOVE DATA BACK
          INC     HL
          LD      A,B         ;TEST BYTE COUNT
          CP      2           ;IS IT LAST BYTE
          JR      NZ,REVCT    ;NO, JUMP
          LD      A,(HL)      ;GET DATA
          PUSH    AF          ;SAVE IT FOR LOW NIBBLE IN CASE OF TWO MESSAGE CODES.
REVCT:    XOR     A           ;CLEAR A
          DJNZ    STREV       ;DO NEXT BYTE
          DEC     HL          ;HL->LAST DATA LOCATION
          LD      A,(HL)      ;GET DATA
          AND     0F0H        ;MAKE LOW NIBBLE 0
          LD      (HL),A
          POP     AF          ;GET LAST DATA BACK
          AND     0FH         ;MASK OUT UPPER NIBBLE
          OR      (HL)        ;MOVE IN HIGH NIBBLE
          LD      (HL),A
          RET
;
;
;SETDP2 ENCODES SECOND MESSAGE

SETDP2:   LD      HL,PCDPBF+3 ;HL->SECOND MESSAGE DATA
          LD      B,3         ;BUBBLE COUNT
DP2A:     LD      A,(HL)      ;GET HIGH NIBBLE
          RRA                 ;MOVE IT TO LOW NIBBLE
          RRA
          RRA
          DEC     HL          ;POINT TO FIRST BYTE
          RLD                 ;MAKE LOW NIBBLE IN (HL) HIGH NIBBLE
                              ;MAKE HIGH NIBBLE IN (HL+1) LOW NIBBLE IN (HL)
          INC     HL
          INC     HL          ;HL->NEXT BUBBLE BYTE
          DJNZ    DP2A
          LD      HL,PCDPBF+2 ;HL->DATA
          LD      B,3
          CALL    STREV       ;REVERSE DATA BITS
          LD      IX,(PAGPTR) ;IX->PAGE RECORD
          LD      BC,4        ;OFFSET TO SECOND MESSAGE SPACE
          ADD     IX,BC       ;MAKE (IX+14) = (IX+18)
          LD      HL,PCDPBF+2 ;HL->DATA TO ENCODE
          SCF                 ;SET CARRY FLAG FOR MESSAGE CODE BIT
          LD      B,3         ;BYTE COUNT TO ENCODE
          CALL    DIPL1       ;ENCODE DATA
          RET
```

```
;RJUST ROUTINE SHIFTS BITS IN H,L AND D REGISTERS RIGHT 'n' TIMES
;ENTRY CONDITIONS: B='n'
;EXIT CONDITIONS: H,L AND D CONTAIN SHIFTED DATA

RJUST:  SRL     H               ;MOVE BIT0 TO CARRY/RESET BIT 7
        RR      L
        RR      D
        DJNZ    RJUST
        RET

;       FORPOC WILL TAKE INPUT DATA FROM THE MODBUS UNPACK IT. CONVERT TRUNK
;       STARS TO POCSAG HYPENS AND CONVERT TWO STARS IN A ROW TO POCSAG SPACES
;       IT WILL ALSO CONVERT A TRUNK 0 TO POCSAG 0

;       FOLLOWING CONVERSIONS ARE MADE * (0BH) TO 0DH)
;                                     ** (0BH,0BH) TO 0CH)
;                                     0AH TO 00H

FORPOC: CALL    UNPACK          ;UNPACK TWO NIBBLE BCD TO SINGLE BYTE WITH
                                ;0FFH AS AN END DELIMETER
        LD      HL,DIDAT        ;DIDAT HAS UNPACKED DATA
CHKAGN: LD      A,STAR          ;CHECK AGAINST 0BH
        CP      (HL)            ;CHECK AGAINST DATA IN BUFFER
        JR      NZ,ZEROCK       ;NO MATCH CHECK AGAINST 0A
        INC     HL              ;LOOK FOR TWO STARS IN A ROW
        CP      (HL)
        JR      Z,SPCCOD        ;IF MATCH THEN INSERT SPACE CODE
        DEC     HL              ;NO MATCH JUST PLAIN HYPHEN
        LD      (HL),HYPHEN
        JR      NXTDAT          ;TRY NEXT BYTE
SPCCOD: DEC     HL              ;GO BACK TO FIRST HYPHEN
        LD      (HL),SPACE      ;PUT IN POCSAG SPACE
        INC     HL              ;PUT EDIT CODE IN NEXT BYTE
        LD      (HL),0AAH       ;AAH MEANS DONT PUT IN FINAL BUFFER
        JR      NXTDAT
ZEROCK: LD      A,ZRO1          ;CHECK FOR 0AH
        CP      (HL)            ;CHECK AGAINST DATA
        JR      NZ,NXTDAT       ;TRY NEXT BYTE
        LD      (HL),NEWZRO     ;PUT IN 00
NXTDAT: INC     HL              ;CHECK FOR END DELIMETER
        LD      A,0FFH          ;FF IN DATA MEANS DONE
        CP      (HL)
        JR      NZ,CHKAGN       ;CONTINUE TILL DONE

;       THIS ROUTINE WILL TAKE NEW BUFFER AND PUT IT BACK IN MAIN PAGE BUFFER

LD      BC,14           ;GET TO DATA BYTE
        ADD     IX,BC
        LD      B,5             ;TO DO CNT
        PUSH    IX
FLOAD:  LD      (IX),0FFH       ;PUT FF IN BUFFRE
        INC     IX              ;NEXT BYTE
        DJNZ    FLOAD
        POP     IX
        LD      HL,DIDAT        ;POINT TO NEW BUFFER
TRY1MR: LD      A,(HL)          ;GET NEW DATA
        CP      0FFH            ;CHECK AGAINST STOP DELIMETER
        RET     Z               ;DONE IF FF
        CP      0AAH            ;IF CHARACTER IS AA IT WILL NOT BE PUT IN BUFFER
        JR      NZ,MOVNB1       ;MOVE IT TO BUFFER ON NO MATCH
        INC     HL
        JR      TRY1MR          ;TRY AGAIN
MOVNB1: SLA     A               ;LEFT JUSTIFY
        SLA     A
        SLA     A
        SLA     A
        OR      0FH             ;MAKE LS NIBBLE F
        LD      (IX),A
        INC     HL              ;GET NEXT DATA BYTE
MOVNB2: LD      A,(HL)          ;CHECK NEXT BYTE
```

```
        CP      OFFH            ;CHECK FOR DELIMETER
        RET     Z               ;GO BACK ON DELIMETER
        CP      OAAH            ;CHECK FOR EDIT CHARACTER
        JR      NZ,MOVNB3       ;NOT IT MOVE TO BUFFER
        INC     HL              ;TRY NEXT BYTE
        JR      MOVNB2
MOVNB3: LD      C,A             ;SAVE DATA BYTE
        LD      A,(IX)          ;GET ORIGINAL BYTE
        AND     OFOH            ;SAVE MS NIBBLE
        OR      C               ;PUT IN DATA
        LD      (IX),A          ;SAVE AWAY
        INC     IX              ;NEXT BUFFER LOCATION
        INC     HL              ;NEXT DATA BYTE
        JR      TRY1MR          ;TRY AGAIN

*E
;       SWAP SUBROUTINE WILL TAKE DATA IN ACC. AND SWAP LSB
;       OF DATA WITH MSB OF DATA

SWAP:   PUSH    HL              ;SAVE HL
        PUSH    DE              ;SAVE CHANNEL OFFSET
        PUSH    BC              ;SAVE DATA
        LD      D,0
        CP      00              ;CHECK FOR ZERO DATA
        JR      Z,NDSWAP
        PUSH    AF              ;SAVE DATA TO BE SWAPPED
        AND     OFH             ;MASK OUT MS NIBBLE
        LD      E,A             ;FORM OFFSET
        LD      HL,SWPTBL       ;GET SWAPPED BYTE
        ADD     HL,DE
        LD      B,(HL)          ;GET FIRST SWAPPED NIBBLE
        POP     AF
        SRL     A               ;MOVE TO LS POS
        SRL     A
        SRL     A
        SRL     A
        LD      E,A             ;FORM OFFSET
        SET     4,E             ;GO TO BOTTOM HALF OF TABLE
        LD      HL,SWPTBL
        ADD     HL,DE
        LD      A,(HL)          ;GET SEC SWAPPED NIBBLE
        OR      B
NDSWAP: POP     BC              ;RETURN
        POP     DE
        POP     HL
        RET
*E

;       CONVERT BCD ADDRESS PAGER NUMBER INTO BINARY

BCDBI2: LD      C,0
C20BI1: LD      L,(IX)          ;PLACE THE HL REG. PAIR CONTENTS
        LD      H,(IX+1)        ;IN A TEMPORARY WORK BUFFER
        LD      (WORK1),HL
        LD      L,(IX+2)
        LD      H,(IX+3)        ;TWO MORE BYTES LOADED IN WORK BUFFER
        LD      (WORK1+2),HL
        PUSH    IX              ;SET UP A POINTER TO THE LAST BYTE
        POP     DE              ;OF THE PAGER ADDRESS IN DE REG. PAIR
        INC     DE
        INC     DE
        INC     DE
        LD      HL,CON2+3
        CALL    BCDS
        JR      NC,C20BI2
        INC     C
        JR      C20BI1
C20BI2: LD      A,C             ;LOAD COUNT
        LD      (IX+1),A        ;STORE MSG OF RESULT
        LD      DE,WORK1+1      ;POINT TO PARTIAL RESULT
        LD      B,3
```

```
        CALL    DECBI
        LD      A,L         ;SWAP H AND L
        LD      L,H
        LD      H,A
        LD      (IX+2),L    ;STORE REST OF RESULT
        LD      (IX+3),H
        RET
```

;      ROUTINE TO SUBTRACT 2 TO 4 BYTES BCD NUMBERS

```
BCDS:   LD      B,4         ;4 LOOPS
        SCF
BCDS1   LD      A,99H
        ADC     A,0         ;ADD ZERO WITH CARRY
        SUB     (HL)
        EX      DE,HL
        ADD     A,(HL)      ;ADD MINUEND
        DAA
        LD      (HL),A      ;STORE RESULT
        EX      DE,HL
        DEC     HL
        DEC     DE
        DJNZ    BCDS1
        RET
```

CHKCAL SUBROUTINE WILL PERFORM XOR OPERATION
ON DATA IN REG BC DE FOR CHECK DIGIT CALCULATION

```
CHKCAL: LD      A,B         ;1ST BYTE
        XOR     (HL)
        LD      B,A         ;GET RESULT
        INC     HL
        LD      A,C         ;2ND BYTE
        XOR     (HL)
        LD      C,A         ;GET RESULT
        INC     HL
        LD      A,D         ;3RD BYTE
        XOR     (HL)
        LD      D,A         ;GET RESULT
        INC     HL
        LD      A,E         ;LAST BYTE
        XOR     (HL)
        LD      E,A         ;GET RESULT
        RET
*E
```

;SUBRTN TO UNPACK DISPLAY BYTES IN MAIN BUFFER FOR FORMATTING

```
UNPACK: PUSH    IX          ;SAVE MAIN BUFFER PTR
        LD      BC,DISP     ;GET DISPLAY BYTE OFFSET
        ADD     IX,BC       ;ADD OFFSET TO PTR
        LD      IY,DIDAT    ;POINT TO FIRST OF TEMP BUFFER
        LD      B,10        ;SET TO DO COUNT
UNPACA: LD      A,(IX)      ;LOAD DISPLAY BYTE
        AND     0FOH        ;MASK OUT RIGHT NIBBLE
        CP      0FOH        ;LOOK FOR DELIMETER
        JR      Z,PKEND     ;DONE IF DELIMETER FOUND
        SRL     A           ;MOVE TO LS NIBBLE
        SRL     A
        SRL     A
        SRL     A
        LD      (IY),A      ;PUT BYTE IN TEMP BUFFER
        INC     IY          ;POINT TO NEXT BYTE IN BUFFER
        DEC     B           ;UPDATE TO DO COUNT
        LD      A,(IX)      ;PROCESS RIGHT NIBBLE
        AND     0FH         ;MASK LEFT NIBBLE
        CP      0FH         ;LOOK FOR DELIMETER
        JR      Z,PKEND     ;DONE IF DELIMETER FOUND
```

```
            LD      (IY),A      ;PUT BYTE IN TEMP BUFFER
            INC     IX          ;GO GET NEXT DISPLAY BYTE
            INC     IY          ;UPDATE BUFFER POINTER
            DJNZ    UNPACA      ;CONTINUE IF TO DO NOT ZERO
    PKEND:  LD      A,0FFH      ;PUT DELIMETER IN BUFFER
            LD      (IY),A
            POP     IX          ;RESTORE MAIN PAGE PTR
            RET                 ;DONE RETURN TO FORMAT DISPLAY
    *E

;SUBRTN TO MERGE 21 BITS IN BC,D WITH 10 BITS IN HL
    ;RESULT IN BC,DE - LEFT JUSTIFIED

MERGE:  SLA     D           ;MOVE BC,D  3-POS TO LEFT
            RL      C
            SLA     D
            RL      C
            RL      B
            SLA     D
            RL      C
            RL      B
            SLA     L           ;MOVE HL  1-POS TO LEFT
            RL      H
            LD      A,D         ;MERGE D AND H INTO D
            OR      H
            LD      D,A
            LD      E,L
            RET

;RTN TO PACK INCOMING DISPLAY DATA INTO OUTGOING WORDS
    ;A = TO-DO CNT,  HL -> DISP DATA

PACK:   PUSH    IX          ;SAVE MAIN PAGE PTR
            PUSH    HL          ;PTR TO IY
            POP     IY
            LD      IX,WORK1    ;WORK AREA
            LD      (IX),13H    ;INIT WITH RECOGNITION BIT AND A BLANK
            LD      (IX+1),33H  ;BLANK, BLANK
            LD      (IX+2),33H  ;BLANK, BLANK
            CALL    REORGR      ;REORG RIGHT NIB OF MS BYTE
            DEC     B           ;TO-DO CNT
            LD      A,0
            CP      B
            JR      Z,PACKX

PACK2:  INC     IX          ;WORK AREA PTR
            CALL    REORGL      ;SET UP LEFT NIBBLE
            DEC     B
            LD      A,0
            CP      B
            JR      Z,PACKX
            CALL    REORGR      ;SET UP RIGHT NIBBLE
            DEC     B
            LD      A,0
            CP      B
            JR      NZ,PACK2

PACKX:  LD      IX,WORK1    ;HOLD AREA
            PUSH    IY          ;NEW DISPLAY DATA PTR TO HL
            POP     HL
            LD      B,(IX)      ;PACKED RESULT BACK TO BC,D
            LD      C,(IX+1)
            LD      D,(IX+2)
            POP     IX          ;RESTORE MAIN PTR
            RET
    *E
```

;RTN TO TAKE INCOMING DISPLAY VALUE, REVERSE BITS AND PACK FOR XMISSION

```
REORGR:  LD     HL,TBLRT       ;REORGANIZE BIT FOR RIGHT NIBBLE
         LD     C,0F0H         ;MASK TO ZERO RIGHT NIBBLE
REORG:   LD     D,0            ;INIT
         LD     E,(IY)         ;INCOMING VALUE USED AS OFFSET IN LOOKUP TABLE
         DEC    IY             ;MOVE UP DATA VALUES
         ADD    HL,DE          ;OFFSET TO BASE OF TABLE
         LD     A,(IX)         ;WORK BYTE
         AND    C              ;MASK
         OR     (HL)           ;MERGE
         LD     (IX),A         ;RESTORE WORK BYTE
         RET

REORGL:  LD     HL,TBLLF       ;SET UP BITS IN LEFT NIBBLE
         LD     C,0FH          ;MASK
         JR     REORG
*E

;CALC 10 CHECK DIGITS
;GEN POLYNOMIAL = X10 + X9 + X8 + X6 + X5 + X3 + 1
; (769H)

;INPUT BITS (21) ASSUMED TO BE IN B,C,D (RIGHT JUSTIFIED) AT ENTRY TO RTN
;RESULT RIGHT JUSTIFIED IN DE

DCHK10:  LD     A,0
         CP     B              ;CONTINUE ONLY IF BC NOT= 0
         JR     NZ,NOTZ10
         CP     C
         JR     NZ,NOTZ10
         CP     D
         JR     NZ,NOTZ10
         LD     DE,769H        ;CHECK BITS FOR ZERO INFO BITS
         RET
NOTZ10:  LD     E,0            ;INIT
         SLA    D              ;SHIFT THE THREE BYTES 2 POS TO LEFT
         RL     C
         RL     B
         SLA    D
         RL     C
         RL     B
CALD10:  LD     A,0            ;CALC HIGHEST DEGREE OF RESULT
         CP     B              ;FIND 1ST NON-ZERO BYTE
         JR     Z,BYTE20       ;NOT THIS ONE
         LD     A,30           ;HIGHEST POSSIBLE DEGREE
         LD     H,B            ;BIT WILL COME FROM B-REG
         CALL   BITCK6         ;FIND HIGHEST BIT SET
         JR     HIBITX
BYTE20:  CP     C              ;IS IT IN C-REG?
         JR     Z,BYTE30       ;NO, JUMP
         LD     A,23           ;HIGHEST DEGREE IF IN C-REG
         LD     H,C
         CALL   BITCK          ;FIND HIGHEST BIT SET
         JR     HIBITX
BYTE30:  LD     A,15           ;HIGHEST DEGREE IF IN D-REG
         LD     H,D
         CALL   BITCK          ;FIND HIGHEST BIT SET
HIBITX:  CP     10             ;MUST BE 10 OR GREATER TO CONTINUE
         RET    C
         SUB    10             ;DIFFERENCE IN DEGREES
         SLA    A              ;X2
         SLA    A              ;X4 (4 BYTE ENTRIES IN TABLE)
         PUSH   BC
         LD     B,0
         LD     C,A            ;TABLE OFFSET
         LD     HL,TBLG10      ;TABLE OF MASKS
         ADD    HL,BC          ;ADD OFFSET
         POP    BC
```

```
            JR       CALD10
*E

;   BITCK  WILL FIND HIGHEST BIT SET IN H REGISTER
        ;          WHICH CORRESPONDS TO HIGHEST DEGREE REMAINING IN
        ;          THE REGISTER C,D

BITCK:  BIT      7,H
        RET      NZ        ;MUST BE HIGHEST DEGREE SO RETURN
        DEC      A         ;ACC HAS DEGREE COUNT
BITCK6: BIT      6,H       ;START HERE FIRST TIME THROUGH
        RET      NZ
        DEC      A
        BIT      5,H
        RET      NZ
        DEC      A
        BIT      4,H
        RET      NZ
        DEC      A
BITCK3: BIT      3,H
        RET      NZ
        DEC      A
        BIT      2,H
        RET      NZ
        DEC      A
        BIT      1,H
        RET      NZ
        DEC      A
        RET

;RTN TO CALC PARITY BIT FOR DATA STREAM TO BE TRANSMITTED
;BIT E(0) WILL BE PARITY BIT, INPUT DATE IN BC, DE
;RTN USES H-REG

PARITY: RES      0,E       ;INIT PARITY BIT
        LD       A,0       ;INIT MASK
        LD       H,0       ;INIT PE=1 CNTR
        OR       B
        JP       PO,CHKC
        INC      H         ;IF PARITY EVEN, INC CNT
CHKC:   LD       A,0
        OR       C
        JP       PO,CHKD
        INC      H
CHKD:   LD       A,0
        OR       D
        JP       PO,CHKE
        INC      H
CHKE:   LD       A,0
        OR       E
        JP       PO,FINCHK
        INC      H
FINCHK: BIT      0,H       ;EVEN CNT => EVEN PARITY
        RET      Z
        SET      0,E
        RET
*E

;SUBRTN TO CONVERT A STRING OF BCD DIGITS TO BINARY
;THE BCD NUMBER MUST BEGIN AT A BYTE BOUNDRY

;RESULT IN HL,DE
;B = BCD BYTE CNT

BCDHX:  LD       HL,0      ;INIT
        LD       DE,0      ;INIT
```

```
BCDHX2:  LD    A,(IX)    ;GET TWO BCD DIGITS
         LD    C,A       ;SAVE
         SRL   A         ;PROCESS MS-NIBBLE FIRST
         SRL   A
         SRL   A
         SRL   A
         CALL  BCDHN
         LD    A,C       ;NOW PROCESS LS NIB
         AND   OFH       ;ZERO MS NIB
         CALL  BCDHN
         INC   IX        ;NEXT BYTE
         DJNZ  BCDHX2    ;BYTE CNT IN B
         RET
```

;RTN TO ADD WEIGHTED VALUE OF BCD DIGIT IN A TO RESULT IN HLDE

```
BCDHN:   CP    OAH       ;CONVERT 1010B TO 0
         JR    NZ,BCDHN1
         XOR   A
BCDHN1:  CALL  HDX10     ;HLDE X 10
         CALL  HDPA      ;HLDE + A
         RET
```

;RTN TO MULT 32-BIT REG HLDE X 10

```
HDX10:   PUSH  BC
         PUSH  HL
         PUSH  DE
         CALL  HDX2      ;HLDE X 2
         CALL  HDX2      ;HLDE X 4
         POP   BC        ;ORIGINAL DE
         EX    DE,HL
         ADD   HL,BC     ;ADD    LSB
         EX    DE,HL
         POP   BC        ;ORIGINAL HL
         ADC   HL,BC     ;HLDE X 5
         CALL  HDX2      ;HLDE X 10
         POP   BC        ;RESTORE BC
         RET
*E
```

;RTN TO MULT 32-BIT REG HLDE BY 2

```
HDX2:    ADD   HL,HL     ;MSB X 2
         EX    DE,HL
         ADD   HL,HL     ;LSB X 2
         EX    DE,HL
         RET   NC
         INC   HL        ;OVERFLOW INTO MSB FROM LSB
         RET
```

;RTN TO ADD A-REG TO HLDE

```
HDPA:    PUSH  BC
         LD    B,0
         LD    C,A       ;A TO BC
         OR    A         ;CLEAR CARRY
         EX    DE,HL
         ADD   HL,BC     ;ADD TO LSB
         EX    DE,HL
         POP   BC        ;RESTORE
         RET   NC
         INC   HL        ;OVERFLOW FROM LSB TO MSB
         RET
*E
```

; TABLE OF MASKS FOR GENERATING POLYNOMIAL

```
TBLG10:  DB      00H, 00H, 07H, 69H
         DB      00H, 00H, 0EH, 0D2H
         DB      00H, 00H, 1DH, 0A4H
         DB      00H, 00H, 3BH, 48H
         DB      00H, 00H, 76H, 90H
         DB      00H, 00H, 0EDH, 20H
         DB      00H, 01H, 0DAH, 40H
         DB      00H, 03H, 0B4H, 80H
         DB      00H, 07H, 69H, 00H
         DB      00H, 0EH, 0D2H, 00H
         DB      00H, 1DH, 0A4H, 00H
         DB      00H, 3BH, 48H, 00H
         DB      00H, 76H, 90H, 00H
         DB      00H, 0EDH, 20H, 00H
         DB      01H, 0DAH, 40H, 00H
         DB      03H, 0B4H, 80H, 00H
         DB      07H, 69H, 00H, 00H
         DB      0EH, 0D2H, 00H, 00H
         DB      1DH, 0A4H, 00H, 00H
         DB      3BH, 48H, 00H, 00H
         DB      76H, 90H, 00H, 00H
```

; TABLE OF RIGHT-JUSTIFIED, 'REVERSED' DISPLAY BYTES

```
TBLRT:   DB      00H, 08H, 04H, 0CH, 02H, 0AH
         DB      06H, 0EH, 01H, 09H, 05H, 0DH, 03H
```

; TABLE OF LEFT-JUSTIFIED, 'REVERSED' DISPLAY BYTES

```
TBLLF:   DB      00H, 80H, 40H, 0C0H, 20H, 0A0H
         DB      60H, 0EH, 10H, 90H, 50H, 0DH, 30H
*E
```

; TABLE TO SWAP BITS OF DATA LSB TO MSB

```
SWPTBL:  DB      00H, 80H, 40H, 0C0H, 20H, 0A0H, 60H, 0EH, 10H, 90H, 50H, 0DH
         DB      30H, 0B0H, 70H, 0F0H, 00H, 08H, 04H, 0CH, 02H, 0AH, 06H, 0EH
         DB      01H, 09H, 05H, 0DH, 03H, 0BH, 07H, 0FH
CON2:    DEFB    0
         DEFB    6
         DEFB    55H
         DEFB    36H
         END
```

; SUBROUTINE TO TAKE PAGES FROM MAIN
; OUTPUT BUFFER AND PLACE THEM BY GROUPS IN EXTERNAL BUFFER

```
NADDR    EQU     -01     ; DUMMY OFFSET FOR ALTERNATE ADDRESS SEARCH
ADDR     EQU     01      ; OFFSET OF ADDRESS INFO IN PAGE
DISP     EQU     14      ; OFFSET OF FIRST ADDRESS BYTE IN PAGE
FTPAG2   EQU     08      ; OFFSET TO LSB OF FRONT PTR
FTPAG1   EQU     09      ; OFFSET TO MSB OF FRONT PTR
GRP      EQU     00      ; GROUP DECODE BYTE

EXTERNAL XMTFLG, GRPOFF, OFFSET, OFFST2, RSTME1, POGPMT
         EXTERNAL OFFST4, GPCNT1, NXTG1, EXTG1, NXTG1, NXTPAG, GRPFLG
         EXTERNAL NDISQ, POCQ, WK1
         EXTERNAL XMTCNT, CHINCR, XMTRID, PNXTG1
```

```
        EXTERNAL  DSBUF1, DSBUF2, DSBUF3, DSBUF4
        EXTERNAL  XMTCNT, XMTRID, FORMAT
        EXTERNAL  GRPCNT, GRPPTR, FTSAVE, NECDEQ
        EXTERNAL  ALTSAV, XMTPRI, UPDTQCNT, EMPFLG, CMP16

GLOBAL NECPAG, SAVPTR, RSTFL, XMTBUF, SETFL, MTCHK, CALOF2, CALPTR
;E

NECPAG: LD    DE, (CHINCR)    ;GET OFFSET FOR PRESENT LOOP
        LD    HL, XMTPRI      ;GET TRANSMITTER FLAGS
        ADD   HL, DE          ;ADD CHANNEL OFFSET
        BIT   0, (HL)
        RET   NZ              ;RETURN IF IN PROCESS
        BIT   7, (HL)         ;CHECK FOR HOUSEKEEP COMMAND
        JR    Z, ALLFUL       ;JUMP IF NOT NEEDED
        RES   7, (HL)         ;RESET HOUSEKEEP
        CALL  SAVPTR          ;RESET BATCH
ALLFUL: LD    HL, GRPFLG      ;GET GROUP STATUS REGISTER
        ADD   HL, DE          ;ADD CHANNEL OFFSET
        LD    A, 0FH          ;IF HEX INDICATES ALL FULL
        CP    (HL)
        RET   Z               ;RETURN IF ALL GROUPS FULL
        LD    B, 0            ;INITIALIZE B REG
        LD    HL, GRPOFF      ;GET GROUP OFFSET PTR
        ADD   HL, DE          ;ADD CHANNEL OFFSET
        PUSH  HL              ;SAVE OFFSET ADDRESS
        LD    A, (HL)         ;GET OLD OFFSET VALUE
        LD    B, 4            ;SET TO DO COUNT
INCOFF: PUSH  BC              ;SAVE TO DO COUNT
        LD    B, 0
        LD    C, A            ;GET OLD OFFSET IN C
        INC   C               ;BUMP UP VALUE
        BIT   2, C            ;CHECK FOR OFFSET OVERFLOW
        JR    Z, NOTOVR       ;JUMP IF NOT OVER
        RES   2, C            ;RESET OFFSET TO ZERO
NOTOVR: LD    HL, GRPFLG      ;GET PTR TO GROUP STATUS REG
        ADD   HL, DE          ;ADD CHANNEL OFFSET
        LD    A, (HL)         ;LOAD GROUP FLAGS IN A
        LD    IX, MTMASK      ;PUT PTR TO TOP OF MASK TBL
        ADD   IX, BC          ;ADD GROUP OFFSET
        AND   (IX)            ;CHECK FOR EMPTY OR FULL
        JR    Z, OFFOK        ;GO INCREMENT OFFSET
        CALL  MTCHK           ;UPDATE POINTER IF NEW PAGE IN
        JR    Z, OFFOK        ;JUMP IF NOT MT ANYMORE
OFFCHK: LD    A, C            ;GET OLD OFFSET VALUE
        POP   BC              ;GET TO DO COUNT
        DJNZ  INCOFF          ;LOOP IF NOT DONE
        POP   HL              ;TRY EXHAUSTED
        LD    (HL), A         ;SAVE VALUE
        RET                   ;GO BACK TO MAIN LOOP
OFFOK:  LD    A, C            ;SAVE OFFSET VALUE
        POP   BC              ;HOUSEKEEP
        POP   HL              ;HL POINTS TO OFFSET
        LD    B, 0
        LD    C, A            ;RESTORE OFFSET
        LD    (OFFSET), BC    ;SAVE OFFSET IN SCRATCHPAD
        SLA   C               ;MULT OFFSET BY 2
        LD    (OFFST2), BC    ;STORE OFFSET X 2
        SLA   C               ;MULT OFFSET BY 2
        LD    (OFFST4), BC    ;STORE OFFSET X 4
        LD    HL, NXTG1       ;GET BASE PTR FOR NXT MAIN BUFF PTR
        CALL  CALPTR
        LD    (NXTPAG), BC    ;PUT PTR IN SCRATCHPAD
        LD    HL, EXTG1       ;GET XMIT BUFF PTR
        CALL  CALPTR          ;CALCULATE PTR
        LD    (GRPPTR), BC    ;SAVE PTR IN SCRATCHPAD
        LD    HL, GPCNT1
        CALL  CALOF1          ;CALCULATE POINTER
        LD    A, (HL)         ;LOAD OLD GROUP COUNT
        LD    (GRPCNT), A     ;SAVE COUNT IN SCRATCHPAD
```

```
CNTCHK: LD      A,17            ;ALL PGS WILL FIT IF < 17 WORDS
        LD      B,(HL)          ;GET CURRENT GROUP VALUE
        SUB     B               ;SUBTRACT FROM 17
        JR      NC,BEGSCH       ;JUMP IF <17 PAGE WILL FIT
        LD      IX,(NXTPAG)     ;POINT TO TOP OF CURRENT PG
        LD      A,(IX+GRP)      ;GET WORD COUNT
        AND     03H             ;MASK OUT HIGH NIBBLE
        LD      B,(HL)          ;GET GRPCNT
        ADD     A,B             ;ADD GROUP COUNT TO THIS COUNT
        INC     A               ;ACCOUNT FOR ADDRESS BYTE
        LD      B,A             ;B NOW HAS NEW GROUP CNT
        LD      A,20            ;GET MAX WORD CNT PER GRP
        SUB     B               ;SUBTRACT NEW GROUP CNT
        LD      A,OFFH          ;SET INCOMPATIBLE
        JR      C,PGCHK         ;JUMP IF THIS PG WILL NOT FIT
BEGSCH: LD      A,(GRPCNT)      ;GET GROUP COUNT
        CP      00              ;CHECK TO SEE IF EMPTY
        JR      NZ,STSRCH       ;START SEARCH IF NOT EMPTY
        LD      HL,XMTFLG       ;LOAD XMITTER STATUS
        ADD     HL,DE           ;ADD CHANNEL OFFSET
        SET     7,(HL)          ;SET BATCH NOT MT
        JR      PGCHK           ;GO PROCESS PAGE
STSRCH: CALL    SEARCH          ;SEARCH FOR INCOMPATIBLE PAGES
        CP      OFFH            ;CHECK FOR PAGE INCOMPATIBLE
        JR      Z,PGCHK         ;GO PROCESS
        CALL    ALTADD          ;CALCULATE ALTERNATE ADDRS
        LD      BC,(NXTPAG)     ;SAVE NXTPAG PTR
        PUSH    BC
        LD      HL,ALTSAV       ;POINT TO WORK SPACE
        LD      BC,NADDR        ;SUBTRACT 20
        ADD     HL,BC
        LD      (NXTPAG),HL     ;GET NEW POINTER
        CALL    SEARCH          ;CHECK FOR ALTERNATE ADDRS MATCH
        POP     BC              ;RESTORE NEXT PAGE PTR
        LD      (NXTPAG),BC
        LD      HL,NDISQ        ;LOAD DISPLAY PAGE PTRS
        LD      BC,(OFFST4)
        ADD     HL,BC           ;ADD GROUP OFFSET
        ADD     HL,DE           ;ADD CHANNEL OFFSET
        PUSH    DE              ;SAVE CHANNEL OFFSET
        PUSH    HL              ;SAVE PTR FOR DISPLAY Q
        LD      C,(IX+FTPAG2)   ;GET FRONT PTR
        LD      B,(IX+FTPAG1)
        LD      (FTSAVE),BC
        CP      OFFH            ;CHECK FOR INCOMPATIBLE PAGE
        JR      Z,NXTPTR        ;NO GOOD IF FFH
        CALL    EXTMOV          ;MOVE TO EXTERNAL BUFFER
        POP     HL              ;GET PTRS TO Q
        PUSH    HL              ;SAVE HL
        CALL    NECDEQ          ;DEQ PAGE
        CP      OFFH            ;CHECK FOR Q MT
        JR      NZ,DELPAG       ;JUMP IF Q NOT MT
        LD      DE,(CHINCR)     ;GET CHANNEL OFFSET
        LD      A,(OFFSET)      ;GET PRESENT OFFSET
        LD      HL,EMPFLG       ;GET MT FLGS
        ADD     HL,DE           ;ADD CHANNEL OFFSET
        CALL    SETFL           ;SHOW MAIN Q MT
DELPAG: LD      A,0
        LD      (IX),A          ;ZERO MEANS LOCATION FREE
NXTPTR: LD      DE,(FTSAVE)     ;GET FRONT PTR
        LD      HL,00
        CALL    CMP16           ;CHECK FOR ZERO FRONT PTR
        JR      NZ,NEWPTR       ;GET NEXT PTR
        POP     HL              ;GET PTR TO FIRST PAGE
        LD      BC,02           ;SET TO DO COUNT
        INC     HL              ;GO TO LAST PTR
        INC     HL
        LD      DE,NXTPAG       ;LOAD LAST PTR TO NXTPAG
        LDIR
        POP     DE              ;RESTORE CHANNEL OFFSET
        LD      HL,GRPFLG       ;GET GROUP FLAGS
        ADD     HL,DE
        LD      BC,(OFFSET)     ;GET CURRENT OFFSET
        LD      A,C             ;LOAD OFFSET TO A
```

```
          CALL    SETEM       ;SET EMPTY FLAG
          JR      RESTOR      ;SAVE NEW PARAMETERS
NEWPTR:   LD      (NXTPAG),DE ;UPDATE NEXT PAGE PTR
          POP     HL
          POP     DE          ;RESTORE CHANNEL OFFSET
RESTOR:   LD      HL,GPCNT1   ;GET COUNT BASE
          CALL    CALOF1      ;CALCULATE OFFSET
          LD      A,(GRPCNT)  ;GET NEW COUNT
          LD      (HL),A      ;RESTORE COUNT
          LD      HL,NXTG1    ;GET BASE PTR
          CALL    CALOF2      ;CALCULATE OFFSET
          LD      BC,(NXTPAG) ;SAVE NEW NXTPAG VALUE
          LD      (HL),C      ;LOAD LOW BYTE
          INC     HL          ;
          LD      (HL),B      ;LOAD HIGH BYTE
          LD      HL,EXTG1    ;GET BASE PTR FOR EXT BUFF
          CALL    CALOF2      ;CALCULATE OFFSET
          LD      BC,(GRPPTR) ;GET CURRENT VALUE
          LD      (HL),C      ;SAVE IN RAM
          INC     HL
          LD      (HL),B      ;SAVE HIGH BYTE
          LD      HL,GRPOFF   ;GET GROUP OFFSET BASE
          ADD     HL,DE       ;ADD CHANNEL OFFSET
          LD      BC,(OFFSET) ;LOAD CURRENT OFFSET
          LD      (HL),C      ;STORE LS BYTE
          LD      A,(FORMAT)  ;CHECK FORMAT ALL FLAG
          RET     Z           ;RETURN TO MAIN LOOP IF FLAG NOT ON
          JP      ALLFUL      ;LOOP BACK TILL ALL DONE
*E

;SUBROUTINES FOR THE ABOVE PROGRAM

;THIS SUBRTN WILL CALCULATE A GROUP OFFSET TO BE USED
; WITH BASE PTRS

CALOF1:   LD      BC,(OFFSET) ;GET CURRENT GROUP OFFSET
          ADD     HL,BC       ;ADD GROUP OFFSET
          ADD     HL,DE       ;ADD CHANNEL OFFSET
          RET

CALOF2:   LD      BC,(OFFST2) ;GET CURRENT OFFSET X2
          ADD     HL,BC       ;ADD GROUP OFFSET
          ADD     HL,DE       ;ADD CHANNEL OFFSET
          RET

CALPTR:   LD      BC,(OFFST2) ;LOAD OFFSET VALUE
          ADD     HL,BC       ;ADD GROUP OFFSET
          ADD     HL,DE       ;ADD CHANNEL OFFSET
          LD      C,(HL)      ;GET LOW BYTE
          INC     HL
          LD      B,(HL)      ;GET HI BYTE
          RET
*E

; THE SEARCH SUBROUTINE TAKES A PAGE FROM THE MAIN BUFFER
; THE CHECKS FOR A ADDRESS MATCH IN THE TRANSMIT BUFFER

SEARCH:   PUSH    DE          ;SAVE CHANNEL OFFSET
          LD      (WK1),A     ;SAVE GROUP COUNT
          LD      HL,WK1      ;SAVE SCRATCHPAD LOCATION
          PUSH    HL          ;SAVE WK1 LOCATION
          LD      HL,XMTBUF   ;LOAD BASE OF XMIT BUFF
          LD      BC,(OFFST2) ;GET GROUP OFFSET
          ADD     HL,BC       ;ADD GROUP OFFSET TO BASE
```

```
            LD      C,(HL)      ;GET HIGH BYTE OF BASE
            INC     HL
            LD      B,(HL)      ;GET HIGH BYTE
            POP     HL
            PUSH    DE
            POP     IY          ;EXCHANGE CHANNEL OFFSET
            ADD     IY,BC
            LD      IX,(NXTPAG)  ;
ADDCHK:     PUSH    IX          ;SAVE START ADDRESS
            PUSH    IY
            PUSH    HL
            BIT     7,(IY)      ;CHECK FOR ADDRESS BYTE
            JR      Z,ADDBYT    ;JUMP IF ADDRESS BYTE
NXTADD.     POP     HL          ;RESTORE REGISTERS
            POP     IY
            POP     IX
            INC     IY          ;POINT TO NEXT WORD
            INC     IY
            INC     IY
            INC     IY
            JR      NZ,ADDCHK   ;TRY NEXT WORD
            AND     00          ;RETURN 00 FLAG = OK
            POP     DE          ;RESTORE CHANNEL OFFSET
            RET
ADDBYT:     LD      H,(IX+ADDR) ;OFFSET TO ADDRESS BYTE
            LD      L,(IX+ADDR+1)  ;GET LOW BYTE OF ADDRESS
            LD      D,(IY)      ;LOAD BYTE OF XMIT BUFFER
            LD      E,(IY+1)    ;LOAD LOW BYTE OF ADDR
            CALL    CMP16       ;COMPARE XMIT TO MAIN BUFFER
            JR      NZ,NXTADD   ;NO MATCH SET NEXT WORD
            INC     IY          ;UPDATE TO NEXT BYTE
            INC     IY
            LD      D,0F8H      ;LOAD MASK FOR LS BITS
            LD      A,(IY)      ;GET NEXT BYTE
            AND     D           ;MASK OUT LS BITS
            LD      B,A         ;SAVE RESULT IN B
            LD      A,(IX+ADDR+2)  ;GET NEXT BYTE
            AND     D           ;MASK LS BITS
            CP      B           ;COMPARE TO XMIT BUFFER BYTE
            JR      NZ,NXTADD   ;NO COMPARE TRY NEXT WORD
            POP     HL          ;RESTORE STACK
            POP     IY          ;
            POP     IX
            LD      A,0FFH      ;SET NO GOOD FLAG
            POP     DE          ;RESTORE CHANNEL OFFSET
            RET
*E

; THIS SUBROUTINE WILL CALCULATE THE ALTERNATE ADDRESS
; FOR THE DIGITAL DISPLAY PAGER. IT DOES THIS BY EITHER
; ADDING OR SUBTRACTING 10,000 FROM THE CURRENT PAGE
; ADDRESS
; IX SHOULD BE ALREADY POINTING TO TOP OF CURRENT PAGE

ALTADD:     PUSH    DE          ;SAVE CHANNEL OFFSET
            LD      C,(IX+ADDR)    ;GET FIRST ADDRESS BYTE
            LD      D,(IX+ADDR+1)  ;GET SECOND ADDRESS BYTE
            LD      E,(IX+ADDR+2)  ;GET THIRD ADDRESS BYTE
            LD      B,3         ;SET UP TO DO COUNT
SHFBEG:     SRL     C           ;SHIFT LEFT 3 TIMES
            RR      D
            RR      E
            DJNZ    SHFBEG      ;LOOP 3 TIMES
            EX      DE,HL
            LD      DE,2710H    ;LOAD 10,000 BINARY CONSTANT
            LD      A,00
            BIT     6,(IX+GRP)  ;CHECK FOR ALTERNATE
            JR      NZ,SUBALT   ;GO SUBTRACT 10,000
            ADD     HL,DE       ;ADD TO ORIGINAL ADDRESS
            ADC     A,C         ;ADD CARRY TO MSB
            JR      SHFLFT      ;LEFT JUSTIFY RESULT
SUBALT:     AND     00          ;CLEAR CARRY FLAG
```

```
         LD      A,C             ;PUT MSB IN ACC
         SBC     HL,DE           ;SUBTRACT 10,000 FROM ADDRESS
         SBC     A,00            ;SUBTRACT BORROW FROM MSB
         LD      C,A             ;GET RESULT IN C
SHFLFT:  LD      B,3             ;SET TO DO COUNT
         EX      DE,HL
ALTA:    SLA     E               ;SHIFT LEFT 3 TIMES
         RL      D
         RL      C
         DJNZ    ALTA            ;LOOP TILL SHIFTED 3 TIMES
         LD      IY,ALTSAV       ;GET POINTER TO WORKSPACE
         LD      (IY+1),D        ;SAVE SECOND
         LD      (IY+2),E        ;SAVE THIRD
         POP     DE              ;RESTORE CHANNEL OFFSET
         RET
*E
```

; THIS SUBRTN WILL TAKE PAGE ADDRESS AND DISPLAY INFO FROM
; THE MAIN BUFFER AND WILL TRANSFER THEM TO THE TRANSMIT
; BUFFER

```
EXTMOV:  PUSH    DE              ;SAVE CHANNEL OFFSET
         PUSH    BC              ;BC HAS GROUP OFFSET
         LD      C,1             ;LOAD DISPLAY PRIORITY
         CALL    UPDTQCNT        ;UPDATE CALL BATCH COUNT
         LD      HL,(NXTPAG)     ;MAIN BUFFER PTR TO IX
         LD      D,O
         LD      E,ADDR          ;LOAD ADDRESS OFFSET
         ADD     HL,DE           ;ADD OFFSET TO ADDRESS BYTE
         LD      DE,(GRPPTR)     ;GET NEXT ENTRY TO XMIT BYTE
         LD      BC,4            ;LOAD TO DO COUNT
         LDIR                    ;MOVE MAIN TO XMIT BUFFER
         LD      A,(GRPCNT)      ;INCREMENT GROUP COUNT
         INC     A
         LD      (GRPCNT),A      ;RESTORE NEW GROUP COUNT
         LD      IX,(NXTPAG)     ;POINT TO TOP OF PAGE
         LD      A,(IX+GRP)      ;LOAD DISPLAY BYTE CNT
         AND     03H
         JR      Z,MOVEIN        ;STOP IF NO DISPLAY BYTES
         PUSH    DE              ;SAVE XMIT BUFFER NXT LOC.
         LD      C,A             ;SAVE DISPLAY COUNT
         LD      HL,(NXTPAG)     ;GET MAIN BUFFER PTR
         LD      D,O
         LD      E,DISP          ;LOAD DISPLAY OFFSET
         ADD     HL,DE           ;ADD DISPLAY BYTE OFFSET
         POP     DE              ;RESTORE OFFSET
NXTWRD:  PUSH    BC
         LD      BC,4            ;LOAD XFER COUNT
         LDIR                    ;MOVE MAIN BUFFER TO XMIT BUFFER
         LD      A,(GRPCNT)      ;INCREMENT GROUP COUNT
         INC     A
         LD      (GRPCNT),A      ;
         POP     BC              ;GET LAST LOOP VALUE
         DEC     C
         JR      NZ,NXTWRD       ;
MOVFIN:  LD      (GRPPTR),DE     ;UPDATE NEXT PTR
         POP     BC              ;RESTORE GROUP COUNT
         POP     DE              ;GET OFFSET
         LD      A,(GRPCNT)
         CP      20
         RET     NZ
```

; SET FULL FLAG FOR GROUP IN USE

```
         LD      HL,GRPFLG       ;GET GROUP FLAG BASE
         ADD     HL,DE           ;ADD CHANNEL OFFSET
         LD      A,C             ;LOAD GROUP OFFSET
         CALL    SETFL           ;SET FULL FLAG
         RET
*E
```

; EMPTY AND HAS BEEN REFILLED WITH APROPRIATE PAGES AND RESET
; GROUP EMPTY FLAG

```
MTCHK:   PUSH     DE
         PUSH     BC
         CP       00          ;00 MEANS NEC DISPLAY
         JR       NZ,POCMT1   ;LOAD POCSAG POINTER IF NOT 00
         LD       HL,NXTG1    ;GET NEC DISPLAY NEXT PAGE PTR
         JR       POCMT2
POCMT1:  LD       HL,PNXTG1   ;GET POCSAG PTR
POCMT2:  ADD      HL,BC       ;ADD GROUP OFFSET
         ADD      HL,BC       ;ADD GROUP OFFSET
         ADD      HL,DE       ;ADD CHANNEL OFFSET
         PUSH     HL          ;SAVE NEXT PTR
         LD       E,(HL)      ;LOW BYTE TO E
         INC      HL
         LD       D,(HL)      ;HIGH BYTE TO D
         LD       HL,00
         CALL     CMP16       ;CHECK FOR NXTPAG =00
         JR       NZ,CHKFRN   ;IF NOT CHECK FOR NEW PGS
         CP       00          ;CHECK FOR NEC DISPLAY
         JR       NZ,POCMT3   ;JUMP IF POCSAG
         LD       HL,NDISQ    ;GET NEC DISPLAY Q
         JR       POCMT4
POCMT3:  LD       HL,POCQ     ;LOAD POCSAG Q S
POCMT4:  SLA      C           ;MULTIPLY OFFSET BY 4
         SLA      C
         LD       DE,(CHINCR)
         ADD      HL,BC       ;ADD CHANNEL OFFSET
         ADD      HL,DE       ;ADD CHANNEL OFFSET
         LD       E,(HL)      ;GET LOW BYTE
         INC      HL
         LD       D,(HL)      ;GET HIGH BYTE
         LD       HL,00
         CALL     CMP16       ;CHECK FOR MAIN BUFFER MT
         JR       Z,NOGUD     ;RETURN STILL MT
         PUSH     DE
         POP      BC          ;PUT NEW PTR IN NXTG1
         JR       UPDAT       ;UPDATE NXT PAG
CHKFRN:  PUSH     DE
         POP      IX          ;EXCHANGE IX,DE
         LD       E,(IX+FTPAG2) ;GET FRONT PTR
         LD       D,(IX+FTPAG1)
         CALL     CMP16       ;CHECK FOR ZERO
         JR       NZ,UPDAT
NOGUD:   OR       0FFH        ;SET NO-GOOD FLAG
         POP      HL
         POP      BC
         POP      DE
         RET
UPDAT:   POP      HL          ;GET NEXT PAGE PTR
         LD       (HL),E      ;PUT NEW FRONT PTR
         INC      HL
         LD       (HL),D      ;PUT NEW FRONT PTR TO NXTPAG
*E

;;;;;CLEAR EMPTY FLAG;;;;;;
         POP      BC
         POP      DE
         CP       00          ;ZERO IN ACC MEANS NEC DISPLAY
         JR       NZ,POCUPD   ;UPDATE POCSAG IF NOT 00
         LD       HL,GRPFLG   ;GET GROUP FLAGS
         ADD      HL,DE
POCUPD:  LD       HL,POGPMT   ;LOAD POCSAG PTR
         ADD      HL,DE       ;ADD CHANNEL OFFSET
         LD       A,C
         CALL     RSTME1
         JR       MTRET1
MTRET:   LD       A,C
         CALL     RSTMT
```

```
MTRET1: AND     00      ;RETURN ZERO ACC
        RET
*E

SAVPTR: PUSH    DE      ;SAVE CHANNEL PFFSET
        LD      B,08    ;TO DO COUNT
        LD      HL,NXTG1
        ADD     HL,DE   ;ADD CHANNEL OFFSET
RSTNXT: LD      (HL),00 ;ZERO NEXT PAGE PTRS
        INC     HL
        DJNZ    RSTNXT  ;LOOP TILL ALL ZERO
        LD      HL,XMTBUF       ;POINT TO TOP OF DISPLAY
        LD      IX,EXTG1        ;LOAD BASE OF PTRS
        ADD     IX,DE   ;ADD CHANNEL OFFSET
        LD      B,4     ;SET TO DO COUNT
PTRMOV: PUSH    BC      ;SAVE TO DO COUNT
        LD      C,(HL)  ;GET LS BYTE OF DISPLAY PTR
        INC     HL      ;GET MS BYTE OF DISPLAY PTR
        LD      B,(HL)
        PUSH    HL      ;SAVE TABLE PTR
        PUSH    BC      ;PUT PTR IN HL
        POP     HL
        ADD     HL,DE   ;ADD CHANNEL OFFSET
        LD      (IX),L  ;PUT PTR IN EXTG1
        INC     IX      ;GET MS BYTE
        LD      (IX),H
        INC     IX      ;GO TO NEXT PTR
        POP     HL      ;RESTORE TABLE PTR
        INC     HL      ;GET NEXT PTR
        POP     BC      ;GET TO DO COUNT
        DJNZ    PTRMOV  ;LOOP FOUR TIMES
        LD      A,0     ;USED TO ZERO CTRS
        LD      HL,GPCNT1       ;GET TOP OF GROUP CTRS
        ADD     HL,DE   ;ADD CHANNEL OFFSET
        LD      B,4     ;SET TO DO COUNT
ZROCTR: LD      (HL),A  ;ZERO GROUP CTRS
        INC     HL      ;NEXT COUNTER
        DJNZ    ZROCTR  ;LOOP 4 TIMES
        LD      HL,DSBUF1       ;LOAD TOP OF DISPLAY BUFFER
        ADD     HL,DE   ;ADD CHANNEL OFFSET
        EX      DE,HL   ;DESTINATION TO DE
        LD      B,40    ;SET TO DO COUNT
IDLMOV: PUSH    BC      ;SAVE TO DO COUNT
        LD      HL,IDLCOD       ;POINTER TO TOP OF IDLE CODE
        LD      BC,8    ;TRANSFER 8 BYTES
        LDIR            ;IDLE CODE TO DISPLAY BUFFER
        POP     BC      ;LOOP 40 TIMES
        DJNZ    IDLMOV  ;LOOP IF NOT DONE
        POP     DE      ;RESTORE CHANNEL OFFSET
        LD      HL,GRPFLG       ;SET PTR TO GRP FLAGS
        ADD     HL,DE   ;ADD CHANNEL OFFSET
        LD      A,(HL)  ;GET GROUP FLAG PTRS
        AND     0F0H    ;RESET FULL FLAGS
        OR      0F0H    ;SET MT FLAGS
        LD      (HL),A  ;SAVE FLAGS
        LD      BC,00   ;INTITIALIZE GROUP CNT
EMPGO:  LD      A,00    ;INDICATE NEC DISPLAY
        INC     C       ;NEXT GROUP
        BIT     2,C     ;STOP AFTER FOUR TIMES
        JR      Z,EMPGO ;LOOP TILL ALL INITIALIZED
        LD      HL,XMTFLG       ;TRANSMIT FLGS
        ADD     HL,DE   ;CHANNEL OFFSET
        RES     7,(HL)  ;SHOW BUFFER AS EMPTY
        RET
*E

; FOLLOWING SUBRTNS USED TO SET AND RESET FLAGS IN STATUS
; REGISTERS

SETFL:  CP      00      ;LOOK FOR GROUP 1 OFFSET
        JR      Z,STG1  ;SET FULL GROUP 1
```

```
        DEC     A
        JR      Z,STG2   ;SET GROUP 2 FULL
        DEC     A
        JR      Z,STG3   ;SET GROUP 3 FULL
        DEC     A
        JR      Z,STG4
        DEC     A
        JR      Z,STG5
        DEC     A
        JR      Z,STG6
        DEC     A
        JR      Z,STG7
        SET     7,(HL)
        RET
STG7:   SET     6,(HL)
        RET
STG6:   SET     5,(HL)
        RET
STG5:   SET     4,(HL)
        RET
STG4:   SET     3,(HL)
        RET
STG3:   SET     2,(HL)   ;SET GROUP 3 BIT
        RET
STG2:   SET     1,(HL)   ;SET GROUP 2 BIT
        RET
STG1:   SET     0,(HL)   ;SET GROUP 1 BIT
        RET

; SET EMPTY FLAG

SETEM:  CP      0        ;
        JR      Z,SETM1  ;SET GROUP 1
        DEC     A
        JR      Z,SETM2  ;SET GROUP 2 EMPTY
        DEC     A
        JR      Z,SETM3  ;SET GROUP 3 EMPTY
        SET     7,(HL)   ;SET GROUP 4 EMPTY FLAG
        RET
SETM3:  SET     6,(HL)   ;SET GROUP 3 BIT
        RET
SETM2:  SET     5,(HL)   ;SET GROUP 2 BIT
        RET
SETM1:  SET     4,(HL)   ;SET GROUP 1 BIT
        RET

;THIS SUBROUTINE RESETS FULL FLAG

RSTFL:  CP      0        ;LOOK FOR GROUP1
        JR      Z,RSTG1  ;RESET GROUP 1 FULL
        DEC     A
        JR      Z,RSTG2  ;RESET GROUP 2 FULL
        DEC     A
        JR      Z,RSTG3  ;RESET GROUP 3 FULL
        DEC     A
        JR      Z,RSTG4
        DEC     A
        JR      Z,RSTG5
        DEC     A
        JR      Z,RSTG6
        DEC     A
        JR      Z,RSTG7
        RES     7,(HL)
        RET
RSTG7:  RES     6,(HL)
        RET
RSTG6:  RES     5,(HL)
        RET
RSTG5:  RES     4,(HL)
```

```
          RET
RSTG4:    RES     3,(HL)    ;RESET GROUP 4 BIT
          RET
RSTG3:    RES     2,(HL)    ;RESET GROUP 3  BIT
          RET
RSTG2:    RES     1,(HL)    ;RESET GROUP 2  BIT
          RET
RSTG1:    RES     0,(HL)    ;RESET GROUPT 1 BIT
          RET

; THIS SUBRTN WILL RESET GROUP EMPTY FLAGS

;
RSTMT:    CP      0         ;LOOK FOR GROUP 1
          JR      Z,RMT1    ;RESET GROUP 1 EMPTY
          DEC     A
          JR      Z,RMT2    ;RESET GROUP 2 EMPTY
          DEC     A
          JR      Z,RMT3    ;RESET EMPTY BIT GROUP3
          RES     7,(HL)    ;RESET EMPTY BIT
          RET
RMT3:     RES     6,(HL)    ;RESET EMPTY BIT
          RET
RMT2:     RES     5,(HL)    ;RESET EMPTY BIT
          RET
RMT1:     RES     4,(HL)    ;RESET EMPTY BIT
          RET
;

;;;;;TABLES FOR USE BY ABOVE ROUTINE;;;;;;;;;;;;

XMTBUF:   DEFW    DSBUF1    ;GROUP 1 BUFFER
          DEFW    DSBUF2    ;GROUP 2 BUFFER
          DEFW    DSBUF3    ;GROUP 3 BUFFER
          DEFW    DSBUF4    ;GROUP 4 BUFFER
          DEFB    00100010B ;GROUP 2 FULL/EMPTY MASK
          DEFB    01000100B ;GROUP 3 FULL/EMPTY MASK
          DEFB    10001000B ;GROUP 4 FULL/EMPTY MASK

IDLCOD:   DEFB    7AH
          DEFB    89H
          DEFB    0C1H
          DEFB    97H
          DEFB    7AH
          DEFB    89H
          DEFB    0C1H
          DEFB    97H
          END
;         INITIALIZATION AND MAIN PROGRAM FOR OUTPUT SECTION

EXTERNAL  TXCNT,XMTRID,CTCTBL,EMPFLG,CTCINT
          EXTERNAL  NECPAG,PGINPT,XMTBEG,CHINCR,CHLEN
          EXTERNAL  RAMEND,RAMSTR,PERXMT,MNPTR
          EXTERNAL  SAVPTR,GRPFLG
          EXTERNAL  MNBUF,XMTFLG,X01INT,X02INT,X03INT,X04INT,X05INT
          EXTERNAL  X06INT,X07INT,X08INT,TIMINT,SIOTBL
          EXTERNAL  SIOTBL,STACK,XMTCNT
          EXTERNAL  POCEMP,POCPAG,POCSAV,PRMDIA
          EXTERNAL  AIDTBL,GRAWRD,LDWORD,DEWRD,XMTCNT,AIDIND,AIDXMT
          EXTERNAL  INDCTRS,AUTIDCNT,AIDTIM,T5MULT,AUTOLM

;
;         TEST CODE TO BE REMOVED ****************
;
          EXTERNAL  TSTTIM,TSTDT1
          GLOBAL    INITST,TST2,TST3,TST4,PROMST,CTCTAG
```

```
TSTLIM: EQU     30              ;TEST TIMER LIMIT
;
;
;***************END OF TEST CODE

;
;
;************************************************************
;
;
;         MASTER AND DISPLAY PROGRAM JUMP VECTOR TABLE
;
;
;************************************************************
;
;
;
BASE:   EQU     3080H           ;MASTER AND DISPLAY JUMP VECTOR BASE ADDRESS

INITM:  EQU     BASE+00H        ;INITIALIZATION ROUTINE FOR MASTER AND DISPLAY
COJUMP: EQU     BASE+03H        ;MASTER CPU CALL FOR PROCESSOR TIME
CHKPAG: EQU     BASE+06H        ;PAGE INPUT ROUTINE CALL
NOTUSD: EQU     BASE+09H        ;SPARE JUMP VECTOR
DISXMT: EQU     BASE+0CH        ;DISPLAY SIO TRANSMIT ROUTINE
DISEXT: EQU     BASE+0FH        ;DISPLAY SIO EXT STATUS ROUTINE
DISREC: EQU     BASE+12H        ;DISPLAY SIO RECEIVE ROUTINE
DSSPEC: EQU     BASE+15H        ;DISPLAY SIO SPEC. RECEIVE ROUTINE

LINXMT: EQU     BASE+18H        ;LINE INTERFACE TRANSMIT
LINEXT: EQU     BASE+1BH        ;LINE INT EXTERNAL STATUS INTERRUPT
LINREC: EQU     BASE+1EH        ;LINE INTERFACE RECEIVE ROUTINE
LNSPEC: EQU     BASE+21H        ;LINE INTERFACE SPECIAL RECEIVE

;
;
;
MASTM1: EQU     BASE+24H        ;MASTER TIMER INTERRUPT CHANNEL 1
MASTM2: EQU     BASE+27H        ;MASTER TIMER INTERRUPT CHANNEL 2
;
;
;       LINE INTERFACE AND LCD KEYBOARD PIOS
;
MASPIO: EQU     BASE+2AH        ;MASTER LCD KEYBOARD PIO
MASPI1: EQU     BASE+2DH        ;MASTER LCD KEYBOARD PIO

;
;       RING DETECT PIO INTERRUPT ROUITNES
;
;
LNPIO0: EQU     BASE+30H        ;PIO 1 PORT A
LNPIO1: EQU     BASE+33H        ;PIO 1 PORT B
LNPIO2: EQU     BASE+36H        ;PIO 2 PORT A
LNPIO3: EQU     BASE+39H        ;PIO 2 PORT B
LNPIO4: EQU     BASE+3CH        ;PIO 3 PORT A
LNPIO5: EQU     BASE+3FH        ;PIO 3 PORT B
LNPIO6: EQU     BASE+42H        ;PIO 4 PORT A
LNPIO7: EQU     BASE+45H        ;PIO 4 PORT B
```

```
TSTSWC: EQU     1F00H           ;TEST SOFTWARE SWITCH
;
;
;       PIO STARTING CONTROL PORT ADDRESS
;
PIOAER  EQU     20H             ;MASTER LCD DISPLAY PIO
INPPRT  EQU     00H             ;INPUT PORT FOR TEST DIP SWITCH

GLOBAL  START, IDSET

PATCTC  EQU     00H             ;ADDRESS OF BATCH CTC
;

;       INITIALIZATION FOR DIGITAL OUTPUT PROCESSOR

PROMST  DI
        IM      2               ;INTERRUPT MODE 2
        JP      START
        DEFW    00
        DI
        JP      START
        DEFW    00
        DEFW    00
        DI
        JP      START
        DEFW    00
        DEFW    00
        DI
        JP      START
        DEFW    00
        DEFW    00
        DI
        JP      START
        DEFW    00
        DEFW    00
        DI
        JP      START
        DEFW    00
        DEFW    00
        DI
        JP      START
        DEFW    00
        DEFW    00
        DI
        JP      START

DEFW    00
        DEFW    00
CTCTAG: DEFW    CTCINT          ;THIS TAG INDICATES FIRST INTERRUPT VECTOR
        DEFW    CTCINT          ;IT IS USED TO SET THE "I" REG ON A RELOCATABLE BASIS
        DEFW    CTCINT
        DEFW    CTCINT
PIO0A:  DEFW    MASPIO          ;LCD KEYBOARD PIO
PIO0B:  DEFW    MASPI1          ;LCD KEYBOARD PIO
PIO1A:  DEFW    LNPIO0          ;LINE INTERFACE RING DETECT PIOS
PIO1B:  DEFW    LNPIO1
PIO2A:  DEFW    LNPIO2
PIO2B:  DEFW    LNPIO3
PIO3A:  DEFW    LNPIO4
PIO3B:  DEFW    LNPIO5
PIO4A:  DEFW    LNPIO6
PIO4B:  DEFW    LNPIO7
        DEFW    00
        DEFW    00
        DEFW    00
        DEFW    00
        DEFW    00
```

```
        DI
        JP      START

DEFW    00
        DEFW    00
        DEFW    00
SIOINI  DEFW    XO2INT      ;SIO INT VECTOR
        DEFW    XO2INT
        DEFW    XO2INT
        DEFW    XO1INT      ;SIO INT VECTOR 2
        DEFW    XO1INT
        DEFW    XO1INT
        DEFW    XO1INT
SIOIN3: DEFW    LINXMT      ;SIO INT VECTOR 3
        DEFW    LINEXT
        DEFW    LINREC
        DEFW    LNSPEC
        DEFW    DISXMT      ;SIO INT VECTOR 4
        DEFW    DISEXT
        DEFW    DISREC
        DEFW    DSSPEC
SIOIN5: DEFW    INTERR      ;SIO 5
        DEFW    INTERR
        DEFW    INTERR
        DEFW    INTERR
        DEFW    INTERR
        DEFW    INTERR
        DEFW    INTERR
        DEFW    INTERR
SIOIN7: DEFW    INTERR      ;SIO INT VECTOR 7
        DEFW    INTERR
        DEFW    INTERR
        DEFW    INTERR
        DEFW    INTERR      ;SIO INT VECTOR 8
        DEFW    INTERR
        DEFW    INTERR
        DEFW    INTERR

BATTAG  DEFW    TIMINT      ;VECTOR FOR BATCH TIMER INT.
        DEFW    TIMINT
        DEFW    MASTM1
        DEFW    MASTM2
        DEFW    00
        DEFW    00
        DEFW    00
        DEFW    00
INTERR  EI                  ;THIS IS AN INTERRUPT ERROR RETURN
RETI    RETI

START:  LD      SP,STACK
        LD      HL,CTCTAG   ;GET VECTOR START LOCATION
        LD      A,H         ;GET HIGH BYTE
        LD      I,A         ;LOAD I VECTOR
        IM      2           ;SET INTERRUPT MODE 2
        LD      A,4FH
        CALL    OUTIN
        CALL    OUTIN

; TURN OFF INTERRUPTS

LD      A,03H
        CALL    OUTALL
        CALL    OUTALL

; INITIALIZE ALL ICT'S & IEO'S

LD      A,32
```

```
        DJNZ    XRETI
        JR      CONTIN

OUTALL  LD      BC,0A700H           ;LD B,0A7H
                                    ;LD C,0
CALL:   OUT     (C),A
        INC     C
        DJNZ    CALL
        RET
CITIN:  LD      BC,6501H            ;LD B,101
                                    ;LD C,1
OIN:    OUT     (C),A
        INC     C
        INC     C
        DJNZ    OIN
        RET

;
;
;       POWER ON DIAGNOSTIC TEST
;

IN      A,(INVPRT)          ;READ DIP SWITCH
        BIT     1,A                 ;3RD SWITCH - IF CLOSED RUN DIAGNOSTIC
        JR      NZ,CONTIN           ;IF OPEN SKIP DIAGNOSTIC
        CALL    PRMDIA              ;DO DIAGNOSTICS
        LD      A,0FFH              ;FF IN IX ON RETURN MEANS TEST OK
        CP      (IX)
        JR      Z,CONTIN            ;IF FF TEST HAS BEEN OKAY
        IN      A,(INVPRT)          ;CHECK SWITCH 4
        BIT     0,A                 ;IF SWITCH IS CLOSED OVERIDE ERROR
        JR      Z,CONTIN

;****** DIAGNOSTIC ERROR ROUTINE TO BE COMPLETED
;
DIAERR: JR      DIAERR

; INITIALIZE XMITTER SIO'S

CONTIN: LD      DE,00               ;INITIALIZE OFFSET
CVENXT: LD      B,04                ;B IS TO DO COUNT
        LD      A,B
        PUSH    AF                  ;SAVE XMITTER COUNT
LODCTC: LD      HL,CTCTBL           ;GET CTC ADDRESS
        ADD     HL,DE               ;ADD OFFSET
        LD      C,(HL)              ;ADDRS TO C
        LD      A,01010111B         ;CONTROL WORD COUNTER MODE PERIOD =
                                    ; .406 X 32 X CTR VALUE
        OUT     (C),A
        LD      A,22                ;416 USECS 2400 BAUD = 1200 BAUD TO SIO
        OUT     (C),A

INITIALIZE SIO

LD      HL,SIOTBL           ;GET SIO ADDRESS
        ADD     HL,DE
        LD      C,(HL)              ;ADDRESS TO C
        INC     C                   ;POINT TO CONTROL
        PUSH    BC                  ;SAVE TO DO COUNT
```

```
                LD      HL,INITBL       ;GET INITIALIZE TABLE
        OTIR                            ;TRANSFER TO SIO
        POP     BC                      ;GET TO DO COUNT
        INC     E                       ;NEXT CHANNEL
        DJNZ    LODCTC                  ;LOOP TILL DONE
        POP     AF                      ;GET XMITTER COUNT
        SRL     A                       ;CUT BY HALF
        LD      B,A                     ;TO DO COUNT
        LD      E,00                    ;INITIALIZE OFFSET
        LD      HL,SIOTBL               ;GET DATA PORT
        LD      C,(HL)
VECLOD: LD      A,03
        ADD     A,C                     ;UP TO CHANNEL B CONTROL
        LD      C,A                     ;SAVE PORT ADDRESS
        LD      A,02                    ;WRITE TO REG 2
        OUT     (C),A
        LD      HL,VECTBL               ;GET ASSOCIATED VECTOR
        ADD     HL,DE                   ;OFFSET X 2
        ADD     HL,DE
        LD      A,(HL)                  ;GET VECTOR
        OUT     (C),A                   ;LOAD VECTOR
        INC     E
        INC     C
        DJNZ    VECLOD                  ;LOOP TILL DONE
;
;
;
;       PIO VECTOR INIT.
;
        LD      B,10                    ;TO DO CNT
        LD      DE,00                   ;INIT OFFSET
        LD      C,PIOADR                ;STARTING PIO ADDRESS
NXTVEC: LD      HL,PIOVEC               ;PIO VECTOR TABLE
        ADD     HL,DE                   ;2 BYTES PER ENTRY
        ADD     HL,DE
        LD      A,(HL)                  ;GET VECTOR
        OUT     (C),A                   ;OUT TO PIO
        INC     E                       ;NEXT VECTOR ENTRY
        INC     C                       ;NEXT PIO CONTROL PORT
        INC     C
        DJNZ    NXTVEC                  ;LOOP TILL DONE

;       SET UP BATCH CTC TIMER

LD      C,BATCTC                ;GET BATCH TIMER ADDRESS
        LD      HL,BATTAG               ;GET INTERRUPT VECTOR
        LD      A,L                     ;USE LSB ONLY
        OUT     (C),A                   ;OUTPUT VECTOR
        LD      B,00010111B             ;CHANNEL 1 CONTROL
        OUT     (C),B
        LD      B,158                   ;1 MSEC. TIME CONSTANT
        OUT     (C),B
        INC     C                       ;NEXT CHANNEL
        LD      B,11010111B             ;CONTROL WORD INTERRUPT ENABLE
        OUT     (C),B
        LD      B,100                   ;100 MS TIME OUT
        OUT     (C),B
        XOR     A                       ;ZERO ACC AND CLEAR CARRY
        LD      HL,RAMEND               ;POINT TO END OF RAM
        LD      BC,RAMSTR               ;FIRST RAM LOCATION
        SBC     HL,BC                   ;TOTAL BYTE CNT -1
        LD      (BC),A                  ;ZERO FIRST BYTE
        PUSH    HL
        LD      HL,RAMSTR               ;START OF RAM
        LD      DE,RAMSTR+1             ;DESTINATION = SECOND RAM BYTE
        LDIR                            ;ZERO REST OF RAM

; INIT AUTO-ID TABLE FOR QRA DE '
        LD      IX,AIDTBL               ;ADDR FOR AUTO-ID TABLE
        LD      (IX),1                  ;CMD OFFSET FOR TABLE
        INC     IX
```

```
        LD      (IX),23         ;LOAD WARMUP
        INC     IX
        LD      (IX),21         ;START WITH INTERBLOCK GAP
        LD      HL,GRAWRD       ;'GRA' WORD
        CALL    LDWORD          ;LOAD MORSE CODE 'WORD' INTO TABLE
        INC     IX              ;NEXT TABLE LOCATION
        LD      (IX),21         ;CMD FOR INTER-WORD GAP
        INC     IX
        LD      HL,DEWRD        ;'DE' WORD
        CALL    LDWORD
        INC     IX
        LD      (IX),21         ;ANOTHER INTER-WORD GAP

;CALCULATE LENGTH OF RAM PER TRANSMITTER
        LD      HL,PERXMT       ;START OF RAM FOR SECOND XMITTER
        LD      BC,XMTFLG       ;START OF RAM FOR 1ST XMITTER
        AND     A               ;CLEAR CARRY FLAG
        SBC     HL,BC           ;RESULT = RAM LENGTH PER CHANNEL
        LD      (CHLEN),HL      ;SAVE RESULT

CALL    IDSET           ;SET UP IDS

;INITIALIZE MAIN BUFFER POINTER
STAID3  LD      HL,MNBUF        ;POINT TO START OF MAIN BUFFER AREA
        LD      (MNPTR),HL      ;INITIALIZE BUFFER POINTER

;*********************
;************** TEST CODE TO BE REMOVED LATER

LD      HL,TSTTIM       ;GET PAGE TIMER
        LD      (HL),TSTLIM     ;INITIALIZE
        LD      HL,INITST       ;INIT TEST BUFFERS
        LD      DE,TSTDT1
        LD      BC,20
        LDIR

;INITIALIZE DISPLAY PAGER EXTERNAL BUFFER

LD      A,(XMTCNT)      ;GET NUMBER OF XMITTERS INSTALLED
        LD      B,A             ;SET AS TO DO COUNT
        LD      DE,00           ;INITIALIZE CHANNEL OFFSET
INIPTR  PUSH    BC              ;SAVE TO DO COUNT
        CALL    DAVPTR          ;INITIALIZE DISPLAY EXTERNAL BUFFER
        LD      HL,GRPFLG       ;GET DISPLAY FLAG REGISTER
        ADD     HL,DE           ;ADD CHANNEL OFFSET
        LD      A,(HL)          ;REGISTER TO ACC.
        OR      0F0H            ;SET EMPTY FLAG
        LD      (HL),A          ;RESTORE FLAGS
        LD      HL,EMPFLG       ;GET MT FLAGS
        ADD     HL,DE           ;ADD CHANNEL OFFSET
        LD      A,0FFH          ;SET MT FLGS
        LD      (HL),A
        LD      HL,POCEMP       ;SET POCSAG QS MT
        ADD     HL,DE           ;ADD CHANNEL OFFSET
        LD      (HL),A
        LD      HL,(CHLEN)      ;GET LENGTH OF RAM PER CHANNEL
        ADD     HL,DE           ;ADD TO ORIGINAL OFFSET
        EX      DE,HL           ;SAVE RESULT AS NEW OFFSET
        POP     BC              ;GET TO DO COUNT
        DJNZ    INIPTR          ;LOOP TILL ALL XMITTERS DONE
```

; FOLLOWING CALL IS TO INITIALIZE THE MASTER/DISPLAY PROGRAM
;
;
         CALL    INJUMP      ;JUMP TO INITIALIZE PROGRAM
;
;
;
         EI                  ;******************* ENABLE INTERRUPTS

MAINLP:  LD      A,(XMTCNT)   ;GET XMITTER COUNT
         LD      (TXCNT),A    ;SAVE IN RAM AS DOWNCOUNT
         LD      DE,0         ;RAM OFFSET FOR XMITTER 1
         LD      (CHINCR),DE  ;SAVE RAM OFFSET
         LD      HL,XMTRID    ;SET UP XMITTER ID
         LD      (HL),1       ;LOAD XMITTER 1 ID
         CALL    AIDCHK       ;CHECK IF TIME TO XMIT AUTO-ID
SUBLP:   CALL    POINPT       ;XMITTER ROUTINES
         CALL    NECPAG       ;CALL PAGE INPUT ROUTINES
         CALL    PUCPAG       ;PROCESS POCSAG
         CALL    XMTBEG       ;CALL DISPLAY PAGER ROUTINES
         CALL    GOJUMP       ;GIVE MASTER/DISPLAY PROCESSOR TIME
         LD      DE,(CHINCR)  ;GET LAST CHANNEL OFFSET
         LD      HL,(CHLEN)   ;LENGTH OF RAM PER CHANNEL
         ADD     HL,DE        ;ADD CHANNEL LENGTH
         EX      DE,HL        ;DE WILL CONTAIN CHANNEL OFFSET
         LD      (CHINCR),DE  ;SAVE NEW VALUE
         LD      A,(XMTRID)
         INC     A            ;INCREMENT XMITTER ID
         LD      (XMTRID),A   ;SAVE NEW VALUE
         LD      A,(TXCNT)
         DEC     A            ;DECREMENT DOWN COUNT
         LD      (TXCNT),A    ;UPDATE DOWN COUNT
         OR      A            ;(CP 0), ARE ALL XMITTERS PROCESSED
         JR      NZ,SUBLP     ;IF NOT CONTINUE PROCESSING
         JR      MAINLP       ;RESET BACK TO XMITTER 0
;

; EACH 30 MIN START DAISY CHAIN OF AUTO-ID TRANSMISSIONS
         BIT     0,(HL)
         RET     Z
         LD      A,(AUTOLM)   ;RESET ID TIMER
         LD      (HL),A
         LD      A,(AUTIDCNT) ;GET AUTO-ID CNTR
         INC     A            ;BUMP IT
         LD      (AUTIDCNT),A ;UPDATE IT
         LD      HL,T5MULT    ;PT TO MULTIPLICATION FACTOR FOR AUTO-ID
         CP      (HL)
         RET     NZ
         XOR     A            ;(LD A,0), RESTART CNT
         LD      (AUTIDCNT),A
;
;
;
;
; INIT AUTO-ID INDICATORS FOR EACH XMITTER
;
IDSET:   LD      HL,XMTCNT    ;XMITTERS IN USE
         LD      B,(HL)       ;LOOP CNT
         LD      HL,AIDIND    ;IND'S IN XMITTER RAM
         LD      DE,(CHLEN)   ;RAM PER XMITTER
         LD      IX,AIDXMT    ;TAILOR INFO
         LD      IY,INDCTRS   ;RESET ID START BITS 3
LDXID:   LD      A,(IX)       ;0 => NO ID, NON-ZERO => SEND ID
         INC     IX
         LD      (HL),A
         RES     3,(IY)
         ADD     HL,DE
         ADD     IY,DE
         DJNZ    LDXID
```

```
;SET BIT TO START FIRST ID
;
IDSET1: LD     HL,XMTCNT       ;XMITTERS IN USE
        LD     B,(HL)          ;LOOP CNT
        LD     IY,AIDIND       ;RAM INDICATOR
        LD     HL,INDCTRS
        LD     DE,(CHLEN)
STAID1: LD     A,(IY)
        OR     A               ;CP 0
        JR     NZ,STAID2
        ADD    IY,DE
        ADD    HL,DE
        DJNZ   STAID1
        RET
STAID2: SET    3,(HL)          ;SET 'SEND-AUTO-ID' BIT
        RET

; FOLLOWING TABLE WILL BE USED TO INITIALIZE SIOS

;    SIO INITIALIZE TABLE

INITBL: DEFB   18H             ;CHANNEL RESET
        DEFB   00
        DEFB   00
        DEFB   00
        DEFB   00
        DEFB   28H             ;INT PENDING RESET
        DEFB   00
        DEFB   04              ;REG  4
        DEFB   00              ;SYNCH MODE ENABLE
        DEFB   06              ;REG 6
        DEFB   00              ;MONO SYNCH CHAR
        DEFB   01              ;REG 1
        DEFB   00000110B       ;INTERRUPT ENABLE
        DEFB   05              ;REG 5

DEFB   60H             ;DTR 8 BITS PER CHARACTER
        ENDC

DEFB   0E0H            ;DTR 8 BITS PER CHAR
        ENDC

;       SIO VECTOR TABLE

VECTBL: DEFW   SIOIN1          ;INTERRUPT   XMIT 1
        DEFW   SIOIN3          ;INTERRUPT   XMIT3
        DEFW   SIOIN5          ;INTERRUPT   XMIT5
        DEFW   SIOIN7          ;INTERRUPT   XMIT7
;

PIOVEC: DEFW   PIO0A           ;INTERRUPT PIO 0A
        DEFW   PIO0B           ;PIO 0B
        DEFW   PIO1A           ;PIO 1A
        DEFW   PIO1B           ;PIO 1B
        DEFW   PIO2A           ;PIO 2A
        DEFW   PIO2B           ;PIO 2B
        DEFW   PIO3A           ;PIO 3A
        DEFW   PIO3B           ;PIO 3B
        DEFW   PIO4A           ;PIO 4A
        DEFW   PIO4B           ;PIO 4B
;
;

;       TEST TABLE TO BE REMOVED
```

```
INITST:  DEFB    00
         DEFB    00
         DEFB    09
         DEFB    94H
         DEFB    00
TST2:    DEFB    00
         DEFB    00
         DEFB    00
         DEFB    00
         DEFB    11H
TST3:    DEFB    00
         DEFB    00
         DEFB    00
         DEFB    01
         DEFB    19H
TST4:    DEFB    00
         DEFB    00
         DEFB    09
         DEFB    03
         DEFB    09H

;************ END OF TEST CODE
         END

LINK $=00 MAINDIG DIGINP NECWORK NECPG POCPAG NECXMIT DIGINT DIGTAIL DIAGNOS
          LAST $=7000 DIG STACK $=7100 DIGRAM (N=PBELL OUTPUT  Y

FORMAT MODULE FOR POCSAG PAGERS

EXTERNAL XMTPRI, OFFSET, OFFST2, NXTPAG, GRPCNT
         EXTERNAL POCQ, FTSAVE, NECDEQ, CHINCR
         EXTERNAL DELPAG, CMP16, MTCHK, SBBTFL, CALOF2, POCOFF
         EXTERNAL FULSTA, SUBNUM, SBGPOC, PNXTG1, POCGP1, POCGP2, POCGP3
         EXTERNAL POCGP4, POCGP5, POCGP6, POCGP7, POCGP8, POCEMP, CALPTR
         EXTERNAL UPDTQCNT, SBBTOC, POGPMT, PRIMSK, FORMAT

GLOBAL POCPAG, RSTME1, MEMCH1, POCSAV, SETME1

GRP      EQU     00      ;OFFSET TO GRP BYTE
MAXLEN   EQU     5       ;NUMBER OF SUBBATCHES
POCLEN   EQU     64      ;BYTES PER SUBBATCH
ADDR     EQU     01      ;OFFSET TO FIRST ADDRESS
FTPAG2   EQU     08      ;OFFSET TO FRONT PTR
FTPAG1   EQU     09
*E

POCPAG:  LD      DE,(CHINCR)     ;GET CHANNEL OFFSET
         LD      HL,XMTPRI       ;CHECK FOR POCSAG IN PROGRESS
         ADD     HL,DE
         BIT     1,(HL)          ;BIT SET POCSAG GOING
         RET     NZ
         BIT     2,(HL)          ;CHECK FOR HOUSEKEEP
         JR      Z,POCFUL
         RES     2,(HL)
         CALL    POCSAV          ;RESET BATCH LOGIC
POCFUL:  LD      HL,SBBTFL       ;CHECK FOR BATCH FULL
         ADD     HL,DE
         LD      A,1FH
         CP      (HL)
         RET     Z               ;RETURN IF FULL
         LD      HL,POCOFF       ;GET LAST POCSAG OFFSET
         ADD     HL,DE
         PUSH    HL              ;SAVE PTR TO ADDRESS
         LD      A,(HL)
         LD      B,8             ;TRY EACH GROUP
TRCPOF:  PUSH    BC              ;SAVE OFFSET
         LD      B,0
         LD      C,A             ;GET LAST OFFSET
```

```
         INC     C          ;NEXT OFFSET
         BIT     3,C        ;CHECK FOR OVERFLOW
         JR      Z,PNTOVR
         RES     3,C        ;BACK TO ZERO
PNTOVR   LD      HL,FULSTA  ;CHECK FOR ALL GROUPS FULL
         ADD     HL,DE
         ADD     HL,BC      ;ADD  GROUP OFFSET
         LD      A,(HL)     ;CHECK FOR ALL FULL
         AND     1FH        ;MASK UNWANTED BITS
         CP      1FH
         JR      Z,POFFCK   ;CHECK NEXT GRP
         LD      A,C        ;CHECK TO SEE IF MT
         LD      HL,POGPMT  ;GET MT BYTE
         ADD     HL,DE
         CALL    MEMCH1
         JR      Z,POFFOK   ;PROCESS IF NOT MT
         LD      A,01       ;SET PGSAG FLAG
         JR      NZ,POFFCK  ;ZERO MEANS NEW PAGE IN
         LD      A,C        ;RESET MT BIT
         LD      HL,POGPMT  ;RESET MT GROUP BIT
         ADD     HL,DE
         CALL    RSTME1
         JR      POFFOK
POFFCK:  LD      A,C        ;GET OLD OFFSET VALUE
         POP     BC         ;GET TO DO CNT
         DJNZ    INCPOF
         POP     HL         ;CHECK EXHAUSTED
         LD      (HL),A     ;GO BACK
         RET
*E

POFFOK   LD      A,C        ;VALID CANDIDATE
         POP     BC         ;HOUSEKEEP
         POP     HL
         LD      B,0
         LD      C,A        ;GET GROUP VALUE
         LD      (OFFSET),BC ;SAVE FOR LATER USE
         SLA     C
         LD      (OFFST2),BC ;SAVE OFFSET X 2
         LD      HL,PNXTG1  ;GET NEXT PAGE
         CALL    CALPTR
         LD      (NXTPAG),BC
         LD      A,00       ;START AT SUBBATCH 1
SUBST1   LD      (SUBNUM),A ;KEEP FOR LATER USE
         LD      HL,GRPCNT  ;CLEAR FLAGS
         LD      (HL),00
         LD      DE,(CHINCR) ;GET CHANNEL OFFSET
         LD      BC,(OFFSET) ;GET PRESENT OFFSET
         LD      HL,FULSTA   ;CHECK FOR SUBBATCH FULL
         ADD     HL,DE      ;ADD CHANNEL OFFSET
         ADD     HL,BC      ;ADD GROUP OFFSET
         CALL    MEMCH1
         JP      NZ,NXTSUB
         PUSH    BC         ;SAVE CHANNEL OFFSET
         LD      C,A        ;ACC HAS SUBBATCH NUMBER
         SLA     C          ;OFFSET X4
         SLA     C
         LD      HL,SBGPOC  ;GET OCCUPIED BYTES
         ADD     HL,DE
         ADD     HL,BC      ;ADD GROUP OFFSET
         POP     BC         ;RESTORE GROUP OFFSET
         PUSH    HL         ;PUT PTR IN IY
         POP     IY
         LD      IX,(NXTPAG) ;GET CURRENT PAG
         LD      A,(IX+GRP) ;GET DISPLAY BYTE NUMBER
         AND     03H
         CP      01         ;CHECK FOR 1 DISPLAY BYTE
         JR      Z,ONEMSK
         CP      02         ;CHECK FOR 2 DISPLAY BYTES
         JR      Z,TWOMSK
         LD      HL,GRPCNT  ;SET NO DISPLAY BIT
         SET     0,(HL)
         LD      HL,PTOMSK  ;GET TONE ONLY MASK
         JR      CHKSVN     ;CHECK FOR LAST GROUP
```

```
ONEMSK:  LD    HL,PD1MSK     ;GET MASK FOR 1 DISPLAY BYTE
         JR    CHKSVN
TWOMSK:  LD    HL,PD2MSK     ;GET MASK FOR 2 DISPALY BYTES
CHKSVN:  ADD   HL,BC         ;ADD GROUP OFFSET
         LD    A,C
         LD    B,(HL)        ;GET MASK
         INC   HL
         LD    C,(HL)
         CP    07            ;CHECK FOR GROUP SEVEN
         JR    NZ,STRCMP     ;PROCESS NORMALLY IF NOT GRP 7
         LD    A,(GRPCNT)
         BIT   0,A
         JR    Z,GRPSVN      ;IF DISPLAY INVOLVED PROCESS SPECIALLY
STRCMP:  LD    L,2           ;TO DO COUNT
STRAGN:  LD    E,(IY)        ;GET OCCUPIED BYTE
         LD    D,(IY+1)
         CALL  CHKOCC        ;CHECK FOR COMPATIBLE BATCH
         JR    NZ,CHKOC1     ;TRY NEXT SLOT
         LD    A,(GRPCNT)
         BIT   0,A           ;CHECK FOR NON DISPLAY
         JP    NZ,MOVPOC
         LD    E,(IY+2)      ;CHECK DISPLAY OCCUPIED
         LD    D,(IY+3)
         CALL  CHKOCC
         JP    Z,MOVPOC      ;JUMP IF OK
CHKOC1:  DEC   L             ;DECREMENT TO DO CNT
         JP    Z,NXTSUB      ;JUMP IF TRY EXHAUSTED
         SRL   B             ;SHIFT MASK OVER
         RR    C
         LD    A,(GRPCNT)    ;SET SECOND TRY BIT
         SET   1,A
         LD    (GRPCNT),A
         JR    STRAGN
;
;       FOLLOWING USED FOR GROUP SEVEN ADDRESSES

GRPSVN:  LD    E,(IY)        ;GET OCCUPIED BYTES
         LD    D,(IY+5)
         LD    A,(IX+GRP)    ;GET DISPLAY BYTES
         AND   03            ;MASK UNWANTED
         CP    02            ;CHECK FOR 2 DISPLAY BYTES
         JR    Z,DISBY2
         CALL  CHKOCC        ;CHECK FOR GROUP OCCUPIED
         JR    NZ,CHKOC2
         LD    E,(IY+2)      ;CHECK DISPLAY OCCUPIED
         LD    D,(IY+7)
         CALL  CHKOCC
         JP    Z,MOVSVN
CHKOC2:  LD    A,(SUBNUM)
         CP    MAXLEN        ;CHECK FOR LAST SUB BATCH
         JR    Z,PNOGUD      ;OUT OF SPACE
         LD    HL,GRPCNT     ;SET SECOND TRY BIT
         SET   1,(HL)
         LD    BC,(LSTMSK)   ;GET MASK
         LD    E,(IY)
         LD    D,(IY+5)      ;GET OCCUPIED BYTES
         CALL  CHKOCC
         JR    NZ,NXTSUB     ;TRY NEXT SUBBATCH
         LD    E,(IY+2)      ;CHECK DISPLAY OCCUPIED
         LD    D,(IY+7)
         CALL  CHKOCC
         JR    Z,MOVSV1      ;MOV TO BATCH
         JR    NXTSUB        ;TRY NEXT BATCH
DISBY2:  LD    A,(SUBNUM)    ;CHECK FOR LAST SUBBATCH
         CP    MAXLEN
         JR    Z,PNOGUD      ;TRY NEXT PAGE
```

```
            LD      E,(IY+2)        ;CHECK DISPLAY OCCUPIED BYTES
            LD      D,(IY+7)
            CALL    CHKOCC
            JR      Z,MOVSV2
            LD      HL,GRPCNT       ;SET SECOND TRY
            SET     1,(HL)
            LD      BC,(LSTMS1)     ;GET SHIFTED MASK
            LD      E,(IY)          ;GET OCCUPIED BYTES
            LD      D,(IY+5)
            CALL    CHKOCC
            JR      NZ,NXTSUB       ;GO TRY NEXT BATCH
            LD      E,(IY+2)        ;GET DISPLAY OCCUPIED BYTES
            LD      D,(IY+7)
            CALL    CHKOCC
            JR      Z,MOVSV2        ;GO MOVE TO BATCH
   NXTSUB:  LD      A,(SUBNUM)      ;GET CURRENT SUBBATCH
            CP      MAXLEN          ;CHECK FOR LAST SUBBATCH
            JR      Z,PNOGUD
            INC     A
            JP      SUBST1          ;GET NEXT SUBBATCH
   PNOGUD:  LD      A,0FFH          ;CANT PUT PAGE IN BATCH
            JR      MOVEXT          ;TRY AGAIN NEXT TIME
   *E

;       FOLLOWING SUBROUTINES WILL MOVE PACSAG PAGES TO BATCH

MOVPOC:  CALL    SETOCC          ;SET OCCUPIED BYTES
   MOVPC2:  LD      BC,(OFFSET)     ;GET CURRENT OFFSET
            LD      A,(SUBNUM)      ;GET CURRENT SUBBATCH
            CALL    GRPSAV          ;CHECK FOR FULL GROUPS
            LD      A,00            ;SET OK FLAG
            JR      MOVEXT
   MOVSVN:  CALL    SETOC2          ;SET OCCUPIED BYTES
            LD      D,(IY+1)
            JR      MOVPC2

MOVSV1:  CALL    SETOC2          ;SET OCCUPIED
            LD      E,(IY)
            LD      D,(IY+1)
            LD      BC,(OFFSET)     ;GET CURRENT OFFSET
            LD      A,(SUBNUM)      ;GET CURRENT SUBBATCH
            CALL    GRPSAV
            LD      D,(IY+5)
            LD      E,(IY+4)        ;CHECK NEXT SUBBATCH
            INC     A
            CALL    SUBSAV          ;CHECK FOR FULL SUBBATCHES
            LD      A,00
            JP      MOVEXT          ;SET OK FLAG AND MOVE

MOVSV2:  CALL    SETOC2          ;SET GROUP SEVEN OCCUPIED
            LD      E,(IY)
            LD      D,(IY+1)
            LD      BC,(OFFSET)     ;GET CURRENT OFFSET
            LD      A,(SUBNUM)
            CALL    GRPSAV
            LD      BC,00           ;MUST BE GROUP 00
            INC     A
            LD      E,(IY+4)        ;GET NEXT OCCUPIED BYTES
            LD      D,(IY+5)
            CALL    GRPSAV
            LD      A,00            ;SET OK FLAG
   *E
   ;       FOLLOWING WILL MOVE PAGE TO BATCH AND DEQUE FROM MAIN BUFFER

MOVEXT:  LD      IX,(NXTPAG)     ;GET CURRENT PAGE
            LD      DE,(CHINCR)
            LD      HL,POCQ         ;GET POCSAG QS
            LD      BC,(OFFST2)     ;GET 2X OFFSET
            ADD     HL,BC
            ADD     HL,BC           ;OFFSET X 4
```

```
             ADD     HL,DE       ;ADD CHANNEL OFFSET
             PUSH    DE          ;SAVE CHANNEL OFFSET
             PUSH    HL
             LD      C,(IX+FTPAG2)    ;SAVE FRONT PTR
             LD      B,(IX+FTPAG1)
             LD      (FTSAVE),BC
             CP      0FFH        ;CHECK FOR INCOMPATIBLE
             JR      Z,PNXTPT         ;GO TO NEXT PAGE
             CALL    POCMOV      ;MOVE FROM MAIN Q TO BATCH
             POP     HL
             PUSH    HL
             CALL    NECDEQ      ;DEQUE PAGE
             CP      0FFH        ;CHECK FOR MT Q
             JR      NZ,PELPG1
             LD      DE,(CHINCR)      ;GET CHANNEL OFFSET
             LD      A,(OFFSET)       ;GET CURRENT GROUP
             LD      HL,POCEMP        ;GET MT Q FLAGS
             ADD     HL,DE
             CALL    SETME1
PELPG1:      CALL    DELPAG      ;DELETE PAGE FROM MAIN Q
PNXTPT:      LD      DE,(FTSAVE)      ;GET FRONT PTR
             LD      HL,00
             CALL    CMP16       ;CHECK FOR ZERO FRONT PAGE
             JR      NZ,NEWFRT        ;GET NEW FRONT PTR
             POP     HL
             LD      BC,02       ;SET TO DO
             INC     HL
             INC     HL
             LD      DE,NXTPAG        ;MOVE TO HOLD AREA
             LDIR
             POP     DE
             LD      HL,POGPMT        ;SET GROUP MT
             ADD     HL,DE
             LD      A,(OFFSET)
             CALL    SETME1
             JR      POCFIN      ;DONE WITH POCSAG
NEWFRT:      LD      (NXTPAG),DE      ;UPDATE NEXT PTR
             POP     HL
             POP     DE          ;GET CHANNEL OFFSET

POCFIN       LD      HL,PNXTG1        ;SAVE NEXT PTR
             CALL    CALOF2
             LD      BC,(NXTPAG)
             LD      (HL),C
             INC     HL
             LD      (HL),B
             LD      HL,POCOFF        ;SAVE LAST OFFSET
             ADD     HL,DE       ;ADD CHANNNEL OFFSET
             LD      (HL),A
             LD      A,(FORMAT)       ;CHECK FOR FORMAT ALL PAGES
             AND     A
             RET     Z           ;IF ZERO
             JP      POCFUL      ;IF NON ZERO KEEP GOING TILL ALL PAGES DONE

;            SUBROUTINES TO SUPPORT ABOVE PROGRAM

GRPSAV:      PUSH    DE          ;SAVE OCCUPIED BYTES
             CALL    CHKGRP      ;CHECK FOR FULL GROUP
             LD      DE,(CHINCR)      ;GET CHANNEL OFFSET
             JR      NZ,SUBFUL
             LD      HL,FULSTA        ;GET FULL STATUS
             ADD     HL,DE       ;GET CHANNEL OFFSET
             ADD     HL,BC       ;GET GROUP OFFSET
             CALL    SETME1
SUBFUL:      PUSH    DE          ;PUT CHANNEL OFFSET IN BC
             POP     BC
             POP     DE          ;GET OCCUPIED BYTES
SUBSAV:      LD      HL,0FFFFH        ;CHECK FOR ALL FULL
             CALL    CMP16
             JR      NZ,SUBOCC
             LD      HL,SBBTFL        ;SET SUBATCH FULL
             ADD     HL,BC       ;BC HAS OFFSET
             CALL    SETME1
```

```
SUBOCC: LD     HL,SBBTOC       ;SHOW SUBBATCH OCCUPIED
        ADD    HL,BC
        CALL   SETME1
        RET
*E

;       POCMOV WILL MOVE PAGE FROM MAIN BUFFER TO BATCH
;

POCMOV: PUSH   DE       ;SAVE CHANNEL OFFSET
        LD     C,4      ;POCSAG PRIORITY
        CALL   UPDTQCNT ;INCREASE CALL CNT
        LD     BC,(OFFST2)
        LD     HL,POCTBL       ;GET TOP OF BUFFER
        ADD    HL,BC    ;ADD GROUP OFFSET
        LD     A,(HL)
        INC    HL
        LD     H,(HL)   ;HL HAS PTR TO BUFFER
        LD     L,A      ;FORM PTR IN HL
        ADD    HL,DE    ;ADD CHANNEL OFFSET
        PUSH   HL
        LD     A,(SUBNUM)      ;GET SUBBATCH NUMBER
        LD     HL,00
        LD     DE,POCLEN       ;GET LENGTH OF BATCH
ADDOFF: CP     00
        JR     Z,DONOFF
        ADD    HL,DE    ;ADD CHANNEL OFFSET
        DEC    A
        JR     ADDOFF   ;ADD OFFSET TILL DONE
DONOFF: EX     HL,DE    ;DE HAS OFFSET
        POP    HL
        ADD    HL,DE    ;ADD SUBBATCH OFFSET
        LD     A,(GRPCNT)      ;CHECK FOR SECOND SLOT
        BIT    1,A
        JR     Z,NOTSEC        ;NOT SECOND SLOT JUMP
        LD     DE,04    ;OFFSET TO SECOND SLOT
        ADD    HL,DE
NOTSEC: EX     HL,DE
        LD     A,(IX+GRP)      ;GET DISPLAY CNT
        PUSH   IX       ;PRESENT PAGE TO HL
        POP    HL
        LD     C,ADDR
        ADD    HL,BC    ;ADD    ADDRESS OFFSET
        AND    03H      ;MASK ALL BUT DISPLAY BYTES
        INC    A        ;ACCOUNT FOR ADDRESS
        SLA    A        ;MULT BY 4 4 BYTES PER WORD
        SLA    A
        LD     C,A
        LDIR            ;MOVE TO BATCH
        POP    DE
        RET
*E

;       POCSAV WILL INITIALIZE BUFFER FOR NEXT BATCH

POCSAV: PUSH   DE       ;SAVE CHANNEL OFFSET
        LD     B,08     ;GET TO DO CNT
        LD     HL,FULSTA       ;RESET FULL STATUS
        ADD    HL,DE
RSTSTA: LD     (HL),00  ;RESET STATUS
        INC    HL
        DJNZ   RSTSTA
        LD     HL,POGPMT       ;SHOW ALL GROUPS MT
        ADD    HL,DE
        LD     (HL),0FFH
        LD     B,16     ;DO 16 TIMES
        LD     HL,PNXTG1       ;ZERO NEXT PAGE
        ADD    HL,DE
POCNXT: LD     (HL),00
        INC    HL
        DJNZ   POCNXT
        LD     B,20     ;RESET OCCUPIED BYTES
```

```
                LD      HL,SBGPOC
                ADD     HL,DE
    GRPNXT: LD  (HL),00
                INC     HL
                DJNZ    GRPNXT
                LD      HL,SBBTOC       ;CLEAR BATCH OCCUPIED
                ADD     HL,DE
                LD      (HL),00
                LD      HL,SBBTFL       ;CLEAR BATCH FULL
                ADD     HL,DE
                LD      (HL),00
                PUSH    DE              ;SAVE CHANNEL OFFSET
                LD      B,40            ;FILL BUFFER WITH IDLE CODE
                LD      HL,POCGP1       ;GET TOP OF BUFFER
                ADD     HL,DE
                EX      HL,DE
    IDLPOC: PUSH    BC
                LD      BC,08
                LD      HL,POCIDL
                LDIR
                POP     BC              ;GET TO DO COUNT
                DJNZ    IDLPOC          ;LOOP TILL FILLED
                POP     DE              ;RESTORE OFFSET
                LD      BC,00           ;GROUP_ZERO
    PEMPGO: LD      A,01            ;INDICATE POCSAG
                CALL    MTCHK
                INC     C               ;NEXT GROUP
                BIT     3,C
                JR      Z,PEMPGO
                POP     DE
                RET
;
;       SETOCC WILL SET OCCUPIED BYTES FOR NON GRP SEVEN ADDRESS

SETOCC: LD      E,(IY)          ;GET FIRST OCCUPIED BYTE
                LD      D,(IY+1)
                CALL    OROCCP          ;OR IN NEW OCCUPIED
                LD      (IY),E           ;SAVE NEW RESULT
                LD      (IY+1),D
                LD      A,(GRPCNT)      ;CHECK FOR DISPLAY
                BIT     0,A
                RET     NZ              ;RETURN IF NO DISPLAY
                SRL     B               ;ROTATE MASK
                RR      C
                LD      E,(IY+2)        ;SAVE AS DISPLAY OCCUPIED
                LD      D,(IY+3)
                CALL    OROCCP
                LD      (IY+3),D
                LD      (IY+2),E
                RET

;       SETOC2 WILL SET OCCUPIED BYTES FOR GRP SVN ADDRESSES

SETOC2: LD      E,(IY)          ;GET OCCUPIED BYTES
                LD      D,(IY+5)
                CALL    OROCCP          ;SET OCCUPIED BITS
                LD      (IY),E
                LD      (IY+5),D
                LD      A,(GRPCNT)
                BIT     0,A
                RET     NZ
                SRL     B               ;SHIFT MASK
                RR      C
                LD      E,(IY+2)
                LD      D,(IY+7)
                CALL    OROCCP          ;SET OCCUPIED
                LD      (IY+2),E
                LD      (IY+7),D
                RET

;       OROCCP WILL SET GROUP OCCUPIED BYTES
```

```
OROCCP: LD      A,D         ;SET GROUP OCCUPIED
        OR      B
        LD      D,A
        LD      A,E
        OR      C
        LD      E,A
        RET
E

;       CHKGRP WILL CHECK FOR FULL GROUPS

CHKGRP: PUSH    HL          ;SAVE POINTERS
        PUSH    BC          ;SAVE GROUP OFFSET
        PUSH    AF
        LD      HL,PD1MSK   ;CHECK FOR GROUP FULL
        ADD     HL,BC
        ADD     HL,BC
        INC     HL
        LD      C,(HL)
        LD      A,D         ;CHECK FOR SUB GROUP FULL
        AND     B
        LD      D,A
        LD      A,E
        AND     C
        LD      E,A
        PUSH    BC
        POP     HL
        POP     AF          ;RESTORE ACC.
        CALL    CMP16
        POP     BC
        POP     HL
        RET

;       CHKOCC WILL CHECK FOR OPEN SPACE IN BATCH

CHKOCC: LD      A,D         ;GET OCCUPIED BYTES
        AND     B           ;CHECK AGAINST MASK
        RET     NZ
        LD      A,E         ;CHECK LS BYTE
        AND     C
        RET

MEMCH1: PUSH    DE          ;SAVE CHANNEL OFFSET
        PUSH    BC
        LD      C,A         ;SAVE ACC
        CALL    BITCAL      ;GET APPROPRIATE MASK
        AND     (HL)
        LD      A,C         ;RESTORE ACC
        POP     BC
        POP     DE          ;RESTORE OFFSET
        RET

SETME1: PUSH    DE          ;SAVE CHANNEL OFFSET
        PUSH    AF          ;SAVE ACC
        CALL    BITCAL      ;GET MASK
        OR      (HL)
        LD      (HL),A
        POP     AF
        POP     DE
        RET
E

RSTME1: PUSH    DE          ;SAVE CHANNEL OFFSET
        PUSH    AF
        CALL    BITCAL      ;GET MASK
        CPL
        AND     (HL)
```

```
           LD      (HL),A
           POP     AF
           POP     DE
           RET

BITCAL:    PUSH    HL              ;SAVE PTR
           LD      D,0             ;FORM OFFSET
           LD      E,A
           LD      HL,PRIMSK       ;GET MASK
           ADD     HL,DE
           LD      A,(HL)
           POP     HL
           RET
*E

PTOMSK:    DEFB    10000000B       ;MASK   FOR FIRST GROUP
           DEFB    00000000B
           DEFB    00100000B       ;SECOND GROUP
           DEFB    00000000B
           DEFB    00001000B       ;THIRD GROUP
           DEFB    00000000B
           DEFB    00000010B       ;FOURTH GROUP
           DEFB    00000000B
           DEFB    00000000B       ;FIFTH GROUP
           DEFB    10000000B
           DEFB    00000000B       ;SIXTH GROUP
           DEFB    00100000B
           DEFB    00000000B       ;SEVENTH GROUP
           DEFB    00001000B
           DEFB    00000000B       ;EIGHTH GROUP
           DEFB    00000010B

PD1MSK:    DEFB    11000000B       ;FIRST GROUP 1 DISPLAY BYTE
           DEFB    00000000B
           DEFB    00110000B       ;SECOND GROUP
           DEFB    00000000B
           DEFB    00001100B       ;THIRD GROUP
           DEFB    00000000B
           DEFB    00000011B       ;FOURTH GROUP
           DEFB    00000000B       ;FIFTH GROUP
           DEFB    00000000B
           DEFB    11000000B
           DEFB    00000000B       ;SIXTH GROUP
           DEFB    00110000B
           DEFB    00000000B       ;SEVENTH GROUP
           DEFB    00001100B
           DEFB    00000000B       ;EIGTH GROUP
           DEFB    00000011B

PD2MSK:    DEFB    11100000B       ;FIRST GROUP
           DEFB    00000000B
           DEFB    00111000B       ;SECOND GROUP
           DEFB    00000000B
           DEFB    00001110B       ;THIRD GROUP
           DEFB    00000000B
           DEFB    00000011B       ;FOURTH GROUP
           DEFB    10000000B
           DEFB    00000000B       ;FIFTH GROUP
           DEFB    11100000B
           DEFB    00000000B       ;SIXTH GROUP
           DEFB    00111000B
           DEFB    00000000B       ;SEVENTH GROUP
           DEFB    00001110B
           DEFB    10000000B       ;EIGTH GROUP
           DEFB    00000011B
*E

LSTMSK:    DEFB    00000001B
           DEFB    10000000B
```

```
            DEFB    11000000B

POCTBL: DEFW    POCGP1    ;START OF POCSAG BATCH
        DEFW    POCGP2
        DEFW    POCGP3
        DEFW    POCGP4
        DEFW    POCGP5
        DEFW    POCGP6
        DEFW    POCGP7
        DEFW    POCGP8

POCIDL: DEFB    5EH       ;POCSAG IDLE CODE
        DEFB    91H
        DEFB    83H
        DEFB    0E9H
        DEFB    5EH
        DEFB    91H
        DEFB    83H
        DEFB    0E9H
        END
;       TRANSMIT MODULE FOR DIGITAL PAGER

EXTERNAL XMTFLG, XMTCNT, XMTPRI
        EXTERNAL GPCNT1, BATPRI
        EXTERNAL INTFST, CMP16, DSBUF1
        EXTERNAL CHINCR, CHLEN
        EXTERNAL XMTRID, BATTIM
        EXTERNAL OUTTBL, KEYTBL, DISTBL
        EXTERNAL POCTBL, SBBTOC, POCGP1, BATPRI
        EXTERNAL MORSE, AIDTBL, GRACNT, GRARPT, SIGNJMP, XAIDTBL
        EXTERNAL NECPAG, POCPAG, FORMAT, AIDTIM, INDCTRS, AIDIND
;
;
;
;       TEST CODE
;
        EXTERNAL TSTTIM
;

GLOBAL TIMINT, SIOTBL, CTCTBL, PRIMSK, DELPAG, XMTBEG, NECDEQ, LDWORD

BFSTR1  EQU     45        ;LOCATION OF DISPLAY DATA PTR IN OUT TBL
BFSTR2  EQU     46
BKPAG2  EQU     06        ;OFFSET TO BACK PTR
BKPAG1  EQU     07        ;OFFSET TO BACK PTR MS
FTPAG2  EQU     08        ;OFFSET TO FRONT PTR LS
FTPAG1  EQU     09        ;OFFSET TO BACK PTR MS
GRP     EQU     00        ;OFFSET TO GROUP COUNT
KEYLEN  EQU     14        ;LENGTH OF TRANMITTER KEY COMMAND
DISLEN  EQU     29        ;LENGTH OF DISPLAY TABLE
GRPCNT  EQU     47        ;LOCATION OF BATCH COUNT IN TABLE
SIOXT1  EQU     90H       ;SIO ADDRESS TRANSMITTER 1
SIOXT2  EQU     92H       ;SIO ADDRESS TRANS. 2
SIOXT3  EQU     94H       ;SIO ADDRESS TRANS. 3
SIOXT4  EQU     96H       ;TRANS 4
SIOXT5  EQU     98H       ;TRANS 5
SIOXT6  EQU     9AH       ;TRANS 6
SIOXT7  EQU     9CH       ;TRANS 7
SIOXT8  EQU     9EH       ;TRANS 8
SIOCT2  EQU     0B1H      ;CTC SIO 2
SIOCT3  EQU     0B6H      ;CTC SIO 3
SIOCT4  EQU     0B5H      ;CTC SIO 4
SIOCT5  EQU     0BAH      ;CTC SIO 5
SIOCT6  EQU     0B9H      ;CTC SIO 6
SIOCT7  EQU     0BEH      ;CTC SIO 7
SIOCT8  EQU     0BDH      ;CTC SIO 8
POCST1  EQU     38        ;OFFSET TO POCSAG POINTER IN INT. DRIVER
POCST2  EQU     39
```

```
PBTCNT  EQU   40          ;OFFSET TO BATCH SIZE IN INT. DRIVER
PDCLEN  EQU   22          ;LENGTH OF DRIVER TABLE
```

*E

```
;THE FOLLOWING ROUTINE WILL CHECK FOR TRANSMITTER BUSY
;CONDITIONS. IT WILL ALSO RESET TIMER COUNTERS AND
;RESET BATCH READY FLAGS AS NEEDED.

XMTBEG: LD    DE,(CHINCR)   ;GET CURRENT CHANNEL OFFSET
        LD    B,0
        LD    HL,XMTPRI     ;GET PRIORITY COUNT
        ADD   HL,DE         ;ADD CHANNEL OFFSET
        BIT   6,(HL)        ;CHECK FOR XMIT BUSY
        RET   NZ            ;RETURN OF XMITTER BUSY
        BIT   3,(HL)        ;CHECK FOR XMIT IN PROGRESS
        JR    Z,NECCHK      ;CHECK FOR NEW BATCH

;
;       CHECK IF AN AUTOID TO BE SENT
;
        LD    HL,INDCTRS    ;POINT TO THE AUTO-ID STATUS INDICATOR
        ADD   HL,DE
        BIT   0,(HL)        ;0 SET MEANS LAST WAS ID
        JR    Z,DSPNXT      ;NOT IT CHECK FOR OTHER BATCHES
        RES   3,(HL)        ;RESET 'SEND-AUTO-ID' IND
        RES   0,(HL)        ;RESET INVERT OVERIDE BIT
        PUSH  HL
        LD    HL,XMTPRI     ;RESTORE ORIGINAL CONDITIONAL BYTE FOR
                            ;ALL OTHER SYSTEM FUNCTIONS.
        ADD   HL,DE
        RES   3,(HL)        ;RESET XMIT IN PROGRESS
        POP   HL

;       INIT NEXT AUTO-ID IF MORE XMITTERS
;
        LD    A,(XMTRID)    ;INTERRUPTING XMITTER ID
        LD    B,A
        LD    A,(XMTCNT)    ;GET XMITTERS IN USE CNT
        CP    B             ;IS IT LAST ONE?
        JP    Z,NECCHK      ;YES, JUMP
        SUB   B             ;DETERMINE XMITTERS REMAINING
        LD    B,A
        LD    IY,AIDIND     ;RAM IND PER XMITTER
        ADD   IY,DE
        LD    DE,(CHLEN)    ;RAM PER XMITTER
STAID:  ADD   IY,DE         ;BUMP TO NEXT XMITTER
        ADD   HL,DE
        LD    A,(IY)
        OR    A             ;CP 0
        JR    NZ,STAID5
        DJNZ  STAID4
STAID5: SET   3,(HL)        ;SET BIT TO START ID
        JP    NECCHK        ;RETURN FORM INTERRUPT
DSPNXT  LD    HL,XMTPRI     ;RESTORE ORIGINAL CONDITIONAL BYTE FOR
                            ;ALL OTHER SYSTEM FUNCTIONS.
        ADD   HL,DE
        BIT   7,(HL)        ;CHECK FOR DISPLAY HOUSEKEEP
        RET   NZ            ;WAIT TILL DONE
        BIT   2,(HL)        ;CHECK FOR POCSAG HOUSEKEEP
        RET   NZ
        RES   3,(HL)        ;RESET XMIT IN PROGRESS
        LD    HL,XMTFLG     ;GET TRANSMIT FLAGS
        ADD   HL,DE         ;ADD CHANNEL OFFSET
        LD    A,0C0H        ;MASK ALL BUT MT BIT
        AND   (HL)
        LD    (HL),A        ;RESTORE NEW BYTE
```

```
;THE FOLLOWING ROUTINES WILL CHECK FOR BATCHES THAT ARE
;READY TO XMIT OR FOR BATCH TIME OUT CONDITIONS
```

```
NECCHK:  LD    DE,(CHINCR)
         LD    HL,INDCTRS      ;STATUS BYTE FOR THE AUTO-ID FUNCTION
         ADD   HL,DE           ;POINT TO THIS CHANNEL'S INDICATOR BYTE
         BIT   3,(HL)          ;IF THREE IS SET, THEN DO AUTO-ID
         JP    NZ,XMTOK        ;IF NO SET, SKIP AUTO-ID AND CONTINUE WITH
NXTNEC:  LD    A,0FFH          ;SET FORMAT EVERYTHING FLAG
         LD    (FORMAT),A
         LD    HL,XMTFLG       ;GET XMITTER STATUS
         ADD   HL,DE           ;ADD CHANNEL OFFSET
         PUSH  HL              ;SAVE XMIT FLAG PTR
         POP   IY              ;SAVE XMIT FLAG PTR IN IY

;
;        CHECK FOR NEC DISPLAY READY
;
DISCHK:  CALL  NECPAG          ;CALL NEC DISPLAY FORMATTING ROUTINE
         BIT   7,(IY)          ;BIT 7 SET MEANS WORK TO DO
         JR    Z,POCCHK        ;NO WORK CHECK FOR POCSAG READY
         SET   1,(IY)          ;SET NEC DISPLAY READY BIT

;
;        CHECK FOR POCSAG READY
;
POCCHK:  CALL  POCPAG          ;CALL POCSAG FORMATTING ROUTINE
         LD    HL,SBBTOC       ;CHECK FOR ANY SUBBATCH OCCUPIED
         ADD   HL,DE
         XOR   A               ;CLEAR ACC
         CP    (HL)            ;CHECK AGAINST SUBBATCH FLAG
         JR    Z,PRICHK        ;IF NONE SET CANT START TRANSMIT
         SET   4,(IY)          ;SET POCSAG READY BIT

;THE FOLLOWING ROUTINE WILL START TRANSMITTING READY BATCHES
;ON A SHARED PRIORITY BASIS.

PRICHK:  XOR   A               ;CLEAR ACC
         LD    A,1FH           ;CHECK FOR BATCH READY
         AND   (IY)            ;CHECK XMIT FLAGS
         RET   Z               ;RETURN IF NONE READY

XMTOK:   LD    HL,XMTPRI       ;SET CHANNEL BUSY
         ADD   HL,DE
         SET   6,(HL)          ;6 IS CHANNEL BUSY
         SET   3,(HL)          ;SET BATCH START

;        FOLLOWING WILL DETERMINE WHICH BATCH IS NEXT TO XMIT
;        ON SHARED BASIS.

LD    HL,INDCTRS      ;XMITTER AUTO-ID STATUS BYTE INDICATOR
         ADD   HL,DE
         BIT   3,(HL)          ;IF SET GO DO AUTO-ID FOR THIS CHANNEL
         JP    NZ,STRTAID
         LD    B,0             ;INITIALIZE
         LD    HL,BATPRI       ;GET LAST PRIORITY USED
         ADD   HL,DE
         LD    C,(HL)
         PUSH  HL              ;SAVE PTR TO BATPRI
         PUSH  DE              ;SAVE CHANNEL OFFSET
         LD    HL,PRIMSK       ;GET PRIORITY MASK
         ADD   HL,BC
         LD    D,(HL)          ;GET MASK TO D
CHKGO:   LD    A,C             ;GET LAST PRIORITY
         OR    A               ;(CP 0), IF ZERO RESET PRIORITY
         JR    NZ,CNTRES
         LD    C,5             ;RESET MASK
```

```
                LD      D,20H           ;RESET MASK BYTE
        CNTRES: SRL     D               ;GO TO NEXT PRIORITY
                DEC     C
                LD      A,D             ;MASK TO ACC
                AND     (IY)            ;CHECK AGAINST BATCHES READY
                JR      Z,CHKGO         ;NO MATCH JUMP TO TRY NEXT BATCH
                POP     DE              ;GET CHANNEL OFFSET
                POP     HL              ;GET BATPRI PTR
                LD      (HL),C          ;SAVE LAST PRIORITY
                BIT     1,A             ;1 IS NEC DISPLAY
                JR      NZ,DISXMT       ;START DISPLAY IF SET
                BIT     4,A             ;CHECK FOR POCSAG
                JP      NZ,POCXMT
                LD      HL,XMTPRI       ;CLEAR CHANNEL
                ADD     HL,DE
                RES     6,(HL)          ;RESET BUSY
                RES     3,(HL)          ;RESET BATCH GOING
                RET                     ;NO MATCH RETURN
        DISXMT: PUSH    DE              ;SAVE CHANNEL OFFSET
                CALL    LODDRV          ;LOAD FIRST PART OF DRIVER TABLE

;       NOTE DE WILL RETURN WITH NEXT ADDRESS OF DRIVER TABLE

LD      HL,DISTBL       ;GET DISPLAY DRIVER TABLE
                LD      BC,DISLEN       ;DISPLAY TABLE LENGTH
                LDIR                    ;MOVE TO OUTPUT TABLE
                POP     DE              ;DE NOW HAS CHANNEL OFFSET
                LD      HL,GPCNT1+3     ;GET PTR TO GROUP CTRS
                ADD     HL,DE           ;ADD CHANNEL OFFSET
                XOR     A               ;(LD A,0), INITIALIZE ACC.
                LD      B,3             ;(LD B,3), SET TO DO COUNT
        BEGCHK: CP      (HL)            ;CHECK FOR ZERO COUNT
                JR      NZ,BEGXMT       ;START XMIT IF NOT ZERO
                DEC     HL              ;GET PREVIOUS GROUP
                DEC     C               ;DECREMENT GROUP COUNT
                DJNZ    BEGCHK          ;LOOP 3 TIMES
        BEGXMT: LD      (IX+GRPCNT),C   ;PUT GROUP COUNT IN OUTPUT TABLE
                LD      HL,XMTPRI       ;GET PRIORITY FLAGS
                ADD     HL,DE           ;ADD CHANNEL OFFSET
                SET     0,(HL)          ;SET DISPLAY BATCH GOING
                LD      HL,DSBUF1       ;LOAD START OF DISPLAY BUFFER
                ADD     HL,DE           ;ADD CHANNEL OFFSET
                LD      (IX+BFSTR1),L   ;PUT BUFFER START IN OUTPUT TABLE
                LD      (IX+BFSTR2),H
                JP      STRXMT          ;START SID GOING

;       FORMAT FOR POCSAG

POCXMT: PUSH    DE              ;SAVE CHANNEL OFFSET
                CALL    LODDRV          ;LOAD FIRST OF DRIVER TABLE
                LD      HL,POCTBL       ;LOAD POCSAG INT. TABLE
                LD      BC,POCLEN       ;TABLE LENGTH
                LDIR                    ;XFER TO OUTPUT AREA
                POP     DE              ;GET CHANNEL OFFSET
                LD      HL,SBBTOC       ;GET OCCUPIED BYTES
                ADD     HL,DE           ;ADD CHANNEL OFFSET
                LD      A,(HL)          ;GET BYTE IN SCRATCHPAD
                LD      B,0             ;INITIALIZE CNT
        CNTBAT: INC     B               ;UPDATE CNT
                SRL     A               ;CHECK EACH BIT
                JR      NZ,CNTBAT       ;LOOP TILL ZERO
                LD      (IX+PBTCNT),B   ;PUT FINAL CNT IN TABLE
                LD      HL,POCGP1       ;GET TOP OF POCSAG BUFFER
                ADD     HL,DE
                LD      (IX+POCST1),L   ;PUT IN DRIVER TABLE
                LD      (IX+POCST2),H
                LD      HL,XMTPRI       ;GET PRIORITY FLAGS
                ADD     HL,DE
                SET     1,(HL)          ;SET POCSAG GOING
                JR      STRXMT          ;START XMIT
```

```
;       SECTION THAT LOADS THE XMITTERS SET TO AUTO ID
;
FILAID  LD      IY,MORSE        ;PT TO MORSE CODE TABLE
        ADD     IY,DE           ;ADD OFFSET TO DESIRED ALPHANUMERIC
        LD      C,(IY)          ;GET CODE BYTE
        LD      A,7             ;CREATE MASK FOR BITS 0-2
        AND     C               ;USE MASK TO GET DOT-DASH CNT TO A-REG
        LD      B,A             ;GET CNT TO B-REG
        LD      A,C             ;USE A-REG FOR SHIFTING
ROTAT:  RLA                     ;LOAD CARRY-FLAG
        JR      C,DASH          ;BIT SET MEANS SEND DASH
DOT:    LD      (IX),17         ;17 = CMD FOR 'DOT'
        JR      NXTELE
DASH:   LD      (IX),18         ;18 = CMD FOR 'DASH'
NXTELE: DEC     B
        RET     Z
        INC     IX              ;NEXT LOC IN TABLE
        LD      (IX),19         ;CMD FOR INTER-ELEMENT GAP
        INC     IX              ;NEXT LOC
        JR      ROTAT           ;CONTINUE
;
; HL = PTR TO 'WORD'
; IX = NEXT LOC IN OUTPUT TABLE
; RTN ALSO USES BC,DE
LDWORD  LD      C,(HL)          ;GET 'WORD' LENGTH
FILCHAR: INC    HL              ;PT TO NEXT ALPHANUMERIC OFFSET
        LD      D,0
        LD      E,(HL)          ;GET OFFSET TO NEXT ALPHANUMERIC OFFSET
        PUSH    BC              ;SAVE
        CALL    FILAID          ;LOAD DOTS AND DASHES FOR THIS CHAR
        POP     BC              ;RESTORE CHAR CNT
        DEC     C               ;REDUCE CHAR CNT
        RET     Z
        INC     IX              ;NEXT TABLE LOC
        LD      (IX),20         ;CMD FOR INTER-CHARACTER GAP
        INC     IX
        JR      FILCHAR         ;CONTINUE
;
;ROUTINE TO BUILD XMITTER PORTION OF 'AIDTBL' AND START TRANSMISSION
;
STRTAID:        PUSH    DE              ;SAVE CHANNEL OFFSET
        CALL    LODDRV          ;INITIALZE SIO CTC
        LD      HL,AIDTBL       ;PT TO AUTO-ID TABLE
        LD      (HL),1          ;CMD OFFSET FOR TOP OF TABLE
        LD      HL,GRACNT       ;PT TO ACTIVE AUTO-ID REPEAT CNT
        LD      A,(GRARPT)      ;GET PRE-SET REPEAT CNT
        LD      (HL),A          ;INIT DWN CNTR TO PRE-SET VALUE
        LD      A,(XMTRID)      ;XMITTER ID (1-16)
        DEC     A               ;MAKE RELATIVE TO ZERO
        ADD     A,A             ;MULT BY 2
        LD      D,0
        LD      E,A             ;OFFSET NOT IN DE
        LD      HL,SIGNJMP      ;PT TO JUMP TABLE FOR CALL SIGNS
        ADD     HL,DE           ;ADD OFFSET
        LD      E,(HL)          ;LSB OF PTR TO CALL-SIGN 'WORD'
        INC     HL
        LD      D,(HL)          ;MSB OF PTR
        EX      DE,HL           ;HL NOW PTS TO 'WORD'
        LD      IX,XAIDTBL      ;PTR TO XMITTER PORTION OF OUTPUT TABLE
        CALL    LDWORD          ;LOAD WORD INTO TABLE
        INC     IX              ;NEXT TABLE LOC
        LD      (IX),22         ;LAST CMD IN TABLE INDICATOR
        POP     DE              ;GET CHANNEL OFFSET
        LD      HL,INDCTRS      ;SET INVERT OVERIDE BIT
        ADD     HL,DE           ;ADD CAHNNEL OFFSET
        SET     0,(HL)
STRXMT: LD      B,0
        LD      A,(XMTRID)      ;GET CURRENT XMITTER
        DEC     A               ;MAKE RELATIVE TO ZERO
        LD      C,A
        LD      HL,SIOTBL       ;SIO ADDRESS TABLE
        ADD     HL,BC           ;OFFSET TO SIO ADDRESS
        LD      C,(HL)          ;LOAD SIO AS PORT ADDRESS
        OUT     (C),B           ;OUTPUT 00
```

```
        INC     C           ;CONTROL PORT
        LD      A,05        ;REG 5
        OUT     (C),A       ;OUT TO SIO
        LD      A,0EAH
        OUT     (C),A
        RET
*E

DELPAG  LD      A,0
        LD      (IX),A      ;ZERO FIRST BYTE OF PAGE (MEANS LOC NOW FREE)
*E

;SUBRTN TO REMOVE PAGE FROM PTR Q'S OF THIS CHANNEL

NECDEQ: LD      (INTFST),HL ;SAVE PTR TO 'FIRST'
        LD      C,(HL)      ;'FIRST' TO BC
        INC     HL
        LD      B,(HL)
        INC     HL          ;'LAST' TO DE
        LD      E,(HL)
        INC     HL
        LD      D,(HL)
        PUSH    BC
        POP     HL          ;'FIRST' TO HL
        CALL    CMP16       ;IS 'FIRST' = 'LAST'?
        JR      NZ,CKLAST   ;NO, JUMP
;PAGE IS ONLY ONE IN THIS Q
        LD      HL,(INTFST) ;GET PTR TO 'FIRST'
        LD      (HL),0      ;ZERO 'FIRST'
        INC     HL
        LD      (HL),0
        INC     HL          ;ZERO LAST
        LD      (HL),0
        INC     HL
        LD      (HL),0
        OR      0FFH        ;SHOW Q IS MT
        RET                 ;RETURN TO MAIN PROGRAM

;DETERMINE IF THIS PAGE IS THE LAST ONE IN THIS Q

CKLAST: PUSH    IX          ;PAGE-IN-USE TO HL, 'LAST' ALREADY IN DE
        POP     HL
        CALL    CMP16       ;'PAGE-IN-USE' = 'LAST'?
        JR      NZ,CKFST    ;NO, JUMP
*E

;PAGE IS LAST PAGE IN QUEUE

LD      BC,BKPAG2   ;OFFSET TO 'BACK' IN PAGE
        ADD     HL,BC       ;'PAGE-IN-USE' WAS IN HL
        LD      E,(HL)      ;GET 'BACK' FROM PAGE TO DE
        INC     HL
        LD      D,(HL)
        LD      HL,(INTFST) ;PTR TO 'FIRST'
        INC     HL          ;PT TO 'LAST'
        INC     HL
        LD      (HL),E      ;'BACK' MOVED TO 'LAST'
        INC     HL
        LD      (HL),D
        PUSH    DE
        POP     IY
        LD      (IY+FTPAG0),0  ;LOAD 'FRONT' WITH 00
        LD      (IY+FTPAG1),0
        RET
;DETERMINE IF PAGE IS FIRST ONE IN QUEUE
CKFST:  PUSH    BC          ;'FIRST' FROM BC TO DE
        POP     DE
```

```
        JR      NZ,INMID        ;NO, JUMP
        LD      DE,FTPAG2       ;'FRONT' FROM PAGE IN USE TO DE
        ADD     HL,DE
        LD      E,(HL)
        INC     HL
        LD      D,(HL)
        LD      HL,(INTFST)     ;PUT PTR AT 'FIRST'
        LD      (HL),E
        INC     HL
        LD      (HL),D
        PUSH    DE              ;PTR TO NEXT PAGE FROM DE TO IY
        POP     IY
        LD      (IY+BKPAG2),0   ;SET 'BACK' FOR NEW PAGE TO ZERO
        LD      (IY+BKPAG1),0
        RET

; PAGE IS NOT FIRST OR LAST IN Q. MUST BE REMOVED FROM WITHIN THE QUEUE

INMID:  LD      C,(IX+FTPAG2)   ;'FRONT' FROM PAGE-IN-USE TO BC
        LD      B,(IX+FTPAG1)
        LD      E,(IX+BKPAG2)   ;'BACK' FROM PAGE-IN-USE TO DE
        LD      D,(IX+BKPAG1)
        PUSH    DE
        POP     IY
        LD      (IY+FTPAG2),C   ;GO TO 'BACK' AND POINT TO 'NEXT'
        LD      (IY+FTPAG1),B
        PUSH    BC              ;PTR TO 'FRONT' INTO IY
        POP     IY
        LD      (IY+BKPAG2),E   ;GO TO 'NEXT' AND POINT TO 'BACK'
        LD      (IY+BKPAG1),D
        RET
*E

PRIMSK: DEFB   00000001B        ;MASK BITS FOR PRIORITY ROUTINE
        DEFB   00000010B
        DEFB   00000100B
        DEFB   00001000B
        DEFB   00010000B
        DEFB   00100000B
        DEFB   01000000B
        DEFB   10000000B

*E

;       LODDRV WILL SET UP SIO CTC AND LOAD FIRST PART OF DRIVER
;       TABLE.

;INITIALIZE SIO CTC

LODDRV: LD     B,0
        LD     A,(XMTRID)       ;GET CURRENT TRANSMITTER
        LD     C,A
        DEC    C                ;MAKE RELATIVE TO ZERO
        LD     HL,CTCTBL        ;GET CTC ADDRESS
        ADD    HL,BC            ;ADD XMITTER OFFSET
        LD     C,(HL)           ;GET ADDRESS
        LD     B,01010111B      ;COUNTER MODE 1200 BAUD
        OUT    (C),B
        LD     B,32             ;SET 416 MICRO SEC PERIOD
        OUT    (C),B            ;1200 BAUD
        LD     HL,OUTTBL        ;GET OUTPUT TABLE START ADDRESS
        ADD    HL,DE            ;ADD CHANNEL OFFSET
        PUSH   HL
```

```
            POP     IX              ;IX NOW HAS TOP OF TABLE
            LD      BC,07           ;SET OFFSET TO START FILL
            LD      (HL),C          ;INITIALIZE TABLE OFFSET
            LD      (IX+1),05       ;INITIALIZE XFER COUNT
            LD      (IX+6),00       ;INITIALIZE OFFSET
            ADD     HL,BC           ;ADD OFFSET
            EX      DE,HL           ;DE NOW HAS DESTINATION
            LD      HL,KEYTBL       ;GET TX KEY TABLE
            LD      BC,KEYLEN       ;LENGTH OF TABLE
            LDIR                    ;MOVE TO OUTPUT TABLE
            RET
E

; FOLLOWING IS A TABLE OF ADDRESS FOR SIOS

SIOTBL:     DEFB    SIOXT1          ;ADDRESS OF FIRST XMITTER ID
            DEFB    SIOXT2          ;ADDRESS OF SEC ID
            DEFB    SIOXT3
            DEFB    SIOXT4
            DEFB    SIOXT5
            DEFB    SIOXT6
            DEFB    SIOXT7
            DEFB    SIOXT8

CTCTBL:     DEFB    SIOCT1          ;FIRST XMITTER SIO'S CTC
            DEFB    SIOCT2
            DEFB    SIOCT3
            DEFB    SIOCT4
            DEFB    SIOCT5
            DEFB    SIOCT6
            DEFB    SIOCT7
            DEFB    SIOCT8
E

;           TIMER INTERUPT ROUTINE

TIMINT:     EX      AF,AF'          ;SAVE ACCUMULATOR
            EXX                     ;SAVE ALL REGISTERS
            LD      DE,00           ;INITIALIZE OFFSET
            LD      A,(XMTCNT)      ;GET TRANSMITTER COUNT
            LD      B,A
            LD      HL,BATTIM       ;GET SOFTWARE COUNTER
            DEC     (HL)            ;DECREMENT COUNT
            JP      NZ,BATCHK       ;JUMP IF NOT TIMED OUT
            LD      A,OFFH          ;SET TIME OUT FLAG
            LD      (HL),30         ;RESET TIME OUT 3 SEC
BATCHK:     PUSH    BC              ;SAVE TO DO COUNT
            CP      OFFH            ;CHECK FOR TIME OUT
            JR      NZ,TSTCOD
            LD      C,1             ;ONE TYPE OF BATCH
            LD      HL,AIDTIM       ;GET TIMER CTR
TIMC:       BIT     7,(HL)          ;CHECK FOR TIME OUT
            JR      NZ,TIMB         ;GO ON IF TIMED OUT
            DEC     (HL)            ;REDUCE COUNT
            JR      NZ,TIMB         ;LOOP IF NOT OUT
            SET     7,(HL)          ;SET TIME OUT BIT
TIMB:       INC     HL              ;GO TO NEXT BATCH TYPE
            DJNZ    TIMC
;
;           TEST CODE
;

TSTCOD:     LD      HL,TSTTIM
            BIT     7,(HL)
            JR      NZ,XMTLUP
            DEC     (HL)
            JR      NZ,XMTLUP
            SET     7,(HL)
```

; INSERT FINE TIMERS HERE *********************

```
XMTLUP:  LD    HL,(CHLEN)    ;GET CHANNEL OFFSET
         ADD   HL,DE         ;BUMP UP TO NEXT XMITTER
         EX    HL,DE
         POP   BC            ;GET TO DO COUNT
         DJNZ  BATCHK        ;LOOP TILL ALL XMITTERS DONE
         EXX
         EX    AF,AF'
         EI
         RETI
;
;
;
         END
;   INTERRUPT DRIVER ROUTINES FOR DIGITAL OUTPUT

EXTERNAL  XMTINT,SIOADR,CHLEN,INTDE,SWAP,BATPRI,INTIDC
         EXTERNAL  XMTPRI,AIDTBL,CTCTBL
         EXTERNAL  QRACNT,AIDWRM,OUTTBL,INDCTRS

GLOBAL   XO1INT,XO2INT,XO3INT,XO4INT,XO5INT,XO6INT,XO7INT,XO8INT
         GLOBAL   CALJMP

SIOXT1   EQU   90H    ;SIO ADDRESS TRANSMITTER 1
SIOXT2   EQU   92H    ;SIO ADDRESS TRANSMITTER 2
SIOXT3   EQU   94H    ;SIO ADDRESS TRANSMITTER 3
SIOXT4   EQU   96H    ;SIO ADDRESS TRANSMITTER 4
SIOXT5   EQU   98H    ;SIO ADDRESS TRANSMITTER 5
SIOXT6   EQU   9AH    ;SIO ADDRESS TRANSMITTER 6
SIOXT7   EQU   9CH    ;SIO ADDRESS TRANSMITTER 7
SIOXT8   EQU   9EH    ;SIO ADDRESS TRANSMITTER 8
INVPRT   EQU   8H     ;DIP SWITCH PORT FOR INVERT CONTROL

XO1INT:  EX    AF,AF'    ;SAVE FLAGS AND ACC.
         EXX             ;SAVE ALL OTHER REGISTERS
         LD    A,1       ;CHANNEL ID
         LD    C,SIOXT1  ;LOAD SIO ADDRESS
         JP    XINTR     ;PROCESS INTERRRUPT
XO2INT:  EX    AF,AF'
         EXX
         LD    A,2
         LD    C,SIOXT2
         JP    XINTR
XO3INT:  EX    AF,AF'
         EXX
         LD    A,3
         LD    C,SIOXT3
         JP    XINTR
XO4INT:  EX    AF,AF'
         EXX
         LD    A,4
         LD    C,SIOXT4
         JP    XINTR
XO5INT:  EX    AF,AF'
         EXX
         LD    A,5
         LD    C,SIOXT5
         JP    XINTR
XO6INT:  EX    AF,AF'
         EXX
         LD    A,6
         LD    C,SIOXT6
```

```
              JP      XINTR
    X07INT:   EX      AF,AF'
              EXX
              LD      A,7
              LD      C,SIOXT7
              JP      XINTR
    X08INT:   EX      AF,AF'
              EXX
              LD      A,8
              LD      C,SIOXT8
    XINTR:    PUSH    IX          ;SAVE IX AND IY REGISTER
              PUSH    IY
              LD      (XMTINT),A  ;SAVE XMITTER ID
              LD      B,A         ;USE A TO CALCULATE RAM
              LD      A,C         ;MOVE SIOADR TO ACC
              LD      (SIOADR),A  ;SAVE SIO ADDRESS
              LD      HL,0        ;BASE OFFSET FOR CHANNEL
              LD      DE,(CHLEN)  ;LENGTH OF RAM/CHANNEL
    DECBR:    DEC     B           ;LOOK FOR CHANNEL
              JR      Z,GOTCHA    ;IF ZERO CHANNEL FOUND
              ADD     HL,DE       ;ADD CHANNEL OFFSET
              JR      DECBR       ;LOOP TILL CHANNEL FOUND
    GOTCHA:   EX      HL,DE       ;CHANNEL OFFSET TO DE
              LD      (INTDE),DE  ;SAVE OFFSET
              LD      HL,INDCTRS  ;CHECK FOR ID IN PROCESS
              ADD     HL,DE
              BIT     0,(HL)      ;0 SET MEANS IN PROGRESS
              JR      Z,NOTIDT    ;NOT SET LOAD REGULAR TABLE
              LD      HL,AIDTBL   ;LOAD AUTO ID DRIVER TABLE
              JR      GETOFF
    NOTIDT:   LD      HL,OUTTBL   ;POINT TO OUTPUT TBL
              ADD     HL,DE       ;ADD CHANNEL OFFSET
    GETOFF:   LD      A,(HL)      ;GET OFFSET
              LD      B,0
              LD      C,A         ;MOVE OFFSET TO BC
              PUSH    HL
              POP     IY          ;IY NOW POINTS TO CMD
              LD      A,(HL)      ;COMMAND TO ACC.
              DEC     A           ;MAKE COMMAND RELATIVE TO ZERO
              LD      HL,CMDJMP   ;CALCULATE JUMP VECTOR
              CALL    CALJMP
              JP      (HL)        ;JUMP TO COMMAND
    *E

;    START OF INTERRUPT TABLE COMMANDS

CMD1:     CALL    ROMLOD      ;LOAD STARTING PARAMETERS
    CMD2:     CALL    ROMPTR      ;GET BYTE FOR XFER
              JR      Z,LSTBYT    ;IF LAST BYTE ACC WILL BE ZERO
              CALL    XMITA       ;SEND 8 BITS
              JP      RETRN       ;RETURN FROM INTERRUPT
    LSTBYT:   CALL    LSTXMT      ;TRANSMIT LAST BYTE
              CALL    BMPOFF      ;INCREMENT OFFSET
              DEC     (IX+4)      ;DECREMENT REPEAT COUNT
              JR      Z,NXTCMD    ;JUMP IF LAST BYTE WAS SENT
    REPCMD:   LD      A,(IX-1)    ;IX POINTS TO TOP OF SAVE AREA
              SUB     06          ;GO BACK TO LAST COMMAND
              LD      (IX-1),A    ;RESTORE NEW OFFSET
              LD      (IX),02     ;RESET COUNT FOR NXT TIME
              JP      RETRN       ;RETURN FROM INTERRUPT
    NXTCMD:   INC     (IX-1)      ;OFFSET TO NEXT COMMAND
              CALL    RSTSAV      ;RESET SAVE AREA
              JP      RETRN       ;RETURN FROM INTERRUPT
    *E

CMD5:     CALL    ROMPTR      ;LOAD BYTE FOR XMIT
              JR      Z,LSTC      ;JUMP IF LAST BYTE
              CALL    XMITA       ;TRANSMIT 8 BITS
              JP      RETRN
    LSTC:     CALL    LSTXMT      ;TRANSMIT LAST BYTE
              DEC     (IX+4)      ;DECREMENT REPEAT COUNT
```

```
            JR      Z,STPXMT        ;GO STOP XMITTER
            LD      A,(IX-1)        ;POINT TO TOP OF SAVE AREA
            SUB     06              ;OFFSET TO LAST CMD
            LD      (IX-1),A        ;SAVE NEW OFFSET
            LD      (IX),02         ;RESET COUNT FOR NEXT TIME
            JP      RETRN
STPXMT:     LD      (IX),02         ;SET UP DUMMY BYTE CNT
            INC     (IX-1)          ;OFFSET TO NEXT COMMAND
            JP      RETRN
*E

CMD6:       CALL    ROMPTR          ;LOAD BYTE FOR XMIT
            JR      Z,LSTB          ;JUMP IF LAST BYTE
            LD      A,B
            CALL    SWAP            ;SWAP BIT POSITIONS OF BYTE
            LD      B,A
            CALL    XMIT8           ;TRANSMIT 8 BITS
            JP      RETRN           ;RETURN FROM INTERRUPT
LSTB:       LD      A,B             ;SWAP BIT POSITIONS
            CALL    SWAP            ;SWAP BIT POSITIONS
            LD      B,A             ;PUT SWAP RESULT IN B
            CALL    LSTXMT          ;TRANSMIT LAST BYTE
            DEC     (IY-1)          ;DECREMENT GROUP COUNT
            JR      Z,ENDBAT        ;JUMP IF DONE WITH BATCH
            CALL    RSTSAV          ;RESET SAVE AREA
            SUB     13              ;GO BACK 1 CMD
            LD      (IX-1),A        ;POINT TO GROUP SELECT CMD
            LD      L,(IX+2)        ;GET LO BYTE OF PTR
            LD      H,(IX+3)        ;GET HI BYTE OF PTR
            LD      BC,80           ;OFFSET TO NEXT BUFFER
            ADD     HL,BC           ;POINT TO NEXT BUFFER
            LD      (IY-3),L        ;LOAD NEW PTR
            LD      (IY-2),H
            JP      RETRN
ENDBAT:     LD      HL,XMTPRI       ;GET TRANSMITTER FLAGS
            ADD     HL,DE           ;ADD CHANNEL OFFSET
            RES     0,(HL)          ;RESET DISPLAY BATCH START
            SET     7,(HL)          ;SET RESET DISPLAY BATCH BIT
            JR      STPXMT          ;STOP XMITTER
*E

CMD7:       LD      HL,OUTTBL+1     ;GET PTR TO OUTPUT TBL
            ADD     HL,DE
            DEC     (HL)            ;REDUCE BYTE COUNT
            JR      Z,LSTCMD        ;JUMP IF LAST BYTE
            LD      B,00            ;XMIT 00
            CALL    XMIT8           ;TRANSMIT 8BITS
            JP      RETRN
LSTCMD:     LD      A,(SIOADR)      ;GET INTERRUPTING SIO
            LD      C,A             ;GET PORT ADDRESS
            INC     C               ;POINT TO CONTROL
            LD      A,00101000B     ;RESET INTERRUPT PENDING
            OUT     (C),A
            LD      A,05            ;WR REG 5
            OUT     (C),A
            LD      A,01100000B     ;DISABLE XMITTER, RESET MODEM
            OUT     (C),A
            LD      HL,XMTPRI       ;RESET CHANNEL BUSY
            ADD     HL,DE
            RES     6,(HL)
            JP      RETRN
*E

;       SIO BAUD RATE CHANGE COMMAND

CMD8:       CALL    ROMPTR          ;GET NEXT BYTE TO TRANSFER
```

```
            JR       Z,LSTD     ;CHANGE BAUD RATE IF LAST BYTE
            CALL     XMITA      ;SEND 8 BITS
            JP       RETRN      ;RETURN FROM INTERRUPT
LSTD:       CALL     LSTXMT     ;TRANSMIT LAST BYTE
            PUSH     DE         ;SAVE CHANNEL OFFSET
            LD       D,0
            LD       A,(XMTINT) ;GET INTERRUPTING XMITTER #
            LD       E,A
            DEC      E          ;MAKE RELATIVE TO ZERO
            LD       HL,CTCTBL  ;GET START OF SIO'S CTC TABLE
            ADD      HL,DE      ;ADD OFFSET
            LD       C,(HL)     ;GET CTC ADDRESS
            POP      DE         ;GET CHANNEL OFFSET
            LD       B,01010111B ;LOAD CHANNEL CONTROL WORD
                                ;NO INT COUNTER MODE X 32
                                ;NOTE CTC MUST BE SET AT 2X FINAL BAUD RATE
            LD       HL,BATPRI  ;GET LAST PRIORITY
            ADD      HL,DE
            LD       A,(HL)     ;CHECK FOR POCSAG PRIORITY

JR       NZ,NECSTR  ;IF MATCH START POCSAG
POCSTR:     OUT      (C),B      ;OUT TO SIO
            LD       B,75       ;512 BAUD RATE .406 X 32 X 75 /2 MSECS
            OUT      (C),B      ;OUT TO SIO
            JR       TIMCHG     ;CONTINUE INT. ROUTINE
NECSTR:     OUT      (C),B      ;OUT TO SIO
            LD       B,192      ;.406 X 32 X 192 / 2 USECS 200 BAUD TO SIO
            OUT      (C),B
TIMCHG:     INC      (IX-1)     ;GO TO NEXT COMMAND
            CALL     RSTSAV
            JP       RETRN
*E

;           START OF DISPLAY BATCH DATA

CMD9:       CALL     ROMLOD     ;GET DISPLAY BATCH PARAMETERS
            JP       CMD6       ;PROCESS BATCH

;           START POCSAG BATCH DATA

CMD10:      CALL     ROMLOD     ;LOAD INITIAL CONDITIONS
CMD11:      CALL     ROMPTR     ;LOAD BYTE FOR XMIT
            JR       Z,LSTE     ;ZERO INDICATES LAST BYTE
            CALL     XMITB      ;TRANSMIT 8 BITS
            JP       RETRN      ;RETURN FROM INTTERUPT
LSTE:       CALL     LSTXMT     ;TRANSMIT LAST BYTE
            DEC      (IY-1)     ;DECREMENT XMIT CNT
            JR       Z,ENDPOC   ;IF ZERO DONE WITH POCSAG
            CALL     RSTSAV     ;RESET PARAMETER AREA
            LD       A,(IX-1)   ;GET OFFSET
            SUB      13         ;GO BACK ONE CMD
            LD       (IX-1),A
            LD       L,(IX+2)   ;GET LO BYTE OF NXT PTE
            LD       H,(IX+3)   ;GET HI BYTE OF NXT PTR
            LD       BC,64      ;GO TO NEXT BATCH
            ADD      HL,BC      ;POINT TO NEXT BUFFER
            LD       (IY-3),L   ;LOAD NEW PTR
            LD       (IY-2),H
            JP       RETRN      ;RETURN FROM INTTERUPT
ENDPOC:     LD       HL,XMTPRI  ;GET XMITTER FLAGS
            ADD      HL,DE
            RES      1,(HL)     ;SET HOUSEKEEP FLAG
            SET      2,(HL)
            JP       STRXMT     ;RESET XMITTER
*E
;           COMMANDS 17 THROUGH 24 ARE USED AS DRIVER CODE
;           FOR THE DOT, DASH, INTER-ELEMENT, INTER-CHARAC-
;           TER, AND INTER-WORD GAPS.
;
CMD17:      LD       B,6        ;TIMER COUNT TO SEND 'DOT'
```

```
        CALL    CHKAI1          ;SET UP AID COUNTER
        JR      SNDELE          ;SECTION TO OUTPUT 'DOT' BIT PATTERN

CMD18:  LD      B,18            ;TIMER COUNT TO SEND 'DASH'
        CALL    CHKAI1          ;SET UP AID CTR
        JR      SNDELE          ;SAME AS ABOVE

CMD19:  LD      B,6             ;TIMER COUNT TO SEND INTER-ELEMENT GAP
        CALL    CHKAI1          ;SET UP AID CTR
        JR      SNDGAP          ;SECTION TO OUTPUT GAP TO DISTINGUISH 'DOTS'
                                ;AND 'DASHES'
CMD20:  LD      B,18            ;TIMER COUNT TO SEND INTER-CHARACTER GAP
        CALL    CHKAI1          ;A ONE/ZERO PATTERN IS SENT, BUT AT AN IN-
        JR      SNDGAP          ;AUDIBLE BAUD RATE.

CMD21:  LD      B,30            ;TIMER COUNT TO SEND INTER-WORD GAP
        CALL    CHKAI1          ;PATTERN SENT AT INAUDIBLE RATE SAME AS
        JR      SNDGAP          ;CHARACTER GAP.
CMD22:  LD      A,(QRACNT)      ;AUTO-ID XMIT CNT
        DEC     A
        LD      (QRACNT),A      ;UPDATE IT
        OR      A               ;(CP 0), THRU REPEATING?
        JP      Z,LSTCMD        ;YES, STOP
        LD      HL,AIDTBL       ;POINT TO TOP OF OUTPUT TABLE
        LD      (HL),1          ;CMD OFFSET (TO BE UPDATED BY CMD13)
        JP      RETRN           ;SEND INTER-WORD GAP

;
CMD23:  LD      A,(AIDWRM)      ;WARM UP CMD
        LD      B,A
        CALL    CHKAI1          ;SET UP COUNTER
        JR      SNDGAP

;
SNDELE: LD      B,0AAH          ;XMITTED BIT PATTERN FOR 'DOT','DASH',AND GAPS
        JR      BAUDOUT         ;SECTION TO OUTPUT BIT PATTERN
SNDGAP: LD      B,00H           ;XMITTED BIT PATTERN FOR INTER-ELEMENT GAP
;

;
BAUDOUT: LD     HL,INTIDC       ;DEC ID COUNTER
        DEC     (HL)
        CALL    XMIT8           ;TRANSMIT BYTE
        JP      RETRN
*E

;
;       CHKAI1 WILL CHECK INTIDC COUNTER IF IT IS ZERO ON ENTRY IT MUST
;       BE INITIALIZED IF IT IS 1 DRIVER OFFSET IS UPDATED TO GO TO NEXT
;       COMMAND. ALSO IF ZERO BAUD RATE WILL BE SET TO 1200 BAUD
;
CHKAI1: LD      A,(INTIDC)      ;CHECK FOR COUNT
        AND     A               ;CHECK FOR 00
        JR      NZ,CHKFIN       ;CHECK FOR CNT TO BE 01
        LD      A,B             ;GET INITIAL CNT
        LD      (INTIDC),A
        RET
CHKFIN: CP      01              ;CHECK FOR LAST CNT
        RET     NZ
        LD      HL,AIDTBL       ;BUMP OFFSET
        INC     (HL)
        RET

;
RETRN:  EXX                     ;GET ORIGINAL REGISTERS
        EX      AF,AF'          ;RESTORE FLAGS AND ACC
        POP     IY              ;RESTORE IY AND IX
        POP     IX
        CALL    RETIA           ;RESTORE INTERRUPT CHAIN
        EI
RETIA:  RETI                    ;RETURN FROM INTERRUPT
*E

*;     FOLLOWING SUBROUTINES USED BY INTERRUPT DRIVER
```

```
; FOLLOWING SUBROUTINE WILL GET NEXT BYTE TO BE SENT
; AND WILL CHECK FOR LAST BYTE. BYTE TO BE SENT IS
; IN B REG. AND A ZERO FLAG WILL BE RETURNED IF IT
; IS THE LAST BYTE

ROMPTR:  LD    B,0
         LD    HL,OUTTBL+1    ;POINT TO SAVE AREA
         ADD   HL,DE          ;ADD CHANNEL OFFSET
         PUSH  HL
         POP   IX             ;IX NOW POINTS TO SAVE AREA
         LD    L,(IX+2)       ;GET LSB OF NXT BYT PTR
         LD    H,(IX+3)       ;GET MSB
         LD    C,(IX+5)       ;GET OFFSET TO TRANSMIT BYTE
         ADD   HL,BC          ;ADD OFFSET TO BASE
         LD    B,(HL)         ;GET BYTE TO BE XMITTED
         LD    A,(IX)         ;GET BYTE COUNT
         CP    01             ;LAST BYTE ?
         RET                  ;RETURN ZERO IF LAST BYTE

; FOLLOWING SUBROUTINE WILL LOAD INTIAL CONDITIONS
; FOR TRANSFERRING DATA TO THE SIO.

ROMLOD:  PUSH  DE             ;SAVE CHANNEL OFFSET
         LD    B,0
         LD    HL,OUTTBL+1    ;POINT TO SAVE AREA
         ADD   HL,DE          ;ADD CHANNEL OFFSET
         LD    C,(HL)         ;LOAD XFER CNT
         EX    DE,HL          ;DE POINTS TO SAVE AREA
         PUSH  IY             ;IY HAS PTR TO PARAMETERS
         POP   HL             ;PUT IN HL
         INC   HL             ;POINT TO PARAMETERS
         PUSH  DE             ;SAVE TABLE START
         LDIR                 ;MOVE PARAMETERS
         POP   IX             ;GET PTR TO SCRATCH AREA
         LD    A,(IX-1)       ;GET OFFSET
         ADD   A,06           ;POINT TO NEXT CMD
         LD    (IX-1),A       ;RESTORE OFFSET
         POP   DE             ;RESTORE CHANNEL OFFSET
         RET

; FOLLOWING SUBROUTINE WILL TRANSMIT 8 BITS AND DECREMENT
; BYTE COUNT

XMITA:   CALL  XMIT8          ;TRANSMIT 8 BITS************
         DEC   (IX)           ;DECREMENT BYTE COUNT
BMPOFF:  LD    A,(IX+5)       ;GET OFFSET
         CP    07             ;MAX BYTES PER TABLE
         JR    NZ,OFFBMP      ;BUMP TO NEXT VALUE IF NOT AT LIMIT
RESOFF:  LD    A,0FFH         ;RESET OFFSET
OFFBMP:  INC   A              ;BUMP UP OFFSET
         LD    (IX+5),A       ;RESTORE OFFSET
         RET

; FOLLOWING SUBROUTINE WILL XMIT 8 BITS BUT WILL NOT RESET
; POINTER OFFSET

DEC   (IX)           ;DECREMENT BYTE COUNT
         INC   (IX+5)         ;INCREMENT PTR OFFSET
         RET

; FOLLOWING SUBROUTINE WILL SEND LAST BYTE OF A WORD.
; IT WILL SEND 5-8 BITS DEPENDING ON PARAMETER IN
; OUTPUT TABLE.
```

```
LSTXMT   LD      A,(IX+1)
LSTXM1:  PUSH    DE                  ;SAVE CHANNEL OFFSET
         LD      E,A                 ;SAVE IN E
         DEC     E                   ;MAKE RELATIVE TO 00
         LD      D,0
         LD      A,(SIOADR)          ;LOAD INTERRUPTING SIO
         LD      C,A
         INC     C                   ;POINT TO CONTROL REG.
         LD      A,05                ;SELECT WR REG. 5
         OUT     (C),A
         LD      HL,LSTTBL           ;GET CONTROL WORD
         ADD     HL,DE               ;ADD OFFSET
         LD      A,(HL)              ;GET CONTROL BYTE
         OUT     (C),A               ;OUT TO SIO
         DEC     C                   ;POINT TO DATA REG
         CALL    INVCHK              ;CHECK FOR INVERT SWITCH
         LD      HL,MSKTBL           ;MASK OUT ALL BUT REQUIRED DATA
         ADD     HL,DE
         LD      B,(HL)
         AND     B                   ;ACC. HAS DATA
         LD      HL,DATTBL           ;GET BITS TO ADD IN FOR SIO
         ADD     HL,DE               ;ADD OFFSET E HAS BITS LAST BYTE
         LD      B,(HL)
         OR      B
GOAHD1:  OUT     (C),A
         POP     DE                  ;RESTORE OFFSET
         RET

RSTSAV:  LD      (IX),05             ;RESET 5 PARAMETERS
         LD      (IX+5),00           ;RESET PTR OFFSET
         RET

;        CALJMP WILL CALCULATE A POINTER TO A TABLE LOCATION
;        IT IS ENTERED WITH ACC. HAVING INDEX VALUE

CALJMP:  LD      B,0                 ;INIT FOR JUMP
         ADD     A,A                 ;TWO BYTES PER ENTRY
         LD      C,A                 ;FORM OFFSET IN BC
         ADD     HL,BC               ;HL POINTS TO TOP OF TABLE
         LD      A,(HL)              ;FORM JUMP ADDRESS
         INC     HL
         LD      H,(HL)
         LD      L,A                 ;FORM PTR
         RET

;        THIS IS THE COMMAND JUMP TABLE TO BE USED IN INTERRUPT
;        DRIVER TABLE.
CMDJMP:  DEFW    CMD1
         DEFW    CMD2
         DEFW    RETRN
         DEFW    RETRN
         DEFW    CMD5
         DEFW    CMD6
         DEFW    CMD7
         DEFW    CMD8
         DEFW    CMD9
         DEFW    CMD10
         DEFW    CMD11
         DEFW    RETRN
         DEFW    RETRN
         DEFW    RETRN
         DEFW    RETRN
         DEFW    RETRN
         DEFW    CMD17               ;ID DOT CMD
         DEFW    CMD18               ;ID DASH CMD
         DEFW    CMD19               ;ID INTER ELEMENT GAP CMD
         DEFW    CMD20               ;ID INTER CHARACTER GAP
         DEFW    CMD21               ;ID INTER WORD GAP
```

```
            DEFW    CMD22           ;FINNISH CMD
            DEFW    CMD23           ;ID WARMUP CMD

;
;
;  *************** NOTE ! FOLLOWING COMMANDS NOT USED NOW
;
;**********************  CMD 3,4,12,13,14,15,16
;
;

LSTTBL: DEFB    10001010B       ;SEND 1 BIT
        DEFB    10001010B       ;SEND 2 BITS
        DEFB    10001010B       ;SEND 3 BITS
        DEFB    10001010B       ;SEND 4 BITS
        DEFB    10001010B       ;SEND 5 BITS
        DEFB    11001010B       ;SEND 6 BITS
        DEFB    10101010B       ;SEND 7 BITS
        DEFB    11101010B

;       MSKTBL IS USED TO MASK OUT UNWANTED DATA IN TRANSFERS TO SIO OF
;       LESS THAN 6 BITS
;
MSKTBL: DEFB    00000001B       ;KEEP ONE BIT
        DEFB    00000011B       ;KEEP 2 BITS
        DEFB    00000111B       ;KEEP 3 BITS
        DEFB    00001111B       ;KEEP 4
        DEFB    00111111B       ;KEEP 5
        DEFB    11111111B       ;KEEP ALL
        DEFB    11111111B       ;KEEP ALL
        DEFB    11111111B       ;KEEP ALL

;
;       DATTBL WILL ADD BITS TO FORMAT FOR SIO TRANSMIT OF LESS THAN 6 BITS

DATTBL: DEFB    11110000B       ;SEND 1 BIT
        DEFB    11100000B       ;SEND 2 BITS
        DEFB    11000000B       ;SEND 3 BITS
        DEFB    10000000B       ;SEND 4 BITS
        DEFB    00000000B       ;SEND 5 BITS

DEFB    00000000B       ;SEND 7
        DEFB    00000000B       ;SEND 8
*E

XMITB:  LD      A,(SIOADR)      ;LOAD INTERRUPTING SIO
        LD      C,A
        INC     C               ;POINT TO CONTROL REG.
        LD      A,05            ;WR REG 5
        OUT     (C),A
        LD      A,11101010B     ;TRANSMIT 8 BITS
        OUT     (C),A           ;OUT TO SIO
        DEC     C               ;POINT TO DATA REG.
        CALL    INVCHK          ;CHECK FOR INVERT SWITCH
        OUT     (C),A
        RET

;       INVCHK WILL CHECK THE POSITION OF THE DIP SWITCH ON THE 984
;       SIO BOARD TO DETERMINE IF INVERTED DATA IS REQUIRED

INVCHK: PUSH    DE
        LD      DE,(INTDE)      ;GET INTERRUPT CHANNEL OFFSET
        LD      HL,INDCTRS      ;CHECK FOR ID TIME
        ADD     HL,DE
        BIT     0,(HL)          ;SET MEANS ID
        JR      NZ,OUTBND       ;SET DONT INVERT
        IN      A,(INVPRT)      ;CHECK DIP SWITCHES
        BIT     3,A             ;CHECK DIP INVERT FOR EVERYTHING BUT MOTOROLA
```

```
            JR      NZ,OUTBND       ;IF SWITCH IS OPEN DONT INVERT
CPLDAT:     LD      A,B             ;PUT DATA IN ACC.
            CPL                     ;COMPLEMENT
            POP     DE
            RET
OUTBND:     LD      A,B             ;COME HERE FOR NON INVERT
            POP     DE
            RET

END
;       DRIVER TABLE FOR NEC TONE ONLY

GLOBAL  DISTBL,KEYTBL,XMTCNT,INITIM
            GLOBAL  POCTBL,DISSEL
            GLOBAL  MORSE,QRAWRD,DEWRD,SIGNJMP,RELNUM
            GLOBAL  TSMULT,QRARPT,AIDXMT,AUTOLM,AIDWRM

EXTERNAL DSBUF1,POCGP1

;       THE FOLLOWING COUNT DEFINES XMITTER WARMUP FOR ALL XMITTERS
;       EACH COUNT EQUALS 33 MILLISECONDS OF WARMUP AND 15 COUNTS
;       EQUALS 500 MILLISECONDS OF WARMUP
;       WARMUP  EQU     1       GIVES 33 MILLISECONDS WARMUP
;       WARMUP  EQU     15      GIVES 500 MILLISECONDS OF WARMUP
;       WARMUP  EQU     30      GIVES 1 SECOND OF WARMUP ETC.

WARMUP      EQU     30              ;WARMUP TIME

WRMTON      EQU     0               ;WHEN EQUAL TO ONE WARMUP WILL BE ONE ZERO PATTERN
;                                    WHEN ZERO PATTERN WILL BE A CONSTANT ZERO

SITID1      EQU     0B0H            ;SITE ID BYTE 1
SITID2      EQU     0B1H            ;SITE ID BYTE 2

DB:         MACRO   #1,#2,#3,#4,#5,#6,#7,#8,#9,#A,#B,#C
            COND    .NOT.('#1'='')
            DEFB    #1
            ENDC
            COND    .NOT.('#2'='')
            DEFB    #2
            ENDC
            COND    .NOT.('#3'='')
            DEFB    #3
            ENDC
            COND    .NOT.('#4'='')
            DEFB    #4
            ENDC
            COND    .NOT.('#5'='')
            DEFB    #5
            ENDC
            COND    .NOT.('#6'='')
            DEFB    #6
            ENDC
            COND    .NOT.('#7'='')
            DEFB    #7
            ENDC
            COND    .NOT.('#8'='')
            DEFB    #8
            ENDC
            COND    .NOT.('#9'='')
            DEFB    #9
            ENDC
            COND    .NOT.('#A'='')
            DEFB    #A
            ENDC
```

```
        COND    .NOT.('#B'='')
        DEFB    #B
        ENDC
        COND    .NOT.('#C'='')
        DEFB    #C
        ENDC
        ENDM

; THE FOLLOWING IS A MESSAGE PASSED UNDER DIAGNOSTIC 21 TO INDICATE REL
; NUMBER TO THE USER.  IT SHOULD BE A FIXED LENGTH OF 8 ASCII CHARACTERS.
;
;
RELNUM. DEFM    '407     '
;
;
;
;
*E

; NEC DISPLAY INTERRUPT DRIVER TABLE

DISTBL: DEFB    1           ;LOAD INITIAL CONDITION CMD
        DEFB    1           ;SEND ONE BYTE PER WORD
        DEFB    5           ;SEND LAST BYTE WITH 5 BITS
        DEFB    45          ;SEND 45 WORDS
        DEFB    2           ;SEND PTR COMMAND
        DEFB    1           ;LOAD INITIAL COND CMD
        DEFB    8           ;SEND EIGHT BYTES PER WORD
        DEFB    8           ;SEND 8 BITS ON LAST BYTE
        DEFW    SYNCH       ;SEND SYNCH BITS
        DEFB    1           ;SEND ONE WORD
        DEFB    2           ;CONTINUATION CMD
        DEFB    1           ;INITIALIZE FOR GROUP SELECT
        DEFB    2           ;2 BYTES PER WORD
        DEFB    7           ;SEND 7 BITS ON LAST BYTE
        DEFW    DISSEL      ;SEND GROUP SELECT BITS
        DEFB    1           ;SEND ONE WORD
        DEFB    2           ;SEND DATA COMMAND
        DEFB    9           ;SEND DISPLAY BATCH
        DEFB    80          ;BYTES PER XFER
        DEFB    8           ;BITS ON LAST BYTE
        DEFW    DSBUF1      ;SEND DISPLAY BATCH
        DEFB    00          ;TO BE GROUP COUNT
        DEFB    6           ;FINISH TRANSMIT COMMAND
        DEFB    7           ;STOP XMIT COMMAND
*E

;       POCSAG INTERRUPT DRIVER TABLE

POCTBL: DEFB    1           ;LOAD INITIAL CONDITIONS
        DEFB    8           ;BYTES PER WORD
        DEFB    8           ;SEND 8 BITS ON LAST WORD
        DEFW    DISSEL      ;SEND ONE ZERO PATTERN
        DEFB    9           ;REPEAT NINE TIMES
        DEFB    2           ;REPEAT COMMAND
        DEFB    1           ;SEND BATCH PREAMBLE
        DEFB    4           ;4 BYTES PER WORD
        DEFB    8           ;SEND 8 BITS ON LAST BYTE
        DEFW    POCPRE      ;POCSAG PREAMBLE
        DEFB    1           ;REPEAT ONCE
        DEFB    2           ;REPEAT COMMAND
        DEFB    10          ;POCSAG BATCH START
        DEFB    64          ;SEND 64 BYTES
        DEFB    8           ;SEND 8 BITS ON LAST BYTE
        DEFW    POCGP1      ;POCSAG GROUP
        DEFB    00          ;TO BE BATCH CNT
        DEFB    11          ;CONTINUE CMD
        DEFB    7           ;STOP XMIT CMD
```

```
KEYTBL: DEFB    1
        DEFB    5
        DEFB    8
        DEFW    GRPSEL
        DEFB    WARMUP          ;THIS MODIFIES WARMUP FOR XMITTERS
        DEFB    2
        DEFB    1
        DEFB    5
        DEFB    8
        DEFW    GRPSEL
        DEFB    1
        DEFB    6
;
;
;       FOLLOWING TABLES USED FOR NEC DISPLAY BATCH
SYNCH:  DEFB    3EH             ;START OF SYNCH CODE
        DEFB    04BH
        DEFB    0A8H
        DEFB    1BH
        DEFB    3EH
        DEFB    4BH
        DEFB    0A8H
        DEFB    1BH

ONEZRO: DEFB    15H             ;START OF DISPLAY PREAMBLE
        DEFB    0AH
        DEFB    15H
        DEFB    0AH
        DEFB    15H
        DEFB    0AH
        DEFB    15H
        DEFB    0AH

COND    WRMTON=0
GRPSEL: DEFB    00              ;START OF GROUP SELECT CODE
        DEFB    00
        DEFB    00
        DEFB    00
        DEFB    00
        DEFB    00
        DEFB    00
        DEFB    00
        ENDC
;
;
        COND    WRMTON=1
GRPSEL: DEFB    55H
        DEFB    55H
        DEFB    55H
        DEFB    55H
        DEFB    55H
        DEFB    55H
        DEFB    55H
        DEFB    55H
        ENDC
TXKEY1: DEFB    SITID1          ;SITE ID BYTE 1
        DEFB    SITID2          ;SITE ID BYTE 2
        DEFB    00
        DEFB    00
        DEFB    00
        DEFB    00
;
;
;       FOLLOWING USED FOR POCSAG BATCH
```

```
PSCPHE:  DEFB    5CH         ;POCSAG SYNCH CODE
         DEFB    7BH
         DEFB    0A8H
         DEFB    1BH

;        NUMBER OF XMITTERS INSTALLED

XMTCNT:  DEFB    01

;
;
;        TIME LIMITS BETWEEN BATCH TRANSMISSION
;
;

INITIM:  DEFB    20          ;NEC T/O TIME LIMIT
         DEFB    20          ;NEC DISPLAY LIMIT
         DEFB    20          ;MOTOROLA TIME LIMIT
         DEFB    20          ;POCSAG
         DEFB    20          ;HARRIS

;
;        THIS IS TIME BETWEEN IDS BASE TIMER, ONE COUNT= 3 SECONDS
;
;
AUTOLM:  DEFB    40          ;TWO MINUTES
;
;

;
DISSEL:  DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H
         DEFB    55H

;
;
;        THE FOLLOWING SECTION IS TAILORED FOR DIGITAL AUTO-ID
;

AIDWRM:  DEFB    75          ;WARMUP TIME 500 MILLISECONDS
;                             EACH COUNT = 6.667 MILLISECONDS
TSMULT:  DEFB    15          ;MULTIPLICATION FACTOR FOR AUTO-ID
;                             TIME BETWEEN IDS = TSMULT X AUTOLM
QRANTY:  DEFB    1           ;TRANSMISSION CNT FOR AUTO-ID.
AIDXMT:  DEFB    1                   ;16 POSITIONAL INDICATORS FOR WHICH
         DEFB    1                   ;XMITTERS WILL SEND AUTO-ID. THE FIRST
         DEFB    1                   ;(TOP-MOST) INDICATOR IS FOR
         DEFB    1                   ;XMITTER #1, THE LAST (BOTTOM-MOST)
         DEFB    0                   ;IS FOR XMITTER #8. A NON-ZERO
         DEFB    0                   ;VALUE => SEND AUTO-ID.
         DEFB    0
```

```
; MORSE CODE TABLE - ONE BYTE FOR EACH ALPHANUMERIC
; 0=DOT  1=DASH  CODE IN BITS 7-3     CNT IN BITS 2-0
; BIT 7 = FIRST DOT OR DASH, BITS 0-2 INDICATE HOW MANY DOTS/DASHES
MORSE:  DEFB    01000010B       ;A (0)  -  DOT,DASH / CNT=2
        DEFB    10000100B       ;B (1)  -  DASH,DOT,DOT,DOT / CNT=4
        DEFB    10100100B       ;C (2)  -  DASH,DOT,DASH,DOT / CNT=4
        DEFB    10000011B       ;D (3)
        DEFB    00000001B       ;E (4)
        DEFB    00100100B       ;F (5)
        DEFB    11000011B       ;G (6)
        DEFB    00000100B       ;H (7)
        DEFB    00000010B       ;I (8)
        DEFB    01110100B       ;J (9)
        DEFB    10100011B       ;K (10)
        DEFB    01000100B       ;L (11)
        DEFB    11000010B       ;M (12)
        DEFB    10000010B       ;N (13)
        DEFB    11100011B       ;O (14)
        DEFB    01100100B       ;P (15)
        DEFB    11010100B       ;Q (16)
        DEFB    01000011B       ;R (17)
        DEFB    00000011B       ;S (18)
        DEFB    10000001B       ;T (19)
        DEFB    00100011B       ;U (20)
        DEFB    00010100B       ;V (21)
        DEFB    01100011B       ;W (22)
        DEFB    10010100B       ;X (23)
        DEFB    10110100B       ;Y (24)
        DEFB    11000100B       ;Z (25)
        DEFB    11111101B       ;0 (26)
        DEFB    01111101B       ;1 (27)
        DEFB    00111101B       ;2 (28)
        DEFB    00011101B       ;3 (29)
        DEFB    00001101B       ;4 (30)
        DEFB    00000101B       ;5 (31)
        DEFB    10000101B       ;6 (32)
        DEFB    11000101B       ;7 (33)
        DEFB    11100101B       ;8 (34)
        DEFB    11110101B       ;9 (35)
QRAWRD: DEFB    3               ;CNT
        DEFB    16              ;Q
        DEFB    17              ;R
        DEFB    0               ;A        'QRA' WORD FOR AUTO-ID
DEWRD:  DEFB    2               ;CNT
        DEFB    3               ;D
        DEFB    4               ;E        'DE' WORD FOR AUTO-ID
; CALL-SIGN JUMP TABLE
SIGNJMP: DEFW   SIGN01          ;CALL-SIGN ADR FOR XMITTER NO. 1
        DEFW    SIGN02
        DEFW    SIGN03
        DEFW    SIGN04
        DEFW    SIGN05
        DEFW    SIGN06
        DEFW    SIGN07
        DEFW    SIGN08
;
;       CALL-SIGN CHARACTER TABLE USED FOR XMITTING CALL-SIGN
;       DURING AUTO-ID
;
;       EXAMPLE
;
;       SIGN01: DEFB    6       ;CUSTOMER'S NAME AND TODAY'S DATE
;                               THIS NUMBER DEFINES THE TOTAL NUMBER
;                               OF CHARACTERS THAT WILL BE XMITTED ON
;                               CHARACTERS ( THREE CALL-SIGNS )
;               DEFB    10      THE NEXT SIX NUMBERS ARE ASSOCIATED
;               DEFB    16      WITH A LETTER OR NUMBER IN THE MORSE
;               DEFB    3       TABLE FOUND ABOVE; SO THAT THE CALL-SIGN
;               DEFB    31      KQD549 IS REPRESENTED BY THE FOLLOWING
;               DEFB    30      LIST OF NUMBERS.
;               DEFB    35
```

```
SIGN01:  DEFB    6                       ; INTRASTATE LA 6-3-82
         DB      10, 11, 12, 27, 28, 28      ; KLM122
SIGN02:  DEFB    6
         DB      10, 16, 3, 27, 28, 29       ; KQD123
SIGN03:  DEFB    6
         DB      10, 11, 12, 30, 31, 32      ; KLM456
SIGN04:  DEFB    6                       ; CHAR CNT
         DB      10, 0, 1, 27, 28, 29        ; KAB123
SIGN05:  DEFB    1                       ; CHAR CNT
         DEFB    0
SIGN06:  DEFB    1                       ; CHAR CNT
         DEFB    0
SIGN07:  DEFB    1                       ; CHAR CNT
         DEFB    0
SIGN08:  DEFB    1                       ; CHAR CNT
         DEFB    0
;
         END
;        RAM  MODULE FOR DIGITAL OUTPUT PROCESSOR

GLOBAL  DSPPOC, PCDPBF, EMPFLG, FORMAT, INPBUF, CTCFLG, TSTNUM
         GLOBAL  CHINCR, OFFSET, OFFST2, OFFST4, WORK1
         GLOBAL  CHLEN, MNPTR, TXCNT, XMTRID
         GLOBAL  FSTPTR, LSTPTR, GRPPTR, GRPCNT, WK1
         GLOBAL  MNBUF, MNEND, PAGPTR, NXTPAG
         GLOBAL  GPCNT1, NXTG1, EXTG1, GRPFLG, NDISG
         GLOBAL  POCG, DSBUF1, DSBUF2
         GLOBAL  DSBUF3, DSBUF4, FTSAVE, ALTSAV
         GLOBAL  BUFLOP, DIDAT, XMTFLG
         GLOBAL  INTFST, GRPOFF, XMTPRI, BATTIM
         GLOBAL  NECCNT, DISCNT, MOTCNT, HARCNT, POCCNT
         GLOBAL  BATCNT, PERXMT, RAMEND, RAMSET
         GLOBAL  OUTTBL, INTDE, XMTINT, SIOADR
         GLOBAL  FULSTA, SBBTOC, SBBTFL, POCEMP, POGPMT
         GLOBAL  SBGPOC, POCOFF, PNXTG1, SUBNUM, BATPRI
         GLOBAL  POCGP1, POCGP2, POCGP3, POCGP4, POCGP5, POCGP6, POCGP7, POCGP8
         GLOBAL  INDCTRS, RPTCNT, QRACNT, XMTID, AIDIND, AIDTBL, XAIDTBL
         GLOBAL  AUTIDCNT, AIDTIM, INTIDC, INTPAG

;        TEST CODE TO BE REMOVED

GLOBAL  TSTDT1, TSTDT2, TSTDT3, TSTDT4, TSTDT5, TSTCNT, TSTTIM

;        RAMSET MUST BE FIRST BYTE IN RAM

RAMSET:  DEFS    2       ; SCRATCHPAD FOR RAM OFFSET
PERXMT:  DEFS    1       ; DIAGNOSTIC TEST CTR
CTCFLG:  DEFS    1       ; TEST FLAG REG FOR DIAGNOSTIC

;        TEST TO BE REMOVED
;

TSTDT1:  DEFS    5
TSTDT2:  DEFS    5
TSTDT3:  DEFS    5
TSTDT4:  DEFS    5
TSTDT5:  DEFS    5
TSTCNT:  DEFS    1
TSTTIM:  DEFS    1

;
;        END OF TEST CODE
INTPAG:  DEFS    2       ; PAGE PTR FOR INTERUPTS
INTDE:   DEFS    2       ; SAVE AREA FOR CHANNEL OFFSET DURING INTERRUPT
XMTINT:  DEFS    1       ; SAVE AREA FOR INTERRUPTING XMITTER
```

```
SIOADR:  DEFS    1          ;SAVE AREA FOR INT. SIO
FORMAT:  DEFS    1          ;FORMAT ALL FLAG
INPBUF:  DEFS    10         ;INPUT BUFFER FOR CALLS
SUBNUM:  DEFS    1          ;SAVE AREA FOR SUB BATCH
CHNCR:   DEFS    2          ;CHANNEL RAM LENGTH
OFFSET:  DEFS    2          ;GROUP OFFSET X1
OFFST2:  DEFS    2          ;GROUP OFFSET X2
OFFST4:  DEFS    2          ;GROUP OFFSET X4
WORK1:   DEFS    4          ;WORK AREA
CHLEN:   DEFS    2          ;LENGTH OF RAM PER CHANNEL
MNPTR:   DEFS    2          ;POINTER TO NEXT MAIN BUFFER LOC.
CXCNT:   DEFS    1          ;MAIN LOOP XMITTER CNT
XMTRID:  DEFS    1
FSTPTR:  DEFS    2          ;SCRATCHPAD FOR FIRST PTR
LSTPTR:  DEFS    2          ;SCRATCHPAD FOR LAST PTR
OEPPTR:  DEFS    2          ;POINTER TO EXTERNAL BUFFER
GRPCNT:  DEFS    1          ;GROUP COUNT SCRATCHPAD
BATTIM:  DEFS    1          ;BATCH TIMER SOFTWARE CTR
WK1:     DEFS    1
MNBUF:   DEFS    1          ;START OF MAIN INPUT BUFFER
         DEFS    999        ;REST OF BUFFER
BUFEND:  DEFS    1          ;END OF MAIN BUFFER
PAGPTR:  DEFS    2          ;PTR TO PRESENT PAGE
NXTPAG:  DEFS    2          ;NEXT PAGE IN MAIN BUFFER
DIDAT:   DEFS    11         ;WORK BUFFER FOR DISPLAY FORMATTING
BUFLOP:  DEFS    1          ;MAIN LOOP COUNT
FTSAVE:  DEFS    2          ;SAVE AREA FOR FRONT PTR
ALTSAV:  DEFS    3          ;SAVE AREA FOR ALTERNATE ADDR.
INTFST:  DEFS    2          ;SAVE AREA FOR FIRST PAGE PTR
AIDTBL:  DEFS    20         ;AUTO-ID OUTPUT TABLE (CNT, GRA, AND DE)
XAIDTBL: DEFS    100        ;XMITTER PORTION OF 'AIDTBL' (UP TO 18 DIGITS
                            ;W/GAPS, FOLLOWED BY AN 'END' COMMAND)
ORACNT:  DEFS    1          ;USED TO CNT REPEATS OF AUTO-ID
AUTIDCNT:DEFS    1          ;COUNTER USED TO DETERMINE TIME TO SEND AUTO-ID
AITIPC:  DEFS    1

;THE FOLLOWING IS USED FOR POCSAG DISPLAY ENCODING ROUTINES

DSPPOC:  DEFS    1          ;FLAG BUFFER
PCDPBF:  DEFS    20         ;BUFFER STORAGE

; FOLLOWING RAM USED ONCE PER CHANNEL

XSTAT:   DEFS    1          ;XMITTER STATUS REG.
EMPFLG:  DEFS    1          ;Q EMPTY FLAGS

FULSTA:  DEFS    8          ;BATCH FULL STATUS FOR POCSAG
SBBTOC:  DEFS    1          ;SUB BATCH OCCUPIED BYTE
SBBTFL:  DEFS    1          ;SUB
POCEMP:  DEFS    1          ;Q STATUS
POCPMT:  DEFS    1          ;INDIVIDUAL POCSAG GROUP STATUS
SBGPOC:  DEFS    20         ;OCCUPIED BYTES
POCOFF:  DEFS    1          ;OFFSET BYTE
POCGP1:  DEFS    8          ;FIRST TIME SLOT BATCH
POCGP2:  DEFS    8          ;SECOND TIME SLOT POCSAG BATCH
POCGP3:  DEFS    8          ;THIRD TIME SLOT
POCGP4:  DEFS    8
POCGP5:  DEFS    8
POCGP6:  DEFS    8
POCGP7:  DEFS    8
POCGP8:  DEFS    8          ;LAST TIME SLOT
         DEFS    256        ;SAVE SPACE FOR WHOLE BATCH
PNXTG1:  DEFS    16         ;NEXT PAGE PTRS
DATPRI:  DEFS    1          ;BATCH PRIORITY
OUTTBL:  DEFS    60         ;OUTPUT DRIVER TABLE
BATCNT:  DEFS    1          ;BATCH COUNT FOR STATUS UPDATE
GPCNT1:  DEFS    4          ;GROUP WORD COUNTERS
NXTG1:   DEFS    8
EXTG1:   DEFS    8          ;NEXT PAGE IN EXTERNAL BUFFER
GRPFLG:  DEFS    4          ;GROUP FULL/EMPTY FLAGS
NDISQ:   DEFS    16         ;NEC DISPLAY PTRS
POCQ:    DEFS    32
```

```
DSBUF1:  DEFS    80          ;GROUP 1 BUFFER PTR
DSBUF2:  DEFS    80          ;GROUP 2 BUFFER PTR
DSBUF3:  DEFS    80          ;GROUP 3 BUFFER PTR
DSBUF4:  DEFS    80          ;GROUP 4 BUFFER PTR
GRPOFF:  DEFS    1           ;LAST GROUP TO BE PROCESSED
XMTPRI:  DEFS    1           ;LAST TYPE TO BE XMITTED
NECCNT:  DEFS    1           ;NEC TONE ONLY Q COUNT
DISCNT:  DEFS    1           ;DISPLAY PAGER BATCH COUNT
MOTCNT:  DEFS    1           ;MOTOROLA BATCH COUNT
HARCNT:  DEFS    1           ;HARRIS BATCH COUNT
POCCNT:  DEFS    1           ;POCSAG BATCH COUNT
AIDTIM:  DEFS    1           ;AUTO ID TIMER
INDCTRS  DEFS    1           ;SEND AUTO-ID (BIT 3), AUTO-ID IN PROGRESS (BIT 4)
RPTCNT   DEFS    1           ;AUTO-ID AND ACTIVE PAGE REPEAT COUNT
XMTID    DEFS    1           ;XMITTER ID (1-8)
AIDIND   DEFS    1           ;IF = 0, NO AUTO-ID SENT FOR THIS XMITTER ON THIS
                             ;CHANNEL
;
; THIS FOR TEST VERSION ONLY
;
PERXMT:  DEFS    10          ;RAM FOR FOUR XMITTERS
RAMEND:  DEFS    1           ;BYTE TO INDICATE END OF RAM
         END
;
;
;        DIAGNOSTICS MODULE
;
;
         EXTERNAL PROMST, SIGMAS, RAMSTR, RAMEND, CTCTAG, CTCFLG, TSTNUM
;
;
CTCCNT:  EQU     1           ;NUMBER OF CTCS TO TEST
CTCAD1:  EQU     00H         ;BATCH TIMER CTC
CTCAD2:  EQU     0B0H        ;SIO CTC
CTCAD3:  EQU     0B4H
CTCAD4:  EQU     0B8H
;
;
PIONUM:  EQU     4           ;NUMBER OF PIOS TO TEST
ALRIN1:  EQU     08          ;FIRST PIO ADDRESS TO TEST
;
;
*E
;   PROM SIGNATURE COMPUTE AND CROSS CHECK

; PROM SIGNATURE COMPUTE AND CHECK

PRMDIA:  LD      IX,TSTNUM   ;GET TEST NUMBER
         LD      (IX),00     ;INITIALIZE TO TEST 1
         LD      HL,PROEND   ;PROM END
         LD      DE,PROMST   ;PROM START
         OR      A           ;CLEAR CARRY
         SBC     HL,DE       ;GET DIFFERENCE
         LD      B,H         ;MOVE TO B
         LD      C,L         ;MOVE TO C
         LD      HL,PROMST   ;PROM START
         LD      E,(HL)      ;LOAD FIRST LOCATION
PRMLOP:  LD      A,E         ;SIGNATURE TO A
         INC     HL          ;INCREMENT PTR
         ADD     A,(HL)      ;ADD CONTENTS
         RLCA                ;ROTATE RESULTS
```

```
           LD      E,A           ;SAVE SIGNATURE
           DEC     BC            ;DECREMENT COUNTER
           LD      A,B           ;MSB COUNTER
           OR      C             ;LSB COUNTER, FINISHED ?
           JR      NZ,PRMLOP     ;NO, CONTINUE
           LD      A,E           ;SIGNATURE TO A
           LD      HL,SIGMAS     ;MASTER SIGNATURE
           CP      (HL)          ;SAME ?
           RET     NZ            ;IF NOT SAME PROM FAILURE RETURN
;
;
;
;
;
; RUN THE RAM TEST
;
;
RAMDIA:    INC     (IX)          ;BUMP UP TEST NUMBER
           LD      HL,RAMEND
           LD      BC,RAMSTR     ;POINT AT BEGINNING AND END OF RAM
           OR      A             ;CLEAR CARRY
           SBC     HL,BC         ;GET DIFFERENCE
           LD      B,H           ;MOVE MSD
           LD      C,L           ;GET LSD OF COUNT
           LD      HL,RAMSTR     ;POINT AT FIRST LOCATION
RAMDOO:    LD      E,(HL)        ;SAVE ORIGINAL VALUE

LD      (HL),D        ;WRITE TO RAM
           LD      A,(HL)        ;READ-BACK
           CP      D
           RET     NZ            ;RETURN RAM ERROR
           LD      D,0FFH
           LD      (HL),D
           LD      A,(HL)
           CP      D
           RET     NZ            ;RETURN ON RAM ERROR
           LD      D,0AAH
           LD      (HL),D
           LD      A,(HL)
           CP      D
           RET     NZ            ;RETURN ON RAM ERROR
           LD      D,55H
           LD      (HL),D
           LD      A,(HL)
           CP      D
           RET     NZ            ;RETURN ON RAM ERROR
           LD      (HL),E        ;RESTORE ORIGINAL VALUE

INC     HL            ;BUMP RAM PTR
           DEC     BC            ;LENGTH CNTR
           LD      A,C
           OR      B             ;FINISHED?
           JR      NZ,RAMDOO     ;NO, JUMP

;
;
;
*E
;  PIO DIAGNOSTIC TEST
;
;
PIODIA:    INC     (IX)          ;BUMP UP TEST NUMBER
           LD      B,PIONUM      ;TO-DO-COUNT.
           LD      C,ALRIN1      ;POINT TO CNTL/PORT OF PIO UNDER-TEST
PIODOO:    LD      A,0FH         ;SET ALL PIOS' TO OUTPUT MODE 0
           INC     C             ;POINT TO CONTROL PORT NOW.
           OUT     (C),A
           DEC     C             ;PT TO DATA PORT
           LD      A,55H         ;TEST PATTERN
           OUT     (C),A
           IN      H,(C)
           CP      H             ;VAL READ = VAL WRITTEN?
```

```
            RET     NZ              ;PIO ERROR RETURN
            LD      A,0AAH          ;2ND TEST PATTERN
            OUT     (C),A
            IN      H,(C)
            CP      H               ;COMPARE AGAIN
            RET     NZ              ;RETURN PIO ERROR
            INC     C               ;PT BACK TO CONTROL PORT
            LD      A,4FH           ;SET TO ALL INPUTS (MODE 1)
            OUT     (C),A
            INC     C               ;POINT TO NEXT PIO (ALRIN2)
            DJNZ    PIODO0

;       TEST CTC'S

CHKCTC: LD      A,(CTCNUM)      ;NUMBER OF CTC'S TO TEST
DADCTC: LD      B,A             ;TO-DO CNT
        LD      IY,CTCADR
        DI                      ;NO INTERRUPTS WHILE CTC'S BEING RESET
        LD      HL,CTCTAG       ;JUMP VECTOR LOC FOR CTC TESTS
CKCTC2: LD      A,L             ;USE ONLY LSB
        LD      C,(IY)          ;ADDRESS OF CTC-0
        OUT     (C),A           ;INIT INTERRUPT VECTOR PTR
        LD      A,17H           ;INT DISABLED, TIMER MODE, PRESCALER = 16,
                                ;POS EDGE TRIGGER, START ON CONSTANT LOAD,
                                ;CONSTANT COMING NEXT, RESET
        OUT     (C),A
        LD      A,157           ;CONSTANT (.407 X 16 X 157 = 1.022384 MS)
        OUT     (C),A
        INC     C               ;CTC-1
        LD      A,53H           ;INT DISABLED, COUNTER MODE, POS EDGE TRIGGER,
                                ;NO CONSTANT FOLLOWS, RESET
        OUT     (C),A
        INC     C               ;CTC-2
        OUT     (C),A
        INC     C               ;CTC-3
        OUT     (C),A
        INC     IY              ;NEXT CTC
        DJNZ    CKCTC2
        EI

;START TESTING CTC'S

LD      A,(CTCNUM)      ;NUMBER TO CHECK
DIGILD: LD      B,A             ;TO-DO CNT.
        LD      IY,CTCADR       ;ADDRESS OF 1ST CTC=0

;CHECK CTC-0 (TIMER)

CTCTST: LD      A,97H           ;ENABLE INT, TIMER MODE, PRESCALER = 16,
                                ;POS EDGE TRIGGER, CONSTANT FOLLOWS, RESET
        LD      C,(IY)          ;CTC ADR
        OUT     (C),A
        LD      H,11H           ;RESET VALUE TO BE USED DURING INTERRUPT
                                ;(DISABLE INT, CONTINUE COUNTING)
        LD      A,0
        LD      (CTCFLG),A      ;CLEAR INTERRUPT FLAG
        LD      A,157           ;CONSTANT
        OUT     (C),A
        PUSH    BC              ;SAVE TO-DO CNT
        LD      B,4             ;ID OF CTC CHANNEL IN CASE OF FAILURE
        CALL    CTCWT           ;WAIT FOR EITHER CTC INTERRUPT OR TIMEOUT
        JP      NZ,CTCERR       ;IF FAILURE, REPORT TO CRT
        LD      B,3             ;TO-DO CNT FOR COUNTER CHANNELS
```

;CHECK CTC COUNTERS

```
                LD      H,51H       ;RESET VALUE FOR COUNTERS IF INTERRUPT
CTC123:         INC     C           ;PT TO NEXT CHANNEL
                LD      A,0
                LD      (CTCFLG),A  ;CLEAR INT FLAG
                                    ;RESET
                OUT     (C),A
                LD      A,3         ;COUNTER VALUE (1.022 X 3 X 3 X 3 = 27.6 MS)
                OUT     (C),A
                CALL    CTCWT
                JP      NZ,CTCERR
                DJNZ    CTC123
```

;CHECK NEXT CTC

```
CHKLST:         POP     BC          ;RESTORE TO-DO CNT
                INC     IY          ;NEXT CTC
                DJNZ    CTCTST
```

;
;

```
TSTEND:         DI                  ;DISABLE INTERRUPTS FOR REST OF INIT
                LD      (IX),0FFH   ;FF MEANS ALL DIAGNOSTICS PASSED
                RET                 ;GO BACK
```
;WAIT FOR EITHER CTC INTERRUPT OR TIMEOUT.

```
CTCWT:          LD      DE,1600     ;RESULT IN WAIT OF APPROX. 35.8 MS
CTCW2:          LD      A,(CTCFLG)  ;WILL BE SET TO 1 IF INTERRUPT HAS OCCURRED
                CP      1
                RET     Z           ;Z-FLAG SET => NO PROBLEM WITH CTC-X
                DEC     DE
                LD      A,D
                OR      E
                JR      NZ,CTCW2
                ADD     A,1         ;RESET Z-FLAG TO SHOW FAILURE
                RET
*E
```

; CTC FAILURE
;
;

```
CTCERR:         OUT     (C),H       ;RESET CTC-X
                DI                  ;DISABLE INT FOR REST
                RET                 ;GO BACK
```

;CTC INTERRUPT RTN

```
CTCINT:         EX      AF,AF'
                LD      A,1
                LD      (CTCFLG),A
                OUT     (C),H       ;DISABLE CTC-X
                EX      AF,AF'
                EI
                RETI
```

```
;           CTC ADDRESS TABLE
;
;
CTCNUM: DEFB    CTCCNT      ;NUMBER OF CTCS TO CHECK
CTCADR: DEFB    CTCAD1      ;FIRST CTC ADDRESS
        DEFB    CTCAD2      ;2 CTC ADDRESS
        DEFB    CTCAD3
PROEND: DEFB    CTCAD4

END
;   STACK FOR DIGITAL OUTPUT

GLOBAL  STACK,RAMSTR

RAMSTR: DEFS    254
STACK:  DEFS    0
        END

;       THIS MODULE IS FOR A MASTER PROM SIGNATURE
;       IT MUST BE THE LAST MODULE TO BE LINKED
;

GLOBAL  SIGMAS

;
;
SIGMAS  DEFB    00      ;PROM SIGNATURE
;
;
        END
```

We claim:

1. In a telephone system including branching means for switching signals on an incoming telephone line between a plurality of extension telephone lines and a plurality of means for receiving paging code signals, each receiving means being responsive to a particular paging code signal, the improvement comprising:
   means for selecting a plurality of extension telephone lines;
   means for detecting signals directed to selected extension lines representing a call;
   means for storing a plurality of signals representing different paging codes, wherein each paging code signal distinctively corresponds to one of the selected extension lines and a receiving means;
   means for identifying the paging code signal corresponding to the selected extension line for which the detecting means detected a call signal; and
   means for transmitting the identified paging code signal to a plurality of the receiving means.

2. The invention of claim 1 wherein the branching means includes means for transferring a call from one extension line to a different predetermined extension line after a predetermined number of ring signals.

3. The invention of claim 1 wherein the branching means includes means for allowing an extension line to access another extension line.

4. In a telephone system including branching means for switching signals on an incoming telephone line between a plurality of extension telephone lines and for holding a call on an extension line and a plurality of means for receiving paging code signals, each receiving means being responsive to a particular paging code signal, the improvement comprising:
   means for selecting a plurality of extension lines;
   a detection means connected to each selected extension line for sensing signals representing telephone rings;
   means for storing a plurality of signals representing different paging codes, wherein each paging code signal distinctively corresponds to one of the selected extension lines and a receiving means;
   control means for sending control signals to the branching means to hold a call on an extension line when the detection means senses a predetermined number of ring signals on the extension line;
   means for identifying the paging code signal corresponding to the selected extension line on which the detection means has sensed a predetermined number of ring signals; and
   means for transmitting the identified paging signal to a plurality of the receiving means.

5. The invention of claim 4 wherein the detection means is optically isolated from the branching means.

6. The invention of claim 4 wherein the control means includes relay means for sending a first control signal to the branching means, when the detection means senses a predetermined number of ring signals on the extension line, to prepare the branching means to receive a second control signal.

7. The invention of claim 6 wherein the control means further includes a tone generator means for sending a second control signal to the branching means to place the call on hold.

8. The invention of claim 4 wherein the branching means includes means for allowing an extension line to access another extension line.

9. In a telephone system including branching means for switching signals on an incoming telephone line between a plurality of extension telephone lines amd a plurality of means for producing paging signals in response to paging code signals, wherein each producing means is responsive to a particular paging code signal, the improvement comprising:
   means for selecting a plurality of extension lines for subscribers and one extension line for command signals;
   a separate ring detection means connected to each subscriber line and to the command line for sensing signals representing telephone rings;
   a code detection means connected to the command line to sense signals representing instructions;
   means for storing a plurality of signals representing different paging codes and commands, wherein each paging code signal distinctively corresponds to one of the subscriber lines or an instruction signal and each command signal corresponds to a ring signal on the command line or an instruction signal;
   means for identifying the paging code signal corresponding to the subscriber line on which the ring detection means has sensed a predetermined number of ring signals or to an instruction signal, and for identifying the command signal corresponding to a ring signal, when the ring detection means has detected a predetermined number of ring signals on the command line, or an instruction signal sensed by the code detection means;
   control means for sending identified command signals to the branching means; and
   means for transmitting the identified paging signals to a plurality of the producing means.

10. The invention of claim 9 wherein the identification means identifies a first command signal when the ring detection means senses a predetermined number of ring signals on the command line.

11. The invention of claim 10 wherein the identification means identifies a second command signal when the code detection means senses a first instruction signal.

12. The invention of claim 11 further comprising means cooperating with the identifying means for enabling a paging code signal when the code detection means senses a second instruction signal on the command line.

13. The invention of claim 11 further comprising means cooperating with the identifying means for disabling a paging code signal when the code detection means senses a second instruction signal on the command line.

14. The invention of claim 11 wherein the identifying means identifies a first paging code signal corresponding to a first instruction signal sensed by the code detection means and a second paging code signal corresponding to a second instruction signal sensed by the code detection means.

15. The invention of claim 10 wherein the identifying means identifies a paging code signal corresponding to the first instruction signal sensed by the code detection means.

16. A telephone paging method comprising:
   selecting a plurality of extension telephone lines on a branching means for switching signals on an incoming telephone line between a plurality of extension lines;
   detecting signals representing rings on the selected extension lines;
   parking a call on the branching means when a ring signal is detected on an extension line;
   storing a plurality of signals representing different paging codes, wherein each paging code signal distinctively corresponds to a selected extension line;
   identifying the paging code signal corresponding to the selected extension line on which a predetermined number of ring signals has been detected; and
   transmitting the identified paging code signal to a plurality of means for producing paging signals in response to different paging code signals.

17. A telephone paging method comprising:
   selecting a plurality of extension telephone lines on a branching means for switching signals on an incoming telephone line between a plurality of extension lines;
   detecting signals representing calls to the selected extension lines;
   storing a plurality of signals representing different paging codes, wherein each paging code signal distinctively corresponds to a selected extension line;
   identifying the paging code signal corresponding to the selected extension line for which a call signal has been detected; and
   transmitting the identified paging code signal to a plurality of means for producing paging signals in response to different paging code signals.

18. A telephone paging method comprising:
   selecting a plurality of telephone extension lines for subscribers on a branching means for switching signals on an incoming telephone line between a plurality of extension lines;
   selecting an extension line on the branching means for command signals;
   detecting signals representing rings on the subscriber extension lines and the command extension line;
   detecting signals representing instructions on the command line;
   storing a plurality of signals representing different paging codes and commands, wherein each paging code signal corresponds to a predetermined selected subscriber extension line or instruction signal and each command signal corresponds to a ring signal on the command extension line or predetermined instruction signal;
   identifying the stored command signal corresponding to a ring signal when a predetermined number of ring signals has been detected on the command extension line or an instruction signal which as been detected;
   identifying the stored paging code signal corresponding to the subscriber extension line upon which a predetermined number of ring signals has been detected or an instruction signal which has been detected;
   sending identified command signals to the branching means; and
   transmitting the identified paging code signals to a plurality of means for producing paging signals in response to different paging code signals.

19. The invention of claim 18 wherein the sending an identified command signal step includes sending a first command signal to the branching means in response to detecting a predetermined number of ring signals on the command extension line.

20. The invention of claim 19 wherein the sending an identified command signal step further includes sending a second command signal to the branching means in response to detecting a first instruction signal on the command extension line.

21. The invention of claim 20 further comprising enabling a paging code signal in response to detecting a second instruction signal on the command extension line.

22. The invention of claim 20 further comprising disabling a paging code signal in response to detecting a second instruction signal on the command extension line.

23. The invention of claim 19 wherein the identifying a stored paging code signal step includes identifying a paging code signal in response to detecting a first instruction signal on the command line.

24. The invention of claim 20 wherein the identifying a stored paging code signal step includes identifying a first paging code signal in response to detecting a first instruction signal on the command extension line and a second paging code signal in response to detecting a second instruction signal on the command line.

25. A telephone paging system comprising:
means for detecting telephone call signals directed to one or more telephone lines; and
means for transmitting a paging code signal that distinctively corresponds to the telephone line for which a call signal has been detected, the paging code signal being operative to activate a remote paging device.

26. A telephone paging system comprising:
means for detecting a telephone call directed to one or more telephone lines;
means for transmitting a paging code signal that distinctively corresponds to the telephone line for which a telephone call has been detected, the paging code signal being operative to activate a remote paging device; and
means for allowing the detected telephone call to be received at a telephone line other than the one upon which the telephone call has been detected.

27. A telephone paging system comprising:
means for detecting a telephone call directed to one or more telephone lines;
means for transmitting a paging code signal that distinctively corresponds to the telephone line for which a telephone call has been detected, the paging code signal being operative to activate a remote paging device;
means for automatically sustaining a telephone call while the transmitting means transmits the paging code signal; and
means for allowing a sustained telephone call to be accessed from a telephone line other than the one for which the telephone call was detected.

28. The invention of claim 27 further including means for enabling or disabling the transmitting means with respect to a particular telephone line.

29. The invention of claim 28 wherein the enabling or disabling means is controlled through a telephone line.

30. The invention of claim 27 further including means for selecting and initiating transmission of a particular paging code signal to a remote paging unit, from one telephone line via another telephone line.

31. A telephone paging system comprising:
means for detecting telephone call signals directed to one or more telephone lines;
means for transmitting a paging code signal that distinctively corresponds to the telephone line for which telephone call signals have been detected, the paging code signal being operative to activate a remote paging device;
means for automatically holding telephone call signals while the transmitting means transmits a paging code signal; and
means for allowing held telephone call signals to be accessed from a telephone line other than the one for which the telephone call signals have been detected.

32. The invention of claim 31 further including means for enabling or disabling the transmitting means with respect to a particular telephone line.

33. The invention of claim 32 wherein the enabling or disabling means is controlled through a telephone line.

34. The invention of claim 31 further including means for selecting and initiating the transmission of a particular paging code signal to a remote paging unit, from one telephone line via another telephone line.

35. The invention of claim 31 further comprising means for directing telephone call signals to one or more telephone lines.

36. A telephone paging system comprising:
means for detecting telephone call signals directed to one or more telephone lines;
means for transmitting a paging code signal that distinctively corresponds to the telephone line for which telephone call signals have been detected, the paging code signal being operative to activate a remote paging device;
means for automatically continuing telephone call signals while the transmitting means transmits a paging code signal; and
means for allowing continued telephone call signals to be accessed from a telephone line other than the one for which the telephone call signals have been detected.

37. The invention of claim 36 further including means for enabling or disabling the transmitting means with respect to a particular telephone line.

38. The invention of claim 37 wherein the enabling or disabling means is controlled through a telephone line.

39. The invention of claim 36 further including means for selecting and initiating the transmission of a particular paging code signal to a remote paging unit, from one telephone line via another telephone line.

40. The invention of claim 36 further comprising means for directing telephone call signals to one or more telephone lines.

41. A telephone paging system comprising:
means for detecting telephone call signals on a telephone line;
means for detecting instruction signals on the telephone line;
means for sending command signals over the telephone line when a predetermined number of call signals or instruction signals have been detected on the telephone line; and
means for selecting and sending a particular paging code signal to a remote paging unit via the telephone line in response to a predetermined instruction signal sent from another telephone line.

* * * * *

UNITED STATES PATENT AND TRADEMARK OFFICE
CERTIFICATE OF CORRECTION

PATENT NO. : 4,642,425
DATED : February 10, 1987
INVENTOR(S) : William H. Guinn et al.

It is certified that error appears in the above-identified patent and that said Letters Patent is hereby corrected as shown below:

IN THE BACKGROUND OF THE INVENTION

In column 1, line 13, please delete "known" and substitute therefor --know--.

In column 1, line 14, please delete "to" ($1^{st}$ occurr.) and substitute therefor --or--.

In column 2, line 12, please delete "codes" and substitute therefore --code--.

In column 5, line 51, after "84" please insert --,--.

In column 6, line 4, after "designed" please insert --to-.

In column 6, line 12, please delete "Ziolg" and substitute therefor --Zilog--.

In column 6, line 12, please delete "no" and substitute therefor --no.--.

In column 6, line 56, please delete "8.2K" and substitute therefor --8.2 K--.

In column 7, line 37, please delete "53" and substitute therefor --54--.

In column 8, line 22, please delete "of" and substitute therefor --to--.

UNITED STATES PATENT AND TRADEMARK OFFICE
CERTIFICATE OF CORRECTION

PATENT NO. : 4,642,425

DATED : February 10, 1987

INVENTOR(S) : William H. Guinn et al.

It is certified that error appears in the above-identified patent and that said Letters Patent is hereby corrected as shown below:

In column 8, line 51, please delete "lone" and substitute therefor --long--.

In column 9, line 34, please delete "posesses" and substitute therefor --processes--.

In column 10, line 8, please delete "second" and substitute therefor --section--.

In column 10, line 44, after "is" please delete --in--.

In column 11, line 34, after "amount" please insert --of--.

In column 11, line 50, after "signal" please insert --to--.

In column 13, line 37, please delete "of" and substitute therefor --on--.

UNITED STATES PATENT AND TRADEMARK OFFICE
CERTIFICATE OF CORRECTION

PATENT NO. : 4,642,425

DATED : February 10, 1987

INVENTOR(S) : William H. Guinn et al.

It is certified that error appears in the above-identified patent and that said Letters Patent is hereby corrected as shown below:

IN THE CLAIMS

In column 325, line 6, after "lines" please delete --amd-- and substitute therefor --and--.

In column 326, line 56, please delete "as" and substitute therefor --has--.

Signed and Sealed this

Eighteenth Day of April, 1989

Attest:

DONALD J. QUIGG

Attesting Officer

Commissioner of Patents and Trademarks